United States Patent
Smith et al.

(10) Patent No.: US 11,119,905 B2
(45) Date of Patent: Sep. 14, 2021

(54) SYSTEM AND METHOD FOR MANAGING ELECTRONIC ASSETS

(71) Applicant: Certicom Corp., Mississauga (CA)

(72) Inventors: Keelan Smith, Toronto (CA); Richard Gwynn Jones, San Diego, CA (US); Chinh Khac Nguyen, Toronto (CA); Thomas Rudolf Stiemerling, Toronto (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/508,073

(22) Filed: Jul. 10, 2019

(65) Prior Publication Data

US 2019/0370159 A1    Dec. 5, 2019

Related U.S. Application Data

(63) Continuation of application No. 14/734,467, filed on Jun. 9, 2015, now Pat. No. 10,380,007, which is a
(Continued)

(51) Int. Cl.
*G06F 11/36* (2006.01)
*G06F 21/00* (2013.01)
(Continued)

(52) U.S. Cl.
CPC ............ *G06F 11/3688* (2013.01); *G06F 8/70* (2013.01); *G06F 9/54* (2013.01); *G06F 21/00* (2013.01);
(Continued)

(58) Field of Classification Search
None
See application file for complete search history.

(56) References Cited

U.S. PATENT DOCUMENTS 6,041,035 A    3/2000 Thedens
6,333,931 B1   12/2001 Lapier et al.
(Continued)

FOREIGN PATENT DOCUMENTS

CA    1298659    4/1992
CA    2297935    2/1999
(Continued)

OTHER PUBLICATIONS

Page et al., "Design Education with Support of a Virtual Learning Environment", Journal of Asia Pacific Design Forum vol. 32006.11, pp. 89-95, 2006 (Year: 2006).*
(Continued)

*Primary Examiner* — Thomas L Mansfield
(74) *Attorney, Agent, or Firm* — Fish & Richardson P.C.

(57) ABSTRACT

An asset management system is provided which comprises one or more controllers, which operate as main servers and can be located at the headquarters of an electronic device manufacturer to remotely control their operations at any global location. The controller can communicate remotely over the Internet or other network to control one or more secondary or remote servers, herein referred to as appliances. The appliances can be situated at different manufacturing, testing or distribution sites. The controller and appliances comprise hardware security modules (HSMs) to perform sensitive and high trust computations, store sensitive information such as private keys, perform other cryptographic operations, and establish secure connections between components. The HSMs are used to create secure end-points between the controller and the appliance and between the appliance and the secure point of trust in an asset control core embedded in a device.

12 Claims, 73 Drawing Sheets

Related U.S. Application Data continuation of application No. 12/834,804, filed on Jul. 12, 2010, now Pat. No. 9,111,098.

(60) Provisional application No. 61/224,823, filed on Jul. 10, 2009.

(51) Int. Cl.
*G06Q 10/06* (2012.01)
*G06Q 50/04* (2012.01)
*G06F 21/57* (2013.01)
*G06F 8/70* (2018.01)
*G06F 9/54* (2006.01)

(52) U.S. Cl.
CPC ............. *G06F 21/57* (2013.01); *G06Q 10/06* (2013.01); *G06Q 50/04* (2013.01); *Y02P 90/30* (2015.11)

(56) References Cited

U.S. PATENT DOCUMENTS

| | | | |
|---|---|---|---|
| 6,966,002 B1 | 11/2005 | Torrubia-Saez | |
| 7,430,670 B1* | 9/2008 | Horning | G06F 21/14 713/190 |
| 7,813,822 B1* | 10/2010 | Hoffberg | G06K 9/00369 381/73.1 |
| 7,933,950 B1 | 4/2011 | Barton et al. | |
| 7,996,631 B1 | 8/2011 | Bender et al. | |
| 8,320,556 B1 | 11/2012 | Bortz et al. | |
| 9,111,098 B2 | 8/2015 | Smith et al. | |
| 10,380,007 B2 | 8/2019 | Smith et al. | |
| 2002/0169976 A1 | 11/2002 | Schelling et al. | |
| 2003/0110382 A1 | 6/2003 | Leporini et al. | |
| 2004/0127196 A1 | 7/2004 | Dabbish et al. | |
| 2004/0177243 A1 | 9/2004 | Worley | |
| 2005/0097555 A1 | 5/2005 | Tuel | |
| 2005/0160319 A1* | 7/2005 | Marcak | G06F 11/2289 714/32 |
| 2006/0131743 A1 | 6/2006 | Erickson et al. | |
| 2006/0286489 A1 | 12/2006 | Duffield et al. | |
| 2007/0214030 A1* | 9/2007 | Shear | G06Q 20/3674 705/345 |
| 2008/0040550 A1 | 2/2008 | Lindner | |
| 2008/0044026 A1 | 2/2008 | Walters et al. | |
| 2008/0222532 A1 | 9/2008 | Mester et al. | |
| 2009/0007101 A1* | 1/2009 | Azar | G06F 9/4881 718/1 |
| 2009/0102505 A1 | 4/2009 | Anderson et al. | |
| 2009/0187783 A1* | 7/2009 | Hansen | G06F 1/3203 713/340 |
| 2010/0174759 A1* | 7/2010 | Piccinini | G06Q 10/00 707/805 |
| 2011/0010720 A1 | 1/2011 | Smith et al. | |
| 2013/0042007 A1* | 2/2013 | Linton | G09B 19/00 709/226 |
| 2015/0309921 A1 | 10/2015 | Smith et al. | |

FOREIGN PATENT DOCUMENTS

| | | |
|---|---|---|
| CA | 2303297 | 3/1999 |
| CA | 2166808 | 5/2000 |
| CA | 2439007 | 9/2002 |
| CA | 2684229 | 10/2008 |
| CN | 101014173 | 8/2007 |
| CN | 101072129 | 11/2007 |
| CN | 101261518 | 9/2008 |
| EP | 0994419 | 4/2000 |
| JP | 200758408 | 3/2007 |
| JP | 2007122106 | 5/2007 |
| JP | 200965256 | 3/2009 |
| WO | 99/14881 | 3/1999 |
| WO | 03/048906 | 6/2003 |
| WO | 2003048906 | 6/2003 |
| WO | 03/077498 | 9/2003 |
| WO | 2003077498 | 9/2003 |
| WO | 2006127475 | 11/2006 |
| WO | 2006133545 | 12/2006 |
| WO | 20060133545 | 12/2006 |
| WO | 2007056712 | 5/2007 |
| WO | 20070056712 | 5/2007 |
| WO | 2007098584 | 9/2007 |
| WO | 2009073969 | 6/2009 |
| WO | 2010057312 | 5/2010 |

OTHER PUBLICATIONS

Decision to refuse a European Patent application for European Patent Application No. 15180403.6 dated Oct. 2, 2018.

Certicom's Bulleting of Security and Cryptography, Code&Cipher, vol. 1, No. 2; copyright 2003; http://www.certicom.com/index.php/code-and-cipher-vol-1-no-2.

Certicom KeyInject datasheet; 2005; http://www.certicom.com/imagegs/pdfs/KI_datasheet.pdf; Certicom Corp.

Injecting Trust to Protect Revenue and Reputation: A Key Injection System for Anti-Cloning, Conditional Access and DRM Schemes; Certicom Technical Overview; Oct. 2005, Certicom KeyInject; http://www.certicom.com/images.pdfs/Certicom_KeyInject_technical_paper.pdf; Certicom Corp.

Certicom Asset Management Data System, "Certicom AMS KeyInject Module for HDCP Features", Data Sheet, 2007, http://www.certicom.com/images/pdfs/ds-ams-ki-o8%202.pdf.

English Abstract for JP2007058408 published Mar. 8, 2007 and retrieved on Sep. 24, 2013.3.

Rawlings, C., Kilopass Technology Inc. White Paper; "Raising the Bar for Hardware Security: Physical Layer Security in Standard CMOS", Mar. 3, 2008; 2008 IEEE Conference on Technologies for Homeland Security; pp. 263-268.

"Anti-cloning protection for conditional access and DRM systems"; Jun. 7, 2008; Certicom; archived online: Certicom KeyInject; http://web.archive.org/web/20080607014958/http:/www.certicom.com/index.php/certicom-keyinject; this reference establishes the date of the availability of the Certicom technical overview and application note cited above.

Defending Against Grey-Market Fraud: protecting your business and your brand; Certicom Studies in Self-Defense; Certicom Application Note; Jun. 7, 2008, last modified Feb. 2, 2007; online: Certicom KeyInject; http://www.certicom.com/images.pdfs/GreyMarketAppNote-final.pdf; Certicom Corp.

Hemmendinger, D., Encyclopedia of Computer Science; 4th Ed., ed. by Ralston, Anthony et al.; s.v. "concurrent programming"; Jul. 2008; Nature Publishing Group; London, U.K.

"Introduction to GS1 DataMatrix"; Issue 1.14; Jul. 2008; online: GSI—the global language of business; http://www.gs1.no/sfiles/65/85/7/file/gs1_datamatrix_introduction_and_technical_overview.pdf.

Certicom AMS press release; "Certicom Announces Comprehensive System to Lower Inventory and Supply Chain Costs for Chip Manufacturers"; Published Nov. 9, 2008 and retrieved on May 23, 2013.

GS1 Standards Document—Global Traceability Standard for Healthcare; Issue 1.0.0; Feb. 2009; online: GS1 Standards | Healthcare | Sectors | GS1—the global language of business; http://www.gs1.org/docs/gsmp/traceability/Global_Traceability_Standard_Healthcare.pdf.

Rawlings, C., Product Authentication Certicom AMS: NIST Product Authentication Information Management Workshop; Feb. 17-18, 2009; http:www.dom.semi.org/web/wstandards.nsf/6FCC4417E3638E7F8825756800829C35/$file/NIST_PA_WrkGrp_CerticomAMS.pdf.

English Abstract for JP2009065256 published Mar. 26, 2009 and retrieved on Sep. 24, 2013.

Axway Datasheet, "Axway Track & Trace for Diversion Detection", Jun. 18, 2009; online; Business & Supply Chain Logistics Management—Axway Trace & Trace | Axway—Global; http://www.axway.com/sites/default/files/repository/Datasheet_TrackAndTrace_DiversionDetection.pdf.

(56) References Cited

OTHER PUBLICATIONS

Rawlings, C., "Securing SoC Platform Oriented Architectures with a Hardware Root of Trust"; Jul. 6, 2009; http://www.embedded.com/design/embeddeddsp/218400593.
Search Report from PCT Application No. PCT/CA2009/001686; search completed Mar. 4, 2010.
Search Report from PCT Application No. PCT/CA2010/001077; search completed Sep. 21, 2010.
Search Report from PCT Application No. PCT/CA2010/001075; search completed Sep. 28, 2010.
Office Action dated Aug. 28, 2012, received for U.S. Appl. No. 12/834,804.
Office Action dated Feb. 20, 2013, received for U.S. Appl. No. 12/834,804.
Office Action dated Sep. 24, 2013, in corresponding Japanese patent application No. 2012-518713.
English translation of the Office Action dated Sep. 24,2013, in corresponding Japanese patent application No. 2012-518713.
Office Action dated Sep. 30, 2013, received for U.S. Appl. No. 12/834,804.
Extended European Search report dated Nov. 27, 2013, in corresponding European Application No. 39827092.9.
Office Action dated Feb. 5, 2014, received for U.S. Appl. No. 12/834,804.
European Examination Report dated Feb. 10, 2015, received for European Application No. 10796631.9.
"Defending Against Grey-market Fraud: protecting your business and your brand", Internet Citation, Feb. 2, 2006, pp. 1-4, XP))8150418, retrieved from the Internet: URL:httpp:www.certicom.com/images/pdfs/GreyMarketAppNote-final.pdf, retrieved on Apr. 2, 2012.
Certicom KeyInjectTM press release: "Certicom KeyInject"; published on Nov. 25, 2008 and retrieved on May 23, 2013; Certicom Corp.
Tsagaris, Nicholas; Search report from PCT Application No. PCT/CA2009/001686; search completed Mar. 4, 2011.
Mattheson, Leigh; Search Report from PCT Application No. PCT/CA2010/001076; search completed Sep. 15, 2010.
Mattheson, Leigh; Seaerch Report from PCT Application No. PCT/CA2010/001077; search completed Sep. 21, 2010.

\* cited by examiner

SYSTEM AND METHOD FOR MANAGING ELECTRONIC ASSETS

This application claims priority to prior U.S. patent application Ser. No. 14/734,467 filed on Jun. 9, 2015, now U.S. Patent Number [Issue fee paid], which claims priority to U.S. patent application Ser. No. 12/834,804 filed on Jul. 12, 2010 (the first business day after Jul. 10, 2010), now U.S. Pat. No. 9,111,098, which claims priority from prior U.S. Provisional Application No. 61/224,823 filed on Jul. 10, 2009, the contents of which are incorporated herein by reference.

TECHNICAL FIELD

The following relates to a system and method for managing electronic assets.

BACKGROUND

There are various elements in a manufacturing process that can create what is considered "waste". Such elements may include defects, inventory (excessive, redundant, etc.), over-production, over-processing, movement, transportation, and waiting. Additionally, there are costs that can be attributed to external causes such as cloning, copying, technology transfer, and theft (both physical and IP theft).

Also, at the heart of a wide variety of consumer and commercial products today is a System-on-Chip (SoC) where many features are integrated on a single silicon die. Manufacturers may use the same SoC in different platforms with various features enabled/disabled in order to differentiate the final products in the market. Unauthorized enablement of features represents significant revenue loss to companies.

Traditional methods of feature programming include: outright customization of the SoC silicon through different mask sets; the use of silicon fuses that may be selectively "blown" to control a feature; the use of jumper wires on motherboards; and the loading of different components and firmware per product.

The provisioning of features occurs in a variety of manufacturing locations whose facilities perform a range of production steps including wafer fabrication for chips, assembly, packaging, test, and system integration where components and firmware are integrated into a final product or assembly. These manufacturing locations are typically overseas and out of the control of the semiconductor company outsourcing the contract manufacturing to these facilities. As a result, there is little reason for the semiconductor company to trust the distributed manufacturing facility to manage the distribution and collection of proprietary and sensitive data such as feature provisioning commands, content protection key data, software/firmware code images, test results and yield reporting data.

Given the value such SoCs have, and the trend for semiconductor companies to outsource manufacturing, assembly and distribution of their products, several new problems begin to emerge due to the lack of trusted manufacturing processes.

BRIEF DESCRIPTION OF THE DRAWINGS

Embodiments will now be described by way of example only with reference to the appended drawings wherein.

DETAILED DESCRIPTION OF THE DRAWINGS

A problem with traditional approaches to feature programming is that they need to be done in a trusted environment, can be costly to make changes, and typically cannot be readily undone.

Also, it has been recognized that counterfeit or discarded chips are being treated as new products with no way of differentiating between legitimate and illegitimate parts. In some cases, defective chips designated to be destroyed are somehow being recycled back into the production line, while good devices are siphoned off and replaced by cheap competitor or non-compatible chips. As a result, chip vendors are beginning to see their brand being diluted while the cost of warranty increases as these unofficial chips are returned for failing to meet specification.

Another problem arises when considering the proliferation of content protection schemes designed to protect the commercial rights of digital media owners. These content protection schemes require that unique per device key data be programmed into each device somewhere in the manufacturing process. As a licensee of these content protection schemes, semiconductor manufacturers become liable for the content protection key data and need to protect that data as it is distributed throughout their untrusted manufacturing operation.

As semiconductor manufacturers begin to leverage the distributed manufacturing model, they lose direct control of proprietary device and manufacturing data to the distributed manufacturing operation. In addition to content protection key data, other outbound forms of proprietary data, like feature provisioning commands, software/firmware instruction/machine code, and device personalization data must be distributed and stored throughout the untrusted manufacturing operation. Proprietary manufacturing data also needs to be stored at and collected from the untrusted distributed manufacturing operation by the semiconductor company. The inbound proprietary manufacturing data could exist as test reports/programs, process data and yield management data.

Opportunities to increase the bottom line in a given manufacturing process may exist by obtaining competitive advantages through the secure management of digital assets. In the following, a system is described that provides a solution framework that may be used to reduce the above-noted wastes and obtain competitive advantages in various applications. The system to be described comprises several software and hardware components that are deployed and integrated into the manufacturing process across multiple physical locations. In this way, a manufacturing platform is created that can provide a comprehensive infrastructure solution.

Asset Management System (AMS)

Figure 1:
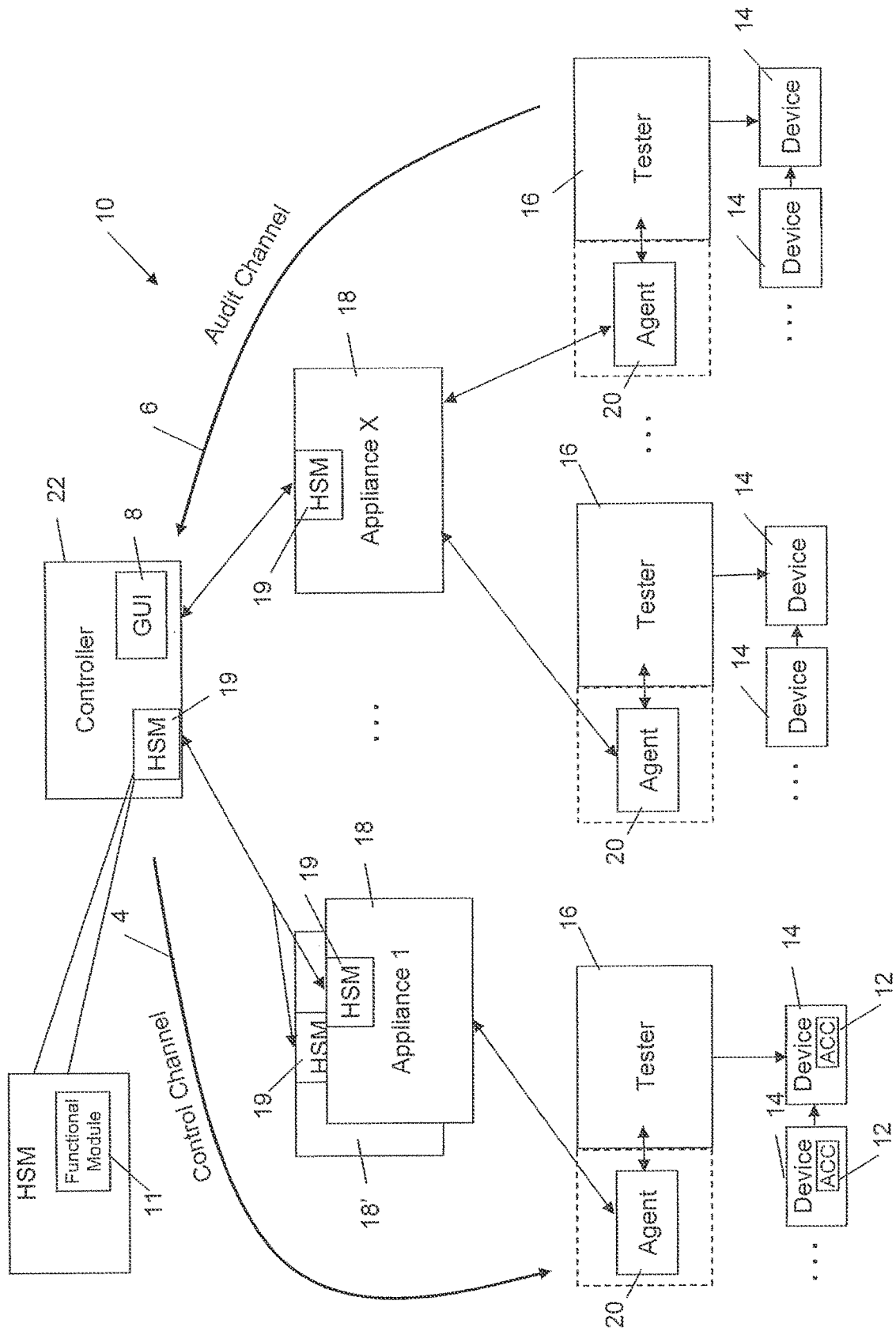
FIG. 1 is a block diagram of an asset management system (AMS).

The manufacturing platform noted above may be referred to herein as an asset management system (AMS) and will be denoted by numeral 10 as shown in FIG. 1. The AMS 10 is a customizable solution that can be adapted to accommodate various services. For example, as discussed below, the AMS 10 can be configured to perform one or more of serialization, key injection, and feature activation by controlling the provision of corresponding assets. An asset may therefore refer to any digital data that is to be added, applied to, associated with, or otherwise bound to a device 14. A device 14 can be any component or item that is capable of utilizing such assets. For example, a device 14 may represent a chip, circuit board, electronic consumer device, computer, processor, memory, etc. The AMS 10 creates a control channel 4 to control the provision or injection of an asset into a device 14, and an audit channel 6 to enforce the collection of logging data to track the distribution and use of the assets. The components of the AMS 10 which will be described below can be distributed globally, implemented locally, or any configuration comprising both remote and local components. The AMS 10 enables a company to manage and control sensitive manufacturing processes across a global, outsourced manufacturing environment.

The AMS 10 comprises one or more controllers 22, which operate as main servers and can be located at the headquarters of an electronic device manufacturer to remotely control their operations at any global location. The controller 22 can communicate remotely over the Internet or other network (not shown) to control one or more secondary or remote servers, herein referred to as appliances 18. The appliances 18 can be situated at different manufacturing, testing or distribution sites. The controller 22 and appliances 18 comprise hardware security modules (HSMs) 19 to perform sensitive and high trust computations, store sensitive information such as private keys, perform other cryptographic operations, and establish secure connections between components. The HSMs 19 are used to create secure end-points between the controller 22 and the appliance 18 and between the appliance 18 and the secure point of trust in the asset control core (ACC) 12 embedded in a device 14. The HSM 19 can be a standard off-the-shelf component that provides the ability to add a functional module (FM) 11 comprising source code to perform additional secure operations. For example, as will be explained further below, the AMS 10 enables the metering of credits for assets that are consumed and the HSM 19 when utilizing the FM 11 allows such metering to be performed securely within the secure boundary created by the HSM 19. The use of the FM 11 provides greater flexibility in which operations can be performed in a trusted and secure manner, e.g. in addition to encryption and signing. The FM 11 also provides greater flexibility in which protocols can be utilized, e.g. the ECMQV protocol used to communicate with the ACC 12 (discussed later).

The controller 22 also provides a graphical user interface (GUI) 8 to enable administrators, operators, and other users to interface with the controller 22, the appliances 18, and the wider AMS 10. The appliance 18 communicates with one or more agents 20, wherein each agent 20 is integrated into a test script or other production routine using an agent application programming interface (API) 21 and in some embodiments a daemon API 23 that places the agent's role in a separate process outside of the tester 16 and its application (see FIG. 6B discussed later). The test script or production routine is typically a custom application that is loaded onto a tester 16 on a manufacturing line. It will be appreciated that the term "tester" may represent any manufacturing or production equipment that is used to inject or otherwise provide an electronic asset to a device 14. Typically, an appliance 18 is located at a production site which may be in the same physical location as the tester 16 or may instead be remote thereto and connected over a LAN, WAN or other network (not shown). As illustrated in FIG. 1, the appliance 18 can be deployed in a redundant architecture (i.e. with additional appliance 18') to ensure that if the primary or master appliance 18 malfunctions or goes offline, the additional appliance 18' is provisioned to take over and minimize production downtime. In some embodiments, the AMS 10 may utilize an ACC 12 embedded on the device 14 for establishing secure communications between the appliance 18 and the device 14, through the agent 20.

Using the AMS 10, a system of factory provisioning can be created and deployed, which can lead to a reduction in revenue loss and can open new revenue sharing opportunities with partners and downstream customers. The AMS 10 can also improve overall security and brand protection throughout the manufacturing process, in particular when outsourced contractors are used to produce high margin devices. Such revenue loss reduction in the manufacturing and distribution processes can be accomplished by: using the AMS 10 to help prevent unauthorized activation of features in semiconductors and other electronic devices 14, reducing over-production, reducing inventory and supply chain costs, enabling strong built-in revenue and brand protection measures, and opening new opportunities to profit from after-market revenue potential.

Figure 2:
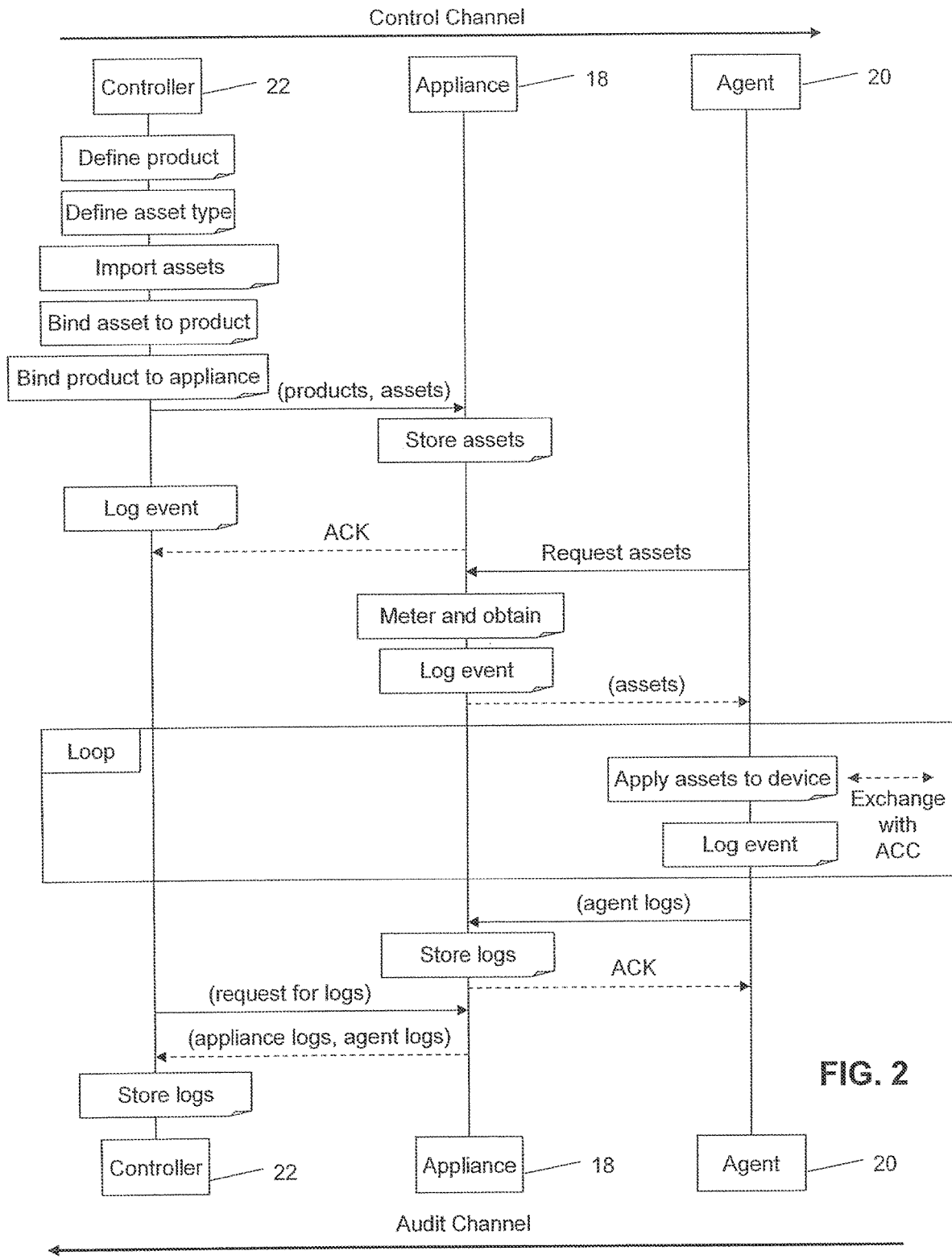
FIG. 2 a sequence diagram showing example operations performed by the AMS in FIG. 1 for providing an asset to a device.

FIG. 2 illustrates how the controller 22, appliance 18, agent 20, and ACC 12 can be used to define, distribute, and apply an asset to a device 14 as well as collect log reports at various stages for auditing purposes. At the controller 22, the manufacturer (or owner of the asset to be provided) defines the product, namely the object utilizing a particular type of service being provided such as serialization, key injection, feature activation, etc. The controller 22 also defines the asset type which corresponds to the product and service being applied to the product. By having separate definitions for the assets and the products, a unique product name can enable multiple assets of different types to be delivered together in some embodiments. For example, a key can be delivered with a set of features to be activated or a key and a serial number can be delivered and injected at the same time. This saves time and bandwidth as the two assets would utilize the same instance of the control channel 4 to optimize delivery on a product-by-product basis.

A number of assets are generated, acquired or otherwise imported by the controller 22 and the assets are bound to the product which creates an association between the asset and product such that application of the service injects or adds the asset to the product and ultimately one or more devices 14 being produced for that product. The product is then bound to an appliance 18. The product can also be bound to more than one appliance 18 such that the AMS 10 can be configured to distribute assets of the product across the appliances 18. If the same type of device 14 is being produced at different facilities, different products can be created, one for each location. For example, a device 14 may be produced in several geographical locations, each having an appliance 18 at a different production facility. A product may then be created for each facility and bound to the corresponding appliance 18. It may be noted that an appliance 18 can service more than one agent 20 at more than one tester 16 and thus more than one product can be defined for the same appliance 18.

The controller 22 then provides the products and corresponding assets to the appliance 18, and these assets are stored and the products thus provisioned at the appliance 18. The controller 22 meanwhile logs the event of sending the products and the assets and waits for an acknowledgement from the appliance 18 of successful receipt and storage of the assets. The appliance 18 is configured to communicate with at least one agent 20. The agent 20 is configured to utilize the assets in a production or distribution stage. The agent 20 thus requests assets that it needs to perform this stage. The appliance 18 meters and obtains an appropriate number of assets and logs this event to record the allocation of assets to a particular agent 20 (and thus a particular tester 16). The assets are then provided to the agent 20. The agent 20 may then begin a loop that includes applying an asset and logging this event for each device 14 that it operates on. It can be seen that when an ACC 12 is used, an exchange with the ACC 12 is performed, details of which are provided below. At some point, e.g. upon hitting a log threshold, the agent 20 provides a set of agent logs to the appliance 18, and the appliance 18 stores the logs. In other embodiments, the appliance 18 may request logs from the agent 20. The controller 22 at some later point (e.g. during a synchronization operation) then requests logs for products associated with the appliance 18, and the appliance logs and agent logs, both stored by the appliance 18 are provided to the controller 22. The controller 22 may then store the logs and make them available for auditing and other post-processing or analyses of the data contained therein. By controlling the distribution in one direction and enforcing the logging of events and collection of same in the other direction, the AMS 10 is able to provide control over the manufacturing process.

As discussed above, the AMS 10 can be configured to provide various services such as serialization, key injection, and feature activation. These services can be implemented using the control and auditing channels exemplified in general in FIG. 2. In order to configure the components of the AMS 10 for these various services, the controller 22, appliance 18, agent 20, and ACC 12 should have certain capabilities. Further detail of these components will now be described, making reference to FIGS. 3 to 6.

Figure 3:
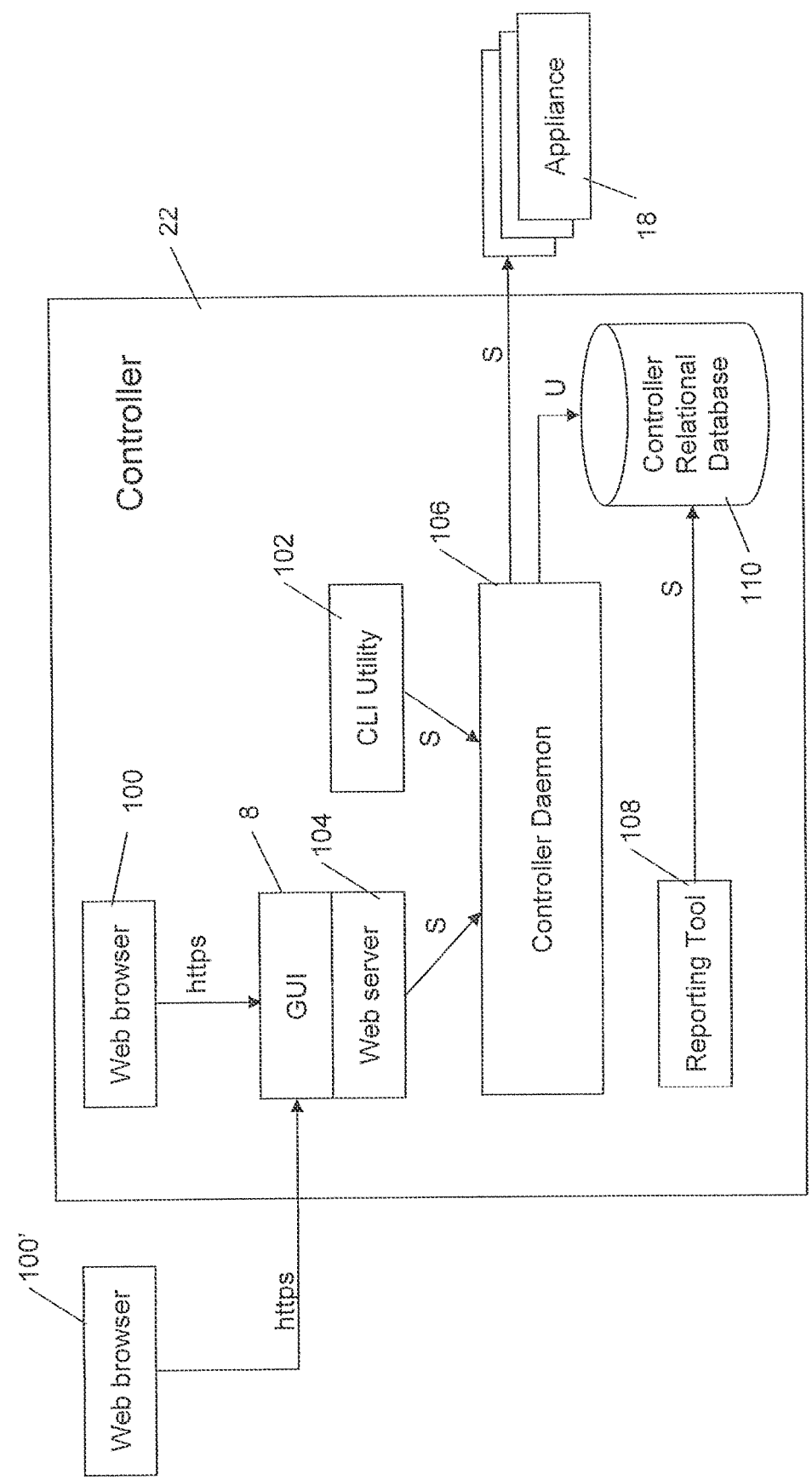
FIG. 3 is a block diagram showing details of one embodiment for the controller shown in FIG. 1.

The controller 22 is shown in greater detail in FIG. 3. The controller 22 can be implemented as a security hardened, rack-mounted system which can be accessed through a web interface from a standard web browser 100, 100'. As seen in FIG. 3, the controller 22 includes the GUI 8 which can be accessed by a web browser 100 at the controller 22 or remotely 100'. The GUI 8 sits on top of a web server 104 that utilizes a controller daemon 106 to communicate securely (denoted by S) with the appliance(s) 18 and typically without security (denoted by U) with the database 110. A reporting tool 108 can also securely access a relational database 110 to obtain logging and other data for the purpose of generating reports. Service requests from the reporting tool 108 or any similar application can be made to access data in the database 110. A database schema is utilized for efficient storage of logs, efficient storage of data as required by service modules, and for efficient lookups of data as required by the service modules. Custom log data from all services modules can be exported from the database 110.

Before an appliance 18 is deleted, the controller 22 should synchronize with the appliance 18 to ensure that all logs have been collected. The controller 22 in this example also supports a command line interface (CLI) utility 102 that operates with the controller daemon 106. The CLI utility 102, if utilized, should provide similar functionality as the GUI 8.

The controller 22 synchronizes appliances 18 automatically at specified time intervals to make sure that any service-related assets are at their specified maximum amounts, i.e. the controller 22 ensures that the appliance 18 has the assets it needs to operate as intended. A read only sync mode can be provided to query current credit levels without topping up any credits. The synchronization operation can also be used to send appliance configuration settings, and to retrieve logs from the appliance 18 as illustrated in FIG. 2. This enables the AMS 10 to support high speed manufacturing at each production site without interruption if connections are temporarily lost. The controller 22 can also issue alerts to specified e-mail addresses to inform operators of conditions that could stop production, ideally before those conditions result. The controller 22 issues an alert under several circumstances, such as: when the controller 22 is unable to contact an appliance 18, if there are any errors when the controller 22 sends data to an appliance 18 (and vice versa), when a synchronization operation has failed, when the number of assets in an appliance 18 reaches a specified warning level, when the free disk space on an appliance 18 reaches a minimum, and when an appliance 18 has blocked a connection from an agent 20—because the agent IP address is not in the list managed by the appliance 18. The management of these alerts can be performed through the GUI 8, described in more detail below.

The controller 22 is also used to monitor all jobs running in the AMS 10, such as synchronization operations and other long running tasks, the status of which can be monitored and their progress logged. Job information can be made available in the GUI 8. The controller 22 also enables operators to add and remove user roles. User roles can be assigned different levels of permission to access each of the components of the AMS 10. The logs generated by the AMS 10 are stored in the relational database 110.

The controller 22 in this example runs on server hardware, e.g. a Dell 2950 PowerEdge 2U rack mount server using a 2×Intel Xeon quad core 5300 processor @ 3 GHz. The controller 22 can also use a 110/220 V 750 W redundant power module, a DVD ROM, dual gigabit NICs, and a PCIe riser. The controller 22 requires initial provisioning, e.g. by an export PKCS10 request for HSM and SSL certificates, signing the certificates by a device certification authority (CA), and importing the SSL and HSM certificates into the HSM 19. It can be appreciated that any identity certificates unique to each HSM 19 can also be used. The controller 22 should enable general settings to be configured, such as name and SMTP settings for email alerts. Support for multiple user accounts should be provided and a per-user permissions matrix can be used to allow access to various parts of the AMS 10 to be granted or denied. In this way, different user roles can be defined and different permissions given to each user role on a per module basis. The permissions matrix should be configurable such that a customer can define such permissions and define the number of user roles to differentiate between users. The controller 22 enables and disables service modules to enable different service products to be defined, e.g. for serialization, key injection, feature activation, etc. The controller 22 can also configure general settings for an appliance 18, settings such as name, manufacturer, location, IP address, port number, socket retries, socket timeout, send/receive block sizes, and list of agents 20 authorized for that appliance 22.

The controller 22 synchronizes with each appliance 18 at configurable time intervals, e.g. every 30 minutes. However, the controller 22 also enables an operator to force a synchronization immediately if this is desired before the next scheduled sync. The controller 22 provides control over the AMS 10 and thus can authorize new appliances 18 before they are added. When shipped from a supplier, the appliances 18 should then be in a state requiring such authorization before use. Other provisioning of the appliance 18 by the controller 22 can also be performed once authorization has completed successfully. The controller 22 also implements a credit system in which the controller 22 issues credit to appliances 18. Whenever an appliance 18 consumes an asset by providing it to an agent 20 (as shown in FIG. 2), the credit is decremented. The operator can define warning, minimum and maximum levels and, if the current credit on the appliance 18 is less than or equal to the warning level, the controller 22 issues an alert. If the current credit on the appliance 18 is less than the minimum level, the controller 22 tops up the credit to the maximum level. If the appliance 18 runs out of credit, it can no longer provide assets to the agents 20. The credits should be allocated per appliance 18 rather than per a service module in general.

As noted above, the controller 22 monitors a list of jobs for each appliance 18. This creates a multithreaded design which allows each appliance 18 to be serviced independently of the others. In addition, jobs on each appliance 18 may also be performed concurrently and independently of the others. This allows multiple UI requests to be handled by separate threads as well as multiple appliance 18 connections to be handled by separate threads such that communication with one entity does not disrupt communication with another thus increasing the parallelism of the AMS 10. The health of each appliance 18 is also monitored, including the free and used hard disk space, free and used memory, health of other hardware components like the HSM 19, date/time of last communication with the controller 22, and date/time of last communication with each agent 20. The controller 22 provides a ping utility to check the network liveness of the appliances 18, which uses the secure communications channel between the controller 22 and the appliance 18. A time synchronization utility is also provided to synchronize time on each appliance 18 with the controller 22 to ensure that the system time and the HSM time on the controller 22 and appliances 18 are specified in UTC and are the same.

The controller 22 should also provide a process to disable appliances 18 from servicing agents 20. Appropriate warnings and confirmation can be provided as such an action may interfere or even stop a manufacturing line. When disabled, appliances 18 should continue servicing the controller 22. For example, the ping utility should still work when the appliance 18 is disabled. This functionality allows an operator to control their manufacturers through the appliances 18 in the event that anomalies are detected and remedial action required. E-mail alerts can be generated to flag issues that may potentially stop the manufacturing line and multiple e-mail addresses can be specified so that all interested and affected parties can be notified. The controller 22 should also be able to automatically and manually trigger a backup of itself. In the event of hardware failure or other disasters, it should be possible to restore the controller 22 from a backup to new hardware or to existing hardware.

Remote upgrades to appliance software, including HSM code, as well as local upgrades of controller software, including HSM code are also enabled by the controller 22. The controller 22 manages a list of agent IP addresses and subnets that are allowed to connect to each appliance 18, and enables service requests from the GUI 8 and the CLI utility 102.

Figure 4A:
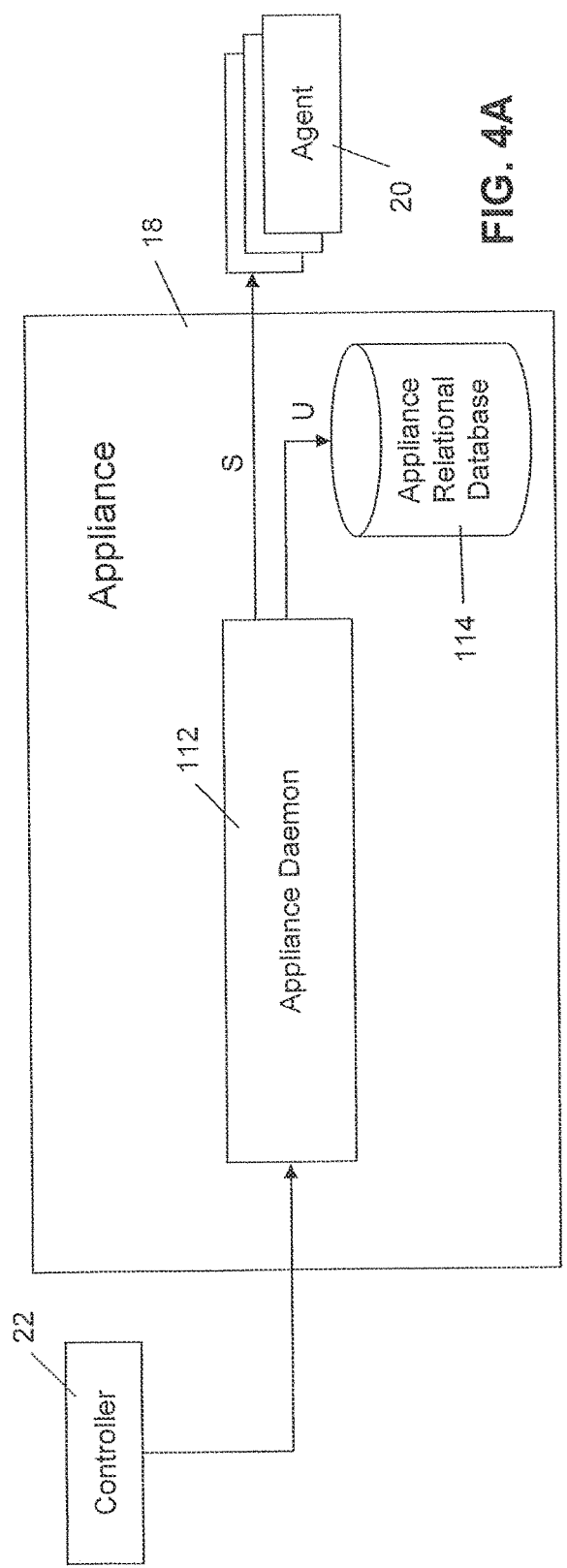
FIG. 4A is a block diagram showing details of one embodiment for the appliance shown in FIG. 1.

The appliances 18 are typically used in redundant pairs as shown in FIG. 1 for failure detection and failover. With redundant appliances 18, 18', each appliance 18, 18' can be given a similar quantity of assets with each set having different values. Therefore, if one appliance 18 fails, the agent 20 can still obtain assets from the other appliance 18' without risk of having overlapping assets, in particular where assets must be unique. The appliances 18 should also be security-hardened, rack mounted systems. Further detail of an example configuration for an appliance 18 is shown in FIG. 4A. The appliance 18 comprises an appliance daemon 112 for controlling communications between the controller 22 and the agent 20 to provide a secure communication channel, and an appliance relational database 114 for storing logs and other data. As discussed above, appliances 18 can be located at a test location, third-party manufacturer, assembly plant, or any production or distribution location. One appliance 18 serves one or more agents 20, and appliances 18 can communicate through one or more agents 20 with an ACC 12, if used. Controller-to-appliance communications should be secure, e.g. using an SSL connection, protected and mutually authenticated. All issues of assets from an appliance 18 to an agent 20 are recorded in activity logs. When these logs are collected by the controller 22, they are saved in the database 114 and can be viewed in the GUI's reports view as discussed later.

Figure 4B:
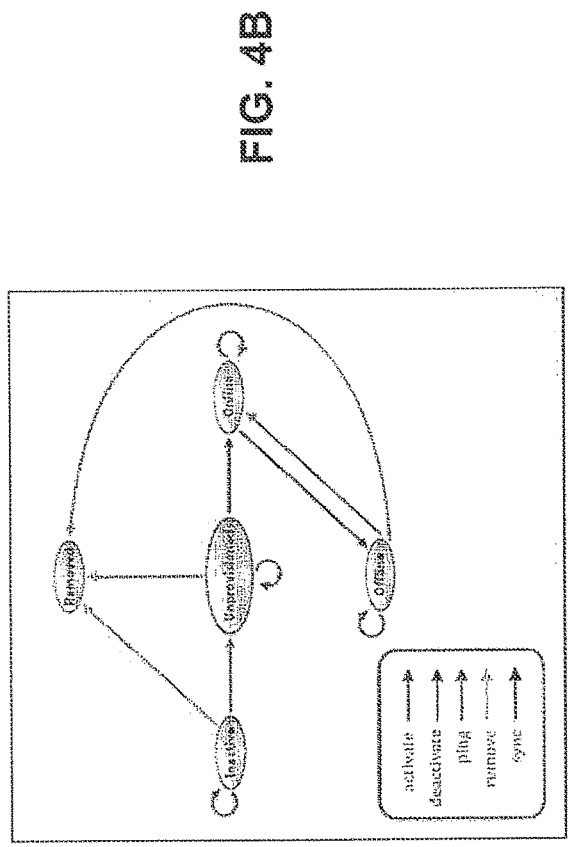
FIG. 4B is a state diagram illustrating state transitions for the appliance shown in FIG. 4A.

When a new appliance 18 is added to the AMS 10, it is in an off-line state. The appliance 18 is then activated in order to be used. Once an appliance 18 is active, it still needs to be synchronized before it can begin producing services. FIG. 4B illustrates the various states of the appliance 18.

The appliance 18 can run on hardware that is similar to the controller 22 and all high trust computations will take place inside an HSM 19. The appliance 18 has at least one HSM 19 but in some embodiments may support more to improve performance of cryptographic operations such as ECMQV (use of ECMQV discussed later). Appliances 18 should be provided in pairs for redundancy and high availability. Both appliances 18, 18' in a redundant pair should always be active as the agent 20 may connect to either one. Both appliances 18, 18' are configured on the controller 22 separately. It may be noted that the operator should ensure that both appliances 18, 18' have similar configurations in terms of assets. From the point of view of capacity planning, each pair should be considered as one appliance 18, for example, you can only count on the throughput of the pair to be no more than the throughput of a single appliance 18. An export PKCS10 request from the HSM 19 can be made for the SSL, HSM and ACC certificates and the certificates should be signed by a device CA. The certificates are then imported into the HSM 19.

When the appliance 18 is interacting with the tester 16, high performance is paramount to minimize test time. Protocol optimizations should therefore be made where possible. For example, ephemeral public keys can be pre-generated in the HSMs 19 for use in the appliance-ACC protocol. Communications with the controller 22 for conveying custom data and log data should also be efficient so as not to impact the performance of the appliance 18 in its interactions with the agent 20. The appliance 18 handles service requests from the controller 22 and the agents 20 using the appliance daemon 112 and uses multiple threads to allow controllers 22 and agents 20 to be serviced independently of each other in the same way as the controller 22 can operate in parallel using multiple threads. In this way, the controller 22 is given a separate thread and each agent 20 is given a separate thread. Schema for the database 114 should be designed for efficient storage of logs, for efficient storage of data as required by various service modules, and for efficient lookups of data as required by the service modules.

Figure 5:
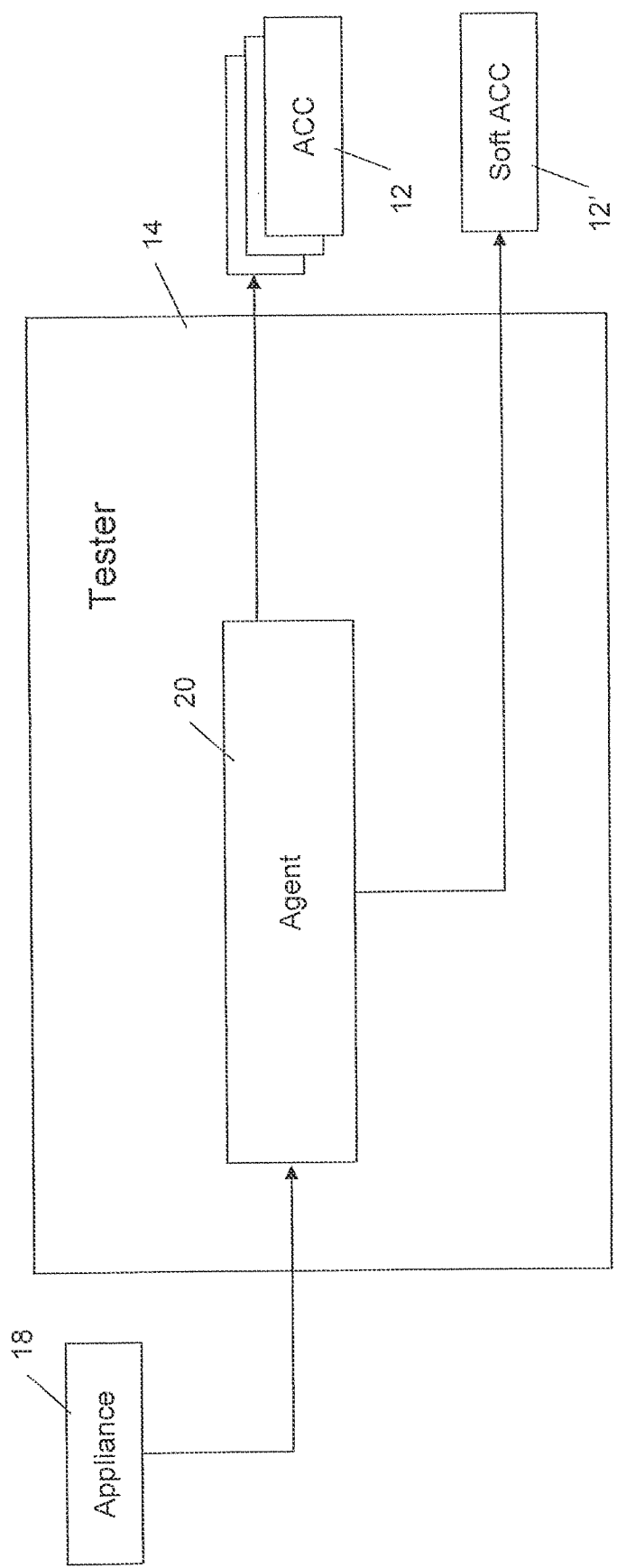
FIG. 5 is a block diagram showing details of one embodiment for the tester and agent shown in FIG. 1.
Figure 6A:
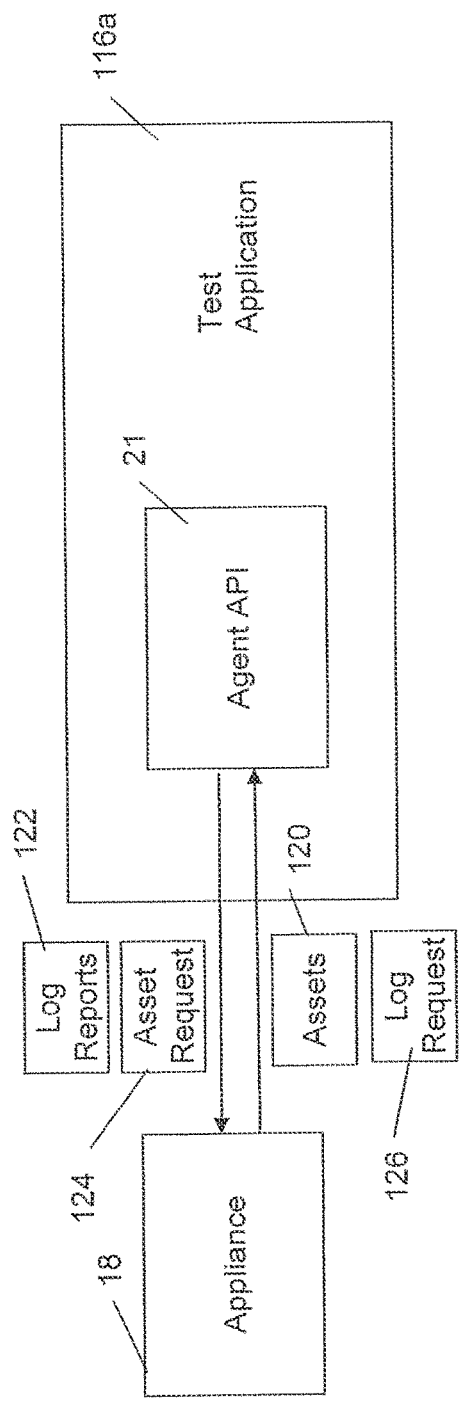
FIG. 6A is a block diagram showing details of one embodiment for the agent API shown in FIG. 1.

The agents 20, shown in FIG. 5, are software libraries and each agent 20 is integrated into or with a customer's test program or script, a custom application that is loaded onto a tester 16 (a computer configured to test the devices 14) on the manufacturing line. Where applicable, the agent 20 communicates with an ACC 12 or a soft ACC 12'. When configured to utilize the agent API 21, the agent API 21 makes requests for assets to appliances 18 and send logs of used assets back through a secure SSL connection. In addition to the agent API 21, the AMS 10 supports the use of the daemon API 23, which spawns a separate process, namely the daemon 25, that retrieves assets from and provides assets to an appliance 18, reducing some of the work being done by the tester application 116. FIG. 6A illustrates a configuration for the agent 20 utilizing the agent API 21. The agent API 21 allows the test application 116a, running on the tester 16, to connect to an appliance 18, to retrieve assets, and to return logs to the appliance 18. It can be seen that the agent API 21 is integrated directly in the test application 116a, which gives complete control over how and when assets and logs are transferred between the tester 16 and the appliance 18. As seen in FIG. 6A, the agent API 21 obtains an asset data package 120 from the appliance 18, as well as any log request 126. The agent API 21 also provides an asset request 124 to the appliance 18 and provides requested log reports 122.

Figure 6B:
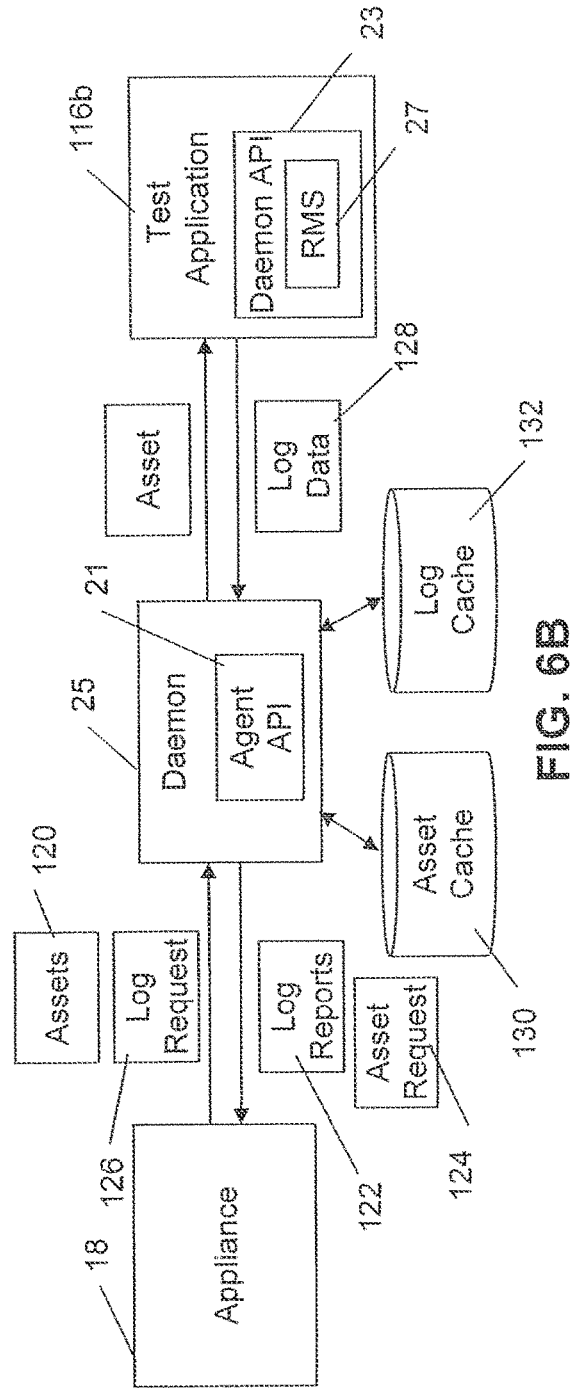
FIG. 6B is a block diagram showing details of one embodiment for the daemon API shown in FIG. 1.

Turning now to FIG. 6B, the daemon API 23 can be used instead of the agent API 21 to offload responsibilities for managing assets and logs. As shown in FIG. 6B, the daemon API 21 is integrated into the test application 116b to enable it to communicate with a separate process—the daemon 25, that acts as an intermediary between the test application 116b and the appliance 18 for managing the exchange of asset data packages 120, log reports 122, asset requests 124, and log requests 126. The daemon API 23 provides a simpler interface and can be configured to run the daemon 25 as a background process. As shown in FIG. 6B, the daemon API 23 provides an interface with the test application 116b to obtain assets as they are needed and obtain log data 128 as it is generated during or at the end of each test. The daemon API 23 runs the separate daemon 25 to host the agent API 21 for the purpose of obtaining assets and providing log reports 122 to the appliance 18 to avoid the test application 116b having to constantly connect to the appliance 18 during the testing process, thus saving time. The daemon 25 can request batches of assets at a time using the agent API 21, and deliver assets as they are needed to the tester 16 through the daemon API 23 such that assets are always available to the tester 16 without having to connect to the appliance 18. In this way, the test application 116b only needs to interface and thus communicate with the daemon API 23 for obtaining an asset and for providing its log data (which is then packaged into a log report by the agent API 23 on the daemon 25). The daemon 25 maintains an asset cache 130 to store batches of assets for subsequent distribution to the tester 16 as needed, and a log cache 132 to store log data 128 output by the test application 116b as tests are completed, to be organized in the log reports 122. The daemon API 23 can also have a resource management subsystem (RMS) 27 configured for independently implementing and registering resource management processes with the daemon 25. In this way, users can implement their own resource management process (with their own directives) to make decisions when to fetch assets, send back logs, etc. and can associate this process by name with a particular product profile.

The use of the daemon 25 and daemon API 23 as shown in FIG. 6B provides several advantages. By having the daemon 25 maintain or cache the connection with the appliance 18, the test application 116b does not need to repeatedly request a new session thus saving time which is critical in a testing environment. Also, the daemon 25 can utilize thresholds to control how many assets it stores in the asset cache 130. For example, a low threshold, when crossed can cause the daemon 23 to utilize the agent API 21 to separately obtain a new batch of assets from the appliance 18 without disrupting the testing procedure and while continuing to forward the assets that it still has. Also, it has been found that when multiple assets are provided by the appliance 18 directly to the test application 116a, for example when sending a batch of keys, if there are leftover assets on the test application 116a when it terminates, these assets can be lost as they may be wiped off the tester's memory. In this case, the AMS 10 would be wasting assets and one or more entities would lose revenue or have to absorb the cost. By separating the daemon 25 from the test application 116b as shown in FIG. 6B, in situations such as this, the daemon 25 and the asset cache 130 would survive the test application 116b and thus no assets would be wasted without a chance to recover them. Leftover assets may thus be marked as wasted if the daemon 25 shuts down and a log report can be generated and returned to the appliance 18 to ensure that leftover quantities can, if the applicant permits, be credited back to the customer. In other embodiments, leftover assets can simply be maintained for the next instance of the test application 116b.

The daemon API 23 can be used to create a standalone application as shown in FIG. 6B or can also be embedded with the test application 116b in other embodiments. The daemon API should be used to offload the management of the assets and the log reports 122 in the test application 116b. The daemon API 23 can be created in client or server mode. In server mode, it connects to the appliance 18 and automatically manages the retrieval of assets and the sending of log reports 122. In client mode, it connects to an already running server mode daemon application for AMS assets and logs. There can also be an auto mode where the daemon API 23 uses client or server mode depending on whether or not another instance of the daemon 25 is already running. The daemon API 23 uses text-based configuration directives for the management of AMS products (or assets) and logs. These directives can be read from a file or from memory at compile time. The configuration directives include one or more product profiles. A product profile contains the name of the AMS product, the connection credentials for logging into an appliance 18, the resource management process, and the process settings. The resource management process is used to manage the assets and logs of the product associated with a profile. The process includes configurable directives for the asset top-up levels (min asset and max asset) and the threshold level at which logs are automatically sent to the appliance (max log).

Since the appliances 18 are typically delivered in pairs, the agent 20 should be configured with the IP addresses of both appliances 18, 18' and fail-over from one appliance 18 to the other 18' in case of appliance failure. The agent 20 should report any errors, for example, if the agent 20 is unable to connect to one of the appliances 18, 18'. In the case of connection errors, the time the agent 20 waits before failover to the other appliance 18 should be configurable.

The ACC 12 is a small and efficient cryptographic security engine that is integrated into a chip's design. The ACC 12 is integrated into the device 14 being manufactured and thus would be established in parallel but separately from the AMS 10. The AMS 10 can be used with or without the ACC 12 depending on the application. For example, serialization and key injection may not require the ACC 12 but the feature activation service module typically does. However, the ACC 12 can be used in applications involving serialization and key injection.

The ACC 12 is typically embedded in a SoC die, which is then packaged into a chip, which is mounted on a printed circuit board (PCB), and eventually assembled into an electronic device 14. Every chip that has an ACC 12 can be registered and logged in the controller's database 110 as soon as it has passed wafer testing, which in turn can track every chip manufactured that underwent wafer testing. The ACC 12 has a set of output ports, and evaluating the aggregate of these outputs indicates which features are to be enabled and which are to be disabled. Once assembled, the ACC 12 can still serve as a root of trust on the ultimate device 14.

The ACC 12 is designed to manage access to non-volatile memory (NVM) and to protect certain regions of the NVM from being accessed by unauthorized agents 20. The ACC 12 can provide self-contained generation of a unique device ID (UID) used to uniquely identify the ACC 12. The ACC 12 can also provide self-contained generation of keys used to open up a secure communication channel with a trusted server. The ACC 12 should ensure that the enabling and disabling of features are done using trusted equipment by trusted sources and the ACC 12 should be able to initiate or disable device self tests and heath checks to make sure the device 14 has not been tampered with. The ACC 12 can also lock out the device whenever too many invalid commands are issued. The ACC 12 is used to process commands from the appliance 18 and can be programmed to shut itself off if it detects a specified number of illegal commands. The ACC 12 should be designed to work in any electronics manufacturing test environment since the security features of the AMS 10 do not necessarily rely on being able to trust the data link between an appliance 18 and the ACC 12. Instead, security is built into the communications protocols using cryptography. As a result, the AMS 10 provides the ability to allow provisioning to occur in a secure, auditable manner anywhere—from the wafer fabrication to the ODM to the OEM to the user.

In order to secure the ACC-to-appliance communication channel, the ACC 12 uses an asymmetric cryptography scheme for key exchange, and symmetric key cryptography to transfer messages between it and the appliance 18. The asymmetric cryptography scheme uses a public key, which is generated from a secret private key. The private key is kept secret and the public key is exposed. It is imperative that the private key be protected in a secure, highly tamper resistant setting. An embedded ACC 12 is able to fulfill this requirement by being able to internally and autonomously generate a unique private key, with a combination of hardware and firmware to protect the secret key from being exposed. The ACC 12 generates a unique identifier for each device 14, and participates in the tracking and provisioning of the device 14 through the encrypted channel with the appliance 18. Once both parties agree on a symmetric key, the appliance 18 issues confidential messages, referred to herein as feature control tickets (FCTs) 50 to the ACC 12 in a secure manner. The ACC 12 is described in greater detail below making reference to FIGS. 51 to 66.

To implement the AMS 10 as discussed above, various security considerations should be made. As noted above, all high trust computations in the controller 22 and appliances 18 should take place inside an HSM 19, in particular on the appliance 18 which is typically running at another entity with various levels of trust between the manufacturer and the entity. When performing serialization, the appliance 18 should only be able to generate serial numbers based on the serial number schema received from the controller 22 (such schemas are described below). For key injection, the appliance 18 should only be able to decrypt the sequenced keys received directly from the controller 22, i.e. not from another appliance 18. For feature activation, the appliance 18 should only be able to decrypt the FCTs 50 received directly from the controller 22, i.e. not received from another appliance 18. The credit or metering scheme used by the AMS 10 should be secured such that appliances 18 can only use the credit notices received directly from the controller 22. The appliances 18 should only use assets that are from the controller 22 from which it was provisioned to ensure that assets mistakenly sent to another appliance 18 cannot be used. It should not be possible for the appliance 18 to use credit notices from another appliance 18 and it should not be possible for an attacker to add, remove, or change the number of credits on the appliance 18. However, it can be appreciated that the AMS 10 can be configured to enable assets on one appliance 18 to be replicated to another appliance 18 for high availability/failover purposes if mechanisms are in place to ensure a unique asset is not used more than once. For the administration of the controller 22, the web browser 100 should only be able to access the web server 104 over https and the communications should be secured, e.g. mutually authenticated, encrypted, integrity checked, replay protected, etc.

The communications between the web server 104 and the controller daemon 106 and the CLI utility 102 and the controller daemon 106 should be secured as shown in FIG. 3, e.g. using SSL. Similarly, the communications between the controller 22 and appliance 18 and appliance 18 and agent 20 should be secured, e.g. using SSL. The communications between the appliance HSM 19 and the ACC 12 should be secured using the ACC protocol and the ACC 12 should authenticate the appliance 18. The appliance 18 does not need to authenticate the ACC 12 as it is considered a trusted root. The logs from the agent 20 to the appliance 18 to the controller 22 may be encrypted and should be integrity protected to prevent eavesdropping and tampering. Only the controller 22 should be able to decrypt and validate logs. These logs may include custom data such as yield data. The controller 22 and the appliance 18 should be hardened against attack. This hardening will apply to the OS and the applications (e.g. the database 110) including those running on the HSM 19.

All certificates are preferably elliptic curve cryptography (ECC) certificates issued by a trusted device CA, signed on a per-customer, AMS sub-root certificate. ECC certificates would then be used for SSL between each of the web server 104, controller daemon 106, appliance 18, and agent 20—for HSM certificates, for every HSM 19 in the AMS 10, and for the ACC certificate used in the ECMQV negotiation with the ACC 12. Customer names should be embedded in the certificates and should be checked so that communications only occur between end points with the same customer name. Data stored in the database 110 should be protected against unauthorized access and modification.

Products and Service Modules for the AMS

In the examples discussed herein, a product is a model, which provides the AMS 10 with a name for the product, its identification, the service it provides, which appliances 18 are producing the product, and a list of assets. For example, assets can be a collection of serialization schemas and a list of appliances 18 to which the schema collection applies. Similarly, the assets can be a collection of key types and a list of appliances 18 to which that key type collection applies. In yet another example, the assets can be a collection of FCTs 50 and a list of corresponding appliances 18. Service modules discussed herein determine what each of the AMS components (controller 22, appliances 18, agents 20, and ACC 12) provide in the production process. The AMS 10 in the following examples can define service modules for serialization, key injection, and feature activation, however, it will be appreciated that other service modules can be applied to deliver and provide other types of assets. Examples of serialization, key injection, and feature activation service module configurations are shown in FIGS. 7A, 7B, and 7C respectively.

Serialization

Figure 7A:
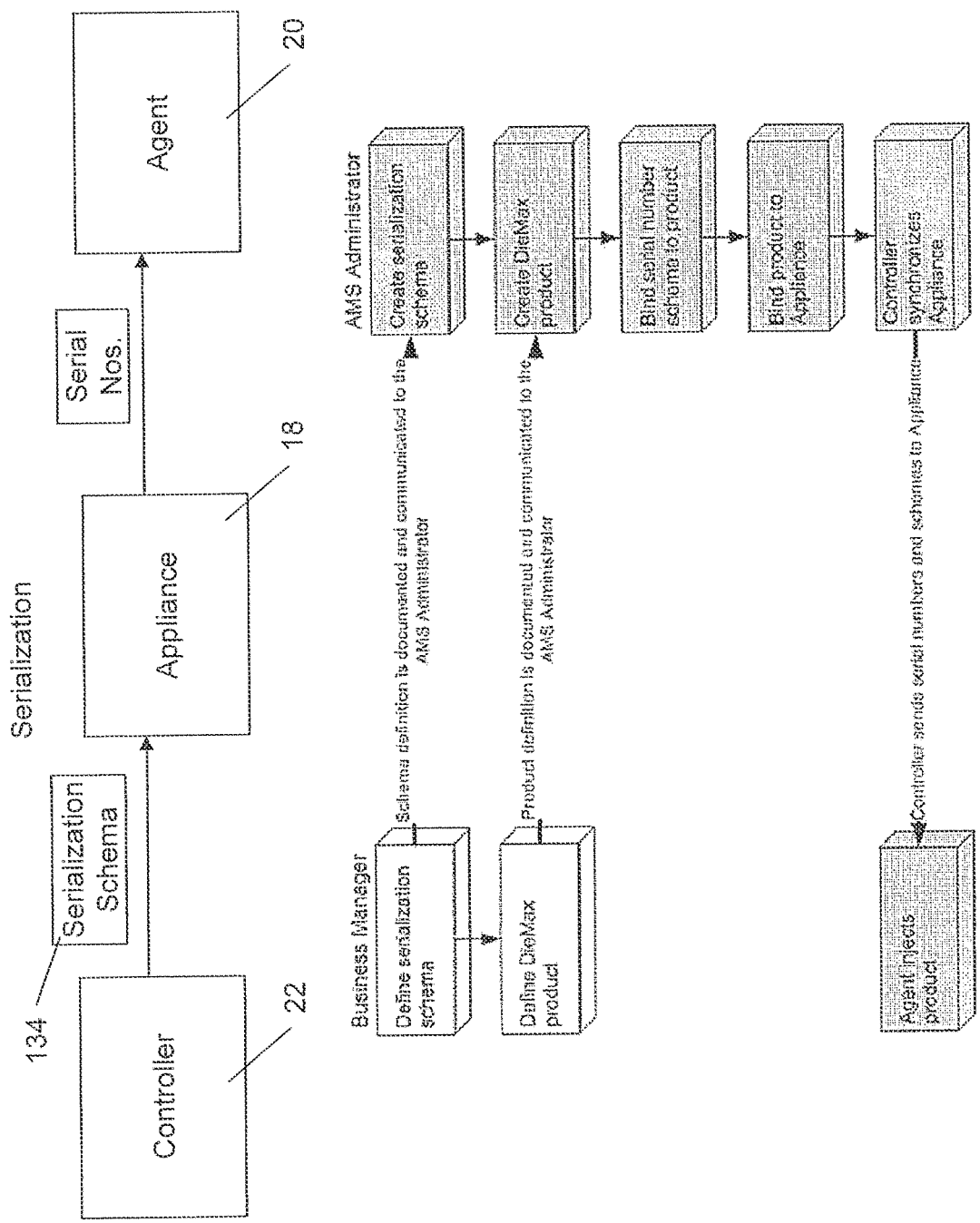
FIG. 7A is a block diagram showing a configuration of the AMS for performing serialization along with a schema definition workflow example.
Figures 7B, 7C:
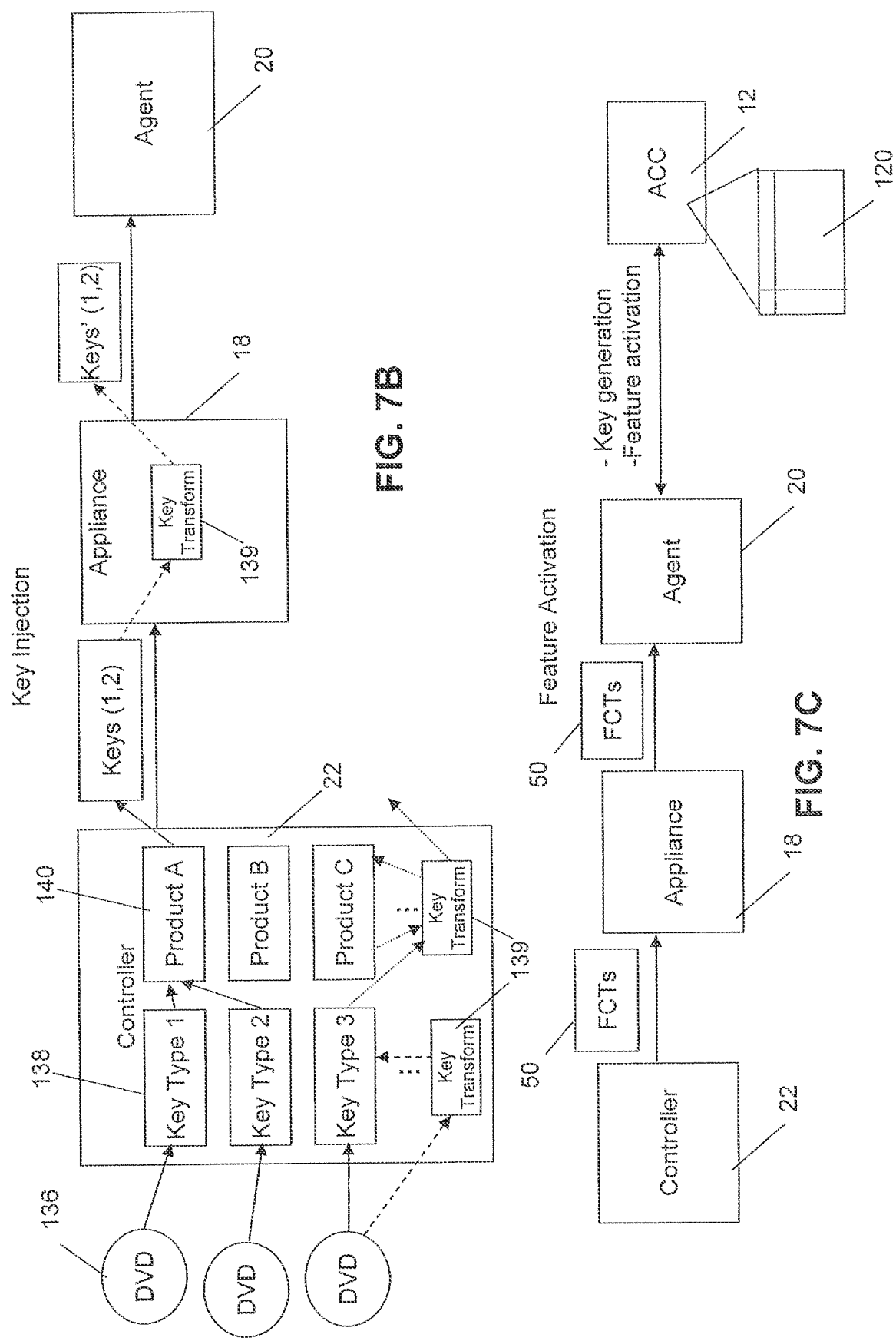
FIG. 7B is a block diagram showing a configuration of the AMS for performing key injection.
FIG. 7C is a block diagram showing a configuration of the AMS for performing feature activation.

Turning first to FIG. 7A, the serialization service module is a configuration of the AMS 10 that is used to provide a secure means of generating, assigning to chips (or other electronic objects or devices), and tracking unique serial numbers. To provide this service, the controller 22 is used to define a product model, then to define one or more serialization schemas 134 to be bound to each product model. Each serialization schema 134 contains a range of serial numbers for a particular product (e.g. device 14). The serial number schemas 134 are sent over a secure, encrypted connection (e.g. over SSL) to the appliances 18 at the manufacturer's location, typically automatically, whenever a synchronization operation takes place. Agents 20 can then request serial number values by product name using the agent API 21 or the daemon API 23. The serial numbers are generated by the appliance 18, metered, and provided to the agents 20. The serial numbers are then injected sequentially into each die in a chip manufacturing process using the agent 20. The controller 22 tracks how many serial numbers have been consumed for each serialization product, and makes these results available in the GUI 8.

A serialization schema 134 is an object that defines the rules about how a serial number is generated. For example, it determines whether the serial number digits are presented in hexadecimal or decimal form and whether fixed strings are included. While one or more serialization schemas 134 can be bound to a serialization product, a particular schema 134 can only be bound to one product. Serialization schemas 134 bound to a product cannot overlap and once bound, the schemas 134 should not be unbound. For other changes, e.g. to change the static strings that have been inserted, a new serialization schema 134 should be created.

If more than one schema 134 is bound to the same product, such multiple schemas 134 should be assigned in a priority order. When requesting serial number strings for a product, serial numbers are given out from schemas 134 with the highest priority. If a schema 134 is exhausted (i.e. count values from the schema 134 have all been assigned), the schema with the next highest priority is then used. Serialization products can be bound to more than one appliance 18, with each binding having a minimum and maximum inventory level. The controller 22 can be used to ensure that products bound to multiple appliances 18 have non-overlapping ranges of serial numbers. When a product is bound to an appliance 18, the controller 22 keeps an inventory of serial numbers at the specified maximum level. Once the inventory has been sent from the controller 22 to an appliance 18, the serial number values should not be able to be recalled or revoked.

A serial number schema 134 may describe how to convert a base value into a serial number string. In this example, the term serial number base value refers to any positive 64-bit integer, and should not be confused with the base attribute. A serial number schema 134 has several attributes: start, count, base, and total characters. The start and count values define the range of base values that are allowed in the schema. The base attribute determines whether the base value is represented in base-10 or base-16 format, when it is converted to a serial number string. The total character attribute defines how many characters to use when representing the base value as a serial number string. Zero or more static strings can be inserted at any position in the serial number string. It may be noted that you should not be able to specify a number less than the minimum number of characters required to represent the largest value in the schema 134. For example, if the schema 134 starts with 0 and the count is 1000, then there should be three or more characters, because the schema defines the range [0, 999] and three characters are required to represent 999.

Given a serial number schema 134 and a base value, a serial number string is constructed as follows:

a) the base value must be in the range of [start value, start value+count−1];

b) the base value is then represented in the specified format;

c) the resultant string is then either truncated from the left, or most significant end, or it is padded on the left with zeros, depending on the total character attribute; and d) any static strings are then inserted in the resulting string.

Example A—If Schema A=(start=1, count=100, characters=4, base=16) and the base value=55, the result is the serial number 0037. This is because 55 is within the range, the hex format for 55 is 37, and four characters are required thus padding of two zeros. If the base value=3, the result is the serial number 0003.

Example B—If Schema B=(start=1, count=100, characters=3, base=10, staticstring1=(pos=3, str=X), staticstring2=(pos=1, str=-)), and the base value is 56, the result is the serial number string 0-56X. This is because 56 is in the range, 56 is already in base 10, an X is inserted at position 3 (i.e. the least significant position) and a dash (-) is inserted at position 1 (i.e. the most significant position). A zero is used to pad the serial number string because 56 is only two characters. If the base value=1, the result is the serial number string 0-01X with two zeros of padding.

The serialization service module creates logs when serial number schemas are sent from the controller 22 to the appliance 18 (recorded as controller activity logs), when serial numbers are generated by the appliance 18 and sent to the agent 20 (recorded as appliance activity logs), and when serial numbers are used by the agent 20 (recorded as agent activity logs). All logs are kept on the controller 22 (after being collected) and can be used to monitor and track serial number use. Each time a serial number is issued to an agent 20, the issuing appliance's credit is decremented by one, and the serial number inventory for that product is decremented. Both levels are replenished during a synchronization operation between the controller 22 and the appliance 18, and are used to meter the serial number use of the appliance 18.

Figure 8:
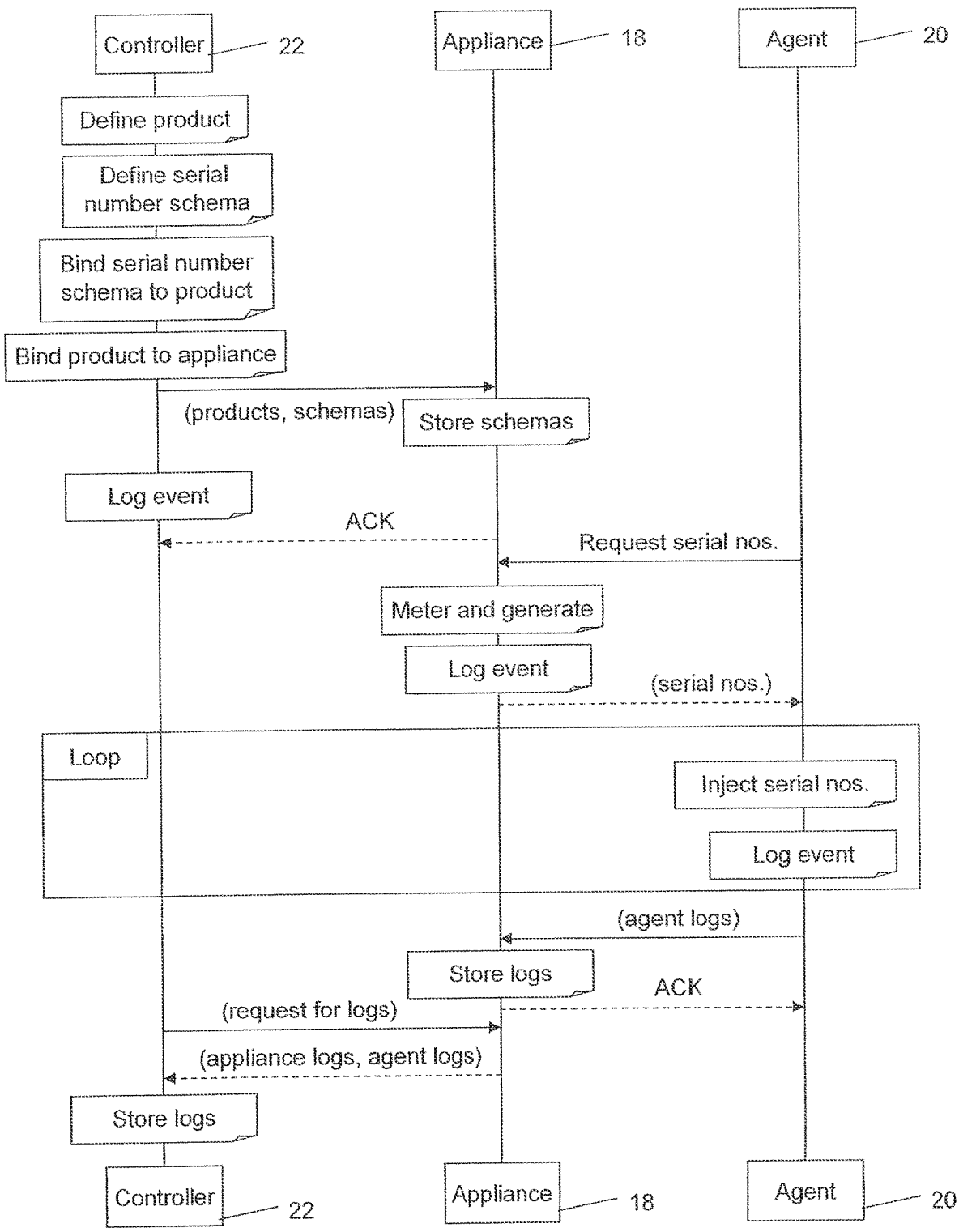
FIG. 8 is a sequence diagram showing an example set of operations for performing serialization using the AMS.

FIG. 8 illustrates a sequence diagram for implementing a serialization service module based on the base AMS sequence diagram shown in FIG. 2. It can be seen in FIG. 8 that the controller 22 generates serialization schemas 134, binds these to a product, then binds the product to the appliance 18, and sends the products and schemas to the appliance 18 whereby the serial numbers are generated and metered.

Turning back to FIG. 7A, a serialization product workflow is shown. In this example, a business manager may define the serialization schema by documenting this and communicating the proposed schema to the AMS administrator. The AMS administrator may then use the controller GUI 8 to generate the serialization schema 134. The business manager can also define the serialization product, document this product definition, and communicate the definition to the AMS administrator. The AMS administrator may then create a serialization product, per the definition, using the controller GUI 8. The AMS administrator then proceeds to bind the serial number schema to the product, bind the product to the appliance, and uses the controller 22 to synchronize the serial number schema with the appliance 18. The appliance 18 then uses the agent 20 to inject the serial numbers, e.g. per the sequence shown in FIG. 8.

The serialization products, when defined, are assigned a unique product ID by the AMS 10 and a unique identifying name provided by the operator in order to distinguish from other products. For each serialization product, the appliance 18 can deliver the serial numbers to the agent 20 directly or can deliver the serial numbers via FCTs 50. If the serial number is delivered via an FCT 50, then the operator would, in the examples provided below, need to specify a 2-byte memory offset (in hexadecimal) within the ACC 12 where the serial number is to be stored and also an 8-byte record tag value (in hexadecimal).

The appliance 18 receives serial number products/schemas from the controller 22, responds to requests from agents 20 for serial numbers, generates the serial numbers based on the serial number schema 134, meters the serial numbers, receives logs back from the agent 20, and sends logs back to the controller 22. The appliance credit is reduced by one for each serial number delivered to the agent 20 and if the credit reaches zero (0), no more serial numbers should be delivered. When a serial number is to be delivered via an FCT 50, it should not be able to be delivered directly, i.e. the appliance 18 should deny any such requests. Also, when delivered via an FCT 50, the logging in the appliance 18 should be identical to when the serial number is delivered directly, with the exception that the ACC UID should also be logged. A configurable receive block size should be accommodated (number of logs returned in a single block from an appliance 18). When a serial number is delivered via an FCT 50, the ACC flag, record tag and memory address data should be protected from tampering on the appliance 18.

The agent 20 should be capable of requesting serial numbers from the appliance 18 using the agent API 21 or the daemon API 23 by serialization product name and count. The agent 20 should also support the two mechanisms for delivery, namely directly or via an FCT 50. Agents 20 should log the use of each serial number and return logs back to the appliance 18. The agent 20 should also log discarded serial numbers as wasted. When a serial number is delivered via an FCT 50, the logging in the agent should be identical to when the serial number is delivered directly, with the exception that the ACC UID should also be logged.

As discussed above, the agent 20 obtains log data 128 from the test application 116b, e.g. when using the daemon API 23. It has been found that the audit channel 6 provided by the AMS 10 enables various correlations to be made during the manufacturing process. For example, when adding a serial number to a chip in the tester 16, the tester 16 typically knows the location of the particular chip on the wafer. This location information can be logged along with the serial number that was added, and eventually this information is stored by the controller 22 in the relational database 110. In this way, at a later time, if the chip fails a test in the manufacturing process, the relational database 110 can be used to correlate the serial number of the failed chip with the location at which it was on the die to determine if faults occur in certain parts of the process or locations within the machinery. In another example, a timestamp associated with the addition of the serial number can be used to track failures at certain times on certain machines or even to identify certain employees in alleged theft of chips. Therefore, the audit channel 6 and relational database 110 can be utilized for various data mining and analyses for improving accountability and for identifying and rectifying root cause of failures in a manufacturing process.

Key Injection

Turning now to FIG. 7B, the key injection service module is a configuration of the AMS 10 that provides a secure means of injecting keys into products (e.g. devices 14). To provide this service, the controller 22 is used to define one or more key types 138. A key type 138 defines the format of the keys in a file. The controller 22 is then used to define a product model 140, and then to bind one or more key types 138 to each product models 140 as shown by way of example only in FIG. 7B. It has been found that by adding keys directly to product definitions without separating key types from products, confusion can arise from the different ways that project names and product types are defined by customers in different applications. For example, if multiple key types are added to "product buckets", when that product gets low in credits, it can be difficult to determine which of the keys is low and to thus know which key types to top up. By separating the key types 138 from the products 140 as shown in FIG. 7B, an additional level of abstraction is provided to more closely reflect how the customers typically utilize the assets. In this way, the controller 22 can be used to define a product type 140 that can form "blobs" of one or more key types 138 as well as other assets to avoid inadvertently loading incorrect keys and to better track the actual inventory level of each key type 138. As such, when the keys are imported, e.g. on a DVD 136 as shown in FIG. 7B, the keys are separated into distinct "buckets" according to key type rather than trying to allocate keys directly to certain products which would then be referred to by different names without necessarily a logical correlation to the number and types of keys used for that product type 140. Instead, the keys are simply separated by key type 138 and then customer defined associations are defined by way of the product type 140 abstraction. Also, when defining a product 140, certain permissions can be established such that the product 140 only uses certain key type(s), e.g. from certain distributers. Since certain key types 138 may be provided according to various contractual obligations, better control over the separation and allocation of key types 138 ensures such contractual obligations are adhered to.

Figure 9:
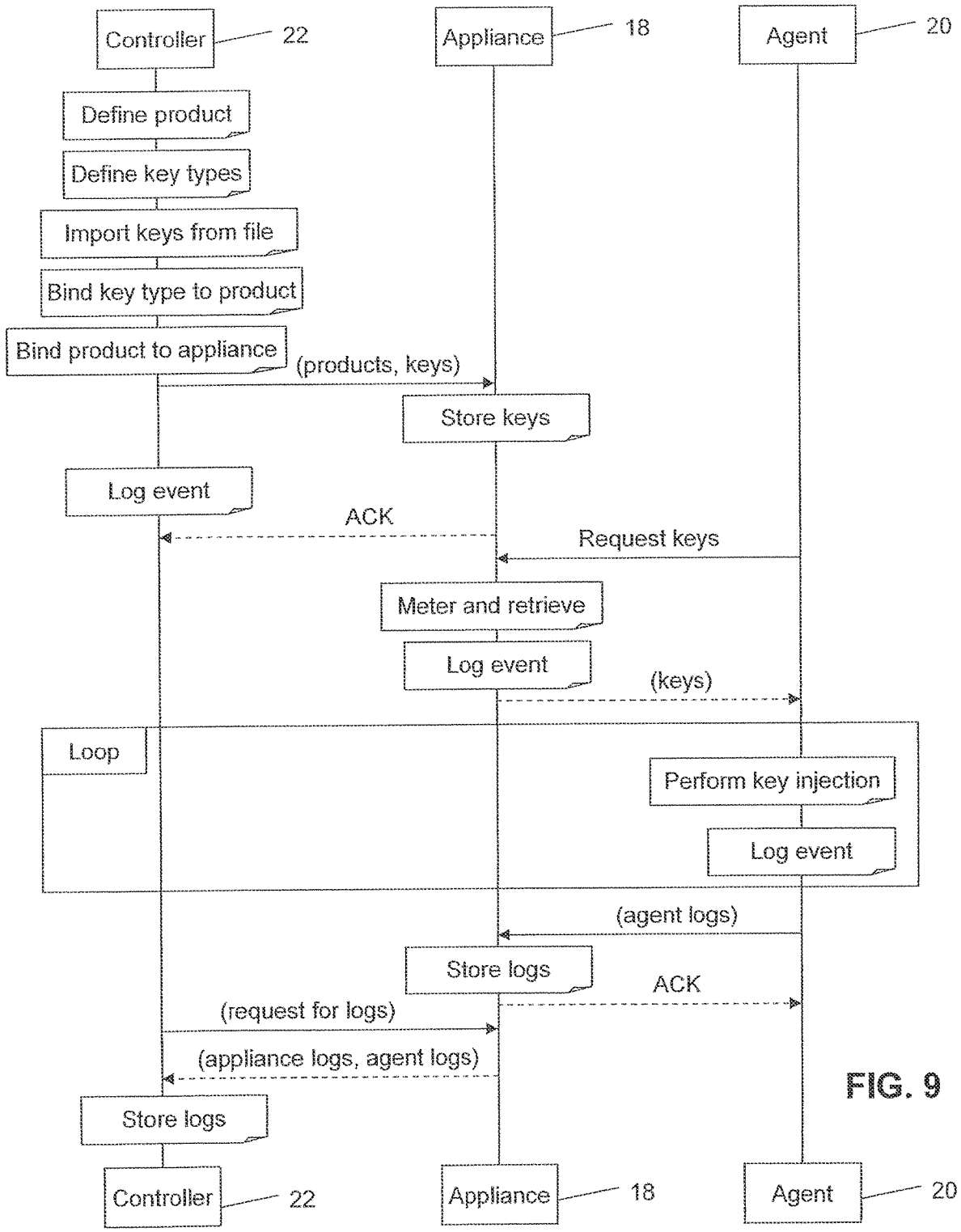
FIG. 9 is a sequence diagram showing an example set of operations for performing key injection using the AMS.

Also shown in FIG. 7B is a key transform 139 which can be used to modify certain key types 138 in customer specific ways. As illustrated in FIG. 7B, a key transform 139 can be applied at the time of importing the keys, e.g. if the keys of that key type 138 are always to be transformed in that way such that a transformed key type 138 is defined. Alternatively, the key transform 139 can be applied prior to or upon delivery wherein the key is transformed on a product-specific basis or on an appliance specific basis. In yet another alternative, the key transform 139 can be applied at the appliance 18 before the keys are delivered to the agents 20. When determining where the key transform 139 is applied, security considerations should be made based on where the key transform 139 is located, e.g. higher security when at the appliance 18 due to the lower trust at that location. It may be noted that by separating key types 138 and product types 140 as shown, the transform 139 can be associated with the product 140 rather than the key type 138 to minimize the number of key types 138 required. In other words, the key types 138 can be stored separately as imported and the key transform 139 performed per the product type 140 to avoid adding yet another key type 138 and the potential confusion this can cause.

can be seen that when compared to serialization, key injection also has a step of importing the keys from a file, however, it can be appreciated that the keys could also be generated by the controller 22 and done at the time of defining the key types. Therefore, the sequence shown in FIG. 9 is for illustrative purposes only.

When implementing the AMS 10 for key injection, the key data should not be stored in plaintext after it is imported onto the controller 22. Decryption should only happen when the appliance 18 delivers keys to agents 20, unless the ACC 12 is used, in which case the data is not decrypted until it is processed by the ACC 12 (i.e. by processing the key within an FCT 50).

A key type 138 has several attributes that define the format of the keys in a file. A typical key type definition is provided in Table 1 below for an HDCP_TX key.

TABLE 1

| Sample key type definition | | |
|---|---|---|
| name | HDCP_TX | A string with a minimum length of 1 character and a maximum length of 256 characters that uniquely identifies the key type. |
| total length | 308 | The total length of the stream of key bytes. |
| key unique id offset | 0 | The 0-based offset in the stream of key bytes where a key identifier can be found. |
| key unique id length | 8 | The length of the key identifier. |
| key data offset | 8 | The 0-based offset in the stream of key bytes where the key data can be found. |
| key data length | 280 | The length of the key data. |
| hash algorithm | SHA-1 | The hash algorithm that is used to check the integrity of the key data. |
| hash data offset | 288 | The 0-based offset in the stream of key bytes where the hash can be found. |
| hash data length | 20 | The length of the hash. The hash is used to verify the integrity of the key. |
| hash protect offset | 0 | The 0-based offset in the stream of key bytes where the hash is computed. |
| hash protect length | 288 | The length of the data used to compute the hash. |
| key file header length | 8 | The length of the key file header. |

Once a key type 138 has been defined, keys of that type can be imported from a key file (e.g. via a DVD 136) onto the controller 22 using the GUI 8. Operations personnel can then use the GUI 8 to specify the number of keys to be sent to an appliance 18. If a hash has been defined, then the AMS 10 verifies the hash value. The keys are sent over a secure, encrypted connection (e.g. SSL) to the appliances 18 at a manufacturer's location, in this example, automatically, whenever a synchronization operation takes place. The keys can then be requested by product name using the agent API 21 or daemon API 23. When the agent 20 fetches keys, it asks for a product and a number of units of that product. The appliance 18 queries all key types bound to this product, and returns the specified number of keys for each key type. The keys are then injected into each die on the assembly line by the agent 20.

Key injection products can be bound to one or more appliances 18, with each binding having a minimum and maximum inventory levels. When a product is bound to an appliance 18, the controller 22 keeps its inventory of keys at the specified maximum level. Once inventory has been sent from the controller 22 to an appliance 18, the keys cannot be recalled or revoked. The controller 22 tracks how many keys have been injected for each key type 138, and makes these results available in the GUI 8. FIG. 9 illustrates an example sequence diagram for performing a key injection service. It The key injection service module is configured to create logs when keys are sent to an appliance 18 (controller activity logs), when keys are sent to an agent 20 (appliance activity logs), and when keys are consumed by agents 20 (agent activity logs), whether they are successful, failed, or wasted. Such log events are shown in FIG. 9. All the logs are stored on the controller 22 after being returned by the appliance 18 during a synchronization operation, and can be used to monitor and track key use. Each time a key is issued to an agent 20, the appliance's credit is decremented by one, and the key inventory for that product is decremented. Both levels are replenished during a synchronization operation between the controller 22 and the appliance 18, and are used to meter use on the appliance 18.

Similar to serialization, each key injection production is assigned a unique product ID by the AMS 10 and a unique identifying name provided by the operator. For each key injection product, the two mechanisms discussed above, namely providing keys directly to the agent 20, and delivery using the FCTs 50 should be allowed. If the key is delivered via an FCT 50, the operator would also specify the 2-byte memory offset within the ACC 12 and the 8-byte record tag value. Each key type 138 is assigned a unique key type ID by the AMS 10 and a unique identifying name provided by the operator. A key is treated in this example as a stream of bytes.

A plaintext batch of sequenced keys can be imported from a file local to the controller 22 (e.g. the DVD 136). Each key is assigned a unique key ID by the AMS 10. It may be noted that this unique key ID is not the same as the key identifier in the key. The key files can also be imported from a remote computer on which the GUI 8 is running A special case is to allow HDCP keys that are PGP encrypted to be PGP decrypted and then imported. There is a specific file format that is supported for these HDCP keys. For PGP decryption, GNU GPG can be used. The certificate and private key required is assumed in this case to have been imported into GNU GPG already.

During importation of the particular key type 138, if the key identifier is used, then the key identifier of the key will be compared to all previously imported key identifiers for that key type 138. It may be noted that this mechanism does not protect against a key file being used again for another key type and thus should be prevented using operational rules. During import of a particular key type, if a hash is used, then the hash is calculated and verified for all keys. This hash calculation is not performed using the HSM 19. Operators should be prevented from importing keys of a particular key type if there is already a job running that is importing keys of the same key type.

One or more keys should be allowed to be bound to a key injection product. Each key type may be assigned to multiple products. For each key type in each product, how many of those key types are required should be specified. A key type should be able to be unbound from a product, but only if the product is not bound to any appliance 18. Each key injection product should be allowed to be bound to one or more appliances 18. Each appliance 18 may have multiple key products assigned to it and it should be able to unbind a key injection product from an appliance 18. The controller 22 should not send duplicate keys to appliances 18. Once a key has been delivered to an appliance, it should be deleted from the controller 22.

Similar to serialization, a metering system should be used and, once keys are issued to appliances 18 they should not be able to be returned, recalled, or revoked. When a key is delivered via an FCT 50, the logging in the appliance 18 and agent 20 should be identical to when the key is delivered directly, but also includes the ACC UID.

The key injection service module can also support the processing of keys at the controller 22 before they are imported, allowing the keys to be arbitrarily transformed, referred to herein as key import signed objects. Key import signed objects should be able to be defined wherein each signed object is assigned a unique signed object ID by the AMS 10 and each signed object is assigned a unique identifying name provided by the operator. The signed object is a shared object that resides in the controller 22 and is cryptographically protected with a signature. A function in the shared object is then called once for every key before it is imported to allow the operator to transform the key. It may be noted that the key identifier (for example KSV in the case of HDCP) should be copied out so that the controller 22 can always access it even after the signed object has potentially obfuscated it. Key import signed objects should be able to be assigned to one or more key types 138 and each key type 138 should be able to have at most one key import signed object assigned. The key import signed objects should be able to be unassigned from key types 138 as well.

The controller 22 when configured for key injection, can also support key transform plug-ins 139, which allows for the processing of keys at the controller 22 after they are decrypted but before they are sent to the appliance 18. This may be referred to as a key-to-appliance transform. The key transform plug-in 139 allows, for example, a hardware specific or end-to-end protocol specific modification to the key be made on a per-customer or per-product basis. This allows modifications such as bit allocation for error correction to be made and the transformations can be performed upon importing the keys or prior to delivery to the appliance 18. Such key-to-appliance transforms 139 should be able to be defined and each transform should be assigned a unique signed object ID by the AMS 10 and each transform should be assigned a unique identifying name provided by the operator. The transform is a shared object that resides in the controller 22 and should be cryptographically protected with a signature. A function in the shared object is called once for every key before it is sent to the appliance 18 to transform the key. It may be noted that the key identifier should be copied out so that the controller 22 can always access it even after the transform has taken place. Key-to-appliance transforms should be able to be assigned to one or more key types 138 when bound to a product. Each bound key type 138 should have at most one key-to-appliance transform assigned. The key-to-appliance transforms should be able to be unassigned from key types in a product as well.

The key injection service module can also support appliance signed objects which allow for the post-processing of keys at the appliance 18 after they are decrypted but before they are sent to the agent 20. With respect to appliance signed objects, key pass-through should also be supported. Depending on whether key pass-through is enabled or disabled, it enforces whether or not appliance signed objects should be present before the appliance 18 will send keys to the agent 20. This may be referred to herein as key-to-agent signed objects.

Key-to-agent signed objects should be able to be defined and each signed object is assigned a unique signed object ID by the AMS 10 and each signed object is assigned a unique identifying name provided by the operator. The signed object is a shared object that resides on the controller 22 and is cryptographically protected by a signature. A function in the shared object can be called for every key before it is sent to the appliance 18 to transform the key. It may be noted that the key identifier should also be copied out so that the controller 22 can access even after the transform takes place. Key-to-agent signed objects should be able to be assigned to one or more key types. Each key type should have at most one key-to-agent signed object assigned and key-to-agent signed objects should be able to be unassigned from key types as well. The key injection service module can also support a read-only sync mode where the controller only queries current key levels and retrieves logs from the appliance without delivering new keys.

The appliance 18 should not send duplicate keys to agents 20 and once a key has been delivered, it should be deleted from the appliance 18. When a key is delivered via an FCT 50, it should not be able to be delivered directly and when a key injection product is unbound from an appliance 18, all keys belonging to that product should be deleted from the appliance 18.

The agent 20 should be able to request key blobs from the appliance 18 by product name and count and each key blob should contain one or more keys, depending on how many key types are bound to the product. For example, if the product utilizes 3 key types, the key blob would include 3 keys. Agents 20 should not send duplicate keys to the tester 16. Once a key is delivered to the tester 16 it should be deleted from the agent 20. The agent 20 should also log the use of each key in the key blob separately, and should log any keys that it intends to discard.

Feature Activation

The AMS 10, when configured to provide a feature activation service module, as shown in FIG. 7C, provides a secure means of activating or deactivating a product's feature set dynamically, after fabrication, using the ACC 12. As noted above, the ACC 12 can also be used with serialization and key injection service modules but is particularly advantageous for use with the feature activation service module. To provide this service, the controller 22 is used to define one or more FCTs 50, then to define a product model. The FCTs 50 are then bound to each product model, in which case all FCTs 50 are also bound to the appliance 18 producing that product. The FCTs 50 are then applied to each die on the assembly line using the ACC 12. Products can be bound to one or more appliances 18, with each binding having a minimum and maximum inventory level. When a product is bound to an appliance 18, the controller 22 keeps its inventory of FCTs 50 at the specified maximum level. Once the inventory level has been sent from the controller 22 to the appliance 18, the FCTs 50 should not be able to be recalled or revoked. The controller 22 tracks how many FCTs 50 have been applied to each product, and makes these results available in the GUI 8.

In the examples described herein, the ACC 12 contains a 256 bit (32 byte) feature register 120, a tag register, and NVRAM. The feature register 120 is meant to be used to control (turn on or off—or partially on or partially off) features on the device 14. Exactly how the features are turned on, off, etc. is device dependent. ACC commands provided by way of FCTs 50 are used to read data from, or write data to the feature register 120, tag register, or NVRAM. FCTs 50 contain feature data and a record tag. The feature data determines which product features to activate or deactivate. The record tag provides a record of which features will be activated by the ACC 12 using the feature data. The feature data is programmed into the ACC feature register 120 and the record tag is programmed into the ACC tag register. The value of the record tag is also customer-dependent. The two commands (which are described in greater detail below) to write to the feature register are SETFEAT and SETFEAT_TEMP. When using the latter, the feature data is not saved in NVRAM and would be lost on power-down.

The ACC 12 also contains in this example a 64 bit (8 byte) record tag (register). The record tag is meant to be used to record what has been programmed on the ACC 12. the record tag is set when using any of the commands that write to the ACC 12 (except SETFEAT_TEMP). How the record tag is interpreted is application-dependent. The ACC 12 also contains an implementation-dependent amount of NVRAM. The command to write to the NVRAM is WRACCESS. A maximum amount of data that can be written is usually imposed, e.g. 500 bytes. What is written to the NVRAM and where it is written is implementation-dependent.

The FCTs 50 are sent over a secure, encrypted connection (e.g. SSL) to the appliances 18 at the manufacturer's location automatically whenever a synchronization operation occurs. FCTs 50 can then be requested by the agents 20 by product name, using the agent API 21 or daemon API 23. When an agent 20 requests a feature activation product it would obtain all the FCTs 50 bound to that product individually. When an agent 20 fetches FCTs 50 from an appliance 18, it queries all service modules for an ACC-enabled product of that name, in which case multiple FCTs 50 may be delivered to an agent 20, and are then send to an ACC 12 individually. The agent API 21 may not interface with the ACC 12 directly in which case an implementation-dependent interface is required. When using the feature activation service module, the feature data should never be in plaintext after it leaves the controller 22 and before it enters the ACC 12.

Figure 10A:
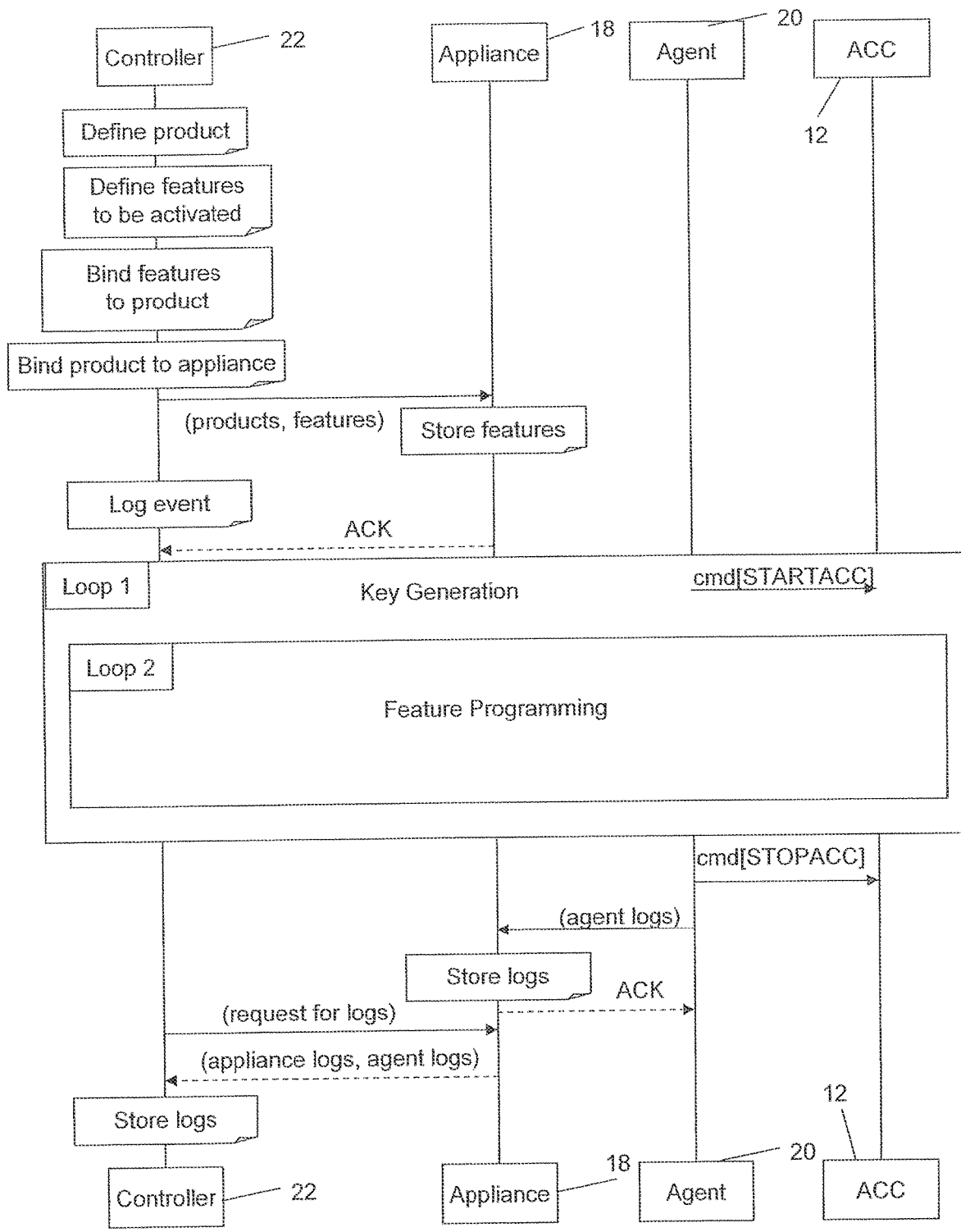
FIGS. 10A to 10B are sequence diagrams showing an example set of operations for performing feature activation using the AMS.

As can been seen in FIG. 10A, the feature activation service module creates logs when feature data is sent to an appliance (controller logs), when feature data is sent to an agent 20 (appliance logs), and when feature data is sent to the ACC 12 (agent logs). All the logs are stored on the controller after being returned by an appliance 18 during a synchronization operation, and can be used to monitor and track feature use. Each time feature data is used on an appliance 18, the appliance credit is decremented by one and each appliance 18 also maintains a feature data product level, which is decremented by one each time feature data is used. The feature data level and credit level are replenished when the controller 22 synchronizes an appliance 18. Both of these mechanisms are used to meter feature data use on an appliance 18.

Figure 10B:
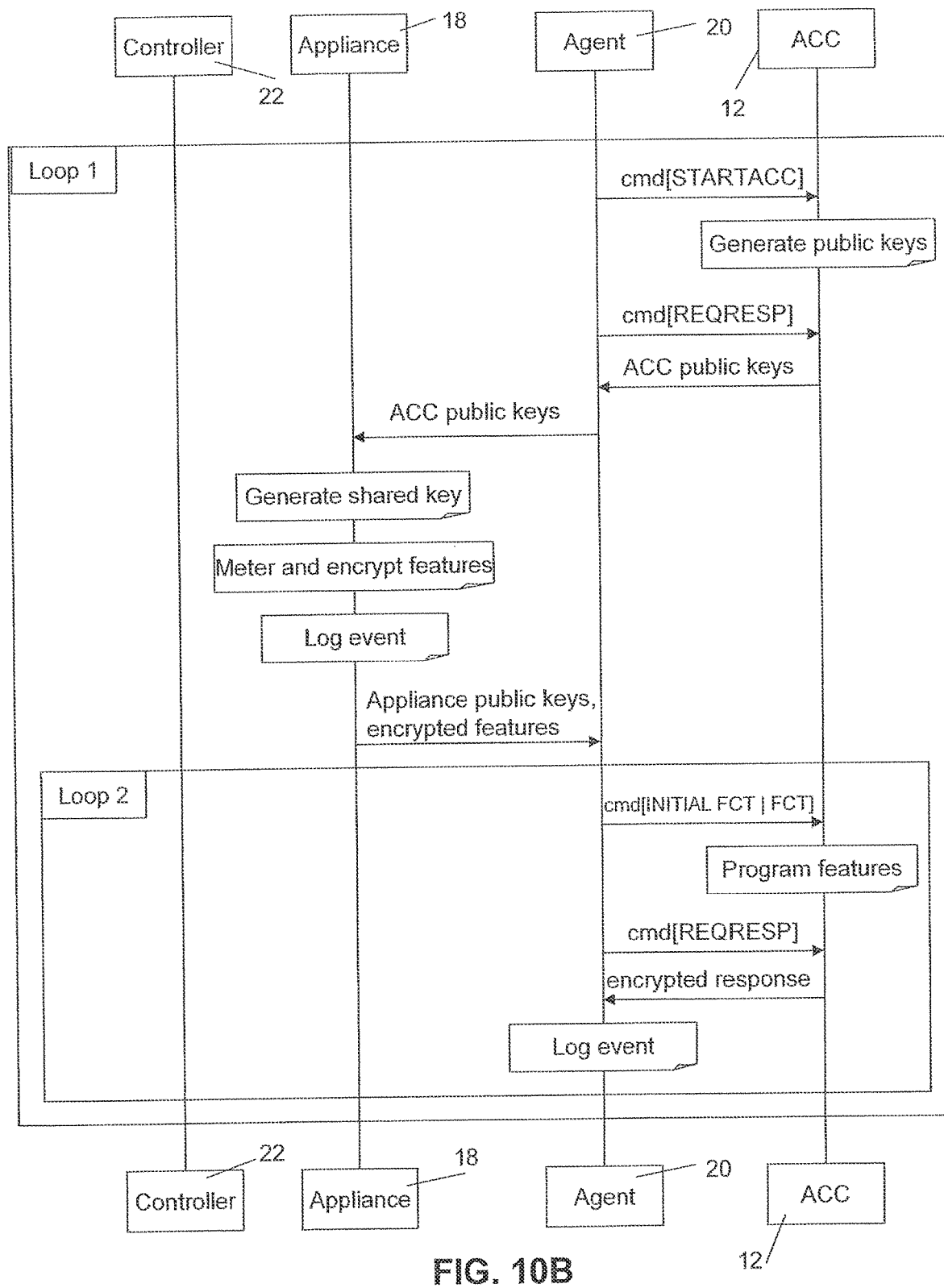

In FIG. 10A, the defining of products and feature data, as well as the delivery of FCTs 50 and log reporting are similar to the mechanisms used in serialization and key injection. However, it can be observed that when utilizing an ACC 12, the normal loop for the injection or application of assets is separated into a pair of loops, Loop 1 that involves key generation, and Loop 2, within Loop 1, which involves feature programming Loop 1 is initiated by providing the command cmd[STARTACC] described in detail below. The loops are terminated by providing the command cmd [STOPACC]. The loops are shown in greater detail in FIG. 10B. Once providing cmd[STARTACC], the ACC 12 generates public keys and after some time the agent 20 requests a response by sending the command cmd[REQRESP] to obtain the ACC public keys. The agent 20 provides these public keys in turn to the appliance 18 and the appliance 18 uses these keys to generate a shared key, e.g. using the ECMQV protocol as exemplified later. The appliance 18 has now opened a secure connection with the ACC 12 and can meter and encrypt the features and log this event. The appliance public keys and the encrypted features are then provided to the agent 20. The agent 20 then initiates the feature programming loop by sending the command cmd [INITIAL FCT|FCT] which includes the FCT 50. The features are then programmed in the feature register 120 by the ACC 12 and the agent requests a response again using the cmd[REQRESP]. In response the ACC 12 provides an encrypted response pertaining to the feature programming steps and the agent 20 logs this event. Since the secure connection is established, additional feature programming steps can be applied before the loops terminate as noted above.

It can therefore be seen that when implementing the AMS 10 with an ACC 12, the general provisioning and delivery of assets is similar to those services that do not require an ACC 12 with additional considerations and commands required to establish the secure connection with the ACC 12 also required. It can be appreciated that these operations can also be adapted to be used in the serialization and key injection service modules to utilize FCTs 50 for carrying serial numbers and keys. As such, various implementations are available using the common application framework provided by the AMS 10.

As with the other service modules exemplified herein, for feature activation, each product should be assigned a unique product ID by the AMS 10 and a unique identifying name provided by the operator. Each feature that is defined can be assigned a unique feature ID by the AMS 10 and a unique identifying name by the operator. Each feature defines a command type and, in this example, a 32-byte data value. One or more features should be allowed to be bound to a feature activation product and each feature may be bound to multiple products. A feature should be able to be unbound from a product, but only if that product is not bound to any appliances 18. Each feature activation product can be bound to one or more appliances 18 and each appliance 18 may have multiple feature activation products assigned to it.

A metering process can be implemented where the controller 22 will top up the feature activation product levels on the appliance 18 during a synchronization operation. The operator would define warning, minimum and maximum levels similar to the other service modules exemplified herein. A feature activation product may be modified/deleted on the controller 22 if it is not bound to any appliance 18 and features may be modified/deleted on the controller 22 if it is not assigned to any feature activation product. An appliance 18 can be deleted on the controller 22 if there are no products bound to the appliance 18. The feature command, record tag, and data should be protected from tampering on the appliance 18 and a read-only sync mode should be supported to allow a query to be made and logs to be obtained without providing more FCTs 50.

The appliance 18 supports delivery of features to the ACC 12 via the agent 20 using the protocol defined in FIGS. 51 to 66 described below. This includes receiving feature activation products from the controller 22, responding to requests from the agent 20 for feature activation products, metering the products, receiving logs back from the agent 20, and sending logs back to the controller 22. The appliance 18 decrements appliance credit for each FCT 50 delivered and when a feature activation product is unbound from an appliance 18, all features belonging to that product should be deleted from the appliance 18.

The agent 20 can request features from the appliance 18 by feature activation product name; can interface with the ACC 12 using the above-mentioned protocols; and can deliver each feature in the product to the ACC 12 separately, log the feature use, and return logs to the appliance 18. The feature activation feature use log should include a single character string field for customer log data, formatted appropriately.

AMS GUI

FIGS. 11 to 50 illustrate example screen shots for the GUI 8 shown in FIGS. 1 and 3.

The GUI 8 is, in this example, a web-based application providing a graphical interface for the AMS 10. As will be explained, the GUI 8 is designed with an AMS system operator as the intended user and thus provides the ability to connect to the AMS controller 22, e.g. by logging in with a username and password. The GUI 8 enables the operator to view status information by products 14, services, or by manufacturer; review current alerts, manage and track jobs currently active on the controller 22; view and generate reports; view information and statistics about the controller 22; manage the appliances 18 and perform operations associated with the appliances 18; manage products 14 in the system and perform operations associated with these products 14; manage serialization schemas, key types, and FCTs 50; manage users, passwords and roles that allow access to controllers 22 and appliances 18; access online help for the particular application; and determine information related to the application (e.g. build date, version, etc.)

Figure 11:
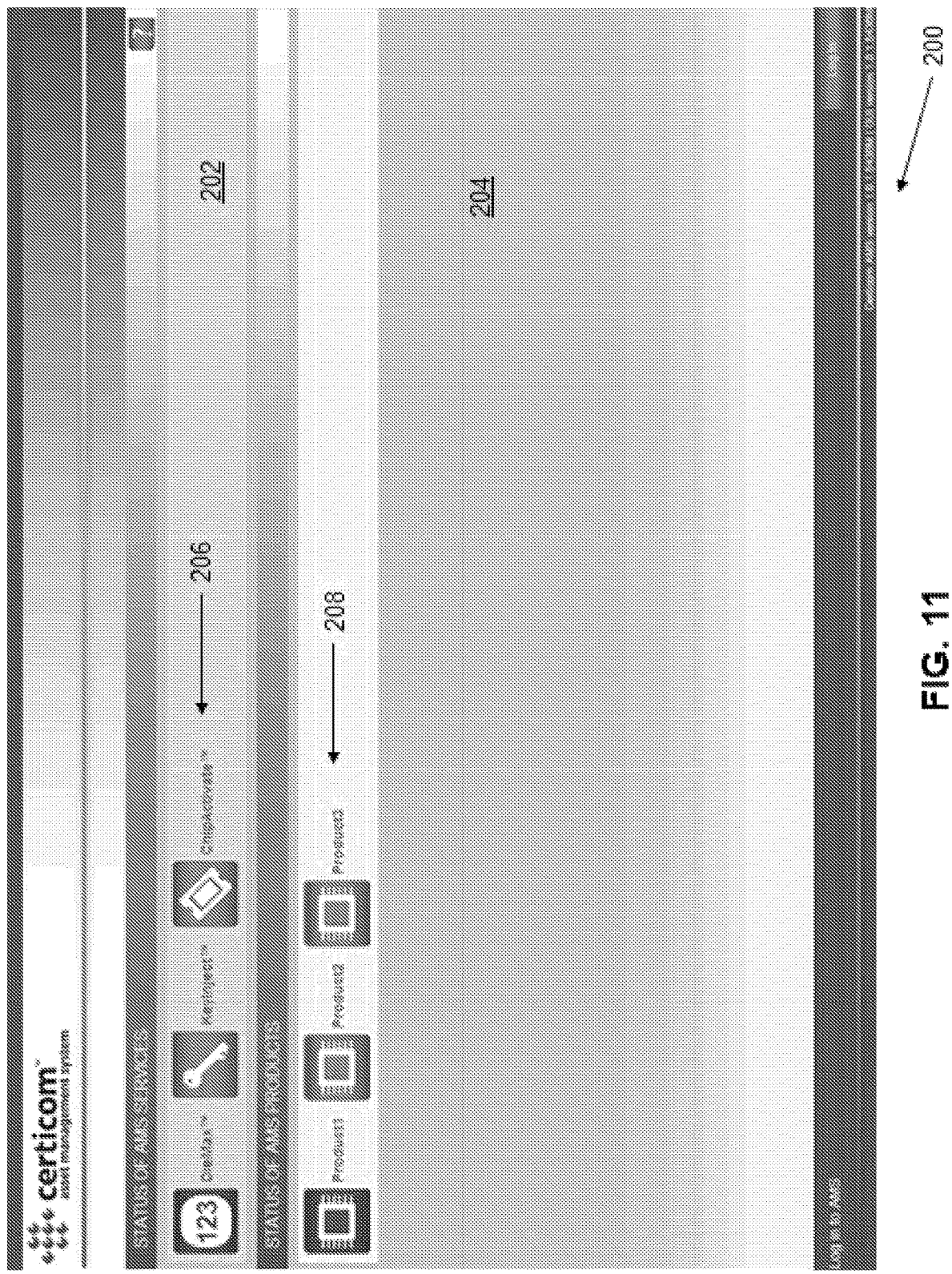
FIG. 11 is an example screen shot showing a quick status view provided by the AMS graphical user interface (GUI) shown in FIG. 1.

When implemented as a web-based system, the GUI 8 can be accessed by launching a standard web-browser and pointing the browser to an appropriate URL. As shown in FIG. 11, the GUI 8 can include a quick status view 200, which can be configured to appear when the user is logged off or otherwise "locked out" of the controller 22. For example, the quick status view 200 can be configured to appear after the GUI 8 times out from inactivity on the part of the user logged in, or if the user clicks a lock button or selects a similar option from a menu (not shown). The quick status view 200 is also made available for viewing even without a user login. In this way, status information, alerts, and other critical messages can be viewed without the observer having to be logged in. For example, when an appliance 18 goes offline or malfunctions an operator or even another person in the vicinity can immediately be aware of this situation without having to first log in. The quick status view 200 also functions as a screen-saver for the GUI 8 such that if a prescribed period of time passes with no activity in the GUI 8, the quick status view is displayed 200 and the operator would need to log in again to continue. This protects the AMS 10 from inadvertent or malicious tampering while still providing important status information on a "read only" basis.

The quick status view 200 comprises a top portion 202 and a bottom portion 204. In the top portion 202, service icons 206 are displayed for the services offered by the AMS 10. Each icon indicates, by colour (e.g. red or blue), whether there is a problem or alert with any of the appliances 18 associated with the particular service. In the bottom portion 204, product icons 208 are displayed for any products 14 defined in the GUI 8. Similar to the top portion 202, each icon 208 indicates, by colour, whether there is a problem or alert with any of the appliances 18 in the system or application supporting the particular product. The use of different colours for normal operations versus problem states enables an operator to quickly identify a problem and drill in to that appliance 18 and application to determine the source of the problem and take any remedial action if necessary. If necessary, the bottom portion 204 can provide multiple rows (not shown), e.g. when there are many products 14. In some embodiments, the operator may be given a option for defining which products 14 should appear in the quick status view 200.

By clicking any of the icons on the quick status view 200, a user login screen (not shown) can be launched. Once logged in, the operator can be presented with a status view filtered according to the selected icon. Therefore, the operator, upon determining a problem with a particular service in the quick status view 200, can click on that service icon 206 and, upon logging in, the next view would be filtered to that service, e.g. serialization. Once in the status view, the operator can observe which appliance(s) have alerts and double-clicking (or other input) can take the operator to a detailed view of information about the appliance 18, allowing them to determine the source of the alert. When logging in, the login screen can be given a format that is similar to the quick status view 200 and other screens and to differentiate between fields, each field can be highlighted with a different colour and provide a status bar to indicate what is being performed. If there is an error logging in, a non-field specific message can be displayed with a red background at the top of the form.

Figure 12:
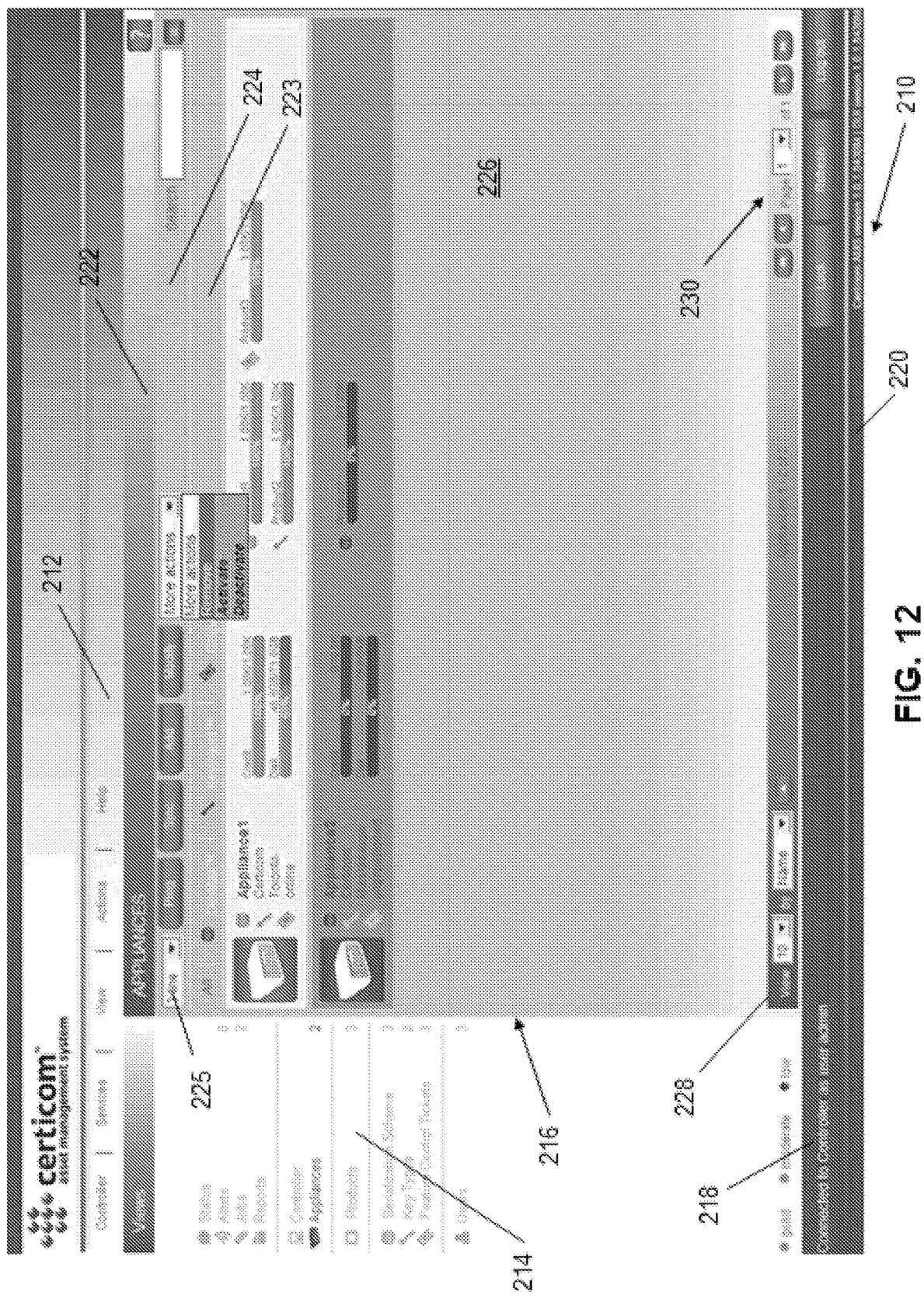
FIG. 12 is an example screen shot showing an appliances view provided by the AMS GUI.

Once the operator has successfully connected and logged onto a particular controller 22, a main application 210 appears, which may be filtered if the user had selected a particular icon 206, 208. One example, providing an appliance view is shown in FIG. 12. To facilitate navigation, the GUI 8 provides a consistent form of panes and methods for interacting with the application.

The main navigational and information areas of the main application 210 in this example include an application menu bar 212, a view pane 214, a main information pane 216, a status bar 218, and a version bar 220. The applications menu bar 212 in FIG. 12 comprises five menus, namely a Controller menu, a Services menu, a View menu, an Actions menu, and a Help menu. The Controller menu enables the operator to modify the controller 22, and log out of the GUI 8. The Services menu includes an item for each service which, in this example include serialization, key injection, and feature activation. The View menu enables the operator to select from various views, e.g. status, alerts, jobs, reports, controller, appliance, products, serialization schema, key types, feature control tickets, users, etc. The Actions menu changes according to the selected view. The Help menu can provide access to various help resources such as system help, administrator's guide, developer's guide, product overview, system overview, user's guide, etc.

The view pane 214 provides quick access to the different views in the GUI 8. Such views may include a status view, alerts view, jobs view, reports view, controller view, appliances view, products view, serialization schema view, key types view, FCTs view, and user's view. It may be noted that in this example, the view pane 214 is an alternative to user the View menu. Where applicable, a number beside each view item indicates the number of the associated item (e.g. number of alerts for the alerts view, number of jobs for the jobs view, etc.) active in the AMS 10. Many of the views can also display the Services menu allowing the operator to quickly filter items in the data according to the selected service. For example, if the appliances view is active and a serialization item is selected in the Services menu, then the appliances view can display all appliances with the serialization service active. When using the Services menu to filter, the standard filter bar can be disabled and hidden. Additional service specific information may be displayed for each item in the information pane 216 and extra service specific actions may appear when selecting services in the Services menu.

The main information pane 216 displays information about the objects in the system according to the selected view. For example, for the Jobs view, each item in the data area is a job in the system. The main information pane 216 comprises several features. A view title bar 222 displays the title of the active view along with the title of the form if a form is currently displayed. For example, the view title bar 222 for a "Modify Appliance" may show: "APPLIANCES•MODIFY APPLIANCE". The view title bar 222 may also contain a link to context-sensitive online help for the current screen. A services bar 223 provides a way for the operator to quickly hone in on the services they are interested in. The services bar 223 in the example shown in FIG. 12 displays icons in a horizontal grid and may include the following items: All, Serialization, Key Injection, and Feature Activation. Selecting "all" removes any filters and displays the results of the active view with no filtering. Selecting any of the remaining services displays the active view filtered according to the selected service. For example, appliances using the selected service, jobs related to the selected service, etc. In this way, the operator can more easily navigate amongst multiple services and appliances served by a single controller 22. Additional service-specific information may be displayed for each item in the data area and extra service-specific actions may appear when selecting services in the service bar.

An action bar 224 contains various buttons on its left side with a pull down menu containing any additional actions that are valid for the current view. On the right side of the action bar 224 is a search field. Typing text in the search field filters the contents of the data area 226 depending on the view. For example, for the appliance view, the user may search by appliance name, manufacturer, location, or product. Actions in the action bar 224 may be valid or invalid depending on the selected item in the data area, or whether there is anything selected. If an action is invalid, it can be greyed out. In general, it is advantageous for the list of actions for each view to be consistent, and actions become valid or invalid. A data area 226 presents the information as appropriate for the view, filtered as necessary. In this example, each view may support up to three zoom levels to enable the user to conveniently drill down into further details when needed to troubleshoot or to identify various settings. Zoom levels may be one item per page, one item per three-lines, and one item per line. The shorthand for these zoom levels are: 1-line, 3-line, and detail. A pull down menu 225 in the action bar 224 allows the operator to select a zoom level. A paging bar 228 allows the operator to page through many items when there are too many items to fit on one page. If the zoom level is "detail", then there may be one page for each item. The paging bar 228 can be configured to appear automatically whenever necessary. If the information to display fits on a single page, the paging bar 228 does not need to appear.

On the left side of the paging bar 228 is a text description of the information presented in the data area 226, with a pull-down menu to select the number of items to display per page and how it should be sorted. For example, "View 10 items by Service", where the number of items and the sort field are pull down menus. There is also a button to switch between increasing and decreasing sort order. On the right side of the paging bar 228 are paging widgets 230, which can include: text describing which items are displayed (for example, "Reports 11-20 of 46"); button to go to the first page; button to go to the previous page; the text "Page XX of YY", where XX is a text field allowing the user to go directly to a specific page, and YY is the total number of pages; button to go to the next page; and button to go to the last page.

The status bar 218 is positioned at the bottom of the window and displays basic information about the controller 22, e.g. to indicate that a connection is made and with which operator. Lock and refresh buttons can be included as shown for all views.

Figure 13:
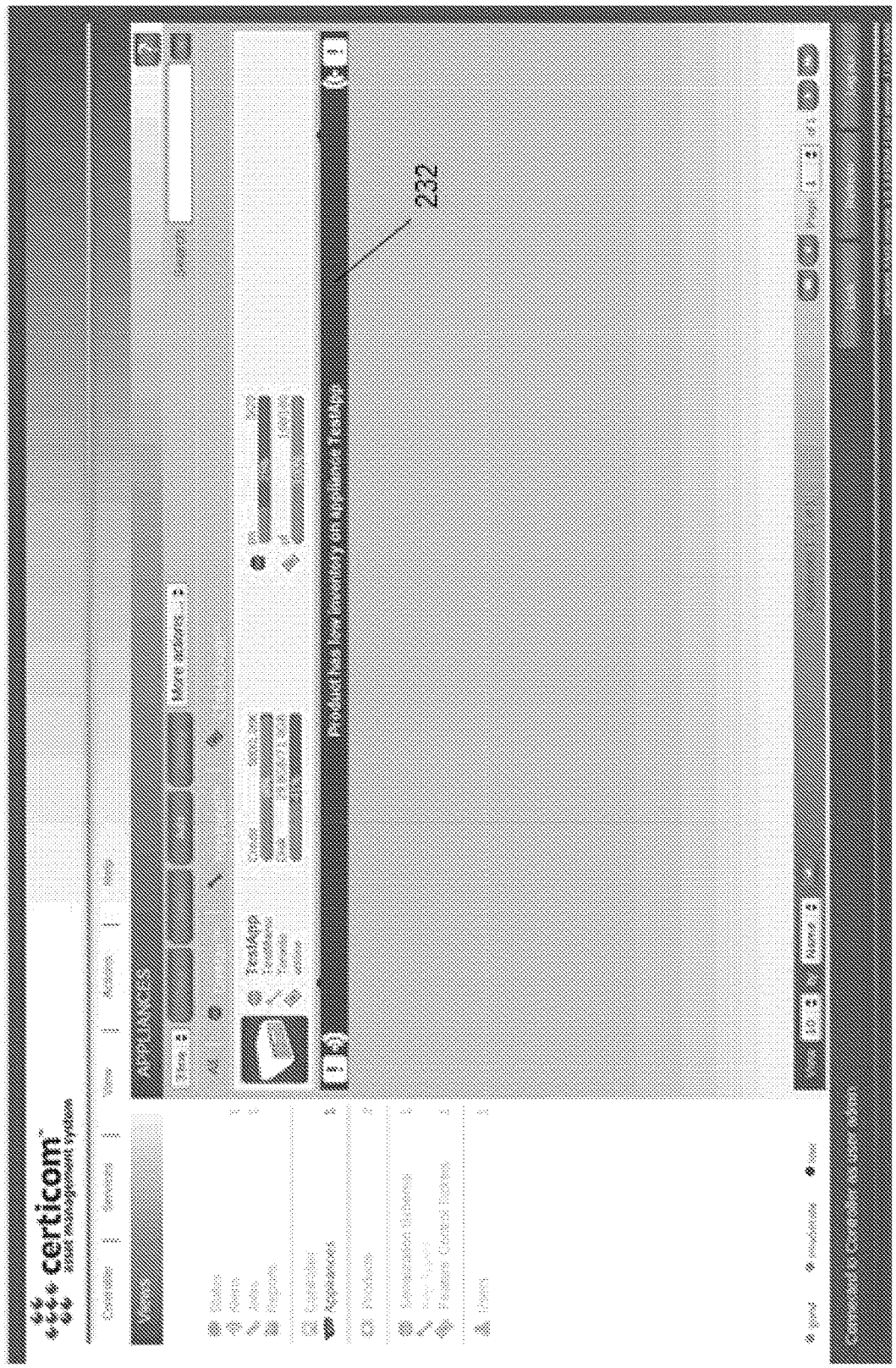
FIG. 13 is an example screen shot showing an appliances view provided by the AMS GUI with an alert bar showing.

To attract the attention of the operator, the data area 226 can be modified to include an alert bar 232 as shown in FIG. 13, which in the example shown indicates that the selected product (shown in the data area 226) has low inventory on a particular appliance 18 named "TestApp". The alert bar 232 can be given a distinct and bold colour such as red, consistent with other alerts, to draw immediate attention to the alert. In this example, the alert bar 232 extends across the width of the data area 226 and includes emergency-related icons to further identify the alert as such.

Figure 14:
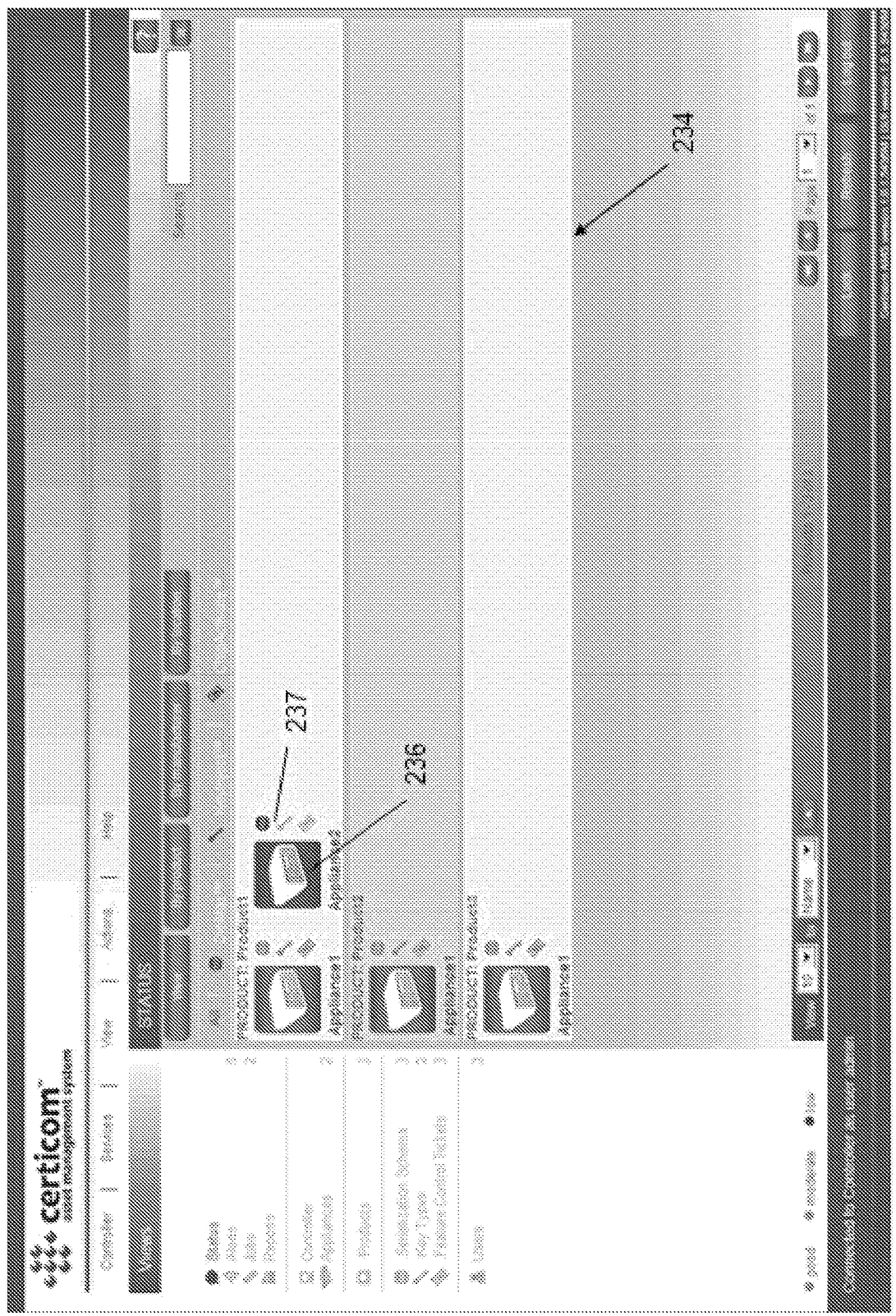
FIG. 14 is an example screen shot showing a main status view provided by the AMS GUI.

The main application 210 can be used to launch a main status view 234 as shown in FIG. 14, which displays appliances 18 in three ways: grouped by product, by manufacturer, or by location. If the view is accessed from the quick status screen 200 by clicking one of the product icons 208, if the view is filtered by products 14, or if the "By Product" action is selected, then it will group appliances by product. Otherwise, it groups appliances 18 by manufacturer. The screenshot shown in FIG. 14 illustrates a view by product. If displaying appliances 18 grouped by product as shown in FIG. 14, each product is displayed showing each appliance 18 associated with the product. If displaying appliances 18 grouped by manufacturer, then each manufacturer is displayed showing each appliance 18 associated with the manufacturer. If displaying appliances 18 grouped by location, then each location is displayed showing each appliance 18 associated with the location.

Appliance icons 236 include service indicators 237 for which services are active on the particular appliance as well as provides an indication of whether the appliance 18 currently has any active alerts (by colouring the icon red) or whether the appliance 18 is operating correctly (by colouring the icon blue). The service indicators 237 can utilize a colour-coded scheme for indicating various states. For example, an orange icon may indicate that the service on that appliance 18 is low on assets, a red icon may indicate a problem with that service, a dim or 'greyed out' icon can indicate that the service is not assigned to the appliance 18, and a green icon can be used to indicate that there are no problems. The status view 234 uses a single zoom level in this example. The View action (or double-clicking a particular appliance) takes the operator to the one item per page zoom level of the appliances view with the selected appliance 18 being displayed. The actions associated with the main status view 234 are: View, By product, By manufacturer, and By location.

Figure 15:
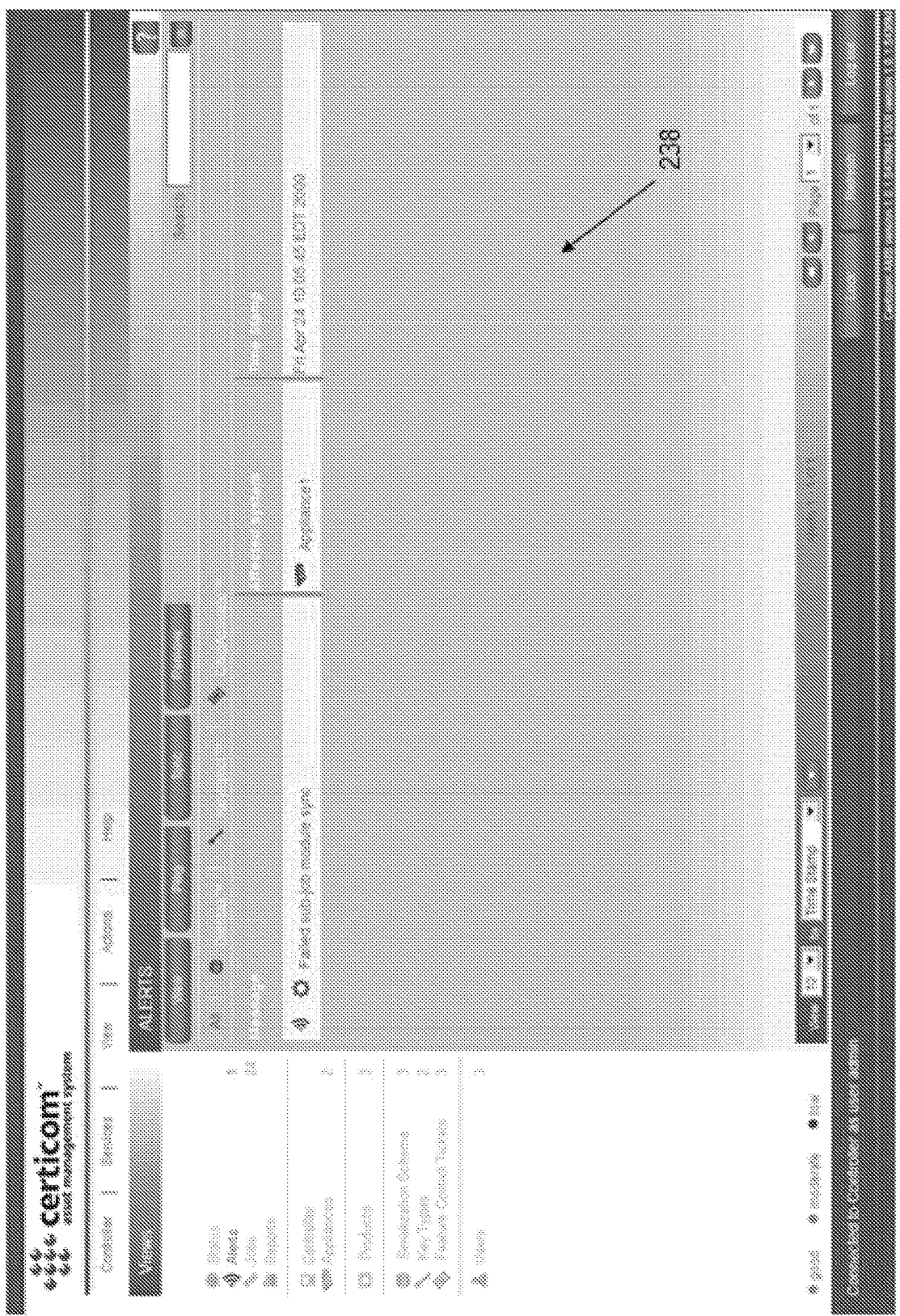
FIG. 15 is an example screen shot showing an alerts view provided by the AMS GUI.

The operator can access the alerts view 238 shown in FIG. 15 to examine any alerts present in the AMS 10. The zoom level shown in FIG. 15 is a 1-line zoom level. In the alerts view 238, the operator can view the alerts, ping the affected appliance 18, sync the affected appliance 18, and remove the alert. The controller 22 can be configured to issue alerts under several different circumstances such as: when the controller 22 is not able to contact an appliance 18, if there are any errors when the controller 22 sends data to an appliance (and vice versa), when a synchronization operation has failed, when the number of assets an appliance 18 has reached the asset warning level, when the free disk space on the appliance 18 has reached a warning level, when the HSM 19 on the controller 22 (or any appliance 18) has deactivated itself, or when an appliance 18 has blocked a connection from an agent 20—because the agent IP address is not in the list managed by the appliance 18. If an alert is issued, the appliance 18 affected appears in the alerts view 238 in the data area 226. The alerts view 238 provides a description of the alert, identifies the service for which the alert was issued, and provides the time the alert was issued. The appropriate response to an alert depends on the cause of the alert.

Figure 16:
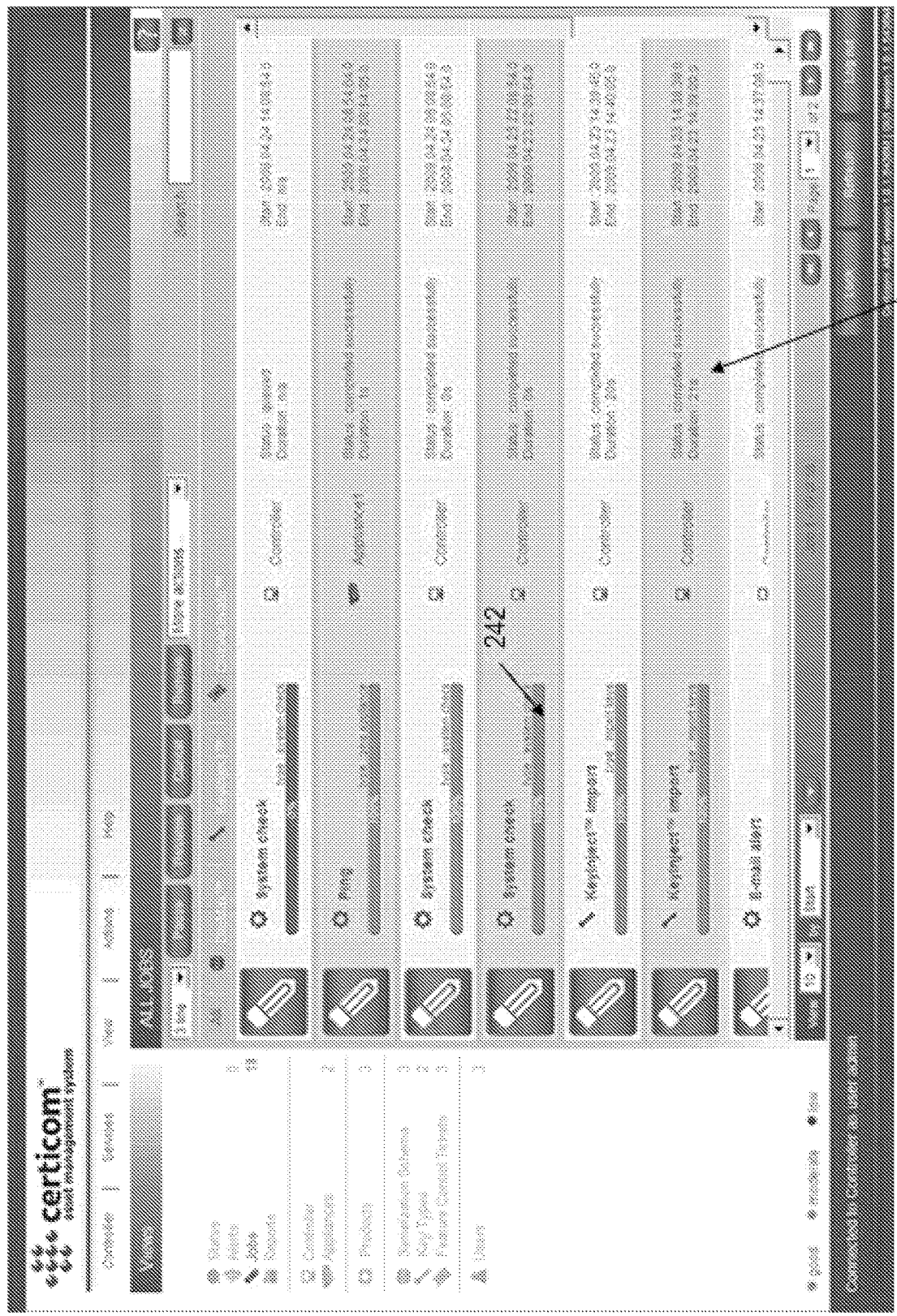
FIG. 16 is an example screen shot showing a jobs view provided by the AMS GUI in a three-line zoom mode.
Figure 17:
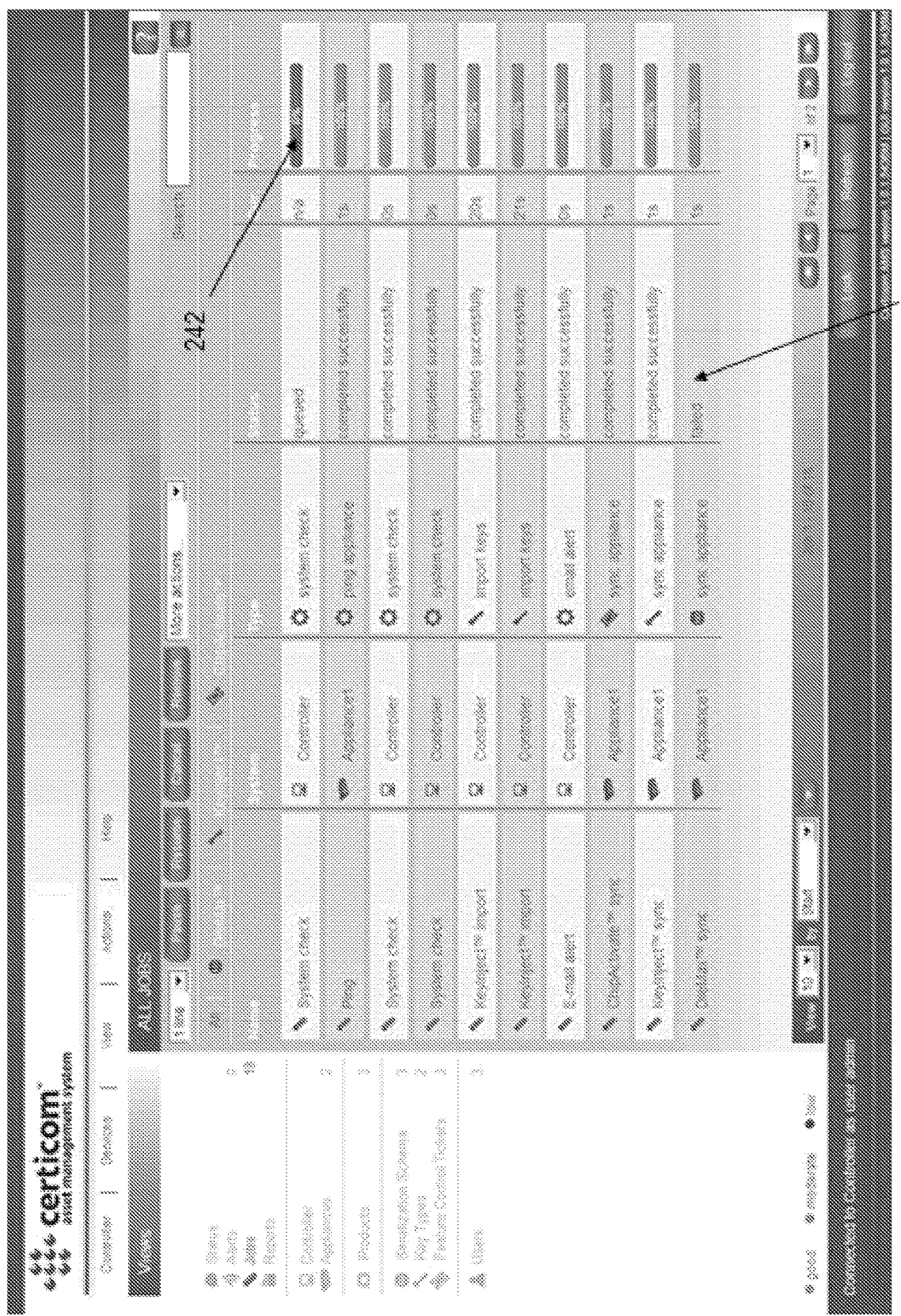
FIG. 17 is an example screen shot showing a jobs view provided by the AMS GUI in a one-line zoom mode.
Figure 18:
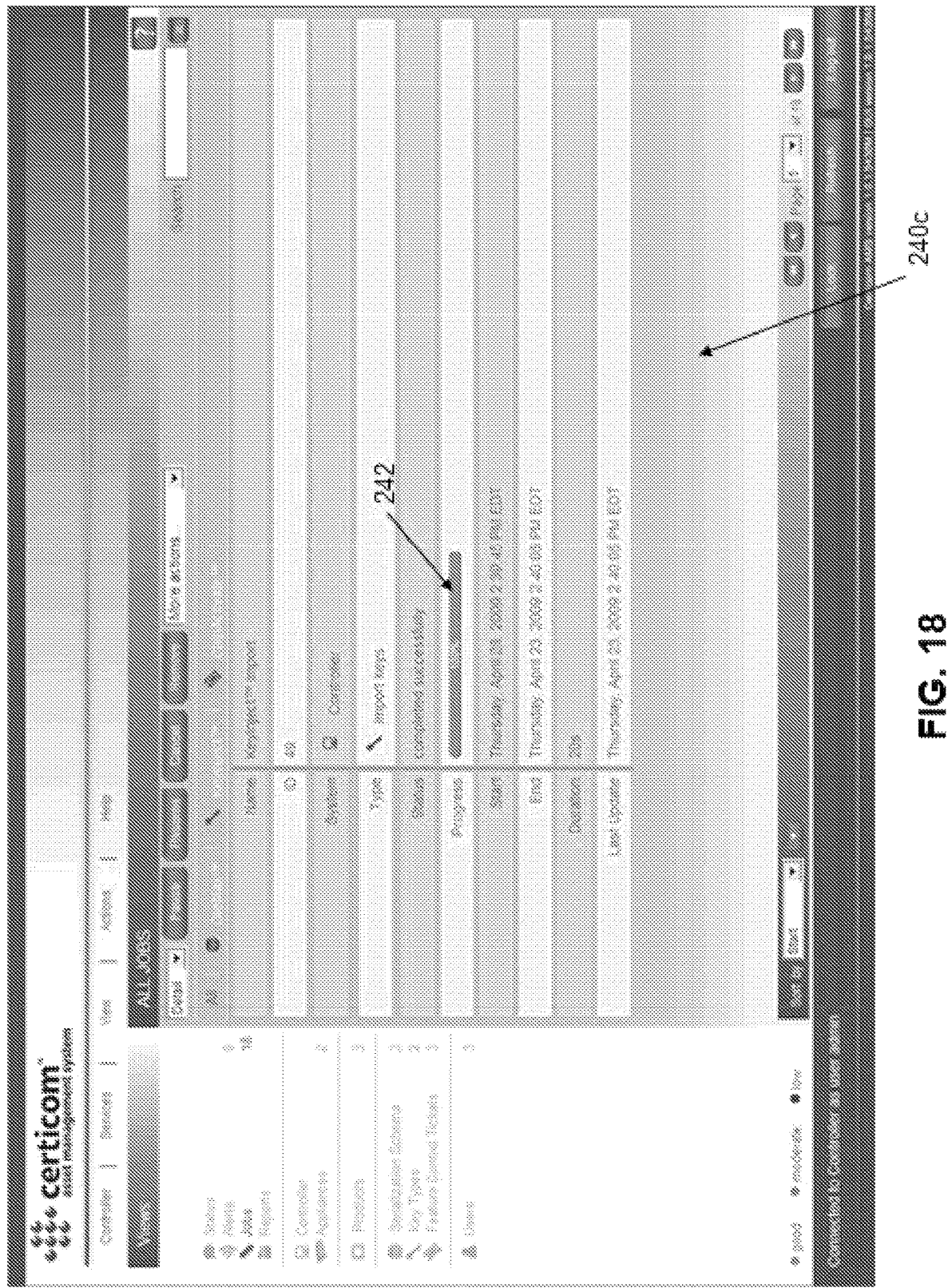
FIG. 18 is an example screen shot showing a jobs view provided by the AMS GUI in a details zoom mode.

The operator can access the jobs view 240 shown in FIGS. 16 to 18 to perform various actions associated with jobs in the AMS 10, such as cancelling a job in progress and removing a completed job. The jobs view 240 in this example supports a 3-line zoom mode 240a as shown in FIG. 16, a 1-line zoom mode 240b as shown in FIG. 17, and a detail zoom mode 240c as shown in FIG. 18. The complete set of information that the detail zoom mode 240c gives, per job, is: name, job ID, system (appliance 18 or controller 22), job type, job status, start time, end time or estimated end time (if available), duration, and progress. A progress bar 242 is provided in each zoom mode 240a-c to provide a graphical overview of the status of the job. Within the jobs view 240, the operator can pause the job, zoom between zoom modes, resume the job, cancel the job, view a job log, remove a job, show completed jobs, and remove completed jobs.

Figure 19:
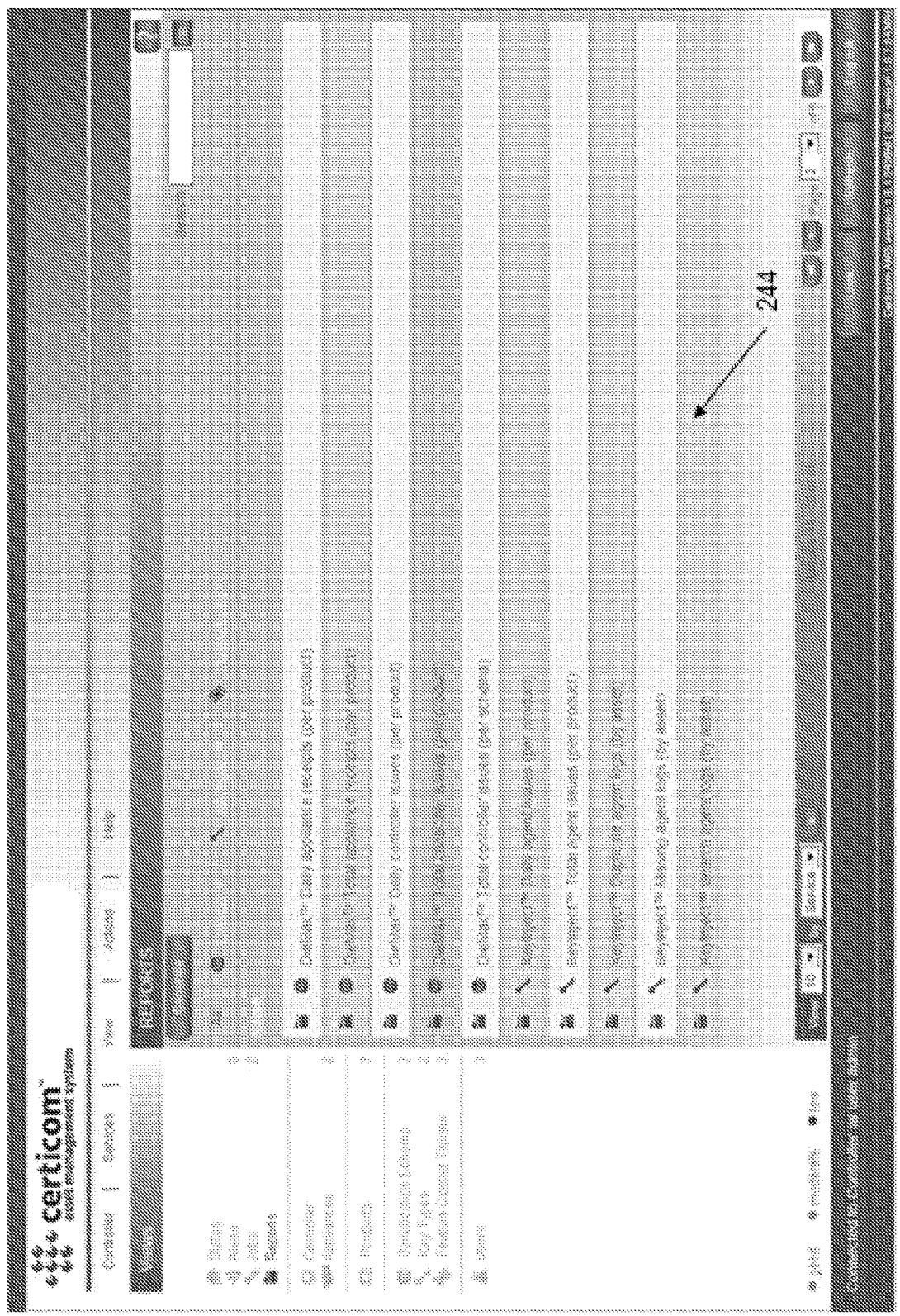
FIG. 19 is an example screen shot showing a reports view provided by the AMS GUI.
Figure 20:
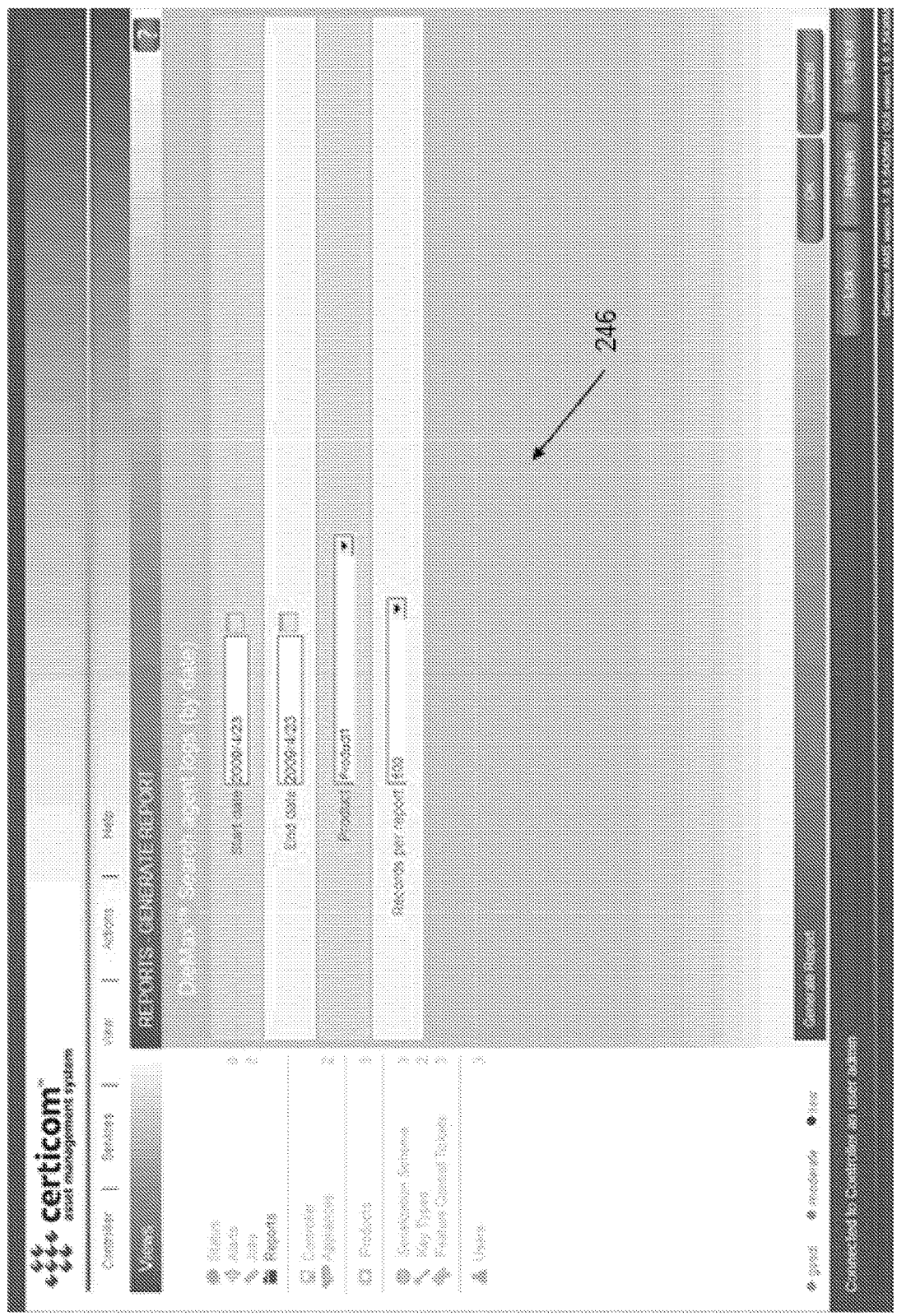
FIG. 20 is an example screen shot showing a generate reports view provided by the AMS GUI.
Figure 21:
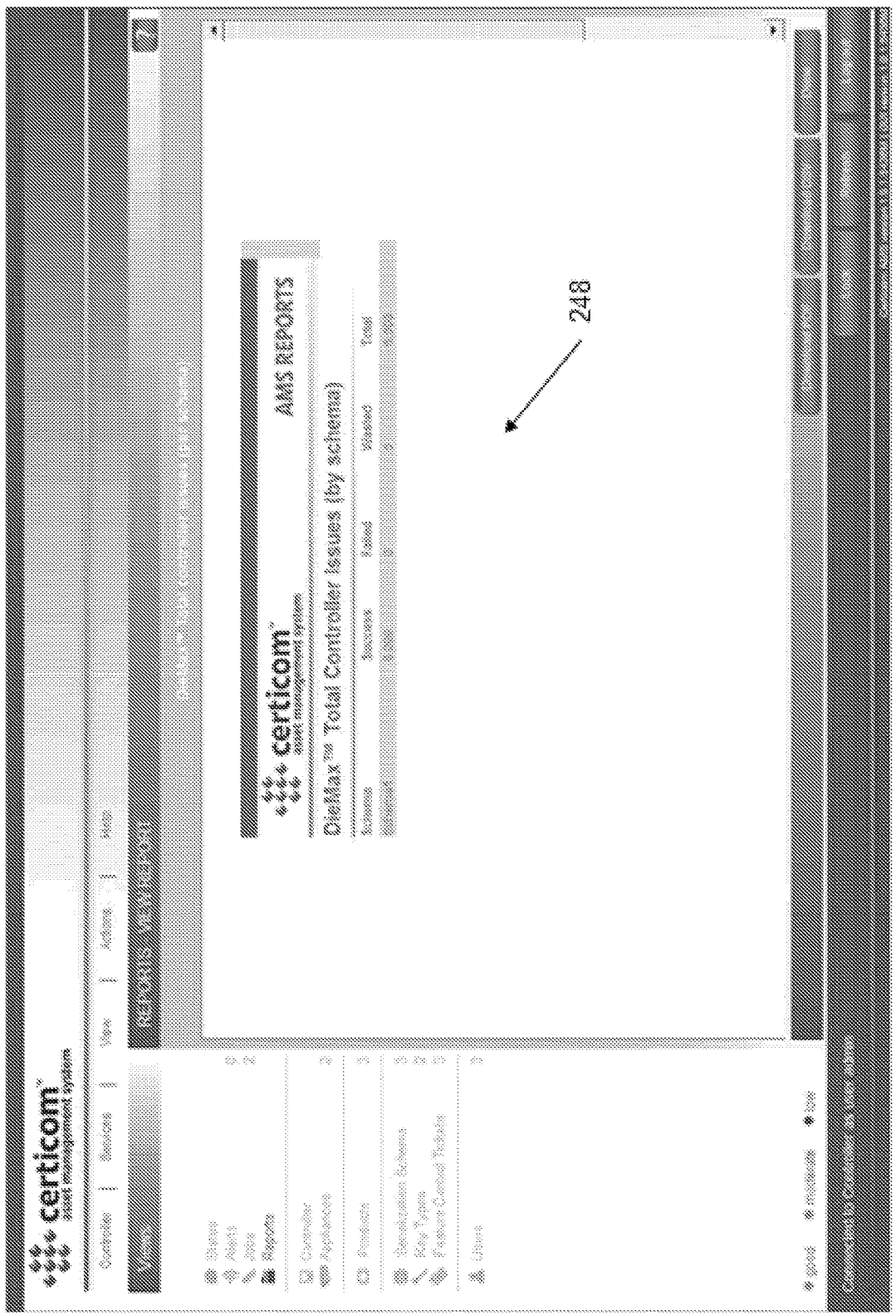
FIG. 21 is an example screen shot showing a reports screen provided by the AMS GUI.

The operator can access the reports view 244 shown in FIG. 19 to generate reports supported by the AMS 10. FIG. 19 illustrates a 1-line zoom mode for the reports view 244. The reports view 244 provides a service icon and a name for a report. The reports view 244 can also be filtered by selecting a service on the services bar 223 to limit the list of reports to a particular service. The generate report action displays a generate reports form 246 shown in FIG. 20 for the operator to enter information required to generate a report. Once the operator has completed the form 246, the report can be viewed as shown in FIG. 21 in the view reports screen 248. The view reports screen 248 also enables the operator to download PDF or CSV formats in this example. Various report types can be generated, for example: number of assets issued by a controller 22 in total, by product or by schema (for serialization); number of assets issued by day for a particular range; number of assets by appliance 18 (total, by day, etc.); number of assets received by agents (total, by day, etc.); number of missing logs, duplicate logs, logs by asset ID or number, logs for a specified product/date range; etc.

Figure 22:
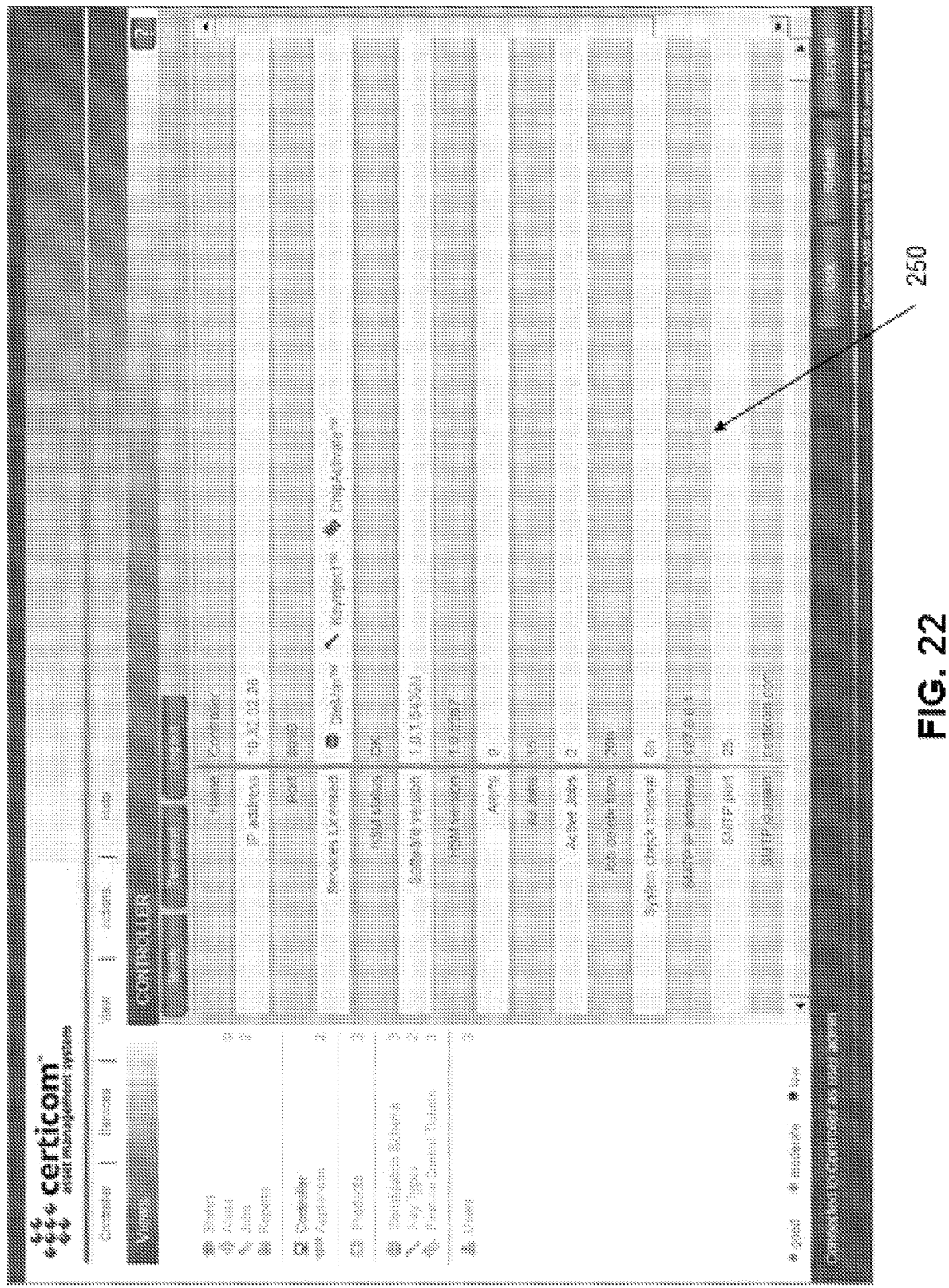
FIG. 22 is an example screen shot showing a controller view provided by the AMS GUI.
Figure 23:
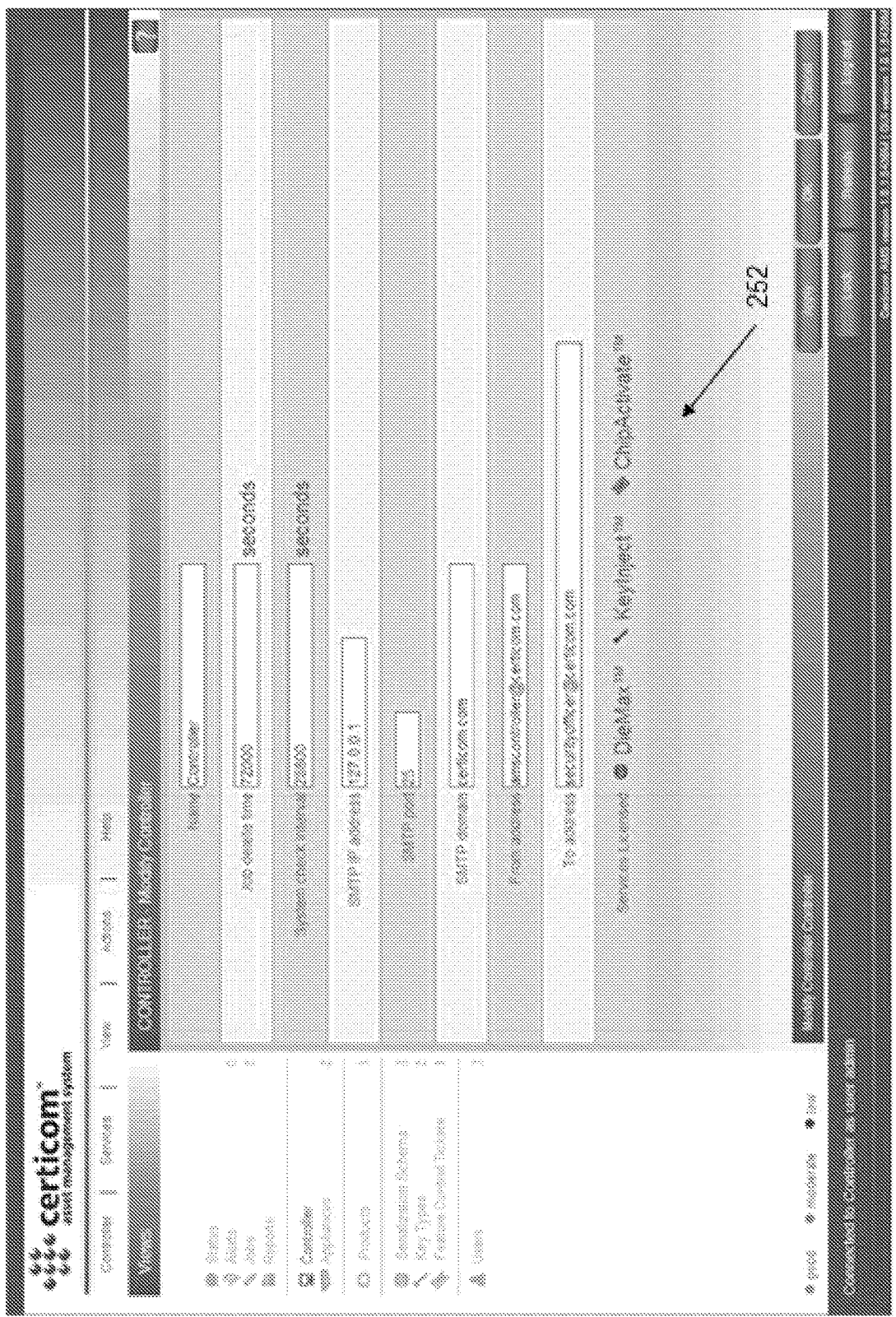
FIG. 23 is an example screen shot showing a modify controller view provided by the AMS GUI.

The controller view 250 shown in FIG. 22 provides details of the controller 22 to which the operator is connected in the data area 226. In this example, the controller view 250 provides the following information: controller name, services the controller is providing, IP address of the controller 22, port of the controller 22, SMTP IP address, SMTP port, SMTP domain, "From" address, "To" address, disk health, controller HSM status, HSM software version, controller software version, number of alerts in the system 10, the number of jobs active in the system 10, job delete time, system check interval, controller's disk space, and memory available on controller 22. In the controller view 250, the operator can modify the controller 22, test email, and log out. To modify the controller 22, the Modify button in the controller view 250 is selected, launching a modify controller form 252 shown in FIG. 23. As can be appreciated from FIG. 23, the modify controller form 252 enables the operator to make changes to the settings and details for the controller 22 and apply those settings.

Figure 24:
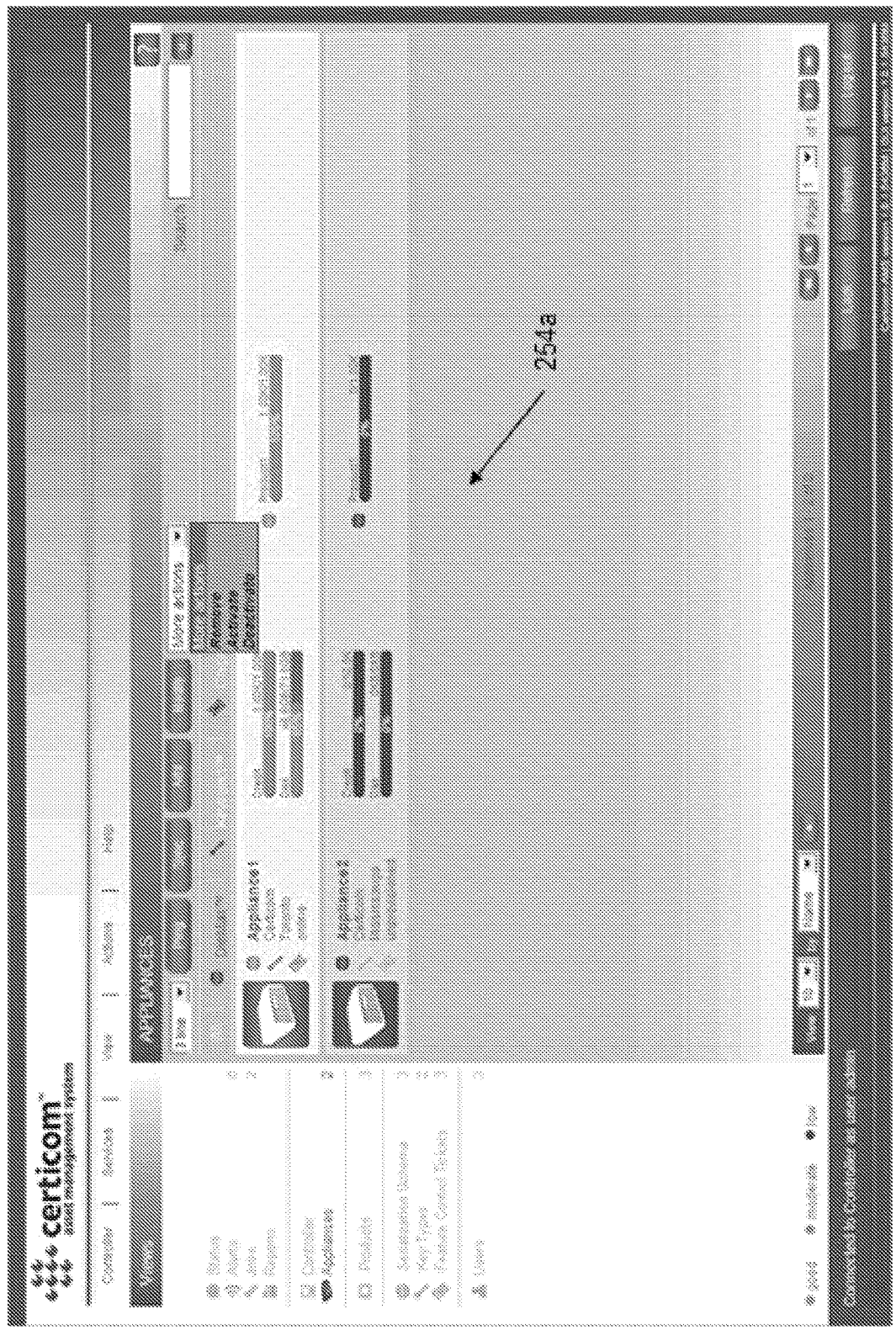
FIG. 24 is an example screen shot showing an appliances view provided by the AMS GUI in a three-line zoom mode.
Figure 25:
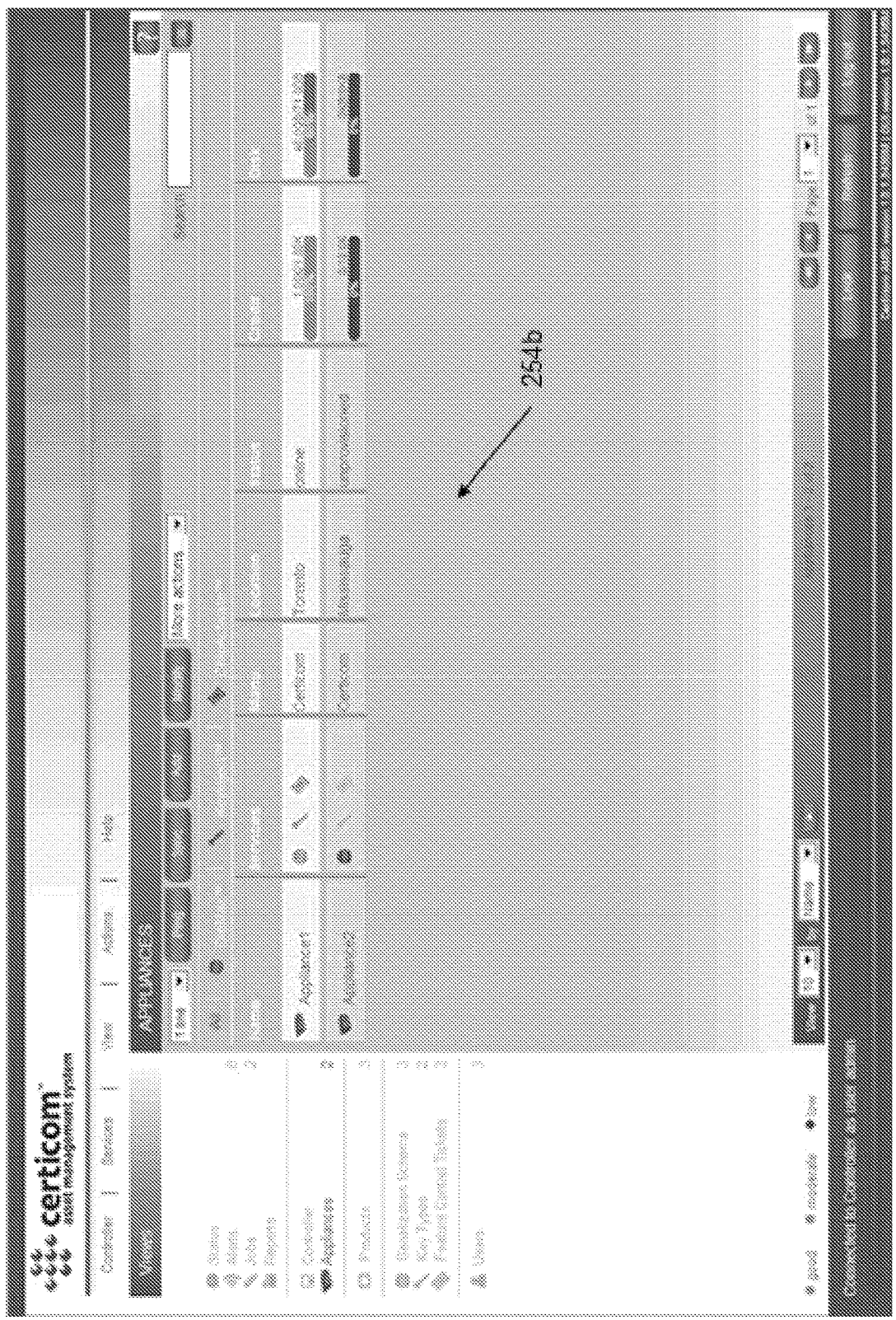
FIG. 25 is an example screen shot showing an appliances view provided by the AMS GUI in a one-line zoom mode.
Figure 26:
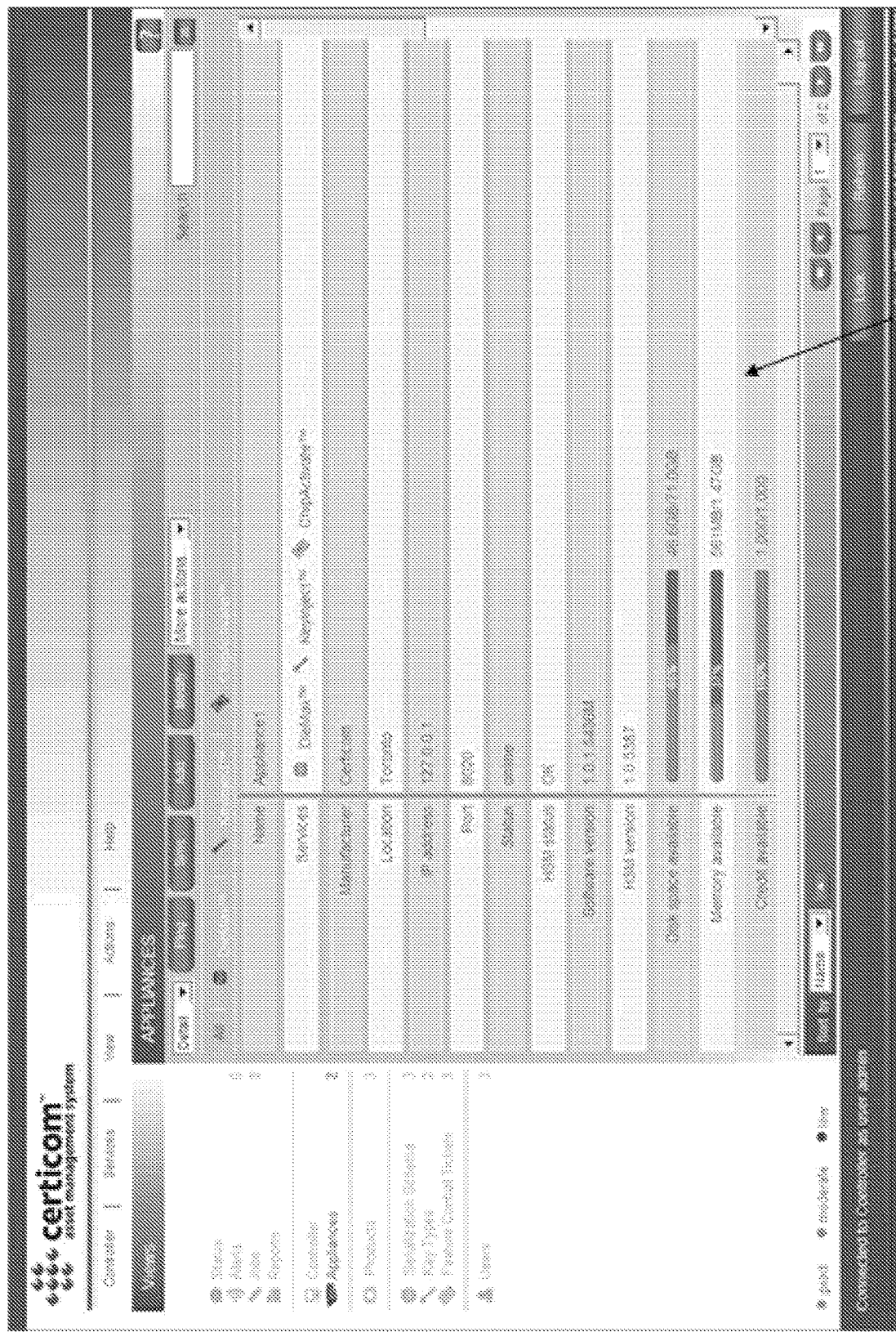
FIG. 26 is an example screen shot showing an appliances view provided by the AMS GUI in a details zoom mode.

The operator can access the appliances view 254 shown in FIGS. 24 to 26 to perform various actions associated with the appliances 18, such as adding, modifying, removing and syncing an appliance 18. The appliances view 254 can support detail, 3-line, and 1-line zoom modes. FIG. 24 shows the appliance view 254 in All Services mode. In All Services mode, each appliance 18 displays service-specific information about one of the services. If only one service is active on the appliance 18, then that service is displayed. If more than one service is active, then the service to display can be selected in a defined order of priority. If a service is selected in the services bar 223, then that service is displayed for all appliances 18 in the appliances view 254. The 3-line mode 254a is shown in FIG. 24, the 1-line mode 254b is shown in FIG. 25, and the details mode 254c is shown in FIG. 26. As can be seen in FIG. 26, the information available per appliance 18 in this example includes: appliance name, services provided by the appliance 18, manufacturer, location, IP address and port, status (e.g. online, offline, inactive, unprovisioned), HSM software version, disk space available, memory available, credit available, minimum amount of credit, maximum amount of credit, warning level for credit, appliance software version, number of alerts, number of jobs, number of connection retries, connection timeout period, auto sync interval, ready only sync, asset block size, last update, list of allowable agent IP subnets, date/time of last communication with controller 22, date/time of last communication with each agent 20, and service-specific information (e.g. serial numbers, keys, FCTs 50). Certain ones of these details can appear in certain zoom levels as shown in FIGS. 24 and 25. In the appliance view 254, the operator can perform a zoom between zoom modes, ping the appliance 18, sync the appliance 18, add an appliance 18, modify an appliance 18, remove an appliance 18, activate an appliance 18, and deactivate an appliance 18.

Figure 27:
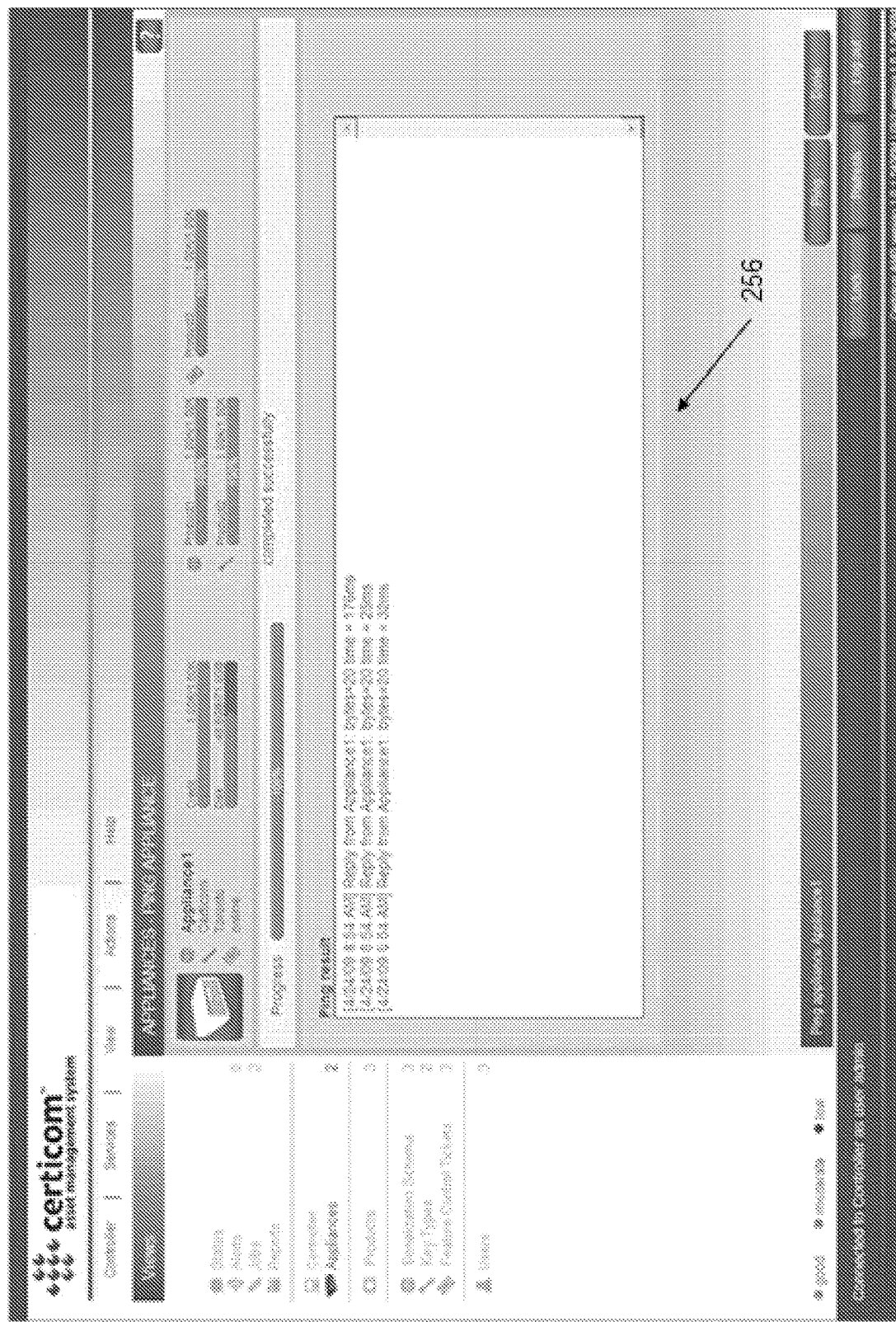
FIG. 27 is an example screen shot showing a ping appliance view provided by the AMS GUI.

The ping appliance action launches a ping screen 256 as shown in FIG. 27, which enables the operator to ping the selected appliance 18 over the secure channel to make sure it is alive and to determine its network latency. The ping action is used to test whether a particular host (appliance 18) is reachable across an IP network and to test an SSL connection, self test the network interface card (NIC) of the computer being used, or as a speed test. The ping can estimate the round-trip time, generally in milliseconds, record packet loss, and print a statistical summary when complete.

Figure 28:
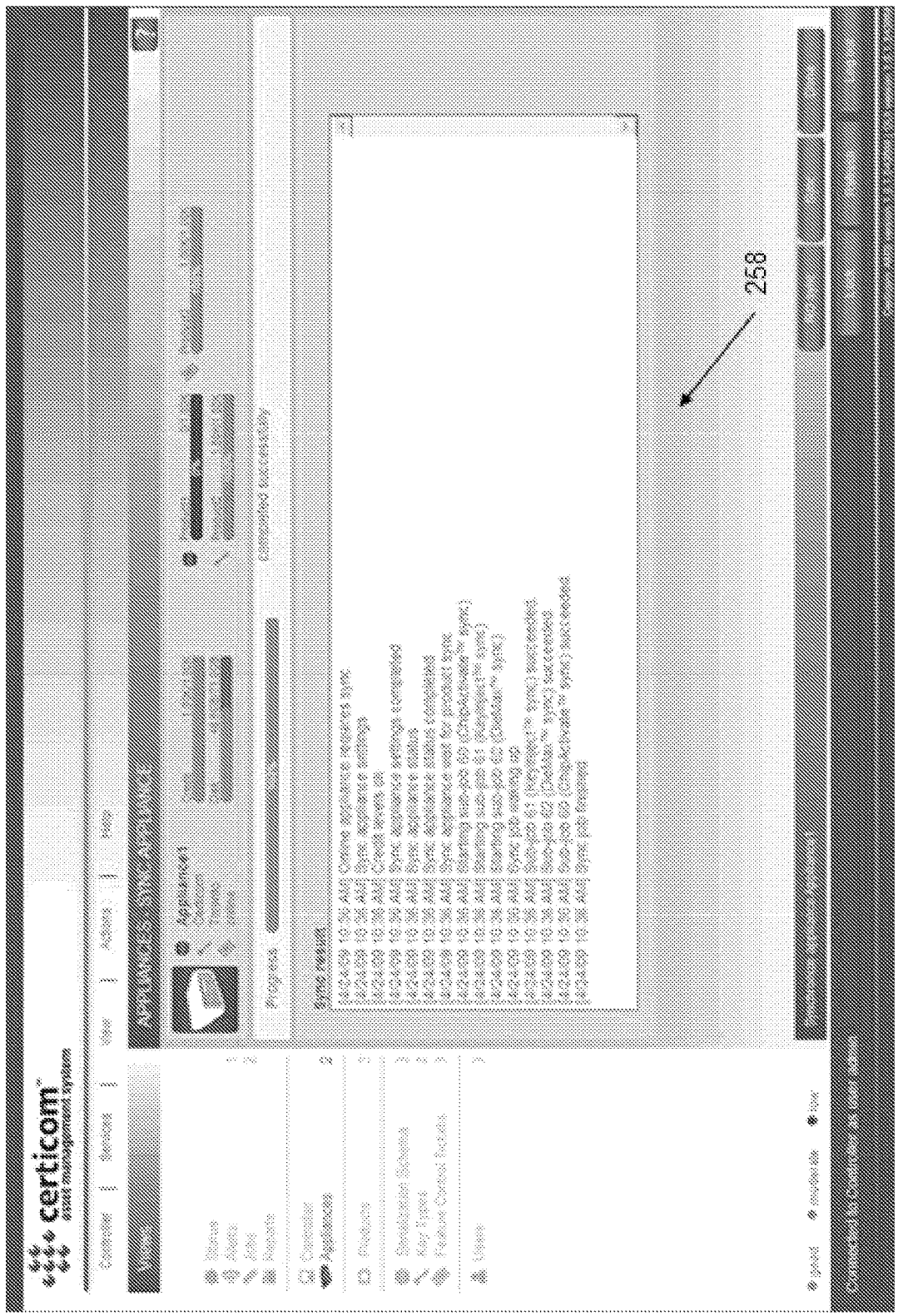
FIG. 28 is an example screen shot showing a sync appliance view provided by the AMS GUI.

The sync appliance action launches a sync screen 258 shown in FIG. 28 and enables the operator to ensure any service-related objects are topped up (e.g. assets such as serial numbers, keys, FCTs 50, etc.), pushes any appliance configuration changes, and retrieves service logs from the appliance 18. The synchronizing action makes sure that any service related objects or assets, such as serial numbers, key, and FCTs 50 are at their maximum amounts. The synchronizing action also synchronizes an appliance's clock with the controller's clock and retrieves service logs from the appliance 18. In addition, any configuration changes made to an appliance 18 can come into effect after the appliance 18 is synchronized. A read only sync can also be performed, which will gather the status and asset information of the appliance 18 to see if it is in sync, but does not make any changes. The synchronization can also be used to obtain service logs from an appliance 18.

Figure 29:
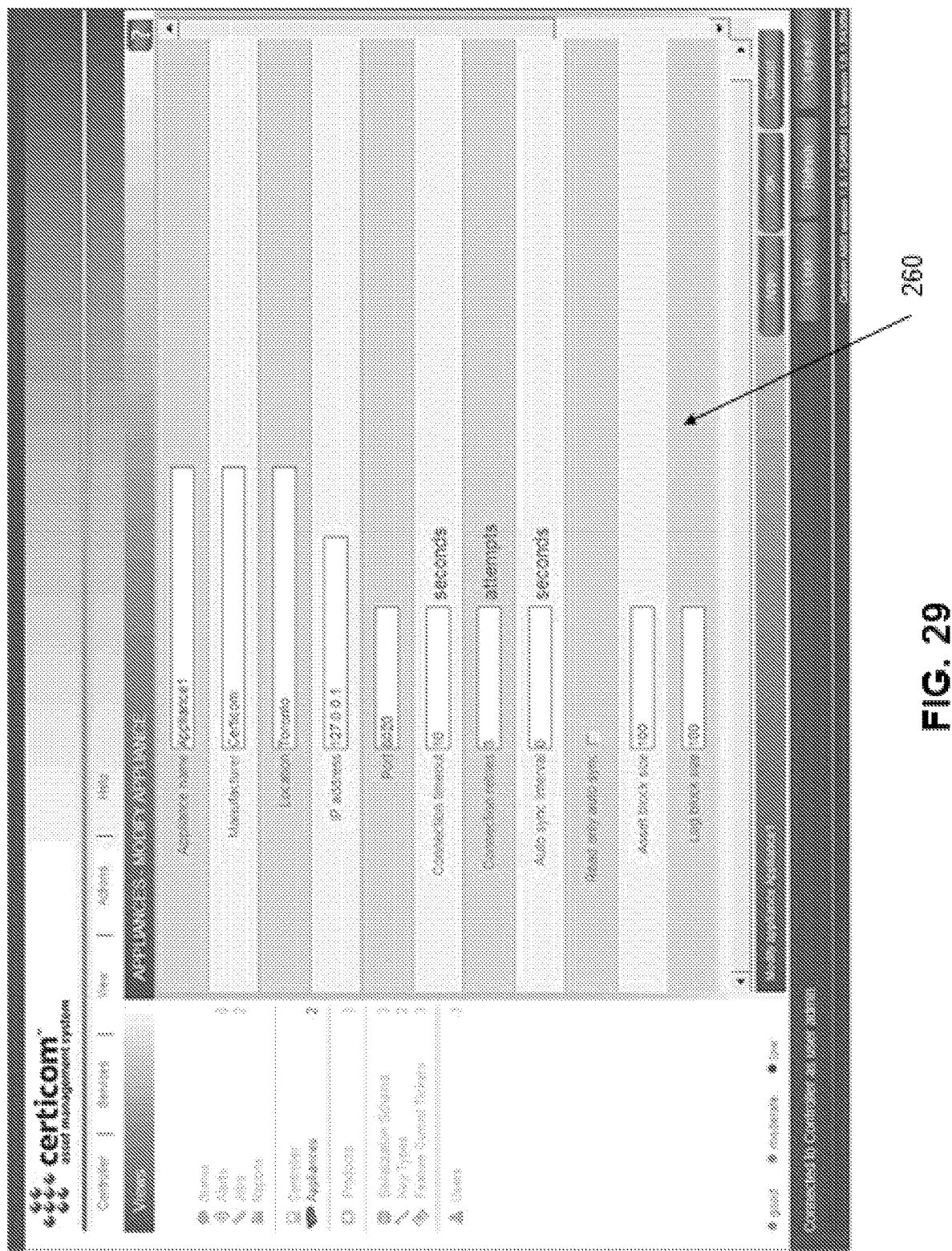
FIG. 29 is an example screen shot showing a modify appliance view provided by the AMS GUI.

The modify appliance action launches a modify appliance screen 260 shown in FIG. 29. The modify appliance screen 260 enables details of the appliance 18 to be edited by the operator. Not shown in FIG. 29 are credit minimum, credit maximum, and credit warning fields to enable the operator to set thresholds for the credits given to the appliance 18 and when to issue a low-level warning. The controller 22 and appliance 18 should automatically synchronize on a regular basis and, when the appliance 18 is synchronized, the controller 22 checks to see how many assets are on the appliance 18. If the number of assets is equal to or lower than the minimum value, then the controller 22 fills the appliance's assets to the maximum level. If the number of assets is equal to or below the warning level, then the controller 22 can issue an alert.

Figure 30:
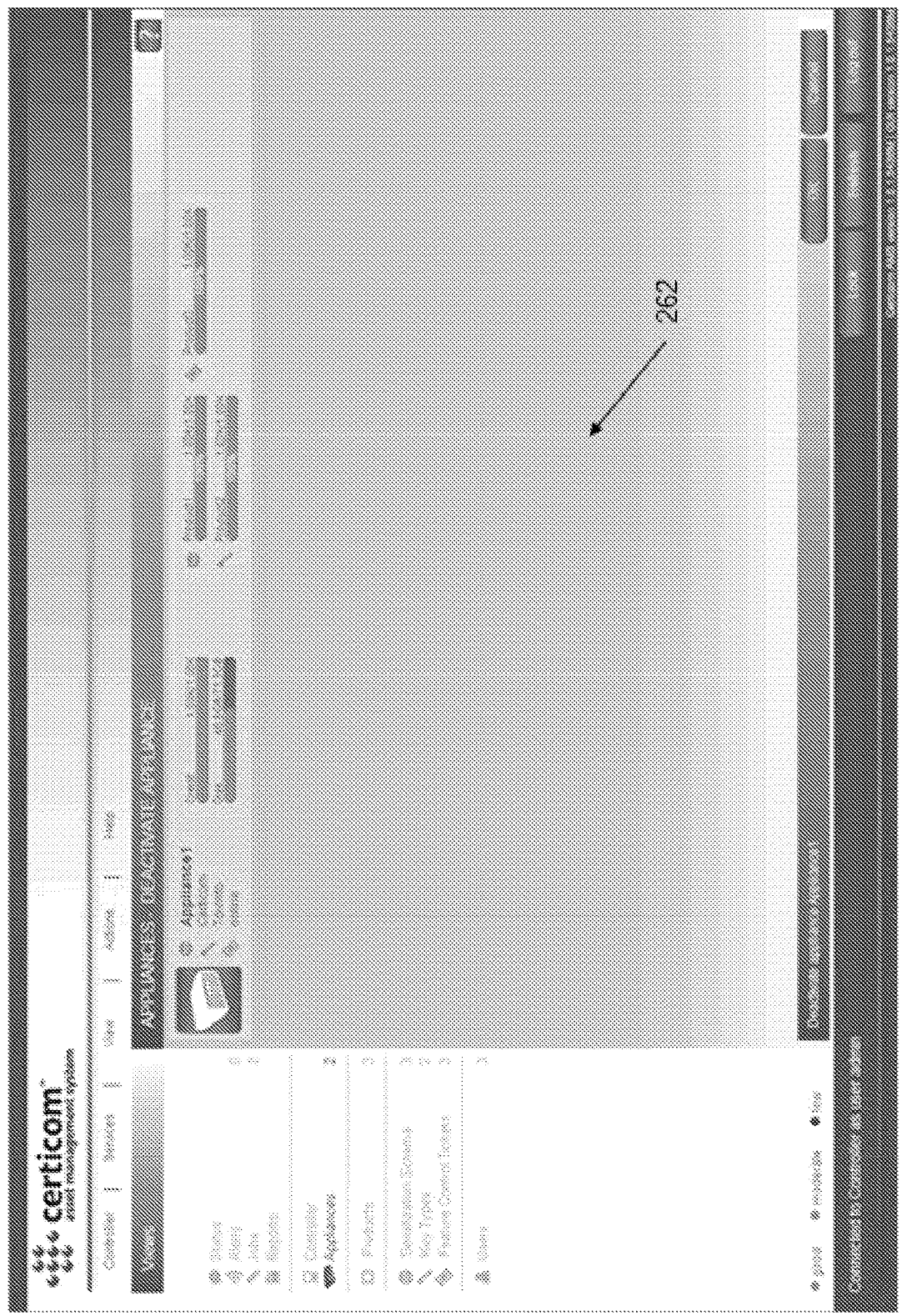
FIG. 30 is an example screen shot showing a deactivate appliance view provided by the AMS GUI.
Figure 31:
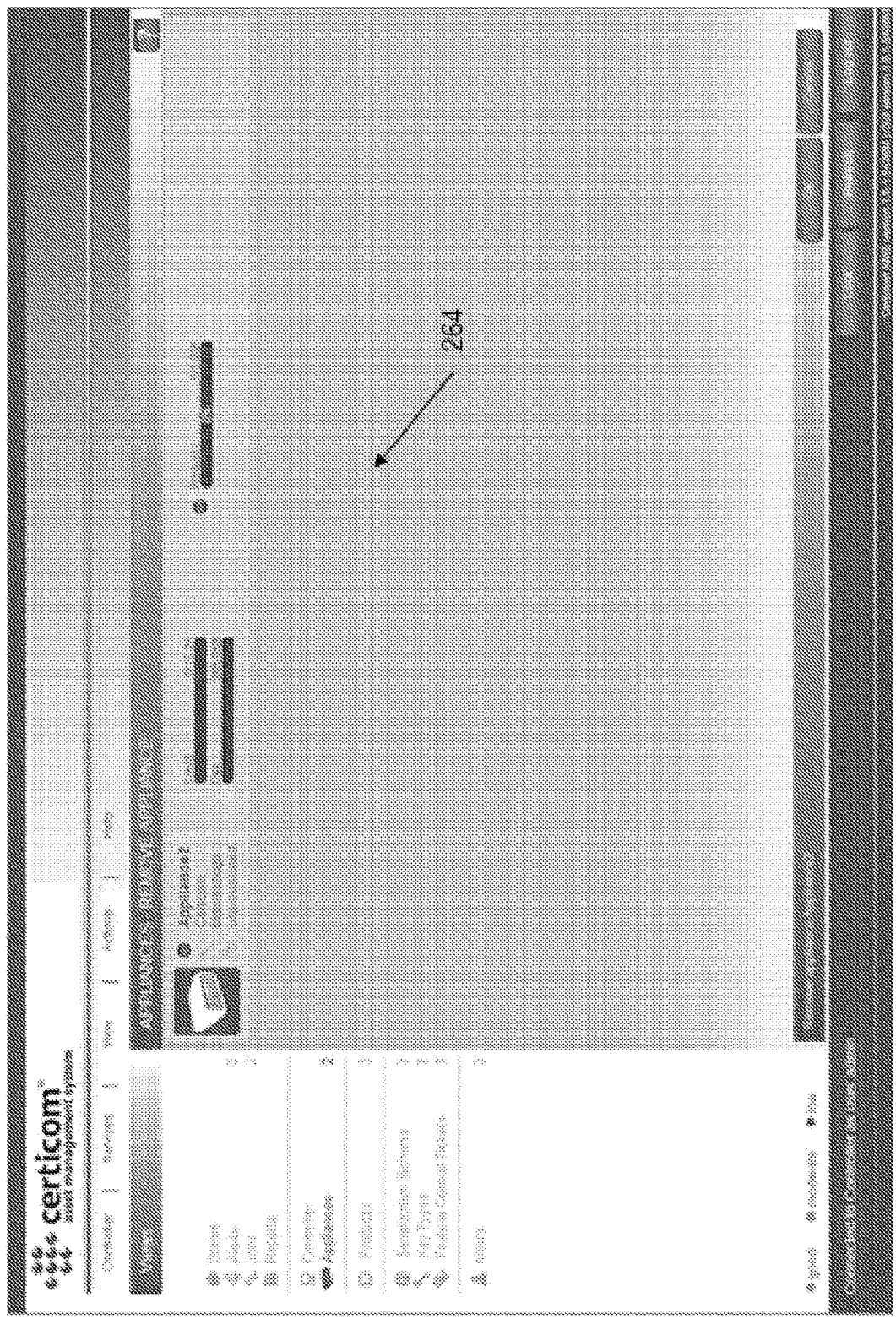
FIG. 31 is an example screen shot showing a remove appliance view provided by the AMS GUI.
Figure 32:
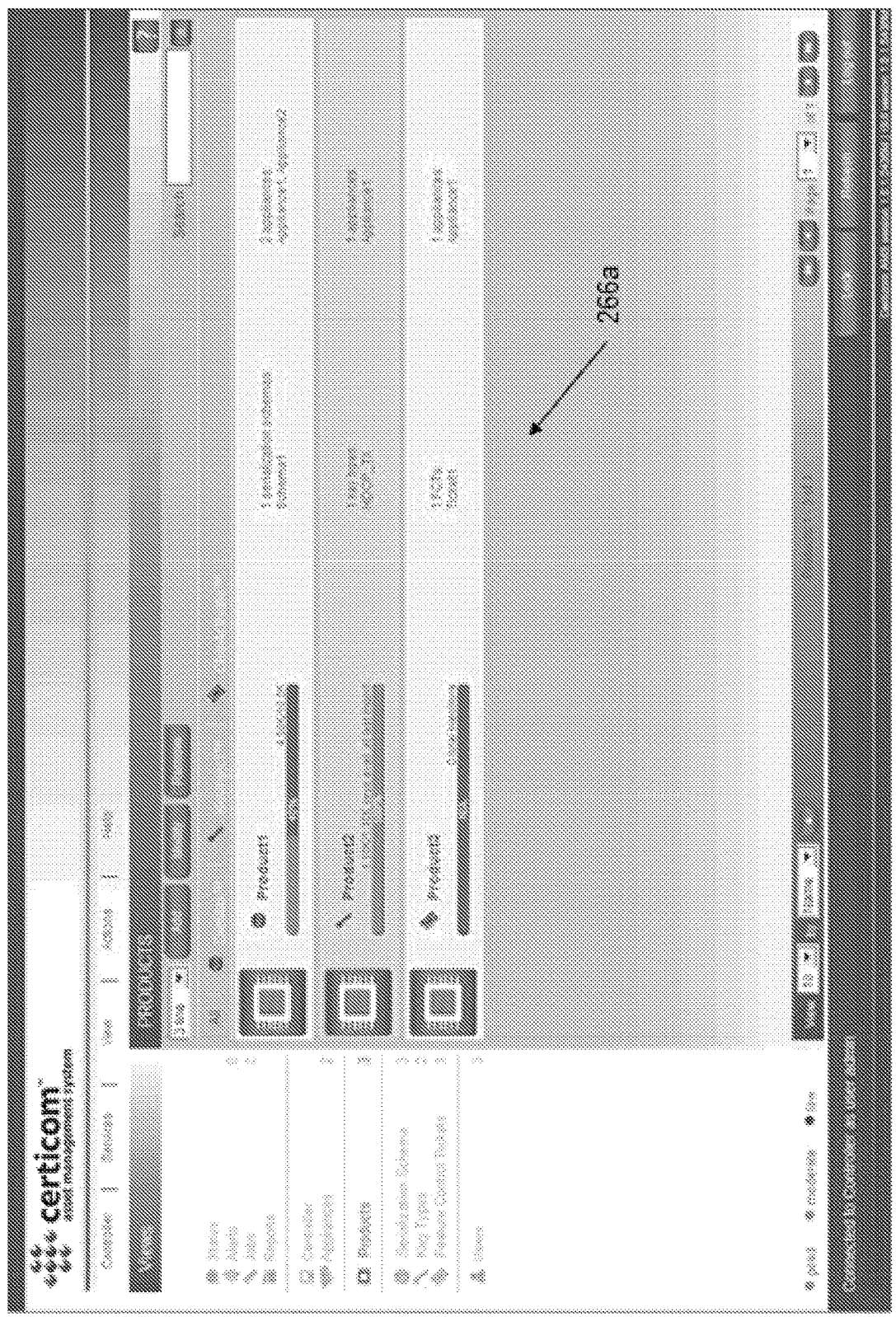
FIG. 32 is an example screen shot showing a products view provided by the AMS GUI in a three-line zoom mode.
Figure 33:
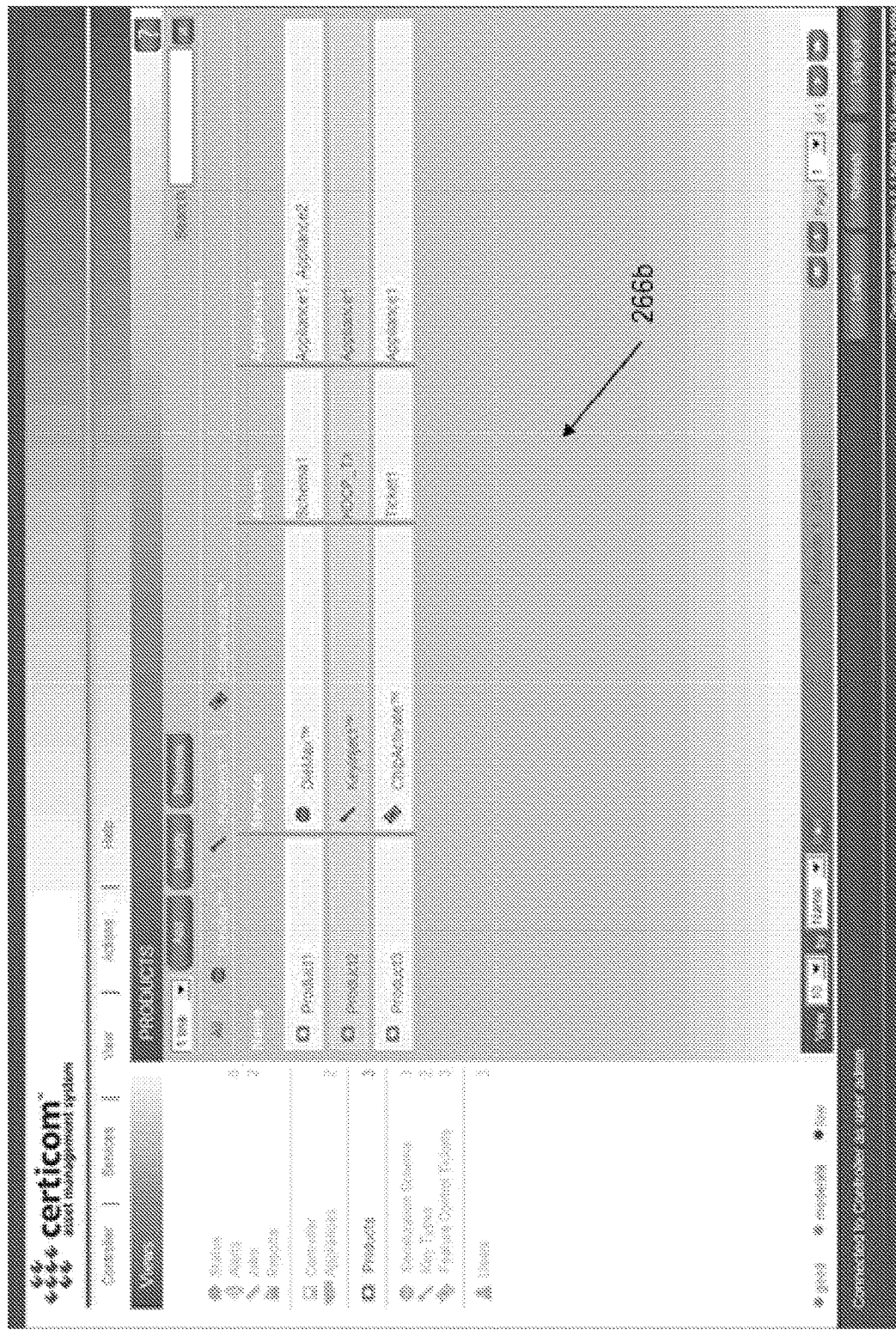
FIG. 33 is an example screen shot showing a products view provided by the AMS GUI in a one-line zoom mode.

When an appliance 18 is first added to a controller 22, it is added with an inactive status (see also FIG. 4B described above). The activate appliance action brings the selected appliance 18 online (automatically initiating provisioning if necessary). The deactivate appliance action takes the selected appliance 18 offline with appropriate warnings if taking the appliance 18 offline will stop an associated production line. FIG. 30 illustrates a deactivate appliance screen 262 showing a selected appliance to be deactivated before having the operator confirm this selection. The remove appliance action should only be available if the selected appliance is not online, otherwise the action should be disabled. FIG. 31 illustrates a remove appliance screen 264 which is similar to the deactivate appliance screen 262 in that the selected appliance 18 is shown prior to confirmation of the selection by the operator. It may be noted that the appliance 18, when deactivated, should indicate this by, e.g. changing colour to red as exemplified above, to provide a further visual cue to the operator regarding the status of the appliance 18.

Figure 34:
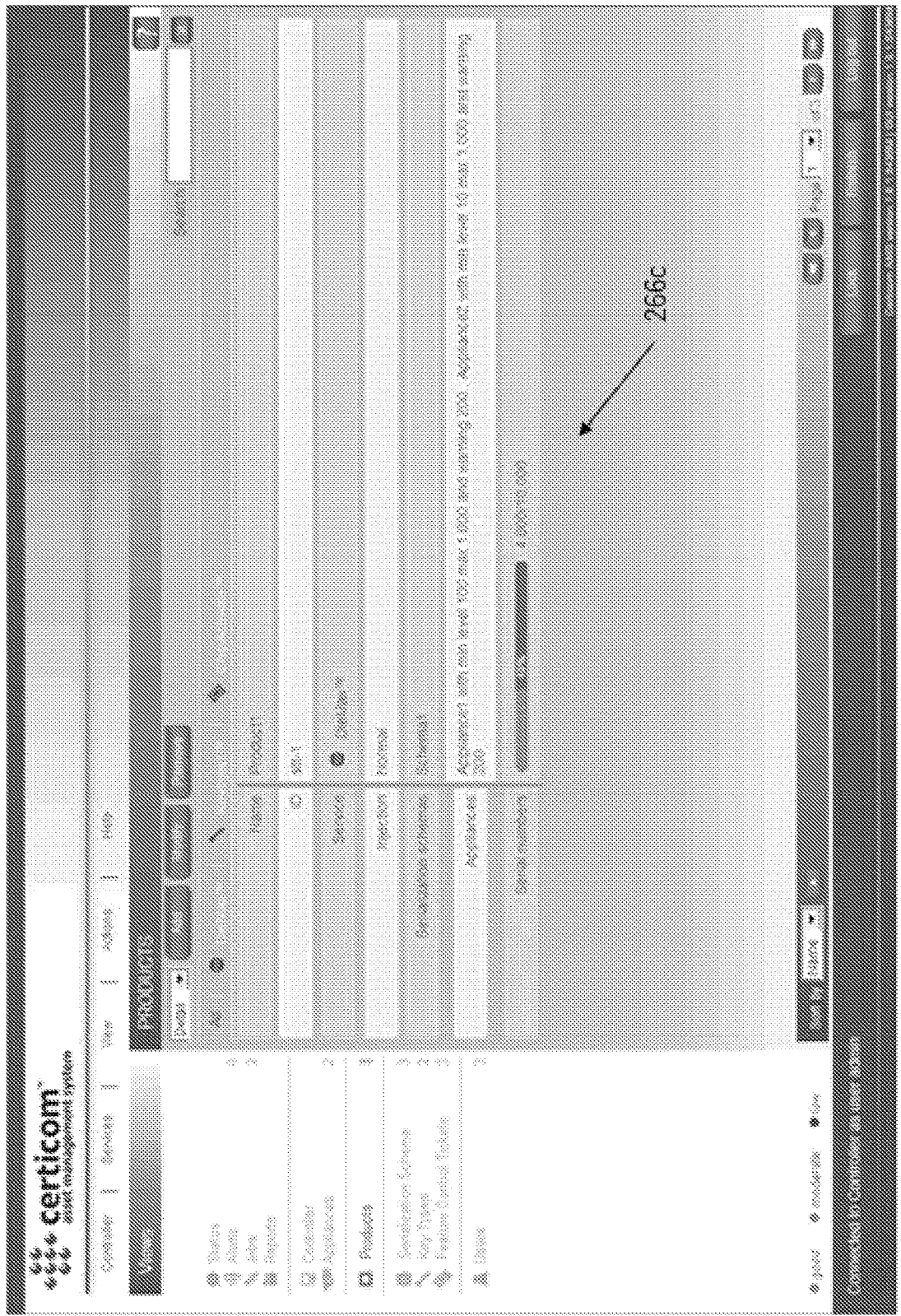
FIG. 34 is an example screen shot showing a products view provided by the AMS GUI in a details zoom mode.

A product in the GUI 8 is a named grouping of one or more asset types that provides the AMS 10 with a name for the product, an identifier for the product, a list of assets (e.g. serialization schema, key type, or FCT 50, depending on the service), a list of appliances to which the assets should apply, and the service the product provides. In the products view 266, shown in FIGS. 32 to 34, the operator can manage products and perform various actions associated with products in the AMS 10, such as adding, modifying or removing a product. The products view 266 is shown in a 3-line zoom mode 266a in FIG. 32, a 1-line zoom mode 266b in FIG. 33, and a details zoom mode 266c in FIG. 34. As can be seen in FIG. 34, the product view 266 can include various information pertaining to the product, such as: product name, service, ID, assets available (displayed as a meter, each displayed individually in detail zoom level 266c), list of assets (schema, key types or FCTs 50), list of appliances 18, and for serialization and key injection-injection method (ACC or normal), ACC record field and ACC offset field. In the product view 266, the operator can perform a zoom between zoom modes, add a product, modify a product, and remove a product.

Figure 35:
FIG. 35 is an example screen shot showing an add product view provided by the AMS GUI.

An add a product form 268 is shown in FIG. 35 and is exemplified for serialization. For key injection, the serialization schema list would be replaced with a key type list and for feature control, the serialization schema would be replaced with an FCT list.

Figure 36:
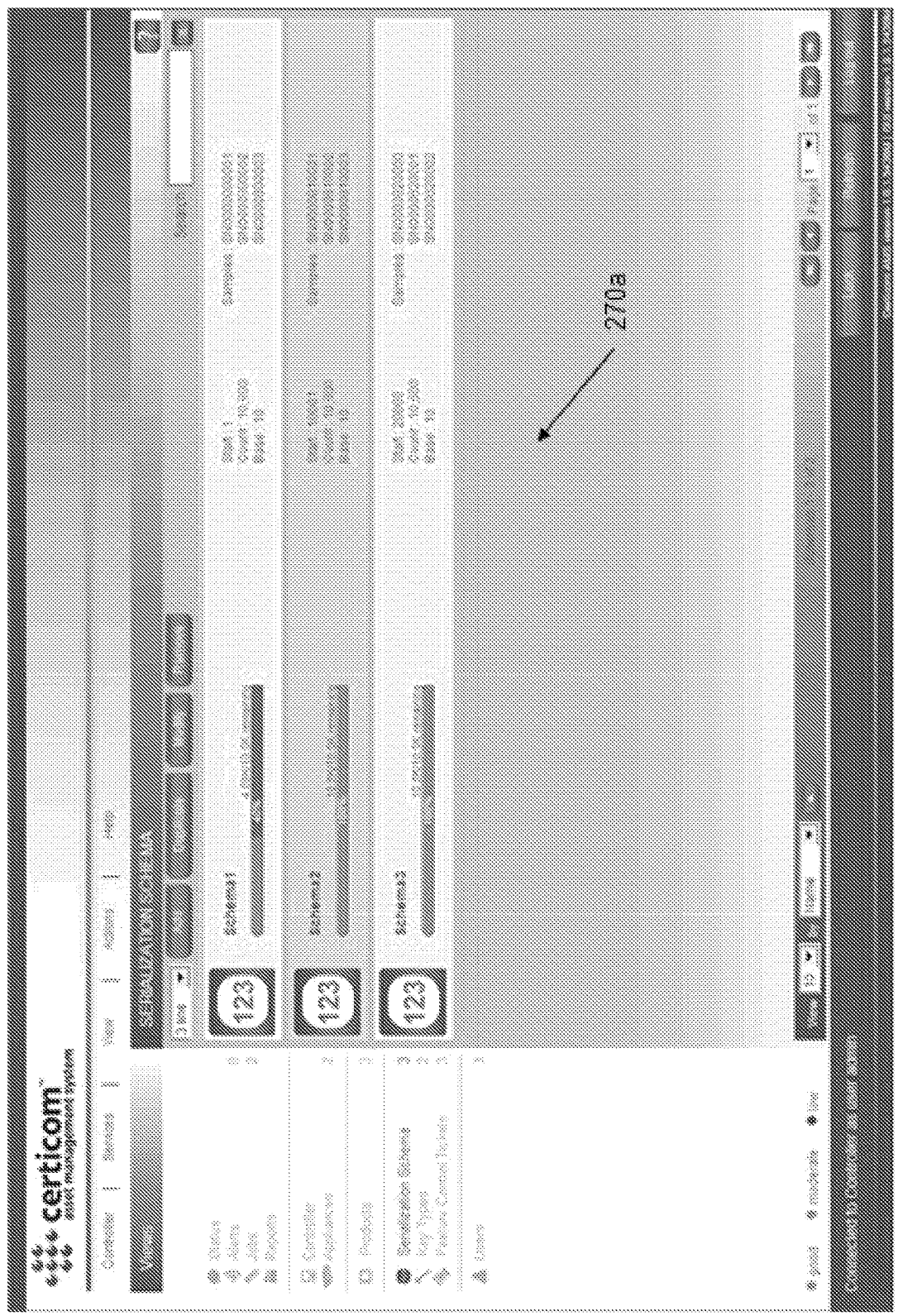
FIG. 36 is an example screen shot showing a serialization schema view provided by the AMS GUI in a three-line zoom mode.
Figure 37:
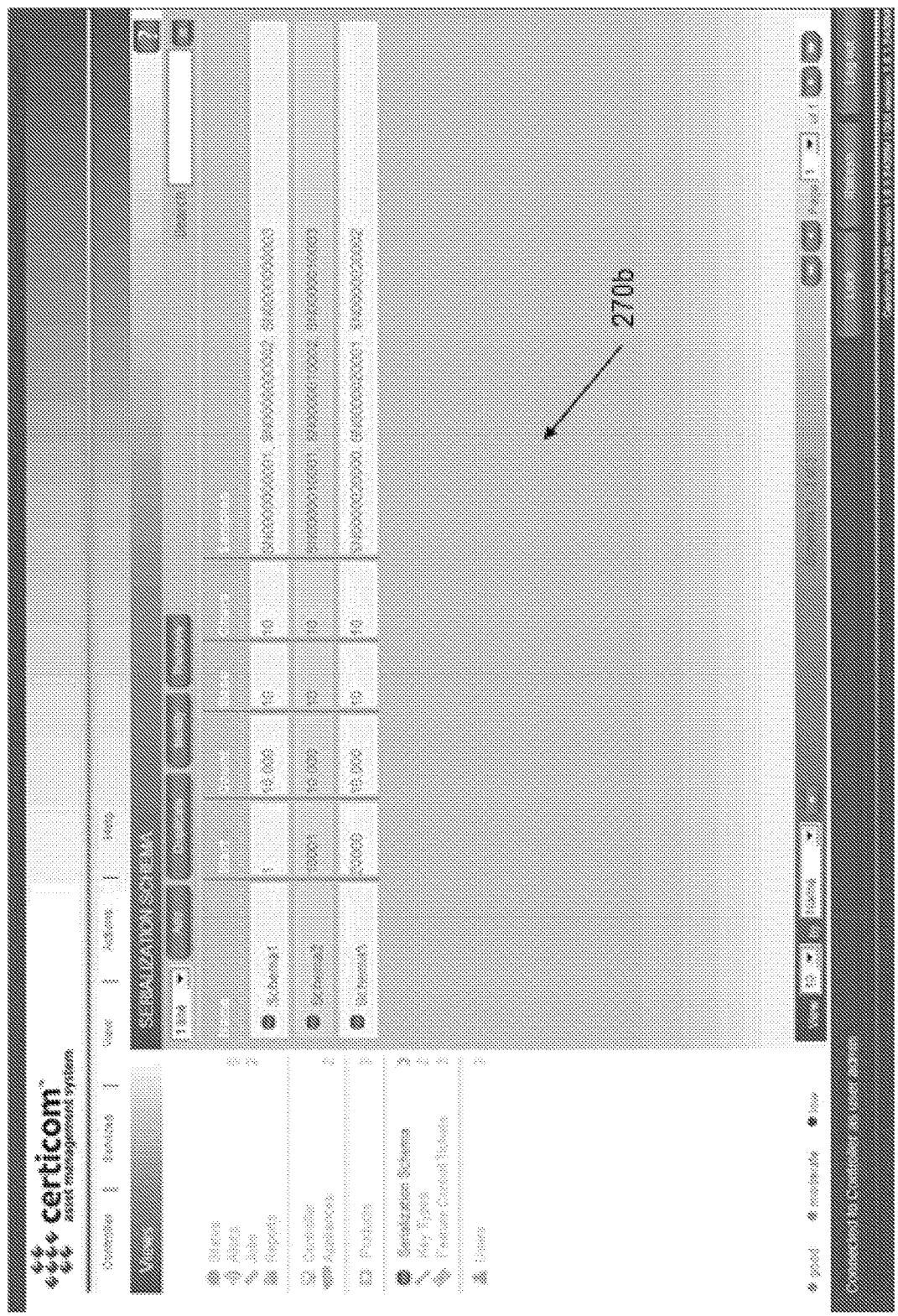
FIG. 37 is an example screen shot showing a serialization schema view provided by the AMS GUI in a one-line zoom mode.
Figure 38:
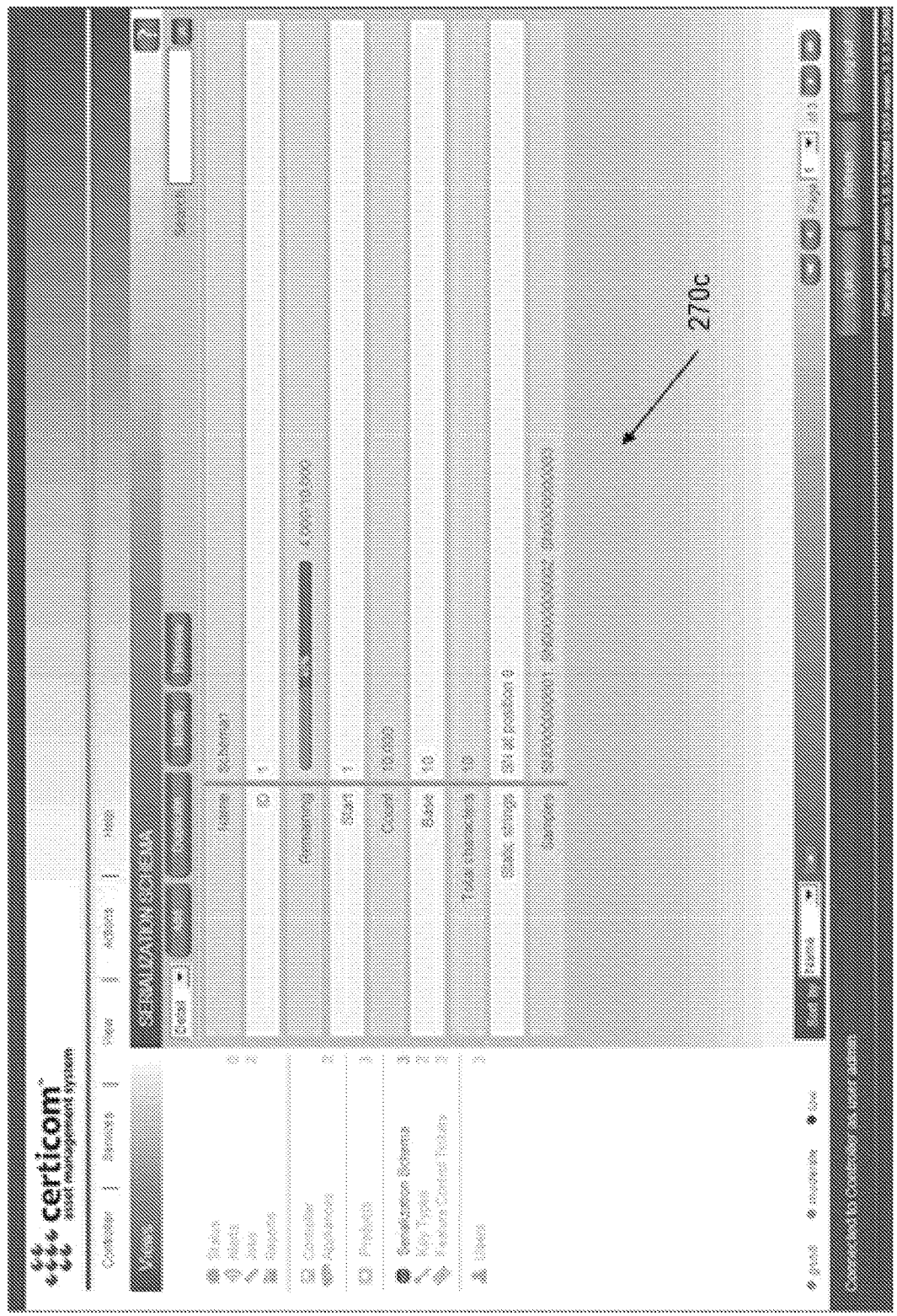
FIG. 38 is an example screen shot showing a serialization schema view provided by the AMS GUI in a details zoom mode.
Figure 39:
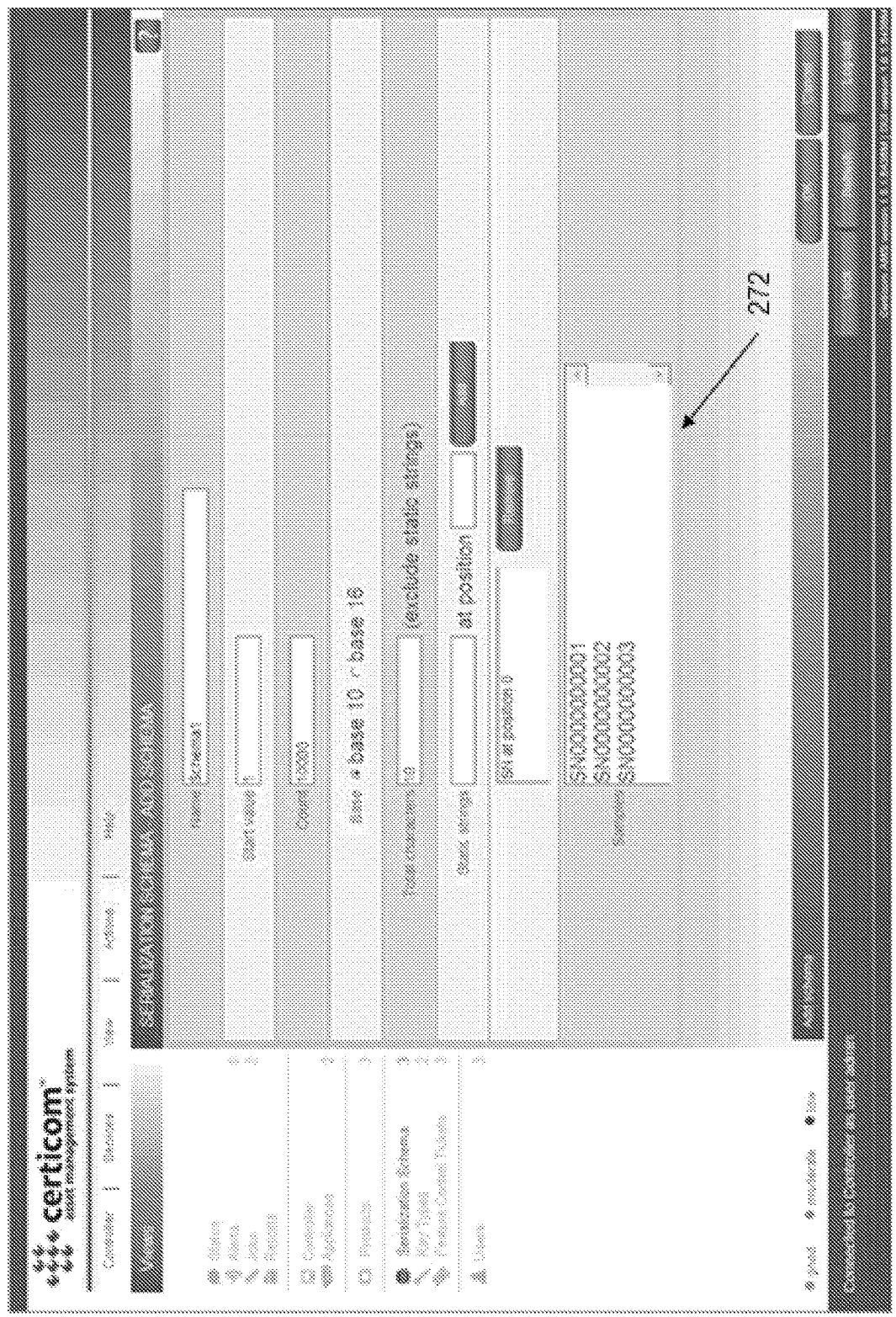
FIG. 39 is an example screen shot showing an add schema view provided by the AMS GUI.

A serialization schema in the AMS 10 is an object that defines the rules about how a serial number is generated. For example, whether the serial number digits are presented in hexadecimal or decimal and whether fixed strings are included. A serial schema view 270 is shown in FIGS. 36 to 38. In these views, the operator can manage serialization schema and perform various actions associated with schema in the AMS 10, such as adding, modifying or removing schema. The 3-line zoom mode 270a is shown in FIG. 36, the 1-line zoom mode 270b is shown in FIG. 37, and the details zoom mode 270c is shown in FIG. 38. As best seen in FIG. 38, the information that defines the serial schema in this example includes the schema name, schema ID, serial numbers remaining (not yet sent to appliances 18) from total pool, start value, total count of serial numbers to generate, whether to use base-10 or base-16, total number of characters in the serial number (to pad or truncate), list of static strings to include with their positions in the serial number, and samples to illustrate the schema. In the serialization schema view 270, the operator can perform a zoom between zoom modes, add a schema, modify a schema, remove a schema, and duplicate a schema (modify the current selection but save with a new name). To add/modify/duplicate a serialization schema, an add/modify/duplicate schema form 272 is launched as shown in FIG. 39.

Figure 40:
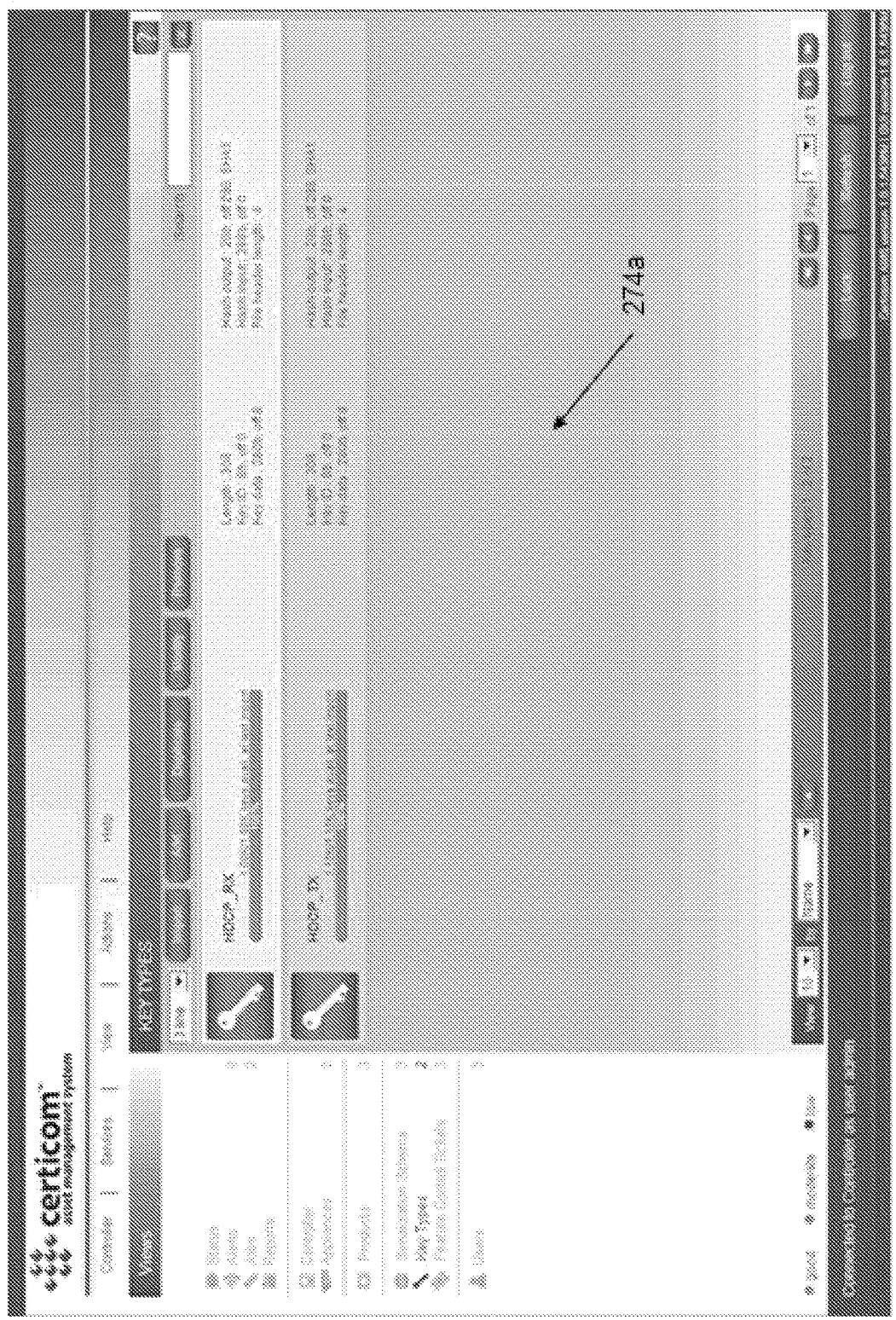
FIG. 40 is an example screen shot showing a key types view provided by the AMS GUI in a three-line zoom mode.
Figure 41:
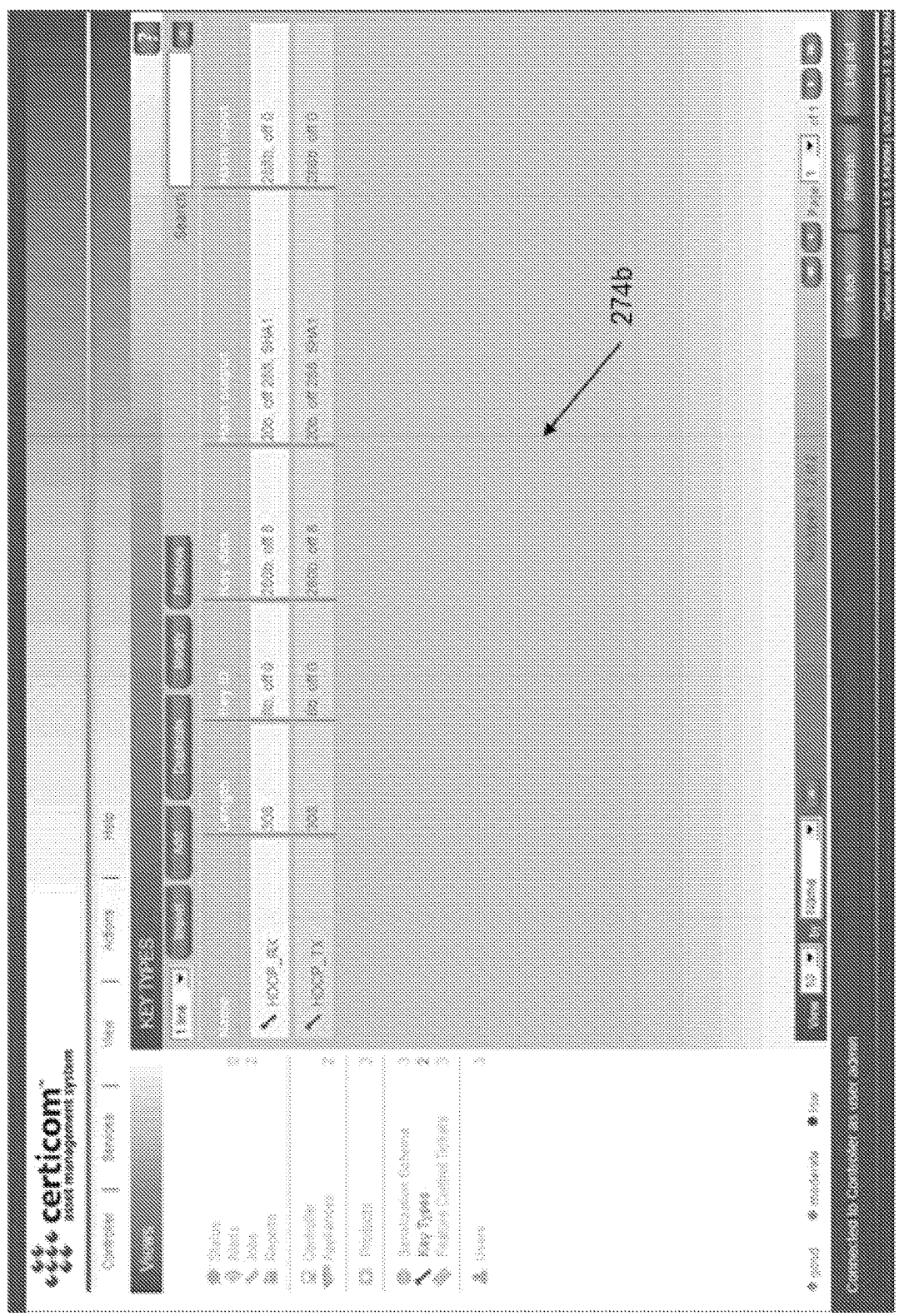
FIG. 41 is an example screen shot showing a key types view provided by the AMS GUI in a one-line zoom mode.
Figure 42:
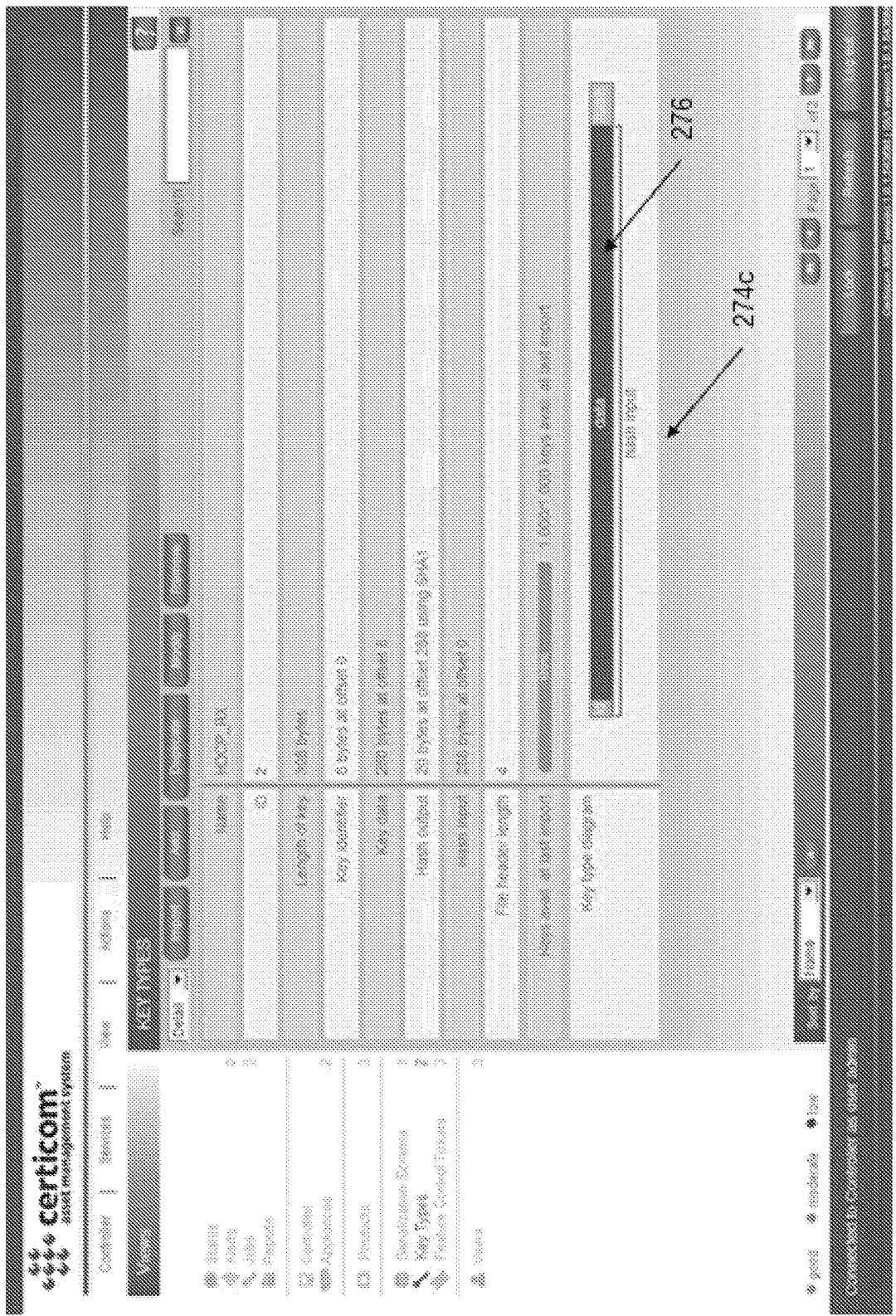
FIG. 42 is an example screen shot showing a key types view provided by the AMS GUI in a details zoom mode.
Figure 43:
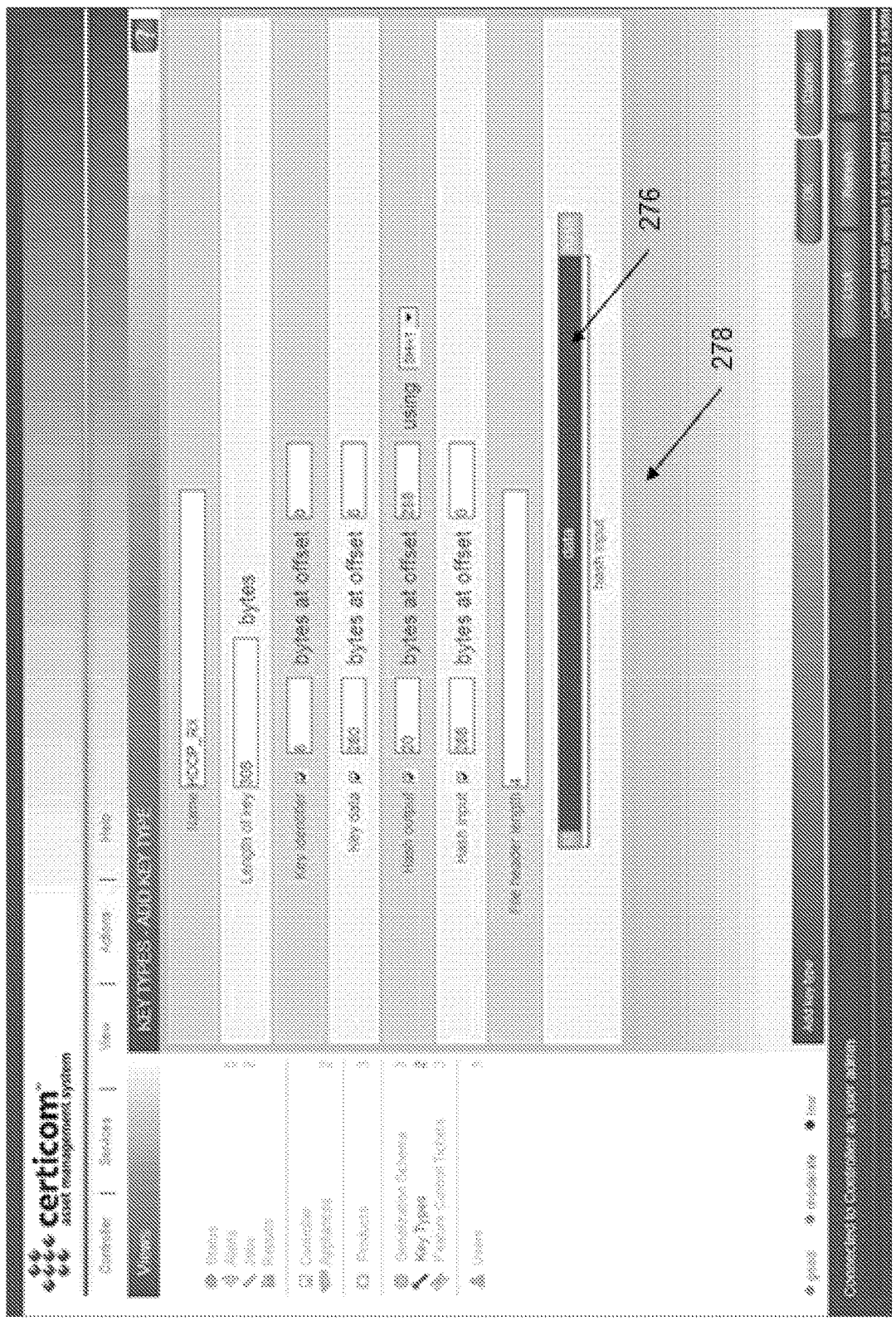
FIG. 43 is an example screen shot showing an add key type view provided by the AMS GUI.

A key type in the AMS 10 is an object that defines the rules about what types of cryptographic keys should be injected for a particular product. A key types view 274 is shown in FIGS. 40 to 42. In the key types view 274, the operator can manage key types and perform various actions associated with key types in the AMS 10 such as adding, modifying or removing a key type. A 3-line zoom mode 274a is shown in FIG. 40, a 1-line zoom mode 274b is shown in FIG. 41, and a details zoom mode 274c is shown in FIG. 42. As best shown in FIG. 42, the information that the key types view 274 may provide can include: key type name, ID, keys available since last import, length of key, key identifier length and offset, key data length and offset, file header length, hash output (length and offset), hash algorithm, and hash input. A key type diagram 276 is also shown which provides a visual depicted of the structure of the key and is updated as parameters are changed to show the way in which the structure changes. In the key types view 274, the operator can zoom, import keys, add key types, modify key types, remove key types, and duplicate key types (modify current selection but save with a new name). An add/modify/duplicate key type form 278 is shown in FIG. 43 which can be seen is similar to the details zoom mode 274c but enables parameters to be edited.

Figure 44:
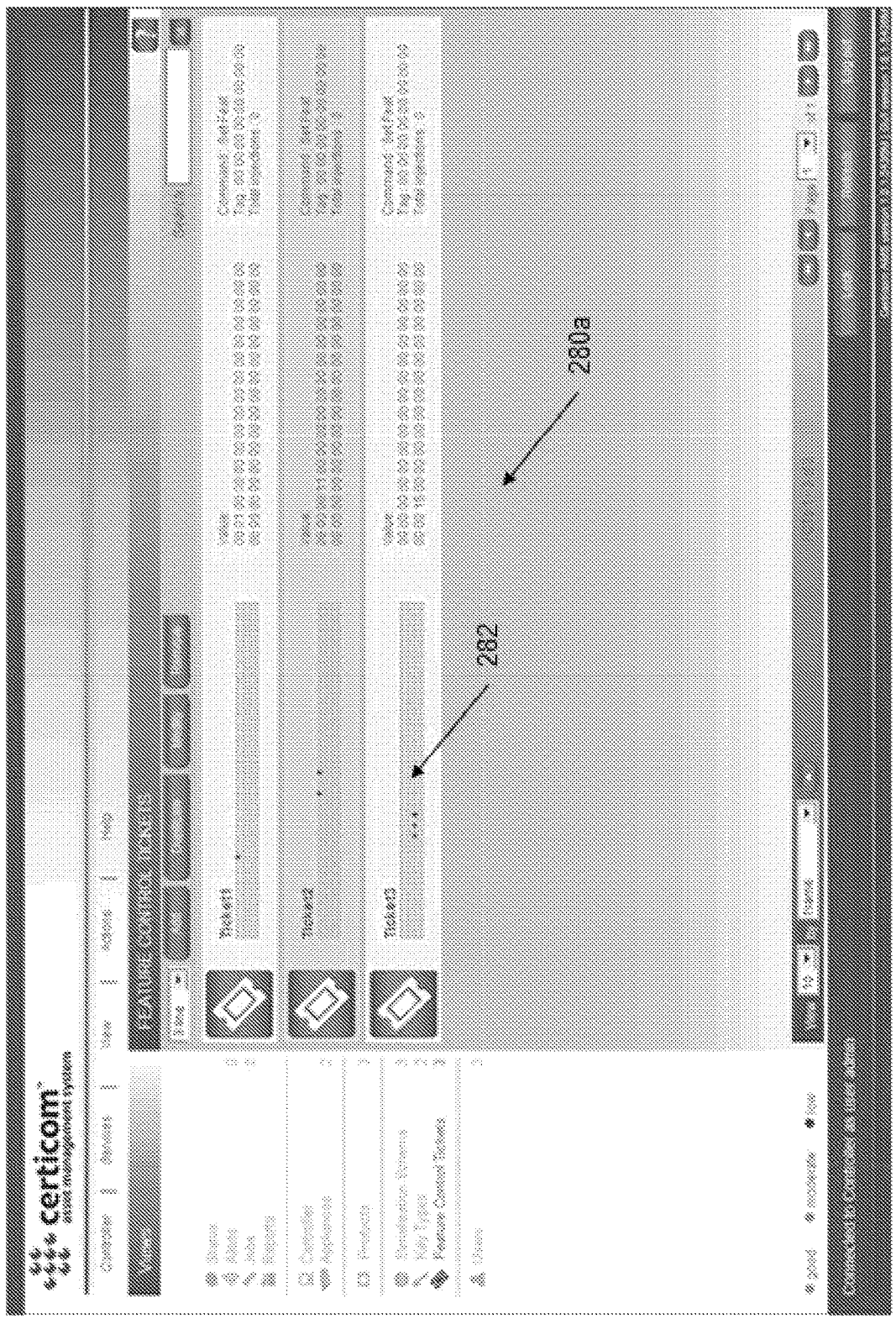
FIG. 44 is an example screen shot showing a feature control tickets view provided by the AMS GUI in a three-line zoom mode.
Figure 45:
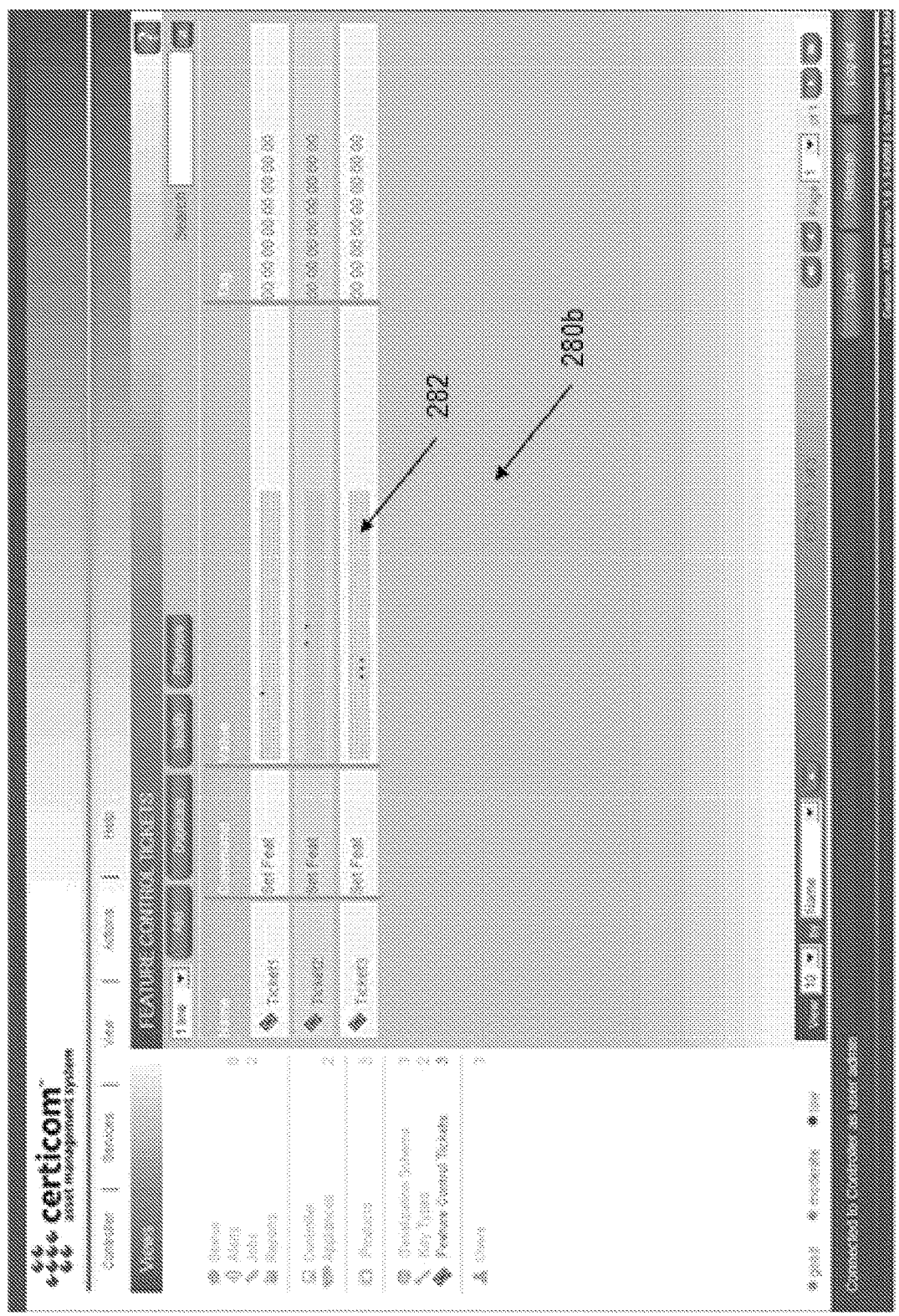
FIG. 45 is an example screen shot showing a feature control tickets view provided by the AMS GUI in a one-line zoom mode.
Figure 46:
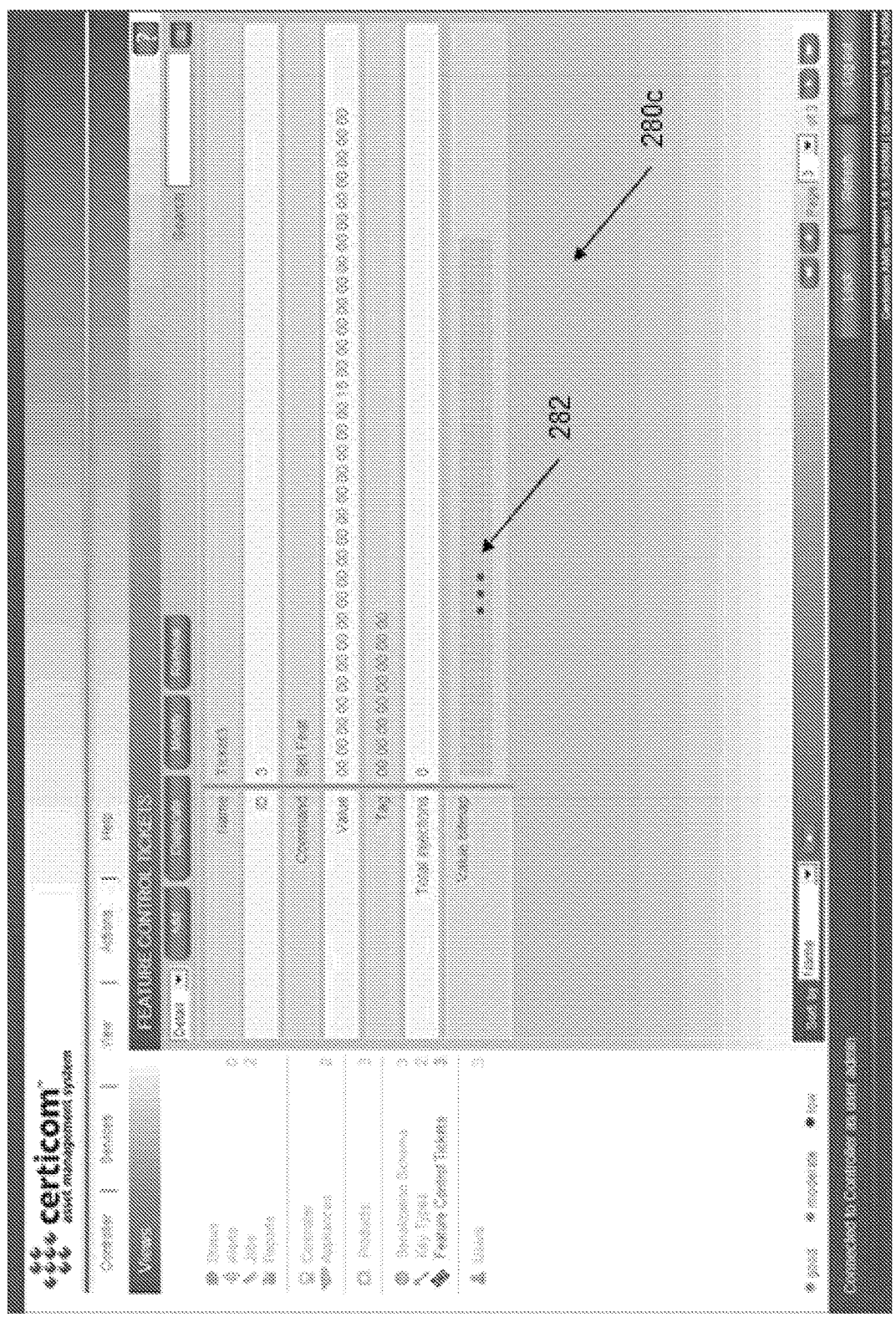
FIG. 46 is an example screen shot showing a feature control tickets view provided by the AMS GUI in a details zoom mode.

An FCT 50 in the AMS 10 is an object that defines a particular feature or features that may be specified for a particular product. An FCT 50 includes an array of bits called the feature register 282. The state of specific bits in the feature register 282 may be mapped to features in the device 14, controlling whether those features are active or disabled. An FCT view 280 is shown in FIGS. 44 to 46 and illustrates a visual depiction of the feature register 282 with the active features being distinguished from unactivated features by filling in a corresponding cell with a different colour. A 3-line zoom mode 280a is shown in FIG. 44, a 1-line zoom mode 280b is shown in FIG. 45, and a details zoom mode 280c is shown in FIG. 46. In the FCT view 280, the operator can manage FCTs 50 and perform various actions associated with FCTs 50 in the AMS 10 such as adding, modifying, or removing a ticket. As best shown in FIG. 46, the information that can be provided in the FCT view 280 for a particular FCT 50 may include: FCT name, ID, feature inclusion value, command implemented, tag (record tag indicating a feature or set of features programmed on the ACC 12), and total number of injections. In the FCT view 280, the operator can navigate between zoom modes, add FCTs 50, modify FCTs 50, remove FCTs 50, and duplicate FCTs 50.

Figure 47:
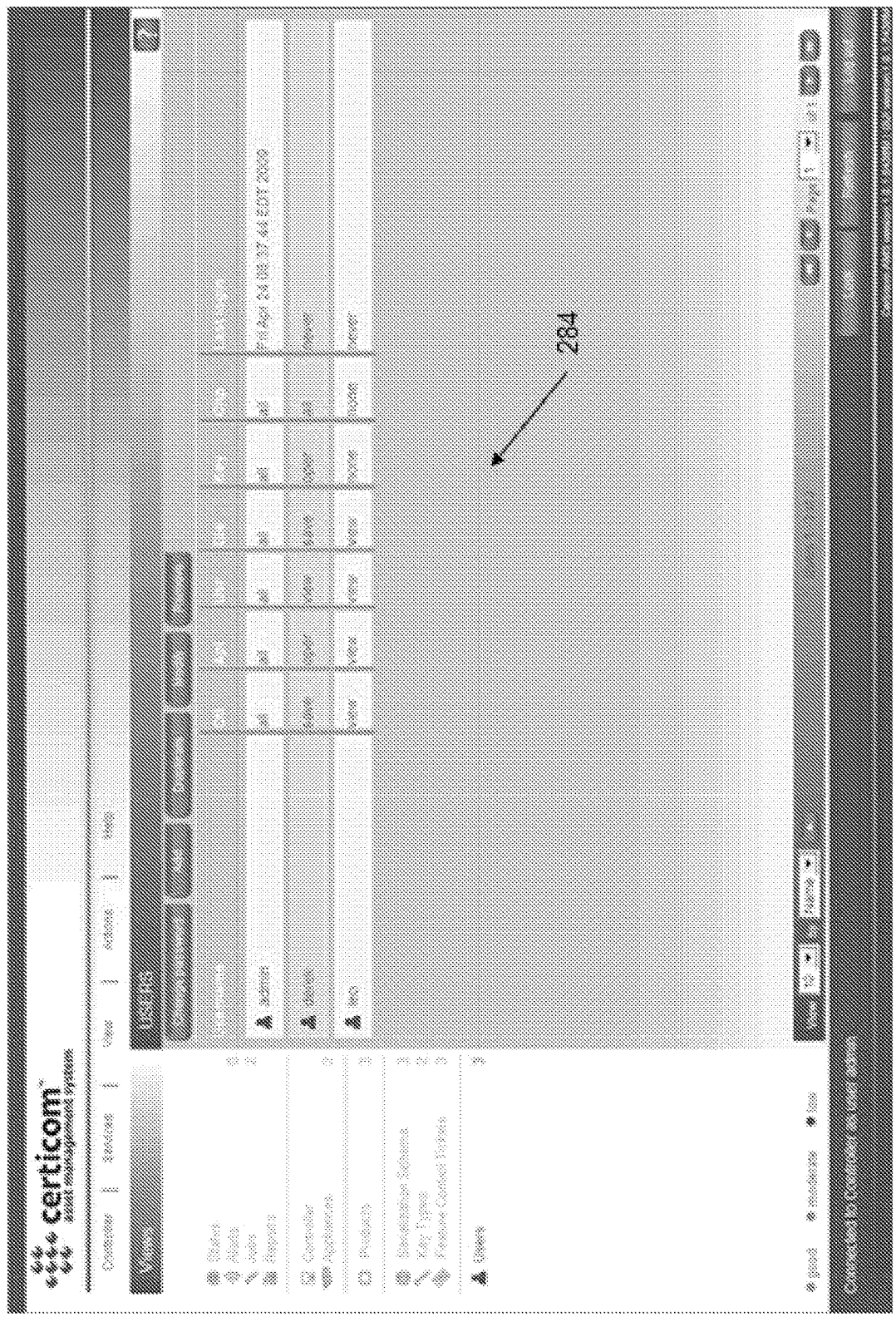
FIG. 47 is an example screen shot showing a users view provided by the AMS GUI.
Figure 48:
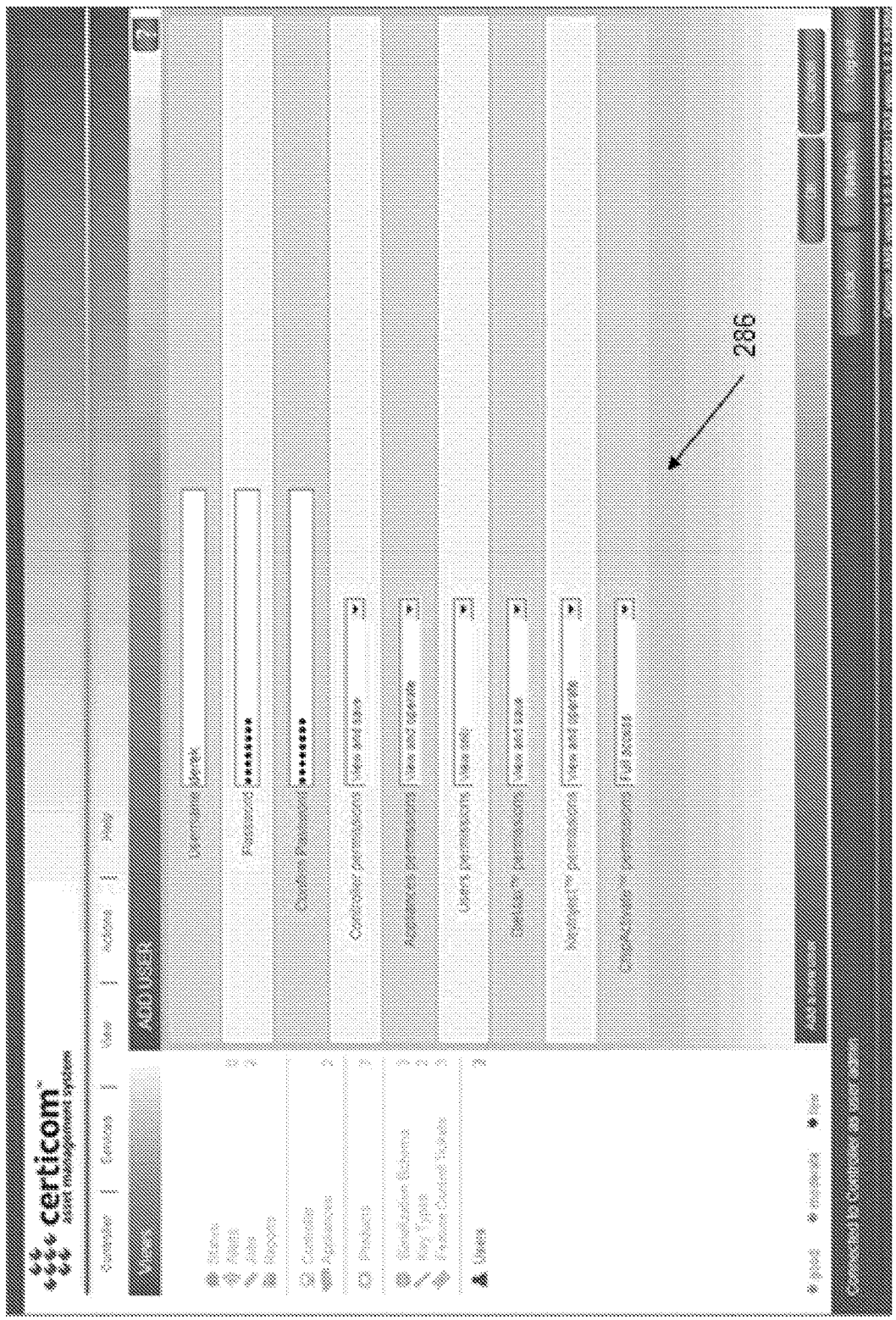
FIG. 48 is an example screen shot showing an add users view provided by the AMS GUI.

An administrator can access a users view 284 shown in FIG. 47 to perform various actions associated with the users in the system, such as adding a user, removing a user, and changing a user's password. In this example, the users view 284 is at the 1-line zoom level. As can be seen in FIG. 47, the users view 284 lists information such as: username, controller permissions, appliance permissions, user permissions, serialization permissions, key injection permissions, feature control permissions, and last login time. The various permissions dictate what operations the user can perform, e.g. adding or removing an appliance, generating a serialization schema, etc. In the users view 284, the administrator can add a user, duplicate a user, modify a user, change a password, and remove a user. An add user form 286 is shown in FIG. 48 and enables the AMS 10 to impose security permissions on its users according to defined user roles. In this way, the administrator can define a user role to enable or deny different levels of access to particular parts of the system. By creating several users with different permissions, the responsibilities can be partitioned within the GUI 8 to allow operating the GUI 8 to be much more effective. For example, three user roles can be establishes as follows: Security Officer (SO), Administrator (AD), and Operator (OP). For each user role, various permissions can be set per the above, e.g. for view only, view and save, view and operate, full access, etc.

Figure 49:
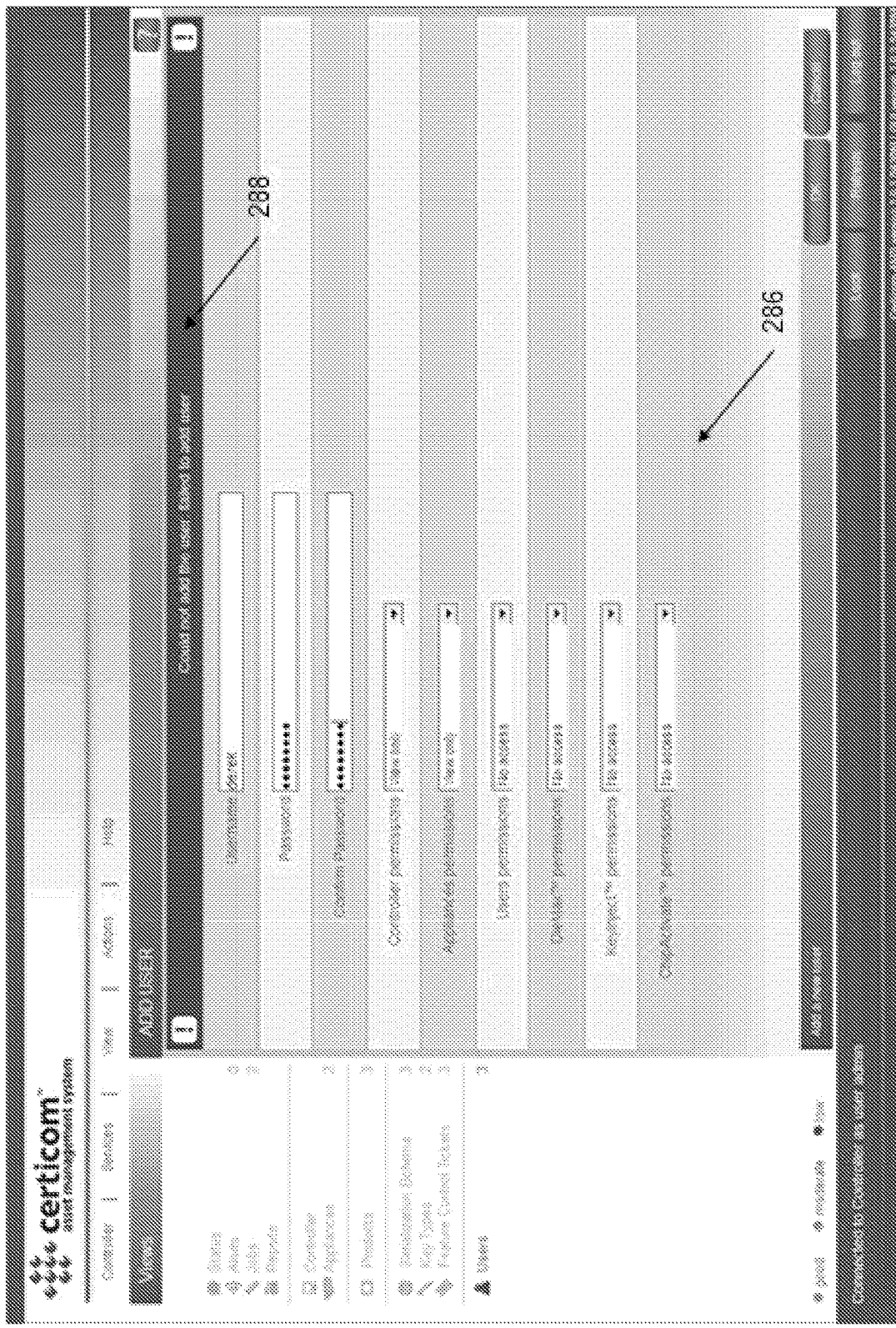
FIG. 49 is an example screen shot showing an add users view provided by the AMS GUI showing one example of an error bar.
Figure 50:
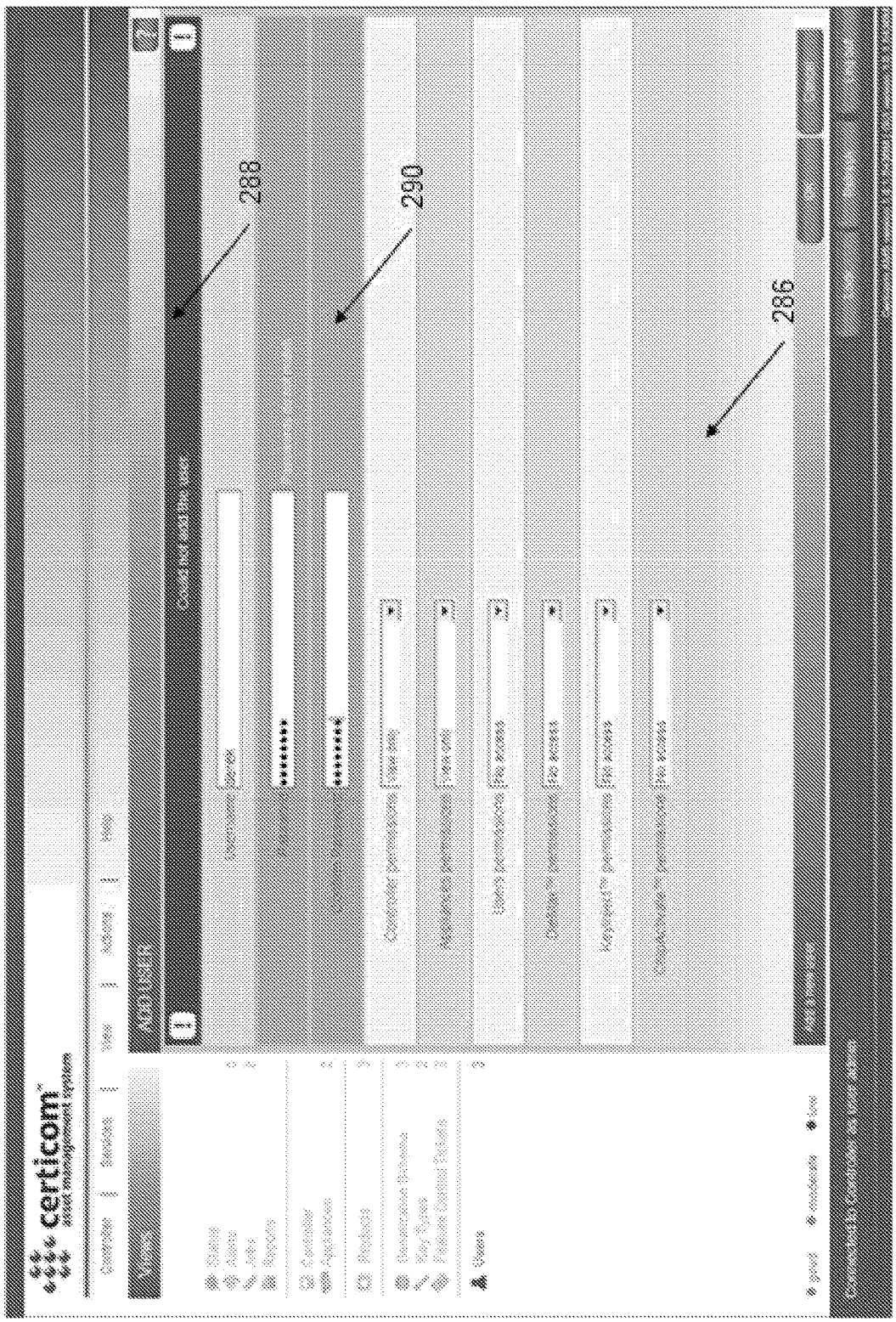
FIG. 50 is an example screen shot showing an add users view provided by the AMS GUI showing another example of an error bar.

FIG. 49 illustrates the add user form 286 with an error bar 288, shown in red to draw the administrator's attention. FIG. 50 illustrates a similar error with a field-specific indicator bar 290 to highlight the cause of the error, in this example due to a lack of correspondence between the password and the confirm password fields. Other forms (not shown) can be launched for changing a user's password and removing a user.

An online help service can also be provided for the GUI 8, which can comprise a menu item or a help icon or both (e.g. as shown in FIGS. 11 to 50) which link to an AMS online help guide, e.g. in HTML format such that it is supported by a web browser. The menu item can lead the user to the front page (table of contents) and the help button can lead the user to a help article determined according to the current view in the data area 226 (i.e. context-sensitive help).

Asset Control Core

Figure 51:
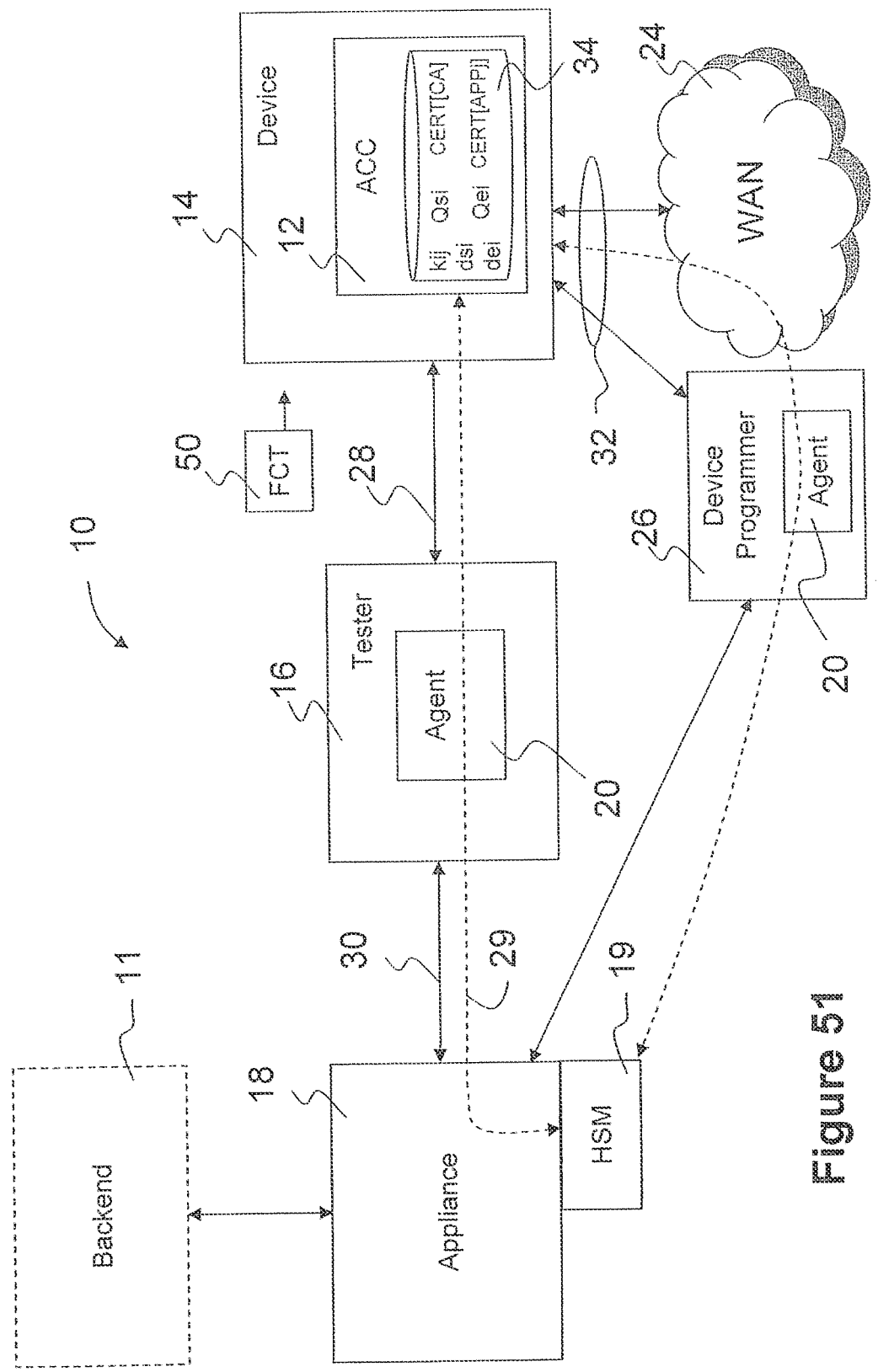
FIG. 51 is a block diagram of an AMS in one configuration for utilizing the ACC.

Turning now to FIG. 51, further detail of an embodiment of the AMS 10 is now shown configured for providing the feature activation service module. In the example shown in FIG. 51, the system 10 is configured to provision, communicate with, provide data to, collect data from, and activate features within an ACC 12 embedded in an electronic device 14. As discussed above, the device 14 and in turn the ACC 12 is connected to a tester 16, which is used in a fabrication/manufacturing/assembly process. The tester 16 employs an agent 20, which is a software module running on the tester 16. The tester 16 is in turn connected to an appliance 18, which includes an HSM 19 that protects sensitive data and provides a secure zone within the appliance 18. As shown in FIG. 1, the agent 20 facilitates a secure communication channel 29 between the HSM 19 and the ACC 12 for cryptographically securing communications therebetween. Over channel 29, an FCT 50 can be sent from the appliance 18 to the ACC 12. The appliance 18 may be connected to a backend infrastructure 11, which may provide a certifying authority (CA), a database, and a controller 22 for controlling one or more appliances 18 as will be explained in greater detail below.

In addition to being connected to the tester 16, the ACC 12 may also, either at the same time or at some later time (or other time during the process), be connected to a user interface (UI) over a wide-area-network (WAN) 24 or a device programmer 26. The device programmer 26 may also connect to the ACC 12 via the WAN 24 as shown. The device programmer 26 and/or WAN 24 can connect to the device 14 and ACC 12 using any suitable connection, for example, serial, parallel, wired, wireless, infrared, RFID, etc. In this example, the ACC 12 is connected to the tester 16 over a standard testing protocol/connection 28 such as JTAG (Joint Test Action Group) IEEE-1149 test interface. The tester 16 and appliance 18 are connected over a suitable connection 30 depending on their relative locations. In the examples provided below, the appliance 18 is located at the same physical facility as the tester 16 and therefore the connection 30 may be a local area network (LAN).

The ACC 12, as will be shown, can comprise various types of memory, shown generally and collectively as numeral 34 in FIG. 51. The ACC 12 uses a portion of memory to store, either persistently or ephemerally, various keys and certificates. FIG. 51 illustrates various keys and certificates that are used in the following examples. A static private key dsi, a static public key Qsi (also referred to as the ACC's UID), an ephemeral private key dei, an ephemeral public key Qei, a CA's certificate CERT[CA], and appliance j's certificate CERT[APPj], are shown in FIG. 51. In one embodiment, the static keys are stored in non-volatile memory (NVM), although they could be mask programmed into a ROM memory. In another embodiment, no NVM may be required and the keys can be stored offline on either a hard disc or flash memory or some other non volatile bulk data storage medium outside of the ACC 12.

Figure 52:
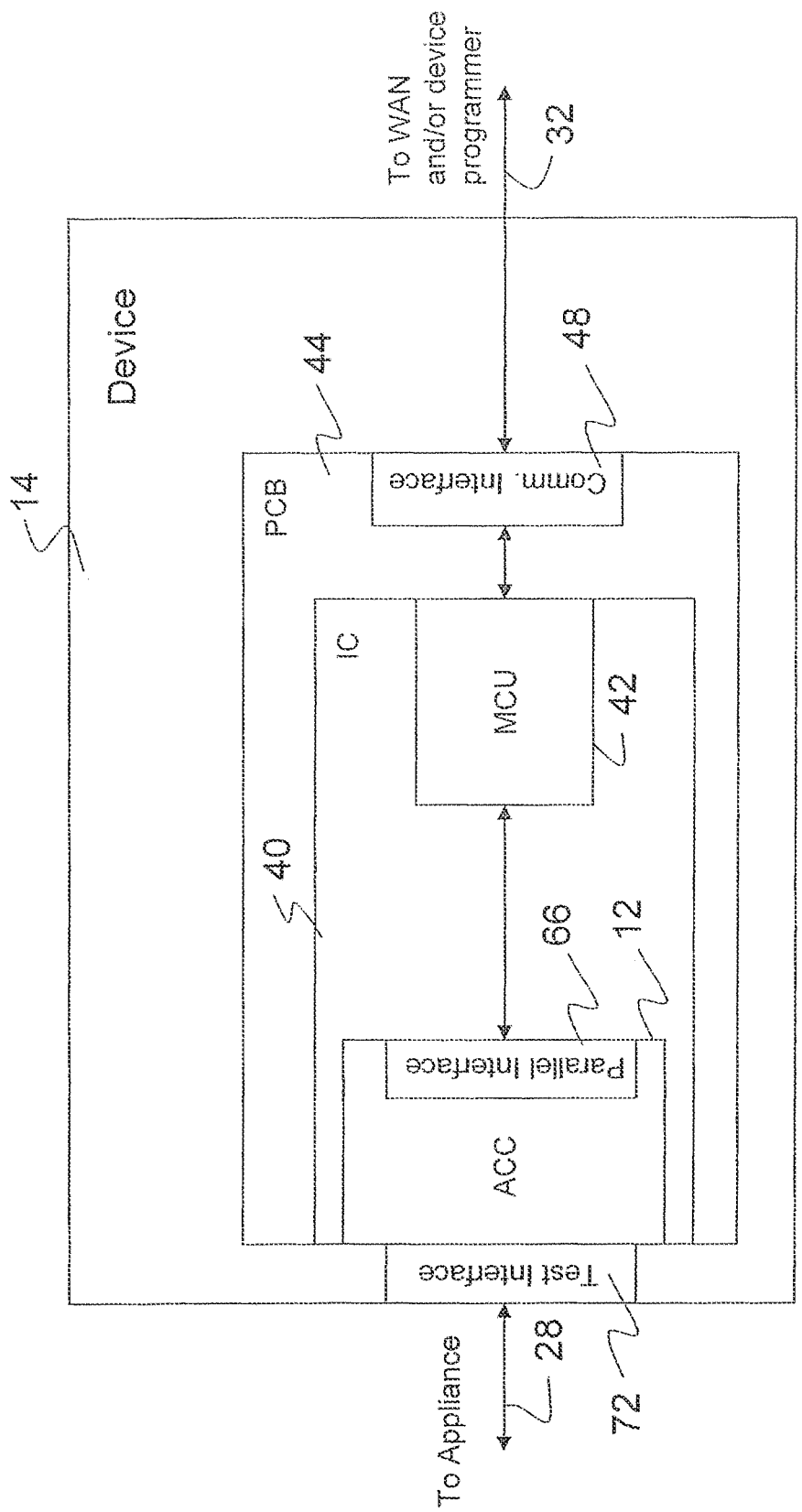
FIG. 52 is a block diagram showing further detail of the device and ACC shown in FIG. 51.

As can be seen in FIG. 52, the ACC 12 is a small hardware core embedded in a target system-on-chip (SoC) that establishes a hardware-based point of trust on the silicon die. The ACC 12 can be considered a root of trust on the consumer device 14 as it comprises tamper proof features that provide physical protection to sensitive data and methods to provide remote attestation and verification. As will be explained in greater detail below, the ACC 12 is able to generate a unique identifier (UID) for one integrated circuit (IC) 40, and participate in the tracking and provisioning of the IC 40 through a secure and authenticated communication channel 29 with the appliance 18. In the example shown in FIG. 52, the IC 40 is mounted on a printed circuit board (PCB) 44 that would then be assembled into a consumer device 14. Although embedded as such, the ACC 12 can continue to serve as a root of trust on the PCB 44 and/or the final device 14.

The IC 40 may also comprise a separate micro-control-unit (MCU) 42 which can be used to establish a connection with a non-tester, e.g. a device programmer 26 by connecting connection 32 to the IC 40 via a communication interface 48 configured for a suitable protocol as is known in the art. It will be appreciated that, as shown in FIG. 52, the communication interface 48 may also be integrated into the IC 40 with a direct connection through the PCB 44 to the WAN 24. The role of the external MCU 42 shown in FIG. 52 would be to facilitate the communication of the FCT 50 between the appliance and the ACC 12 over a network (e.g. WAN 24) by receiving FCT 50 command messages through the communications interface 48 and reformatting the networked data, in this case may be a stream of bytes, into a format that it could pass over its (the MCU's) memory mapped interface through the ACC 12 parallel interface 66 (see also FIG. 53) for processing by the ACC 12. Conversely the ACC 12 would return FCT 50 response messages over its parallel interface 66 to the external MCU 42 for the MCU 42 to translate into a stream of bytes and transmit over the communications interface 48 back to the appliance 12. The ACC 12 may connect to the agent 20 and thus the appliance 18 via a test interface 72 (e.g. JTAG)—see also FIG. 53—which in turn bridges the connection 28.

The appliance 18 is a secure module used to cache, distribute and collect provisioning data and responses to/from one or more agents 20. For example, when an ACC 12 comes on-line, the appliance 18 can track the parts that it is connected to using the ACC's unique ID (UID). The appliance 18 and the ACC 12 may then proceed to exchange key information and open up a tamper resistant communication channel 29, which allows data to be transferred in such a way that the ACC 12 can be certain that it is talking to an authorized appliance 18, and the appliance 18 can be assured that only one unique ACC 12 can decrypt and respond to the message it has sent. Ultimately, the ACC 12 can be issued FCTs 50, and provide FCT responses which contain provisioning commands, secure data, key information, serialization information and any other data the appliance 18 wishes to provide to, push to, upload to, inject into or collect from the ACC 12 or the device 14 in general.

The agent 20 may be considered a piece of software that manages the lower-level data transmission between the appliance 18 and the ACC 12. Each agent 20 is coupled to a tester 16 or device programmer 26, and is responsible for passing data transparently between the appliance 18 and the agent 20. The agent 20 comprises a transport layer API with which the appliance 18 may be used to issue commands and receive responses to/from the ACC 12. It will be appreciated that unless specified otherwise, secure operations performed by the appliance 18 are preferably performed within the HSM 19. The tester 16 or device programmer 26 can be physically connected to the chip through the standard JTAG IEEE 1149 test ports (e.g. test interface 46 and connection 28), or another programming interface depending on the application. The agent 20, in either configuration, is used to bridge the transport and physical layers. The agent 20 may be considered insecure and in the examples described herein does not perform any cryptographic functions aside from simply providing a message caching mechanism and passing messages between the appliance 18 and the ACC 12. Of course, if desired, the agent 20 can also be equipped with cryptographic capabilities of varying degrees depending on the requirements of the application.

The back-end infrastructure 11, is a general term referring to the entire backend infrastructure that is used to interface between the manufacturer and its customers/end users. Conceptually, every device ever processed by the system 10 and all programming records would be kept in a back-end database which the manufacturer may use to query the history of each part manufactured. The infrastructure may comprise a CA, database engine, ERP applications and submodules, a feature control server (FCS), and an e-commerce front-end server if necessary. The system 10 may also comprise connector logic to connect it to an to an ERP or e-commerce front end server. The typical system environment may have the back-end server located at a central location talking to an appliance 18 at a customer's manufacturing site via security protocols such as Secure Sockets Layer (SSL), Transport Layer Security (TLS), or Level 2 Security (MACSec) over the internet.

Figure 53:
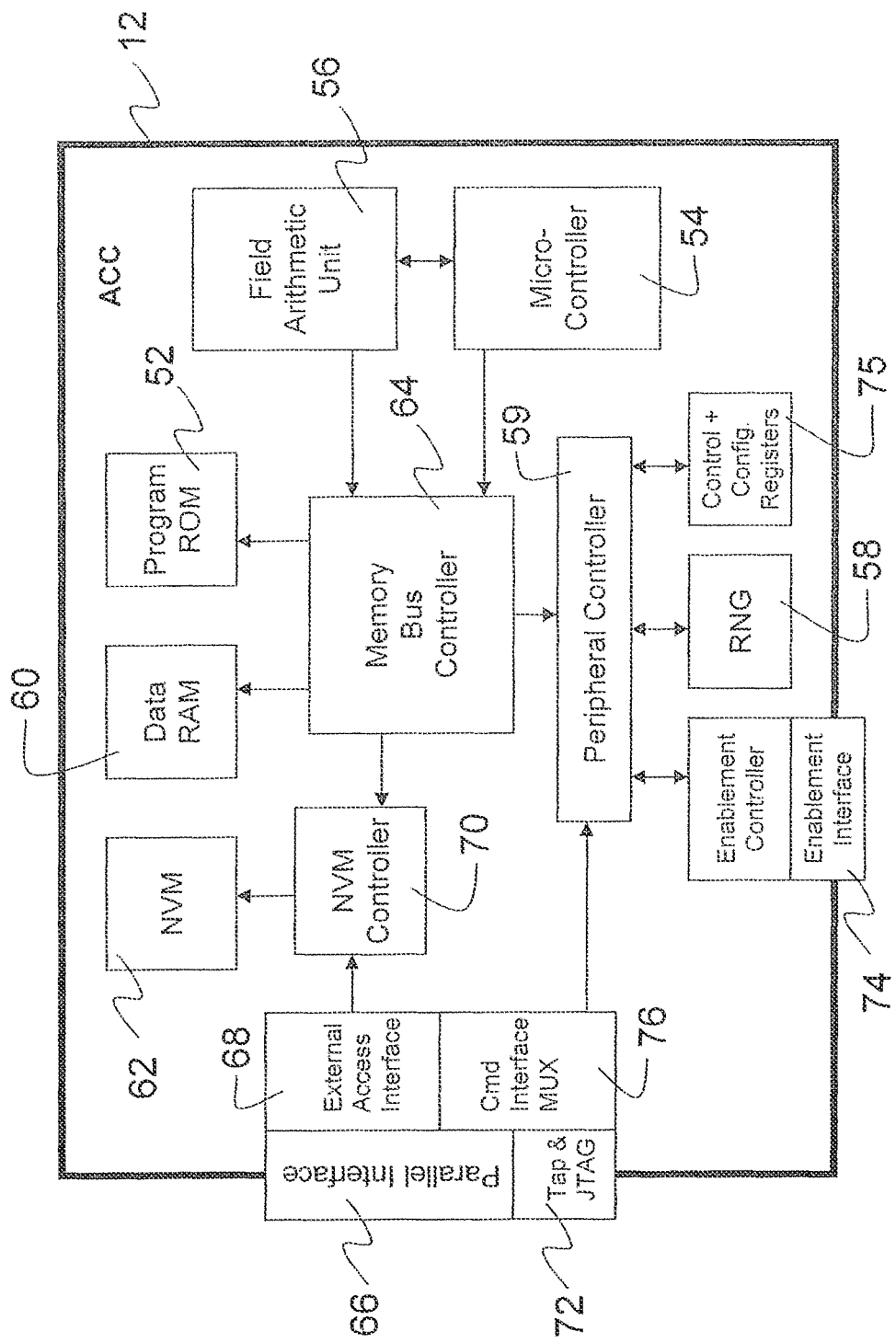
FIG. 53 is a block diagram showing further detail of hardware components of the ACC shown in FIGS. 51 and 52.

Greater detail concerning the ACC 12 is shown in FIG. 53. The dark outer boundary in FIG. 53 denotes a secure boundary such that any operations performed within this boundary are presumed to be trusted.

The ACC 12 is typically a relatively small hardware core with customizable firmware stored in read-only-memory (ROM) 52. In the example shown in FIG. 53, the ACC 12 also contains a small microcontroller 54, an elliptic curve cryptography (ECC) arithmetic unit 56, a hardware-based random number generator (RNG) 58, data read/write memory (RAM) 60 and non-volatile memory (NVM) 62. The ACC 12 has the ability to participate in the elliptic curve implementation of the Menezes-Qu-Vanstone (ECMQV) protocol, and the elliptic curve digital signature algorithm (ECDSA), as well as message encryption and authentication with advanced encryption standard (AES)-based algorithms.

As noted above, the ACC 12 is designed to communicate with an appliance 18 connected to a tester 16 or something similar to a device programmer 26. In order to secure this communication channel 29, the ACC 12 may use an asymmetric cryptography scheme for key exchange, and symmetric key cryptography to transfer messages between it and the appliance 18.

For asymmetric cryptography, a public key (e.g. Qsi) is generated based on a secret private key (e.g. dsi). It is important that the private key be protected in a secure, highly tamper resistant setting. An embedded ACC 12 is able to fulfill this requirement by being able to internally and autonomously generate a unique private key, with a combination of hardware and firmware to protect the secret from being exposed. The private key is statistically unique to a particular device 14 and is permanently associated with that device 14.

The private key is kept secret, whereas the public key is shared. For the ACC 12, the public key, or some numerical derivation thereof, can be treated as the IC's unique device ID (UID) as discussed above. Since the private key has a one to one mapping with the public key, the UID is also statistically unique to a particular device 14 and is permanently associated with that device 14 (when the public key is derived from a static private key).

This technique of IC identification along with the confidentiality and authentication provided by the provisioning protocol described below, gives a chip or device vendor the ability to register every authentic part in a database, to enact enforcement measures in order to detect and prevent impropriety in the manufacture and distribution of the device 14 such as cloning and reselling over-production parts.

The UID can be used as part of the security protocol to establish a secret between the appliance 18 and the ACC 12 through mutual key agreement. During key agreement, public keys are traded between two parties, each party generates a shared key independently of the other, using only the public keys that were exchanged in the open, and his/her own private key that is kept secret. The result of key agreement is that the two parties arrive at a secret shared between only the two of them, while any third parties trying to listen in could not complete the agreement unless they have copies of the private keys.

The appliance 18 and ACC 12 can also participate in an ECMQV key agreement scheme, which generates a secret key that is known only to the two parties involved. The shared secret generated (e.g. kij) is the basis and prerequisite for symmetric key cryptography, that is, it is used to establish a highly tamper resistant encrypted and authenticated communication channel 29 between the two parties.

Once both parties agree on a symmetric key, the appliance 18 can start issuing and receiving signed confidential messages, also known as FCTs 50, to/from the ACC 12 in a secure and authenticated manner FCT 50 commands are messages containing either feature provisioning, read/write access to protected NVM 62 memory regions, or any other command or message to be provided to the ACC 12 in a controlled, secured and traceable manner FCT 50 responses are messages containing status, audit data or any other command or message to be provided to the appliance 18 in order establish, maintain or comply with the secure provisioning protocol.

Privileges can be used to positively enable features at test and manufacture time, or enable features upon reconnecting to a server or device programmer 26 in the after-market. The lack of privileges can be used negatively to disable non-authorized features in a suspect device, whether it being a clone, a counterfeit or otherwise stolen device.

Completely secured feature provisioning can be achieved through the combination of various cryptographic techniques, examples of which are as follows.

Each ACC 12 may have a Root CA public key stored in its ROM 52 or NVM 62. Each appliance j may then have its own unique certificate CERT[APP$_j$] produced by the Root CA (not shown). The certificates may be relatively small and the certificate fields bit-mapped for easy parsing. The appliance 18 authenticates itself to the ACC 12 by sending a certificate to the ACC 12 as part of the protocol (to be discussed in greater detail below). The ACC 12 uses the CA root certificate to verify the identity of the appliance 18.

Each appliance 18 can have a customer ID (CID) assigned to it that is sent along with the certificate. The CID in the certificate should match one of the CIDs stored in the ACC 12 to ensure that a particular appliance 18 belongs to the proper owner/producer of a particular device 14 and is authorized to communicate with the embedded ACC 12. Multiple CIDs on an ACC 12 allows for different vendors on a tiered manufacturing process to provision features that they own. For example, an application specific integrated circuit (ASIC) vendor would configure the SoC for a particular original equipment manufacturer (OEM), who then configures the device to target a particular equipment seller or service provider, and finally the end customer might be allowed to activate yet another subset of configurations based on his/her service plan.

The ACC 12 can be made to enforce access control to the third party vendor owned features according to a secure identity data (CID) of the participating vendors. The original owner of the SoC could potentially load a CID/Feature Set configuration table as part of its provisioning.

Each FCT 50 from the appliance 18 to the ACC 12 is encrypted, integrity protected, authenticated, and protected against replay and spoofing in this embodiment. Each FCT 50 may be keyed to the UID of a specific ACC 12, and feature privileges granted only on a per device basis upon the success of unlocking the FCT 50 with a device's private key. A fraudulent device attempting to intercept an FCT 50 locked to another UID would then fail to decrypt the FCT 50. Each FCT 50 may also be provided a serial number associated with it such that an FCT 50 can only be used once to prevent them from being copied or replayed. Each FCT 50 may be signed by the appliance 18 that issued it so that the FCT 50 cannot be altered in an undetectable manner.

The response from the ACC 12 back to the appliance 18 can be configured to have a serial number and a message authentication code (MAC) so that even the response cannot be altered or replayed. Since the FCTs 50 are linked to a specific UID, the appliance 18 can keep an audit log showing where and what a particular UID was programmed. The audit log can be reported back through the backend 11 to the SoC manufacturer/vendor. Should multiple instances of the same UID be detected in a review of these log files, it would be an indication that a chip has been cloned or counterfeited.

The use of ECMQV provides an encrypted tunnel 29 that links a specific appliance 18 to a specific ACC 12. No other party can participate in this protocol or decrypt commands sent during an encrypted programming session. ECMQV in particular, may be chosen as the technique to create the channel 29, since it is known to be less vulnerable to the man-in-the-middle attack, which is a credible threat in the environment shown.

The ACC 12 and appliance 18 can be configured in various ways to suit a particular environment. The following discusses various features that enable such configurability. The ACC 12 should utilize a very small total silicon area, and should support on-chip (self contained in ACC 12) generation of a UID, and on-chip generation and storage of ECC public-private key pairs. Enablement/disablement of scan chain testing of the ACC 12 should be available prior to ACC ECC key pair generation to prevent the private key from being revealed. Authentication/integrity protection of commands from the appliance 18 to the ACC 12 should be provided, and security-critical commands should be unique to a specific ACC 12. FCTs 50 between an appliance 18 and the ACC 12 should be encrypted for confidentiality and features may be enabled and disabled via FCTs 50 provided to the ACC 12.

The ACC 12 may function as a protocol enforcer—if the received commands are invalid, the ACC 12 can reject them and optionally shut down if a threshold of invalid commands were attempted. There should also be the ability to ensure that once the ACC 12 is locked out, (as in the case when the device is to be retired permanently, or if the system 12 detects the device has been tampered with,) the ACC 12 cannot be re-enabled. When not in use, the ACC 12 should be capable of powering down to very low current drain, and the ACC 12 operation should not rely on external (off-core) firmware or an external CPU to perform its basic functions.

The agent 20 and/or any suitable interface (e.g. 46, 48) can provide the flexibility to allow customers to add their custom programming interfaces to the ACC 12, which ultimately allows customers to communicate with the ACC 12 using a variety of device programmers 26 (e.g., USB port, I2C serial interface, Ethernet, etc.). Similarly, ACC 12 programming should be capable of taking place at multiple locations, at multiple times, provided it can open up a secure communication channel 29 with a trusted appliance 29. In this way, programming can be deferred until the least costly phase of the manufacturing cycle. The appliance 18 and the ACC 12 can be used to securely program and store additional information such as unique device identification numbers (e.g., IMEI/EIN for mobile phones).

Hardware Details

Further detail of the hardware implementation shown in FIG. 53 will now be provided. The ACC hardware in this example comprises a microcontroller 54, a memory bus controller 64 to access scratch data ram 60 and NVM 62, and several memory mapped peripherals, including an arithmetic unit 56 (configured for EC operations), an RNG 58 accessible through a peripheral controller 59 and, although not shown, optionally an AES and SHA core (if the area/performance trade-off is feasible). Additionally, the ACC 12 can have an optional generic parallel bus interface 66 and external-access NVM interface 68 to add flexibility for SoC designers.

At the center of the ACC 12 is the microcontroller 54, which plays an integral part in all the tasks that the ACC 12 accomplishes, including: authenticating and executing provisioning commands and enforcing provisioning; executing high-level security protocols; assisting in sequencing the low-level hardware cryptographic accelerator functions, performing management tasks such as initialization, configuration, power management; and assisting in maintenance built in self test (MBIST) and a RNG BIST during wafer testing. The microcontroller should be chosen primarily for its size, then enhanced to meet speed performance where deemed necessary.

The field arithmetic unit 56 provides hardware acceleration of the low-level cryptographic calculations. Specifically, the field arithmetic unit 56 should be configured to perform a binary field multiplication efficiently. The field arithmetic unit 56 may be considered an important part of the ACC 12 because it allows the completion of an EC point multiplication relatively quickly. The field arithmetic unit 56 can be used to accelerate both the ECDSA and ECMQV public key protocols used to provide, respectively, authentication and mutual authentication. The details of these protocols will be explained below.

The hardware and firmware typically trade off in terms of area, code memory, complexity and performance metrics. Decisions based on what will be implemented in hardware is typically primarily gate-count and performance driven. The performance of the ACC 12 has direct cost implications measured in terms of tester time, and the equivalent gate count drives the cost of implementation as measured by silicon area.

The RNG 58, with the help of a software conditioner (not shown) can be used to generate statistically random numbers used as cryptographic keys and UIDs. In elliptic curve public key cryptography schemes, a random number is used as the private key, and when it is multiplied, using elliptic curve scalar point multiplication, by the previously agreed upon Generation Point of the curve parameter, the product would be the public key. The RNG 58 can be used when the ACC 12 generates its static private key pair which is static throughout the entire life of that ACC 12. In addition, a new ephemeral key is created for every secure session between an ACC 12 and an appliance 18. Whenever the ACC requires a new static or ephemeral key to be generated, the RNG 58 is asked to provide a random bit stream to be used as the seed to generate the private static or ephemeral key. The random bit stream feeds into an AES block cipher to condition the raw entropy produced by the RNG, producing a uniformly distributed random number that is used as the static private key. In some embodiments, prior to feeding into the AES block cipher, the random bit stream can be fed into a software-based linear feedback shift register (LFSR) to condition the RNG data. As part of design for testability (DFT) testing, the ACC 12 should be asked to perform a health check of the RNG 58.

The ACC 12 in this example can have a 16-bit address, ranging from 0000h-FFFFh, byte addressable memory spaces. The following Table 2 lists how the memory space may be divided into distinct regions in this embodiment.

TABLE 2

Memory Space Allocation

| start addr | end addr | # of bytes allocated | Name | Description |
|---|---|---|---|---|
| 0x0000 | 0x0FFF | 4K | XRAM | General purpose scratch data ram |
| 0x1000 | 0x1FFF | 4K | — | reserved |
| 0x2000 | 0x21FF | 512 | NVPRIV | Private Space of the NVM |
| 0x2200 | 0x23FF | 512 | NVPROT | Protected Space of the NVM |
| 0x2400 | 0x2FFF | 3K | NVSHARE | Shared Space of the NVM |
| 0x3000 | 0x3FFF | 4K | ACCREG | ACC registers |
| 0x4000 | 0x7FFF | 16K | DBG | debugger storage (reserved) |
| 0x8000 | 0xDFFF | 16K | ROM | Instruction Program ROM |
| 0xE000 | 0xFFFF | 16K | — | reserved |

The microcontroller scratch space (XRAM) in the above table, can be used for temporary data storage by the microcontroller 54. It may be implemented as fast, single-cycle access, 8-bit byte addressable, 32 bit data static RAM. The actual amount of scratch space should be defined based on firmware usage.

The ACC 12 may be configured to have a generic interface to an NVM storage element 62 such as OTP, MTP, EPROM, FLASH, etc. NVM 62 is IC technology dependent, so an NVM interface 70 for such NVM 62, is likely defined according to the specific application. The NVM interface 70 provides abstraction and should have the capability of writing, rewriting and erasing the UID in a secure manner that is easily adapted to a proprietary NVM interface protocol. Certain types of NVM 62 are one-time programmable (OTP); which means that once they are "burned" they cannot be erased or re-written into that memory location. If OTP memories are used, then firmware is needed to make sure that it keeps track of which memory locations have already been written to and maintain a mechanism which is used to find the latest data content and where there are available free space.

In this embodiment, there are three distinct NVM permission levels, each permission level having different restrictions placed on them. First, private space permission level, wherein NVM 62 is reserved for the ACC's use exclusively. The ACC 12 can read and can write, but other agents are prohibited to access this region. Data stored in this region may include the secret static key, the UID, and the non-volatile state of the ACC 12. Second, a protected public space permission level, wherein external agents can only write data in this region using the FCTs 50 and the secure messaging protocols with authentication as will be described below. This region is readable from the JTAG port 72 with the RDACCESS type FCTs 50. This region is also readable from the parallel command interface 66 with a normal memory access, as well as with RDACCESS FCTs 50. Typically, this region contains secret data that the customer would want to store in NVM 62 that are only allow accessible by on-chip logic, assuming the on-chip logic does not leak that data to outside the chip. Third, a shared memory space permissible level, containing other data to be stored in NVM 62 that that the ACC 12 does not need to protect. External agents can read and write in this region either with the cmd[SHARENVMWR] or the cmd[SHARENVMRD], or by using direct memory access from the parallel command interface 66. The "cmd" commands will be explained in greater detail below. At a minimum, the ACC 12 should have enough NVM 62 space with a "private" permission level to store on-chip secrets.

One of the many applications for the ACC 12 is to provide a way to enable and disable features based on customer requirements. Although the exact feature set defining what can be enabled/disabled is to be provided by the customer, the following describes how a provisioning interface 74 may be used such that adaptations can be made according to specific customer requirements. In short, as noted above, the ACC 12 comprises a set of output ports, denoted by the enablement controller and interface 74 in FIG. 53, and evaluates the aggregate of these outputs indicates which features are enabled and which are disabled. In one embodiment, there is one enable signal detected over the enablement controller and interface 74 per feature item that would need to be enabled/disabled. The raw data that determines the values output to the enablement controller and interface 74 may come from the NVM 62. It is possible to encode or scramble the enable signals such that there is not a one-to-one mapping of a particular feature to a single enable signal. In this case you would instead need to evaluate multiple bits of signals to determine whether a particular feature has been enabled. It can be appreciated that it would be up to individual customer application to determine whether this is necessary or feasible. In this way, unauthorized feature enabling can be made more difficult, at the cost of some additional logic. However, whether scrambling is even necessary depends on the actual feature list from the customer and which threat models are being considered.

If the ACC 12 has been compromised, as will be explained below, it is transitioned into a lock-out state, wherein the feature enablement is automatically set to some very primitive value where only a bare minimum set of features are enabled for debugging and post-mortem analysis. The feature enablement value when in the lock out state may be different than the initial feature enablement of a new device 14 depending on customer requirements.

The amount of time for which the ACC 12 is active is typically relatively short, and therefore power consumption while it is inactive should be considered more important than while it is active. The ACC 12 can include power management circuitry provided by the underlying silicon technology to reduce power when it is inactive. For example, techniques that can be used to save power when the ACC 12 is inactive, include clock gating and power gating may be used.

The ACC 12 shown in FIG. 53 also provides a bi-directional generic serial command interface 76 to a JTAG test access port (TAP) controller 72 as defined in the IEEE 1149 (JTAG) specification. The controller 72 is simply a state machine and implements the feature provisioning commands as JTAG user-defined commands. The JTAG specification provides a nicely defined tester interface that can be used by the tester to translate high level commands from the provisioning server into tester commands that are communicated to the design-under test (DUT) through the tester interface.

The ACC DFT features that can be implemented comprise the following:

1) Software MBIST of the RAM 60 and NVM 62 can be initiated by a command issued by the tester 16. MBIST for RAM 60 and NVRAM involves a fixed pattern across the rows and columns of the memory then reading them back to make sure it contains what is expected. However, if OTP NVM 62 is used, it is impractical to test every address location, so the pattern may be applied to only one address location.

2) Partial scan chain testing inserted for the registers inside the ACC 12, initiated and controlled by the tester 16. Registers, which may be a sub-set of control and configuration registers 75 in the ACC 12, deemed to contain sensitive information are excluded from scan chain. The following registers may be excluded from scan chain: Life_Cycle_State and System_Ready registers, feature enablement registers, reset enable register, cross-clock domain synchronization latches, and DFT enable/disable register.

3) JTAG Boundary scan is used to test the primary I/O of the IC 40. This is added security to make sure the ACC 12 was not disconnected, which might be an indication of an attack. All ACC 12 DFT features are controlled by the ACC's own TAP controller 72 and, as such, the hardware should be designed so that the DFT features can be enabled and disabled based on the state of the ACC 12. An uninitialized ACC 12 powers up into a Test State and has DFT features enabled by default. When the ACC 12 receives a cmd[EXITTEST], software then causes a transition from the Test State to the Initialization State. As a result of this transition, the hardware can determine that it is no longer in the Test State and disables DFT features until it is enabled again.

In this embodiment, appliance 18 commands are sent serially through the JTAG interface to the ACC's TAP controller 72 as described above. It is possible that is some applications, it would be desirable to have an alternate way of issuing commands to the ACC 12 besides a TAP controller 72, and thus a second interface for commands to be sent can be provided, namely a generic programming interface. Such a generic programming interface is considered to be simply a 16 or 32-bit processor interface.

Figure 54:
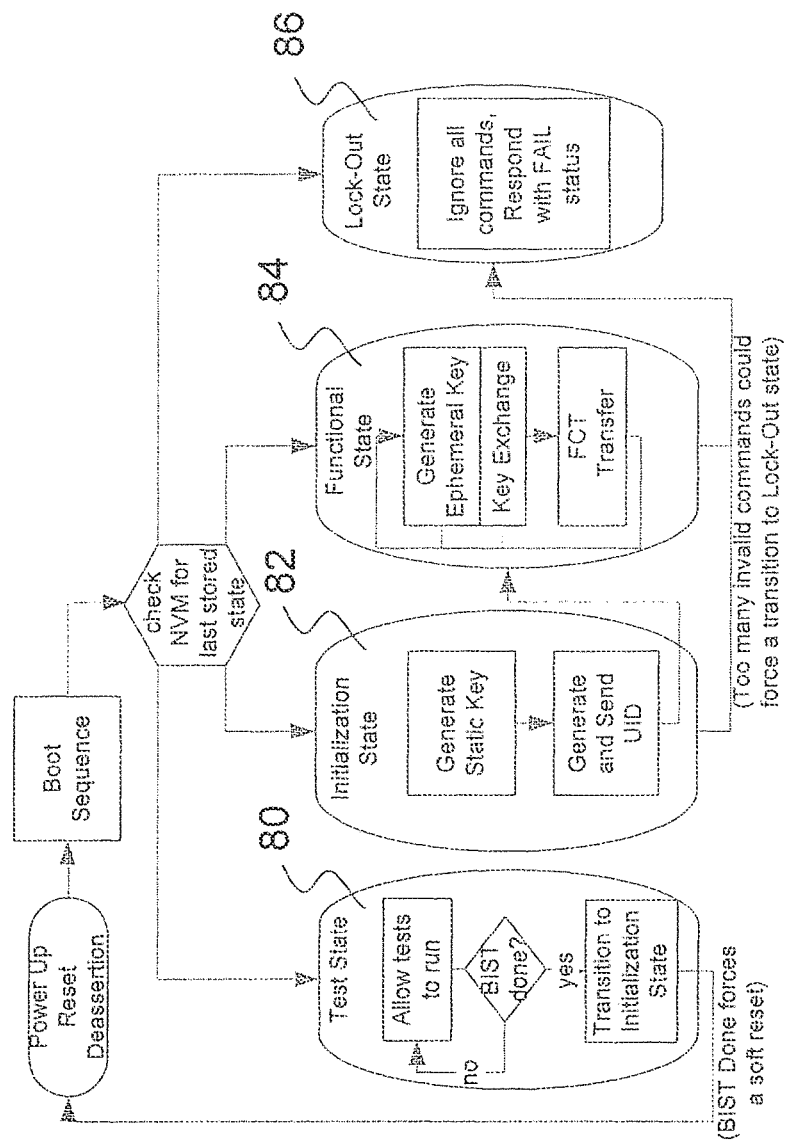
FIG. 54 is a state diagram illustrating the sequence of operations executed by the firmware in the ACC in transitioning through various states.

The parallelized output from the two command sources should be multiplexed (MUXED) together and only one command interface should be active at any time. The command interface 76 chosen is the one that issues the first command (the TAP controller 72 may be chosen as the default in case there is a tie.) The selected interface is the active interface until a cmd[REQRESP] is completed or an explicit cmd[STOPACC] is issued or if the device 14 resets. The purpose of the command processing state machine, which is implemented in protected firmware running on the MCU 54, is to perform a preliminary decode and filter of the commands issued by the appliance 18 to see how to handle them. Sequence of Operations for the ACC FIG. 54 is a high-level state diagram illustrating the sequence of operations for transitioning from one life cycle state to the next. Throughout its life time, the ACC 12 can operate in one of four states based on what has occurred in the past, thus they are called the ACC's Life Cycle States. Preferably, certain actions are only permissible in particular life cycle states, as enforced by a combination of hardware control logic and firmware code.

The firmware should have sole control of the state transition based on commands received from the appliance 18. The first step of transitioning to a new state is to write the new state value to a fixed location in private NVM space. The definitive state value would then be kept in NVM 62 so that if power gets cut before the state was saved, the ACC 12 does not revert back to a state that it has already transitioned through upon power up. In other words, the lifecycle state transition and the update to the lifecycle state register should be executed as an atomic operation. An overview of the four life cycle states shown in FIG. 54 will now be provided.

Test State 80—The ACC 12 is in the test state 80 when it is a brand new, un-initialized device that has yet to pass testing and sorting. If an ACC 12 is still in this state, it implies that the ACC 12 has not completed BIST, Scan or other test operations, and is thus presumed to not yet be ready for the Initialization State 82. During the Test State 80, the ACC 12 can execute any number of chip validation tests, repeatedly if necessary. Some of these tests can corrupt the internal registers and memory content, therefore it is foreseeable for the test program to require multiple reset cycles before being done. The ACC 12 should be designed such that it remains in the Test State 80 through multiple reset cycles until the tester issues one particular command, namely the cmd[EXITTEST] command (described below), that can be designated as the way to exit the Test State 80.

The cmd[EXITTEST] causes the ACC 12 to disable all DFT features, and transition to the Initialization State 80, before issuing a soft reset. Disabling DFT features prevents an adversary from using those features to tamper with the SoC without authorization. The DFT features are left disabled until they are explicitly enabled with a FCT 50 issued by an authenticated appliance 18 later on in the Functional State 84. The least significant bit of the feature register can be reserved to allow DFT in the Functional State 84. DFT features should not be able to alter the Life Cycle state, and having DFT re-enabled should not cause the state to change. The soft reset can be helpful to ensure that there are no residual DFT data left in the ACC 12. The ACC's firmware should be used to update the Life Cycle State value in NVM 62 before issuing the soft reset to ensure that when the ACC 12 restarts, its proceeds directly to performing the initialization procedure.

Initialization State 82—In this state the ACC 12 generates its static key pair (e.g. dsi, Qsi). The x-coordinate of the public static key may then be used as the ACC's UID. When this has been done, the ACC 12 can update the non-volatile life cycle state so that the next boot will proceed to the Functional State 84. The response to the cmd[EXITTEST], in this example, contains the UID.

Functional State 84—In this state, the ACC 12 performs basic health checks, updates the feature register and then goes into hibernation, waiting for the cmd[STARTACC] and subsequent commands from the appliance 18. The ACC 12 can verify that the commands from the appliance 18 are valid and participating in secured communications. If for whatever reason the ACC 12 receives a limited number of what are deemed to be invalid commands in any of the above states, the ACC 12 can automatically transition into a Lock-Out State 86. The least significant bit of the feature register allows DFT in the Functional State 84. DFT features should not be able to alter the Life Cycle state, and having DFT re-enabled should not cause the state to change. A FCT 50 may be required to set the DFT feature bit, bit zero of the feature, so that only under secure conditions the DFT can be re-enabled. It may be noted that this re-enabled occurs typically in a volatile FCT enable operation, where DFT capability is lost when the device powers down. The volatile nature of DFT enable allows for multiple enables over the lifecycle of the device, even when considering the use of non-volatile memory to store enable bits.

Lock-Out State 86—This state may be reached if the ACC 12 has encountered one of the following conditions: i) been issued the cmd[LOCKOUT], ii) detected and exceeded a maximum number of allowed errors, iii) detected an unrecoverable error. The lock-out mechanism is intended to be a deterrent against repeated attempts to attack the ACC 12 and the entire system 10 as a whole. Once the ACC 12 is in the Lock-Out state 86, the ACC 12 ceases to process additional commands Any attempt to communicate using ACC commands thereafter would then result in a LOCKED status as a response. In addition, the firmware can either revert to a pre-specified feature set or simply maintain the feature set as is, prevent further changes to the feature set or protected space of the NVM 62, then shut down and go into hibernation.

Life cycle state transitions are typically progressive and are non-volatile, that is to say, once the ACC 12 has transitioned to a new state, it could not go back to a previous state even through power and reset cycles. The exception to this can be the transition to the Lock-out State 86, which will be volatile. The Life Cycle State 86 that is stored in NVM 62 should not be modified by going to Lock-Out state 86, such that the ACC 12 will be unlocked if it goes through a power or reset cycle. By preventing command and protocol errors to cause a permanent lock out of the ACC 12, this scheme can prevent the SoC from being permanently disabled inadvertently.

However, there are certain errors (mostly due to hardware defects) that may prevent the ACC 12 from operating normally. If the ACC 12 encounters any of these unrecoverable errors, then it is possible for the ACC 12 to be stuck in the Lock-Out state 86 permanently. A counter allocated in RAM 60 may be used to keep track of how many error conditions the ACC 12 has observed since reset. Each time the ACC 12 encounters an error condition, it would then increment the error count. When the ACC 12 reaches a maximum number of allowed errors, the ACC 12 transitions into the volatile Lock-out state 86. The error counter may allow any specified number of allowable errors before locking out the ACC 12.

Firmware—Boot Sequence, State Transitioning, and Life Cycle States

The firmware can be organized generally into the following groups: a set of cryptographic primitives, which includes various underlying arithmetic primitives; a set of BIST primitives; boot and start up sequencer; Life Cycle State functions; and a set of functions to interpret and process incoming commands and messages. The cryptographic primitives will be described later following a discussion of the communication protocols, and the BIST primitives will be discussed with a discussion of the command handling. The following will thus focus on the boot and start up sequences, the Life Cycle State functions and the set of functions to interpret and processing incoming commands and messages.

Figure 55:
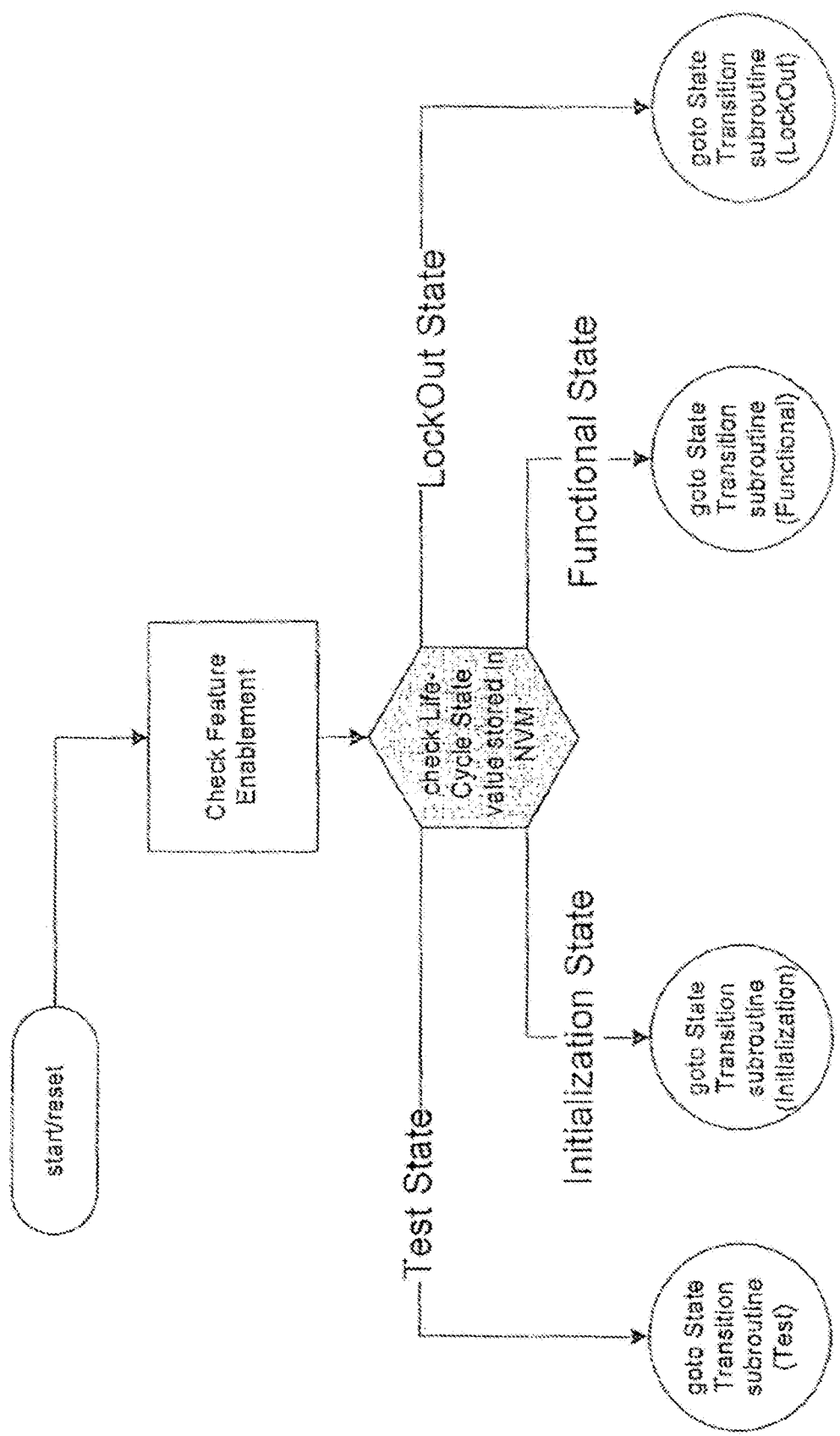
FIG. 55 is flow diagram illustrating a boot sequence executed by the firmware in the ACC.

Boot/Start up—As shown in FIG. 55, at every ACC 12 restart, the microcontroller 54 embedded in the ACC 12 automatically starts executing firmware boot code upon power up or coming out of reset. The firmware program should always begin executing the boot sequence in the following order: 1) Perform some necessary low level register initializations and configurations; 2) Read the feature enablement list stored in NVM 62 and determine which features needs to be enabled or disabled, then drive the appropriate feature enable signals; 3) Read the NVM 62 to get the last state the ACC 12 was in with before it was powered-down/reset; and 4) Transition into the appropriate Life Cycle State by writing to the Life Cycle State register and jumping to a sub-routine that handles everything needed to be done in that particular state.

Figure 56:
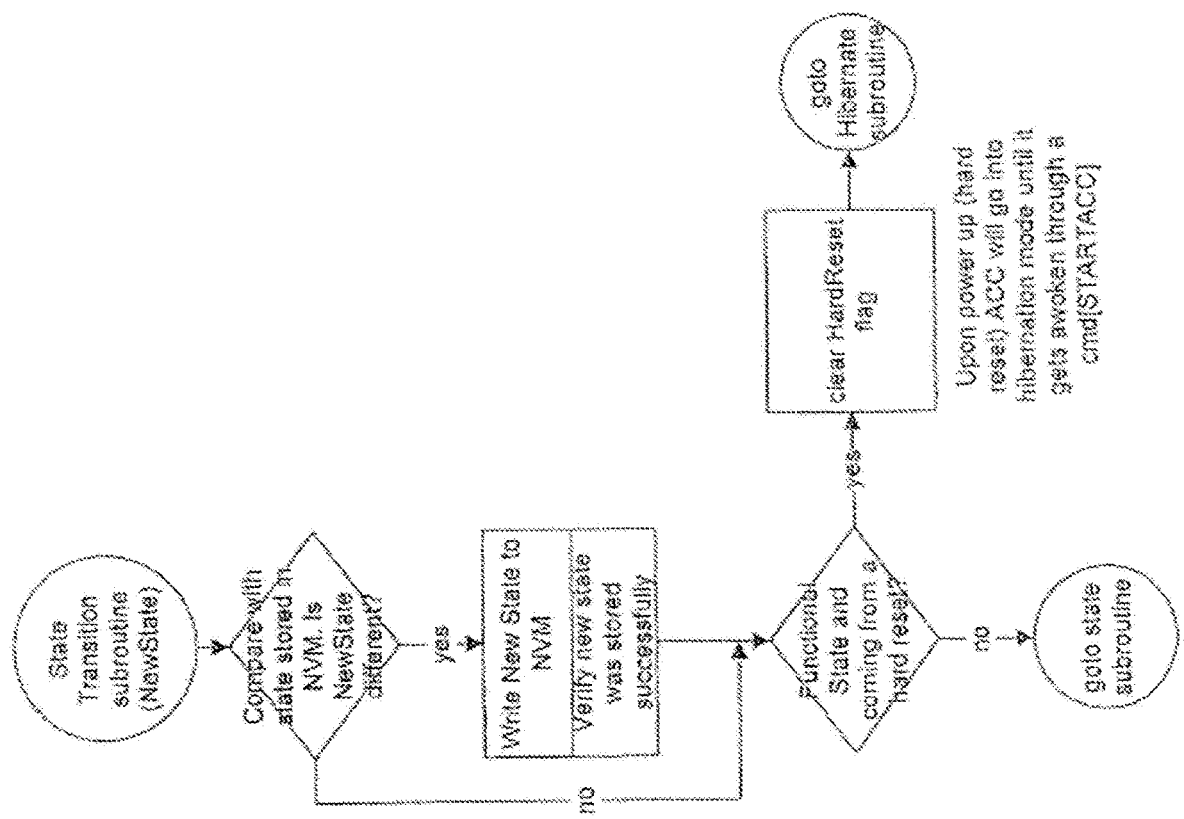
FIG. 56 is a flow diagram illustrating a state transition sequence executed by the firmware in the ACC.

A diagram illustrating a state transition sequence is provided in FIG. 56. Every state transition may begin with the following sequence: First, the state transition subroutine has an input parameter indicating the new state it is transitioning to and then does the following: 1) Check the new state against the current state to make sure the state transition is valid; 2) If the new state is different than the last state stored in NVM 62, update the NVM 62 with the new state value; 3) Write the new state value to the Life Cycle State register; 4) Decide whether this state transition is the first state transition right after a power up or a hard reset. If it is, then go automatically into hibernation mode by default; and 5) Otherwise, call the corresponding state function to start performing the required operations in that particular state. It may be noted that, for step 5, each state has its own subroutine to handle the operations necessary in that state. The subroutines for each of the state subroutines are shown in FIGS. 57a to 57d.

Figures 57A, 57B:
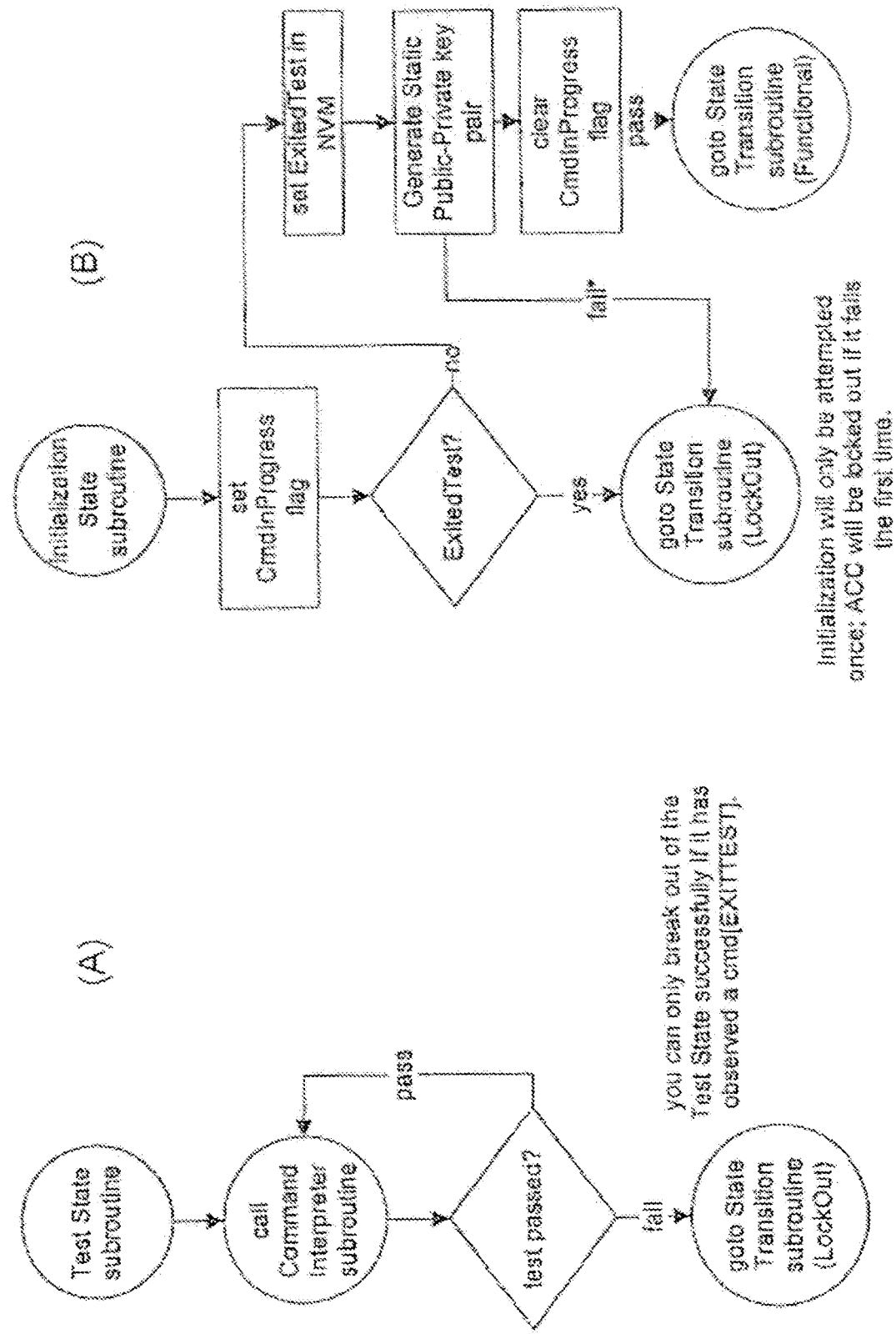
FIGS. 57a to 57d are flow diagrams illustrating subroutines for the four life cycle states shown in FIGS. 54 and 55.
Figure 57D:
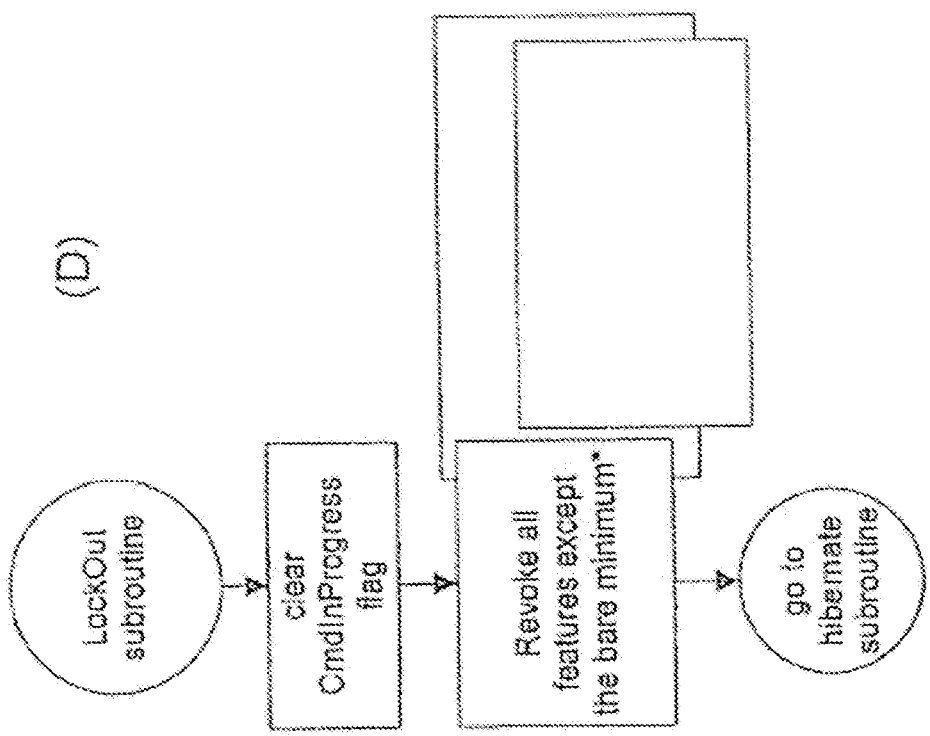
Figure 57C:
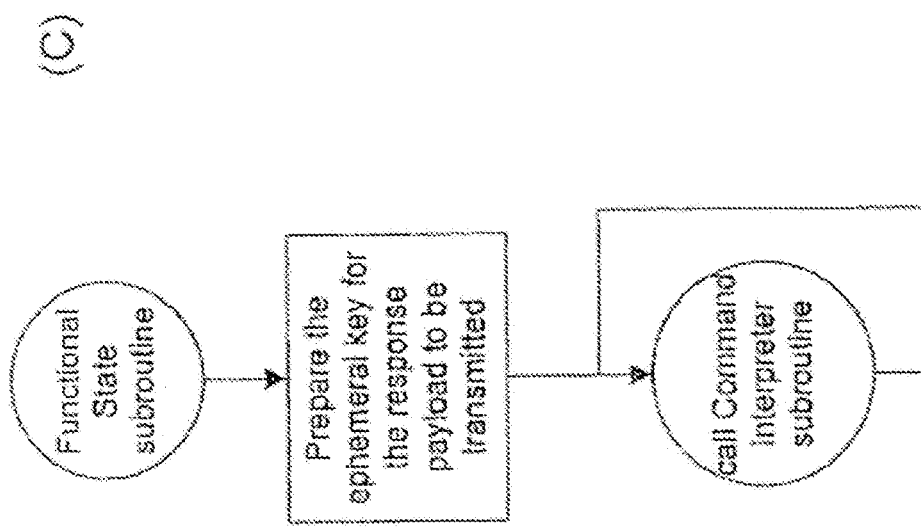

The Test State subroutine is shown in FIG. 57a, the Initialization State subroutine is shown in FIG. 57b, the Functional State routine is shown in FIG. 57c, and the Lock-Out State subroutine is shown in FIG. 57d. It can be seen that the subroutines generally follow the high-level blocks shown in the life cycle diagram of FIG. 54.

It may be noted that, as far as firmware is concerned, enabling or disabling features involves writing the appropriate values to a set of hardware registers and storing that value in known locations in NVM 62. It may also be noted that in certain applications, the ACC 12 may use OTP memories to store non-volatile data. OTP memory does not allow firmware to erase previously written data. Typically, OTP memories can be thought of as fuse circuits: Every bit has a value of '0' initially, and upon writing a '1' to a certain bit location, that fuse is permanently burned and could never be restored. For this to occur, the firmware should consider: whether a piece of data is valid or not, where to look for most up-to-date data, where there is free space available and what happens when no more free space, and allocating enough extra redundant space to allow for multiple writes. If the NVM 62 is not OTP, firmware may treat it as RAM and be free to overwrite existing content. However, it should be appreciated that NVM 62 is typically slower than SRAM. Firmware should try to access NVM 62 in bursts to minimize performance impact.

The firmware should store important information to NVM 62 as soon as possible in case the ACC 12 loses power or is suddenly disconnected from the appliance 18. With certain NVM 62 technologies, data written into NVM 62 should be read back to ensure the writes were successful since some NVM 62 write operations may not be 100% reliable. In addition, the firmware should maintain a running count of how many failed/illegal commands were observed, and if the count reaches a threshold, firmware should place the ACC 12 into the Locked-Out State 86. Also, if a command fails to provide the proper response in a reasonable amount of time, it might be an indication that something went wrong inside the ACC 12 or it had been disconnected prematurely. In such cases, the appliance 18 could attempt a reset or it would need to log the disconnection in the database; and resume the last operation in case this ACC 12 is ever reconnected again.

In order to impede side-channel attacks where an adversary extracts secret information by examining information inadvertently leaked out due to implementation details of fundamentally sound algorithms, the ACC's firmware may include certain firmware counter measures to mitigate these attacks. The counter measures, if any, will be specified in the firmware implementation specification. It may be noted that certain counter measures create complexity in the system 10, which in turn increases the execution time and energy consumption.

Figure 58:
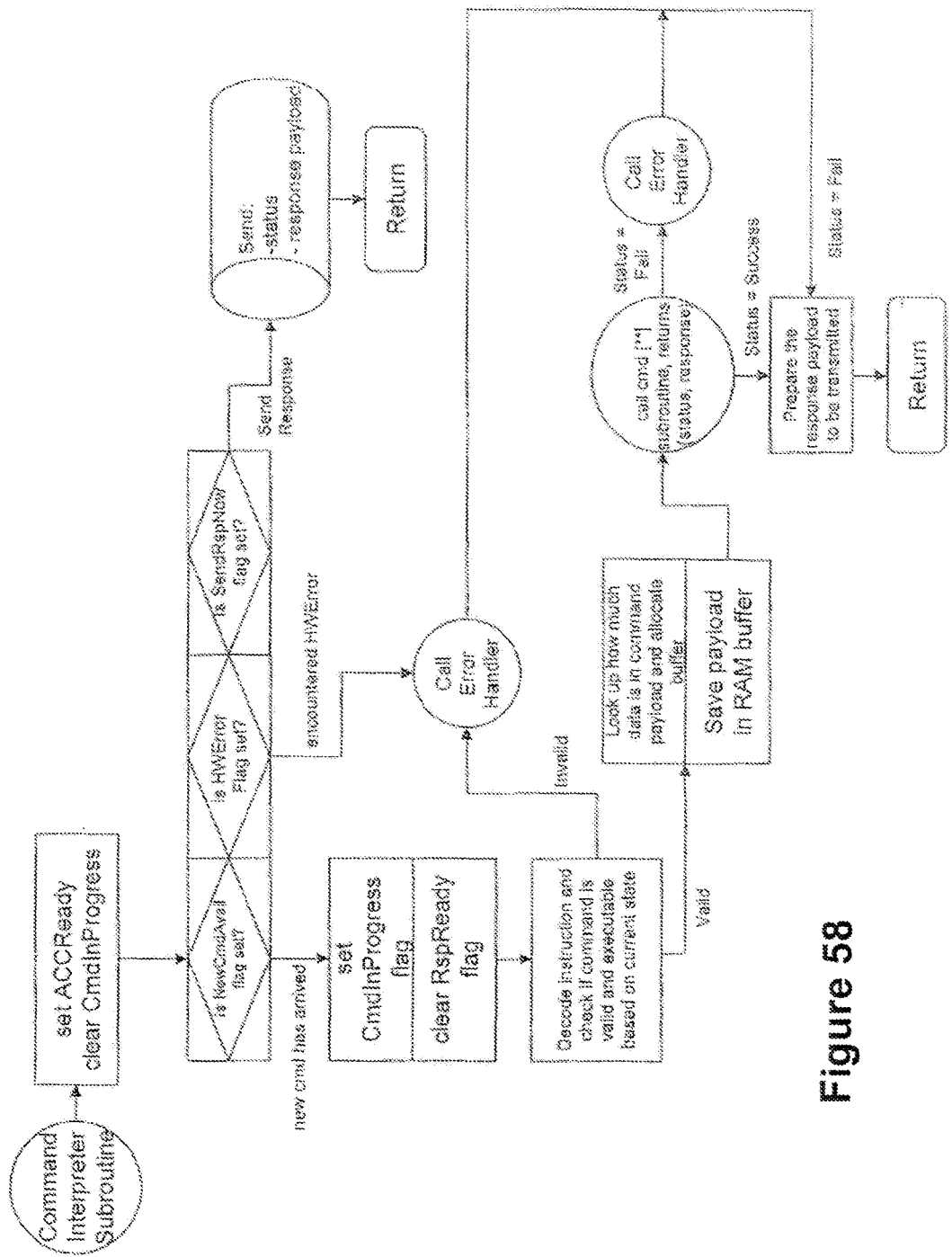
FIG. 58 is flow diagram for a command interpreter executed by firmware in the ACC.

FIG. 58 provides a diagram illustrating a command interpreter subroutine, which outlines what the firmware does for received commands. The firmware is responsible of processing the following commands, shown in Table 3 below:

TABLE 3

Valid Firmware Commands

| Command Code | Command Name | Valid State |
| --- | --- | --- |
| 0x02 | REQVERID | Test, Initilaize, Functional |
| 0x03 | STARTACC | Any |
| 0x04 | STOPACC | Any |
| 0x05 | LOCKOUT | Test, Initilaize, Functional |
| 0x06 | INITIALFCT | Functional |
| 0x07 | FCT | Functional |
| 0x08 | TESTMEM | Test (*DFT), Functional |
| 0x09 | TESTROM | Test (*DFT), Functional |
| 0x0A | TESTNVM | Test (*DFT), Functional |
| 0x0B | TESTRNG | Test (*DFT), Functional |
| 0x0D | SHARENVMWR | Test, Functional |

TABLE 3-continued

Valid Firmware Commands

| Command Code | Command Name | Valid State |
|---|---|---|
| 0x0E | SHARENVMRD | Test, Functional |
| 0x0F | EXITTEST | Test |
| 0x10 | REQRESP | Any |

If the firmware receives a command that is not in a predetermined list, such as that in Table 3 (even valid commands that are handled by the hardware), the firmware can treat such commands as errors and call the error-handler function. The commands indicated by (*DFT) in the Table 3 are used to validate the logic on the silicon is manufactured without defect. Some DFT commands have their own protocols and behave differently than the regular command sequence. A description of the actual functionality of these commands will be described later. The DFT commands remain invalid in the Functional State 84 until the DFT features are re-enabled through secure feature provisioning via cmd[FCT]—the command associated with providing FCTs 50.

The process of handing ACC commands can be described in the following processing sequence:

1) Poll the register NewCmdAvail until it detects the bit value '1', which indicates a new command is available;
2) Set the CmdInProgress bit to notify the hardware that the firmware started processing the command;
3) Read the instruction register (IR) to obtain the command code;
4) Read the data (if applicable for the command) from the registers (word by word, where word is 32-bit);
5) Process the data, perform necessary operations requested by the command;
6) Prepare the response payload to the hardware, where the response payload is in this format: <status code, data>, where 'status code' contains a 4-byte value (SUCCESS, FAIL, or LOCKED) and 'data' contains is as many bytes as required by the command (it can be empty for some commands, and it should always be empty if the status is not=SUCCESS);
7) Set the RspReady bit and clear the CmdInProgress bit at the same time by writing to SWFLAGS register;
8) Wait until SendRspNow is set to '1' (indication that the hardware is ready to receive response data from the firmware), and write the response data to the registers (word by word, where word is 32-bit); and
9) If instead of the SendRspNow flag you have a NewCmdAvail flag, abandon the response and handle the new command instead.

As noted above, FIG. 58 provides a flow diagram showing the steps that the command interpreter firmware code may take.

Figure 59:
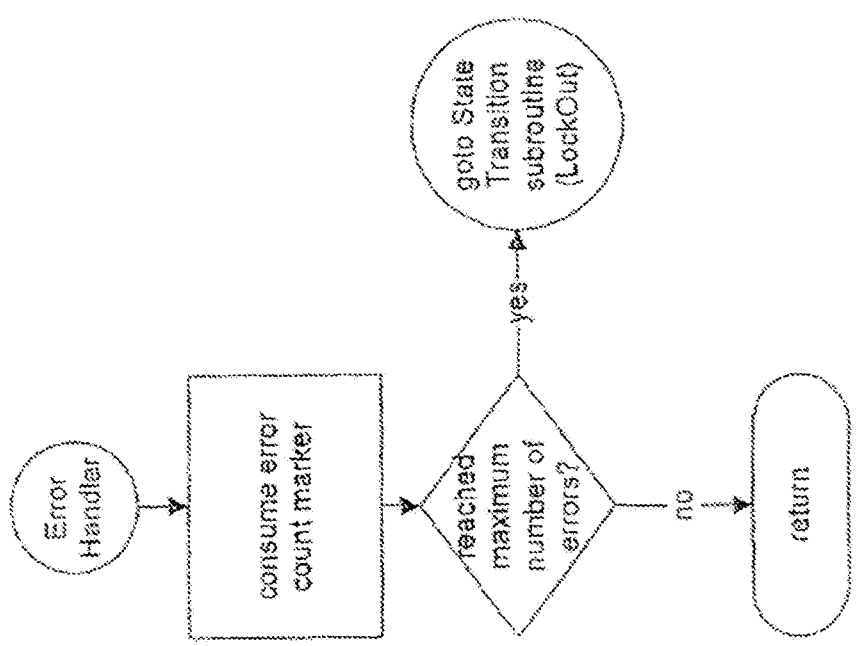
FIG. 59 is a flow diagram illustrating an error handler routine executed by the firmware in the ACC.

FIG. 59 illustrates a flow diagram showing steps in an error handling routine. It is possible to jump into the error handling function and never come back because the ACC 12 has reached the maximum number of errors allowed and has transitioned into the Lock-Out State 86. In this example, as noted above, there are a total of 8 error count markers, allowing up to 8 invalid commands to be observed without locking up the ACC 12 throughout the entire life span of the ACC 12. The error handling can optionally be implemented via the MCU traps, which are interrupts that can be triggered by programmable conditions such as counter thresholds, read/write operations to/from a specified register or via an external signal. There are some benefits to using the MCU traps: uniformed error handling from everywhere in the firmware code and handling exceptions such as invalid MCU instructions, bad addresses, and such (so that the hardware can catch these exceptions and treat them as errors).

Figure 60:
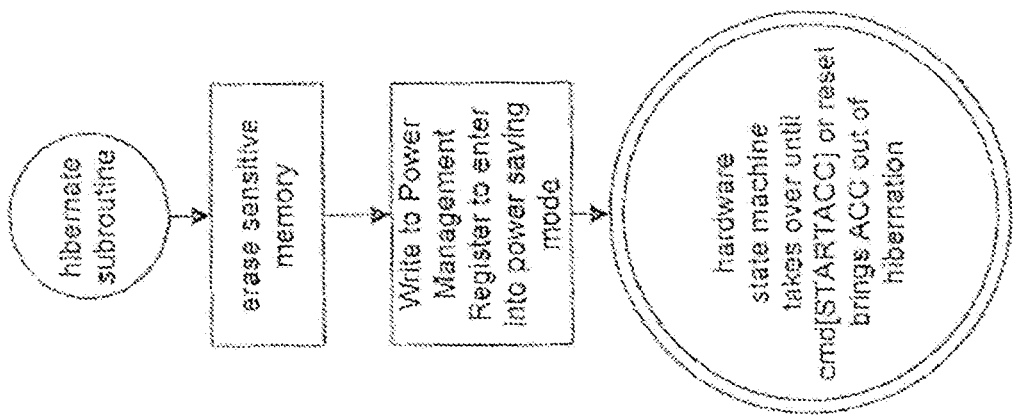
FIG. 60 is a flow diagram illustrating a hibernation subroutine executed by the firmware in the ACC.

FIG. 60 provides a flow diagram illustrating steps performed during a hibernation routine. The hibernation mode can be implemented via an MCU "stop" instruction, which puts the MCU 54 into a low-power mode. In this embodiment, the only way for the firmware to get out of hibernation state is to perform an MCU reset. When the hardware receives cmd[STARTACC] from the appliance 18, it can reset the MCU 54 causing the firmware to boot.

Command Handling

An important aspect of the ACC 12 is incorporating protocols to decode, verify, process and respond to commands that are sent by the appliance 18. ACC hardware and firmware need to cooperate by communicating with each other through the use of memory mapped registers that are set, cleared or polled at the proper instances. Various commands have been introduced above but the following describes further detail of all the commands the ACC 12 accepts in this embodiment to illustrate an exemplary protocol for command handling.

The following Table 4 provides a summary of all the commands that the ACC 12 can process. The function of each of these commands will then be described in more detail.

TABLE 4

Command Summary

| Command Name | Encoding IR[4:0] | Life-Cycle State Available | Additional Comments | Description |
|---|---|---|---|---|
| IDCODE | 0x01 | ALL | *HW-Only, *SPECIAL | JTAG IDCODE |
| REQVERID | 0x02 | ALL | *HW-Only, *SPECIAL | send ACC SW and HW versions |
| STARTACC | 0x03 | TEST, INIT, FUNC | *HW-Only | ACC reset/wake-up from hibernate |
| STOPACC | 0x04 | TEST, INIT, FUNC | | ACC hibernate |
| LOCKOUT | 0x05 | TEST, INIT, FUNC | | Go to lockout state |
| INITIALFCT | 0x06 | FUNC | | Establishes shared key session and process the first FCT in the session |

TABLE 4-continued

Command Summary

| Command Name | Encoding IR[4:0] | Life-Cycle State Available | Additional Comments | Description |
|---|---|---|---|---|
| FCT | 0x07 | FUNC | | Process an additional FCT in an existing key session |
| TESTMEM | 0x08 | TEST, FUNC | *DFT | RAM test |
| TESTROM | 0x09 | TEST, FUNC | *DFT | ROM test |
| TESTNVM | 0x0A | TEST, FUNC | *DFT | NVM test |
| TESTRNG | 0x0B | TEST, FUNC | *DFT | RNG test |
| SCAN | 0x0C | TEST, FUNC | *DFT | SCAN test |
| SHARENVMWR | 0x0D | TEST, FUNC | | Writes to "shared" regions of NVM |
| SHARENVMRD | 0x0E | TEST, FUNC | | Reads from "shared" regions of NVM |
| EXITTEST | 0x0F | TEST | | Disables DFT features and exit the TEST state |
| REQRESP | 0x10 | ALL | *SPECIAL | Request for Response |
| BYPASS | 0x1F | ALL | *HW-Only, *SPECIAL | JTAG BYPASS |

First, some general comments regarding Table 4. The commands indicated as *HW-only are ones which are handled by the hardware only and the firmware are not aware of them. All the other commands are passed to the firmware to be processed. The commands indicated as *DFT in Table 4 are used to validate that the logic on the silicon is manufactured without defects. As the ACC 12 transitions out of Test State 80, DFT commands are disabled and considered invalid. They will remain invalid until the DFT features are re-enabled through the secure feature provisioning with a FCT 50. The REQRESP command is a special command, designed to be used to get the response of another command REQRESP requires hardware and firmware to work together. The commands indicated as *SPECIAL are low-level hardware commands They do not follow the command protocol sequence (to be described later), and they do not return data using the cmd[REQRESP]. SHARENVMWR and SHARENVMRD are optional, and either one or both may be omitted in certain applications. TESTMEM, TESTROM, TESTNVM, and SCAN are optional depending on the application's DFT strategy. The use of STOPACC may also be optional. In some applications, this command does not need to be used, e.g. if it is intended that the tester/device programmer issue a reset when it wants to disconnect from the ACC 12. Finally, some commands are restricted to only certain Life Cycle States (80-86). The ACC 12 enforces the validity of the command issued for the current state, keeps track of the number of invalid commands encountered, and if the count exceeds a threshold, the ACC 12 is to be locked out.

cmd[REQRESP]—The purpose of the REQRESP command, as mentioned earlier is to provide a request for the response of some other command and, as such, it should be issued only when it is preceded by another command There is typically no request payload for this command. The ACC 12 drives all '0's until the response is ready, then it returns the following message: (Start-Of-Payload marker||STATUS||<RSPPAYLOAD>). Responses are comprised of the Start-of-Payload marker, a status, and the returned data payload when applicable. The Start-Of-Payload marker may have the following form: 0xFFFF0000 represented by 16 consecutive bits of '1' followed by 16 consecutive bits of '0's or, if the appliance 18 is using the parallel command bus, the values '0xFFFF' followed by '0x0000' if the bus is 16-bits wide, or a DWORD containing the value '0xFFFF_0000' if the bus is 32-bit wide. The response comprises one of three status values: SUCCESS, FAIL, LOCKED. The following codes may then be used to designate the response statuses: SUCCESS=0xFFFF0001; FAIL=0xFFFF000E; and LOCKED=0xFFFF000D.

If the status is =SUCCESS, there can be a response payload based on the initial command type. The size and content of the response payload will vary from command to command. The appliance 18 should have to keep track of how long the response from the ACC 12 and this should be based on what was the original command that was issued. If the response is anything but SUCCESS, no additional information will be returned, instead, the ACC 12 can repeat a string of '0's if the appliance 18 has attempted to read after a non-success. The appliance 18 may then choose to either retry or abort the operation. In some cases, the appliance 18 may choose to disable the ACC 12 permanently by issuing a cmd[LOCKOUT]. This command is usually issued in the event that the appliance 18 has detected repeated attack attempts, defects in the ACC, or if it wants to decommission the device. The lack of more insightful status codes than simply status messages may be used to prevent divulging information about the internal operations of the system, inadvertently yielding an advantage to an attacker. The REQRESP command in this embodiment is valid in all states.

cmd[EXITTEST]—This command may be used to indicate that all DFT are done and to transition out of the Test State 80. EXITTEST will disable DFT features, transition to the Initialized State 82, cause a soft reset, and reboot the ACC 12. The static keys are generated in the Initialization State 82, making the UID available as a result. The request payload in this example is 4 bytes, wherein Payload_len=0. An additional response payload is then generated if the command is successful, which comprises $UID_i$—the x-coordinate of the static public key of $ACC_i$. This command is valid in the Test State 80. It is recommended that the tester 16 initiates a hard reboot immediately prior to issuing the cmd[EXITTEST] to remove any residual traces from DFT testing in the ACC 12. In addition, the firmware should assume that the RAM content is corrupted and unreliable, so it should execute out of ROM 52 as much as possible.

cmd[STARTACC]—This command may be used to cause a soft reset, which effectively wakes up the ACC 12 from power-saving mode and reboots. Once the ACC 12 resumes from reset, it may begin executing the entire boot sequence. If the ACC 12 is in the Functional State 84, it automatically generates a new ephemeral key pair in order to prepare to establish a new key session with the appliance 18. There is no request payload for this command. If successful, an additional response payload comprises $Q_{si}$, the static public key (73 bytes), and $Q_{ei}$, the ephemeral public key (73 bytes). The successful response is sent only in the Functional State 84 (after the static keys have already been generated and that it was verified to have been written to NVM 60 correctly). This command is valid in all states. It may be noted that STARTACC may require time for the soft reset boot sequence, entropy collection, and generation of the ephemeral keys.

cmd[STOPACC]—This command may be used to prepare the ACC 12 to be disconnected. The firmware should then transition into the hibernation mode. The request payload in this example comprises 4 bytes wherein Payload_len=0. If the request is successful, no additional payload is provided. This command is valid in the Test State 80, the Initialization State 82, and the Functional State 84. It may be noted that no response is available for this command Issuing a REQRESP after the ACC 12 has been put in hibernate mode will yield nothing but '0's when attempting to retrieve a response. The firmware should save all necessary data in the NVM 62 before going to the hibernation mode because, in order to resume, the hardware generates a reset causing the boot sequence in the firmware and thus all data that is not in NVM 62 after this point will be lost.

cmd[LOCKOUT]—This command may be used to force a transition to the Lock-Out State 86. The request payload in this example comprises 4 bytes wherein Payload_len=0. If the request is successful, no additional payload is provided. This command is valid in the Test State 80, the Initialization State 82, and the Functional State 84. Executing this command results in a permanent lock-out of the ACC 12, where the ACC 12 then refuses to process any additional commands In this state, the ACC 12 goes to power-saving mode and only responds with the LOCKED status when it sees cmd[REQRESP].

cmd[INITFCT]—This command is typically the first feature control command in a key session and it is used to instruct the firmware to process a FCT 50 message. The command contains all necessary information to derive a shared secret for the session, to secure the tunnel between the appliance 18 and the ACC 12 via the tester 16 and agent 20. It may be noted that a key session lasts until the ACC 12 is rebooted and the INITFCT command should be issued only once between ACC 12 reboots. If another cmd[INITFCT] is encountered once a key session has been established, it should be treated as an error. To send additional feature provisioning commands after a key session has been established, the appliance 18 should use the shorter cmd[FCT] commands (see below) for subsequent feature provisioning messages. The request payload for the INITFCT command may be arranged as follows:

| 4 bytes | 73 bytes | 150 bytes | 2 bytes | EM_len | 16 bytes |
|---|---|---|---|---|---|
| Payload_len | $Q_{ej}$ | $CERT_j$ | EM_len | $EM_{nij}$ | $MAC_{nij}$ | where:

Payload_len is length of the payload. This field can be used to specify how many 32-bit words are in the rest of the payload. (If the payload ends on a fraction of a word, the payload_len may be rounded up to nearest integer).

$Q_{ej}$ is the ephemeral public key of $APP_j$ (e.g. in standard ANSI external format).

$CERT_j$ is a mini-certificate of $APP_j$, containing: $CERT_j=VER\|CID\|Q_{sj}\|SIG_{certj}$, where VER is certificate version number (1 byte), CID is the customer ID (4 bytes), $Q_{sj}$ is public static key of $APP_j$ (73 bytes), and $SIG_{certj}$ is the signature for the $CERT_j$, signed by the root CA, where $SIG_{certj}=ECDSA\_SIGN\ (CERT_j, d_s)$, and $d_s$ is the root CA's private key.

EM_len is the length of $EM_{nij}$ in bytes (e.g. having a range of [74-584]).

$EM_{nij}$ and $MAC_{nij}$ represent the encrypted feature provisioning message FCT 50 (e.g. 90-600 bytes), where $(EM_{nij}, MAC_{nij})=AES\_CCM^*\ (FCT\|SIG_{nij}, n, k_{ij})$, FCT being the feature control ticket message (2-512 bytes), $k_{ij}$ being the derived encryption key, n being a nonce built as (msgID∥4 zero bytes) (8 bytes), msgID being a message counter for the current message (4 bytes)—e.g. always even incrementing by 2 with every FCT command, and $SIG_{nij}=ECDSA\_SIGN\ (UID\|msgID\|padding\|FCT, d_{sj})$ (72 bytes). Here, UID is the ACC's UID (36 bytes), msgID is the same as above (4 bytes), padding comprises zero bytes (8 bytes), and $d_{sj}$ is the $APP_j$'s private key, corresponding to the certificate $CERT_j$.

It will be appreciated that the number of bytes indicated above are for illustrative purposes only and may change as required by the particular application.

The additional response payload, if the command is successful may be arranged as follows:

| (40-552 bytes) | 16 bytes |
|---|---|
| $ER_{nij}$ | $MAC_{nij}$ | where:

$ER_{nij}$ and $MAC_{nij}$ represent the encrypted response to the feature command $(ER_{nij}, MAC_{nij})=AES\_CCM^*\ (FCTRSP_{ni}, n, k_{ij})$, where FCTRSPni is the response to the FCT 50 command, kij is the derived encryption key, n is a nonce built as (msgID∥4 zero bytes) (8 bytes), and msgID is a message counter for the current message (4 bytes) (e.g. value of the msgID in the request payload plus '1', always odd).

This command is valid in the Functional State 84. If the firmware detects this command in the Functional State 84, it can perform the following operations for this command:

1. Reset the message counter, msgID, to '0', and use it to validate that the ACC's own message count matches what was transmitted while processing the feature provisioning message in step 5.

2. Authenticate the $CERT_j$, and extract $Q_{sj}$ from the certificate.

3. Compute a shared secret key and derive the encryption key $k_{ij}$ with ECMQVwKDF $(d_{si}, d_{ei}, Q_{ei}, Q_{sj}, Q_{ej})$.

4. Decrypt EMnij, verify SIGnij, then process the feature provisioning message, FCT 50.

5. Prepare a response, $(ER_{nij}, MAC_{nij})$ to the feature provisioning message. When preparing the response, (msgID+1) should be used for the nonce n.

If all of the above steps are successful, the firmware may then send the status code SUCCESS and $(ER_{nij}, MAC_{nij})$ back. Otherwise, the firmware sends the status code FAIL, or if the error counter has reached its maximum, the firmware transitions into the Lock-Out State 86 and sends the status code LOCKED.

cmd[FCT]—This command is used to instruct the firmware to process a feature provisioning message. It is similar to the INITFCT command except that it reuses an existing shared key instead of generating a new shared key. The request payload may be arranged as follows:

| 4 bytes | 2 bytes | EM_len | 16 bytes |
|---|---|---|---|
| Payload_len | EM_len | $EM_{nij}$ | $MAC_{nij}$ | where, as above:

Payload_len is the length of the payload, which specifies how many 32-bit words are in the rest of the payload. (If the payload ends on a fraction of a word, the payload_len is round up to nearest integer).

EM_len is the length of the $EM_{nij}$ in bytes (e.g having a range [74-584]);

$EM_{nij}$ and $MAC_{nij}$ represent the encrypted feature provisioning message (90-600 bytes). $(EM_{nij}, MAC_{nij})$= AES_CCM* (FCT||SIGnij, n, $k_{ij}$), where FCT is the feature control ticket message (2-512 bytes), n is the nonce built as (msgID||4 zero bytes) (8 bytes)—e.g. always even, incrementing by 2 with every FCT command, msgID is the message counter for the current message (4 bytes), $SIG_{nij}$=ECDSA_SIGN (UID||msgID||padding||FCT, $d_{sj}$) (72 bytes), UID is the ACC's UID (36 bytes), msgID is the same as above (4 bytes), padding comprises zero bytes (8 bytes), $d_{sj}$ is the $APP_j$'s private key corresponding to the certificate $CERT_j$, and $k_{ij}$ is the derived encryption key.

The additional response payload, if the FCT command is successful, may be arranged as follows:

| (40-552 bytes) | 16 bytes |
|---|---|
| $ER_{nij}$ | $MAC_{nij}$ | where:

$ER_{nij}$ and $MAC_{nij}$ represent the encrypted response to the feature command, where $(ER_{nij}, MAC_{nij})$=AES_CCM* $(FCTRSP_{ni}, n, k_{ij})$, $FCTRSP_{ni}$ is the response to the FCT command, $k_{ij}$ is the derived encryption key, n is the nonce built as (msgID||4 zero bytes) (8 bytes), and msgID is the message counter for the current message (4 bytes) (e.g. value of the msgID in the request payload plus '1', always odd).

The FCT command is valid in the Functional State 84. The firmware may perform the following operations for this command:

1. The message counter msgID is incremented by 2 regardless of whether the FCT 50 is valid or not, and is validated while processing the feature provisioning message in step 2.

2. Decrypt EMnij, verify SIGnij, then process the feature provisioning message FCT 50.

3. Prepare a response $(ER_{nij}, MAC_{nij})$ to the feature provisioning message. When generating the response, (msgID+1) should be used for the nonce.

If all the steps are successful, the firmware sends the status code SUCCESS and $(ER_{nij}, MAC_{nij})$ back. Otherwise, the firmware sends the status code FAIL, or if the error counter has reached its maximum, the firmware transitions into the Lock-Out State 86 and sends the status code LOCKED. It may be noted that in some embodiments, this command requires that a cmd[INITFCT]command be successfully processed previously so that a key session is available. If that is not true, the command would then result in an error.

FCT 50 messages sent to the ACC 12 as part of cmd [INITFCT] and cmd[FCT] are typically constructed by the appliance 18 ahead of time and may be non-specific to any particular ACC 12. There are several different types of FCTs 50, and examples of the formatting of the different FCT types may be defined as follows:

TABLE 5

| FCT Types and Corresponding Fields ||||
|---|---|---|---|
| FCT Type | Field Name | Size (in bytes) | Description |
| SETFEAT | | | Setting feature provisioning bits to some values |
| | TYPE | 2 | Type = 0 |
| | TAG | 8 | Record Tag (See below). |
| | FEATSET | 32 | Feature provisioning data as a byte stream of 32 bytes (The definition of what each bit does is typically application specific) |
| GETFEAT | | | Retrieve the feature provisioning values currently in use |
| | TYPE | 2 | |
| | | | Value = 1 |
| WRACCESS | | | Writing data to Protected NVM |
| | TYPE | 2 | Value = 2 |
| | TAG | 8 | Record Tag (see below). |
| | ADDR | 2 | Address offset from the beginning of NVM |
| | DATA | EM_len-12 | Data to be written to NVM as a byte stream of the EM_len-12 bytes. |
| RDACCESS | | | Reading data from Protected NVM |
| | TYPE | 2 | Value = 3 |
| | ADDR | 2 | Address offset from the beginning of NVM memory |
| | SIZE | 2 | Value = [4-512] bytes. |

TABLE 5-continued

FCT Types and Corresponding Fields

| FCT Type | Field Name | Size (in bytes) | Description |
|---|---|---|---|
| SETFEAT_TEMP | | | Temporary feature enablement |
| | TYPE | 2 | Value = 4 |
| | FEATSET | 32 | Feature data as a byte stream of 32 bytes (The definition of what each bit does is typically application specific) |

Note 1: The shortest of all FCT 50 is the GETFEAT type, which is only 2 bytes long. The longest FCTs 50 are of the WRACCESS type, which can be up to 512 bytes (see notes 2 and 3 for further details).

Note 2: RDACCESS and WRACCESS FCTs 50 in this example can only access data in 4 Byte increments. The address should be aligned on 4-Byte boundaries, and the amount of data accessible should be divisible by 4.

Note 3: The minimum amount of data accessible is, in this case 4 bytes. The maximum amount of data a WRACCESS can access is =(maximum EM_len)−len(n)−len(TYPE)−len(TAG)−len(ADDR)=512−1−1−8−2=500 bytes. The maximum amount of data a RDACCESS type FCT 50 can access is limited by the maximum length of the ER_len, which is in this embodiment defined to be 512B. The limitations placed on the maximum EM_len and ER_len is due to the fact that there should be the ability to hold the entire payload within the limited amount of RAM 60 available. If more data needs to be accessed, then one would need to break it up into multiple FCTs 50 until they fit within these limits.

Note 4: The WRACCESS and RDACCESS FCTs 50 should only be allowed to access protected areas of the NVM 62. Attempting to access anything other than protected NVM 62 would then be considered as an error. One exception to this rule can be writing/reading the record tag, TAG, stored in private NVM 62, which is allowed for these commands (although the user of WRACCESS should be aware that TAG and DATA are written at the same location in private NVM 62, causing the resulting value in NVM 62 to be an OR operation result of TAG and DATA values.

Note 5: SETFEAT FCTs 50 are used to perform permanent feature provisioning while SETFEAT_TEMP FCTs 50 are used to perform temporary feature provisioning. With permanent feature provisioning, the FEATSET bits are written into NVM 62. With temporary feature provisioning, the FEATSET value in NVM 62 is OR'ed with the FEATSET field of the FCT 50, and as a result will be used as the actual FEATSET for as long as the ACC 12 remains powered on. Once the ACC 12 loses power and/or reboots, the temporary FEATSET is lost and reverts back to what was stored in NVM 62.

FCT TAG Record—The TAG field of programming FCTs 50, (namely, SETFEAT and WRACCESS types), is used as a history record of what has happened to the ACC 12 in the past.

Each programming FCT 50 may represent a step in the manufacturing process, each step has a bit in the TAG record associated with that step. After a FCT 50 is processed, the corresponding bit is set to indicate that step has happened. When the appliance 18 constructs the FCT 50, it would then need to know what is the content of the FCT 50 and set the appropriate tag bit. The ACC 12 then keeps a TAG record in a special reserved space in the protected area of NVM 62. When a FCT 50 is successfully processed, the ACC 12 may then bit-wise OR the FCT's tag field with the previous TAG record and store the new value back into NVM 62. By just looking at individual bits of the TAG record, the programming steps which were taken can be determined (if the bit='1') and which were not (if the bit='0'). A brand new, un-initialized ACC 12 in this case would have a TAG record of all '0's. The tag record on the ACC 12 is updated as a result of successfully processing a programming FCT 50, or alternatively, an arbitrary value can be written directly to the tag record if you know the address of the tag record with a WRACCESS FCT 50. The TAG record should not be updated if the ACC 12 encounters an error while processing the FCT 50. The tag record can be read out using cmd [SHAREDNVMRD], and the read data will be unencrypted.

It may be noted that care should be taken when issuing an WRACCESS FCT 50 that is to write to the tag record, the tag record will be written twice, once when executing the FCT 50, the second time updating the TAG record. If this were to happen, the DATA field should be the same as the TAG field or one of them consists of all '0's to prevent accidentally corrupting the TAG record.

FCT Responses—FCT responses are sent after processing either cmd[INITFCT] or cmd[FCT]. The complete response may be arranged as follows:

| 4 bytes | Flexible Size |
|---|---|
| STATUS | ER | where:
ER=AES CCM* ((STATUS∥UID∥<data>), n, k), where STATUS is one of the status codes listed above, $UID_i$ is the unique ID of the $ACC_i$, the x-coordinates of $Q_{si}$, and <data> is data requested by the FCT 50 command, where:
  if FCT type=SETFEAT: none
  if FCT type=GETFEAT: the current settings for all the features on the device (32 bytes)
  if FCT type=WRACCESS: none
  if FCT type=RDACCESS: up to 512B of the requested read data.

n is the nonce built as (msgID∥4 zero bytes) (8 bytes), and msgID, as above, is the message counter for the current message, and should always be odd (4 bytes).

It may be noted that STATUS is sent out both in the clear, and also part of the encrypted response. Even though the unencrypted status should match the encrypted status, unless the status is authenticated by decrypting and verifying the ER, there is no guarantee that the unencrypted status is correct because the message could have been altered enroute. Some applications may want to simply look at the unencrypted status to get a quick check on whether the FCT 50 was successful, but they should only do it if they are willing to trust the communication channel. The length of the successful response, len (status∥ER), should be known to the agent when it issued the FCT 50 command, so the agent should always assume that the ACC 12 returns that amount of data in the response, and reads that amount of data back.

Cmd[TESTMEM], cmd[TESTROM], cmd[TESTNVM], [TESTRNG]: These commands can be used by the chip manufacturers to run functional DFT tests on the silicon die to determine whether the chip is faulty. The request payload, identified by Payload_len, may be 4 bytes and is equal to zero.

if TESTMEM, TESTROM, TESTNVM, the additional response payload, if the command is successful is: none.

if TESTRNG, the additional response payload, if the command is successful is a 32-bit string of random data, as collected by the on-board random number generator. These commands are valid in the Test State 82, and the Functional State 84 if that particular DFT feature has been reenabled using a FCT 50. The enable check is done by firmware.

The ACC 12 may execute one of the following based on the command type:

1. A memory test program marches a specific data pattern across the entire RAM 60 to see if any of the memory bits are faulty.
2. A NVM 62 test program, which is similar to the MemTest, but for the NVM 62.
3. The ROM 60 code health check involves running a CRC-32 on the entire ROM 60 content and comparing that against a hardwired check sum. This is a simple check to make sure the ROM 60 is accessible and fault-free; it is not meant to secure the ROM 60 code from being tampered with.
4. A RNG 58 test to check the amount of entropy received out of the RNG ring oscillators. This involves collecting a bit stream from the RNG 58 over a fixed period of time, then returning the random data to be post-processed off-chip.

It may be noted that each of these BIST programs has a DFT command associated with it. The command triggers the execution of these test programs and the pass/fail test result will be the response status. If any of the BIST program fails, the ACC 12 enters the Lock-Out State 86 automatically on the first failure. They will not be given the ability to accept multiple additional tries like other invalid command error conditions. It can be appreciated that in other embodiments, the application may dictate other DFT strategies, in which case only a subset of these commands may be implemented.

cmd[SHARENVMWR]—This is typically an optional command that allows the appliance 18 or other agents 20 to write to the "shared" region of the NVM 62. These commands are insecure, but they allow open access to the NVM 62 that is within the ACC's control. Typical reasons why these commands should be included: a) if the design of the SoC only has one NVM 62 that is shared between different multiple functional blocks, the ACC 12 would be the gate keeper to that NVM 62 block and help enforce access restrictions; b) if a system was to use the NVM 62 as a mailbox to and from the ACC 12; and c) if the tester needs to inject information to the ACC 12 before a secure session can be established. The request payload may be arranged as follows:

| 4 bytes | 2 bytes | 2 bytes | SIZE |
|---|---|---|---|
| Payload_len | ADDR | SIZE | WRDATA | where:

Payload_len is, as above, the length of the payload;

ADDR is the the starting address offset from the NVM base address that the command is trying to access, which should be aligned on 4-byte boundaries;

SIZE is the number of bytes being accessed, in increments of 4 bytes; and

WRDATA is the data stream to be written and being SIZE number of bytes long, only applicable for cmd [SHARENVMWR].

For this command, if successful, there would be no additional response payload. This command is valid in the Test State 82 and the Functional state 84. The maximum amount of data that is accessible is limited by the maximum amount of contiguous shared NVM spaces available, up to 64 KB. The firmware should check the address and size of the request against a pre-programmed NVM permission table, and make sure the entire access is permitted. If any part of the access is outside of Shared NVM space, then it is considered as an error and the command fails. The exception to this would be when reading the TAG record, which is located in a special reserved Protected area of the NVM 62.

cmd[SHARENVMRD]—This may also be used as an optional command that allows the appliance 18 or other agents 20 to access the "shared" region of the NVM 62. These commands are insecure, but they allow open access to the NVM 62 that is within the ACC's control. Typical reasons why these commands should be included are: a) if the design of the SoC only has one NVM 62 that is shared between different multiple functional blocks, the ACC 12 would be the gate keeper to that NVM block and help enforce access restrictions; b) if a system was to use the NVM 62 as a mailbox to and from the ACC 12; and c) As pointed out above, the cmd[SHARENVMRD] can be used to read back the FCT TAG record that is located in a specially reserved area of the NVM 62. The TAG record is readable in the clear with the cmd[SHARENVMRD] but should not be writable with cmd[SHARENVMWR]. The request payload may be arranged as follows:

| 4 bytes | 2 bytes | 2 bytes |
|---|---|---|
| Payload_len | ADDR | SIZE | where:

As above, Payload_len is the length of the payload;

ADDR is the starting address offset from the NVM 62 base address that the command is trying to access, and should be aligned on 4-byte boundaries; and SIZE is the number of bytes to be accessed, in increments of 4 bytes.

If the command is successful, the additional response payload comprises RDDATA which is of flexible size. RDDATA is a data stream of SIZE number of bytes long, only applicable for cmd[SHARENVMRD]. It should be presumed that the agent 20 talking to the ACC 12 can calculate the length of RDDATA beforehand. Also, the appliance 18 that created the command should let the agent 20 know how much data to retrieve when it sends down the SHAREDNVMRD command. This command is valid in the Test State 80, and the Functional State 84. The maximum amount of data that is accessible should be limited by the maximum amount of continuous shared NVM spaces available, up to 64 KB. The firmware checks the address and size of the request against a pre-programmed NVM permission table, and makes sure the entire access is permitted. If any part of the access is outside of Shared NVM space, then it is considered as an error and the command fails.

cmd[SCAN]—This command indicates that the tester wants to start scan testing the ACC 12. The request payload is 4 bytes and the Payload_len=0. If the command is successful, no additional response payload is provided. This command is valid in the Test State 80 and the Functional State 84, if this particular DFT feature has been reenabled using a FCT 50. The enable check is done by firmware. The ACC 12 should set the ScanMode bit high.

cmd[REQVERID]—This command may be used to request the ACC's version ID, which is used to identify the hardware and software revision of the ACC 12. This command can be useful in cases where there needs to be a way to distinguish protocols and feature differences between different versions of the ACC 12. Typically, this command is the first command sent to confirm that all parties are in agreement as to the exact protocol to use in further communications. There is no request payload for this command. The response may be arranged as follows:

| DR[31:16] | DR[15:8] | DR[7:0] |
|---|---|---|
| 0x0000 (reserved) | FW VERID$_i$ | HW VERID$_i$ |

Both firmware and hardware version IDs are both 8 bits. The actual values of these fields are determined based on which revision of the ACC 12 design is in use. REQVERID should always return with a response immediately. The response will not have a Start-of-Payload marker, nor will it have a status field. HW Version ID should be hard-wired and, as such, always available. FW Version ID is initially all '0's, until the firmware loads the correct value from ROM 60 and writes that value to the FWVERID register at boot time. If the FW Version ID is "0", then it indicates that the ACC 12 has not started to run yet and should try again later. If the response is anything other than known VERIDs, it should be considered as a fatal error. This command is valid in all states shown in FIG. 54.

cmd[IDCODE]—This command returns the IDCODE of the ACC's tap controller, per IEEE 1149 spec. (further detail of this command can be found in this spec). There is no request payload for this command. The response may be arranged as follows:

| DR[31:0] |
|---|
| IDCODE (reserved) |

The IDCODE should be a hard-wired constant and thus should always return a response immediately. The response will not have a Start-of-Payload marker, nor will it have a status field. The actual value of the IDCODE is typically application specific. This command is valid in all states.

cmd[BYPASS]—This command puts the ACC tap controller in bypass mode, per IEEE 1149 spec. Every bit that gets shifted in is delayed by 1 TCK clock cycle and shifted out. This command is valid in all states.

Communication Protocols

A high level description of the communication protocols is now provided. As has been discussed, the appliance 18 communicates securely with the ACC 12 using messages known as Feature Control Tickets or FCTs 50. In the system 10, there are two interfaces with which the appliance 18 can communicate with the ACC 12.

One interface is the JTAG test interface 72 as defined in the IEEE 1149.1 standard for test access port and boundary scan architecture. The interface standard includes the definitions of a set of control and data signals, a test access port controller, and a mechanism and instruction set to support testing of the circuit. Although the JTAG interface 72 is typically used to test integrated circuits for manufacturing defects, the standard includes provisions for individuals to extend the command set to implement user defined functions.

In addition to the JTAG interface 72, this embodiment provides a secondary command interface 66 for connecting a parallel bus to enable the additional flexibility of allowing after-market reprogramming, or if there is no access to the JTAG interface 72. The secondary command interface 66 can be configured to look like a simple, generic memory-mapped bus. The data width on the secondary interface 66 could be configured to be 8, 16, or 32 bits, depending on the application's requirements.

It may be noted that although the JTAG interface 72 and Parallel Command Interface 66 are physically different, one being a serial interface, the other being a parallel bus, they share a common set of commands and responses. The two interfaces 72, 66 are multiplexed together in hardware (via command interface MUX 76) to present a uniform interface to the firmware. As such, the differences in the physical implementations can be hidden from firmware.

When trying to follow the communication protocol described herein, the following may be noted:

a) The appliance 18/agent 20 should always be the one to initiate communication with the ACC 12, through a tester 16 or a customer-dependent device programmer 26.

b) The ACC 12 can be considered a slave in the command protocol, such that it can only respond to commands, it cannot initiate them. For example, in this configuration, the ACC 12 does not even send response data without being prompted to do so.

c) The microcontroller 54 in the ACC 12 is single threaded, with no interrupts. Therefore, it can only work on one task at a time and will have to complete that task before it does anything else. If another command arrives before that task is done, the new command will need to be ignored.

d) A wafer tester typically does not want to waste time waiting for the ACC 12 to finish its time consuming calculations. Instead, it will want to move on to do other things and come back when ACC 12 is close to completing a command.

e) The JTAG interface 72 specification requires every JTAG implementation have an Instruction Register (IR) and a Data Register (DR). Both registers are readable and writable by the tester 16. In this example, there are two versions of IR/DR register pairs. One is located in Tap and JTAG interface 72, the other in the parallel interface 66. The Cmd Interface Mux 76 arbitrates between the two versions and routes the IR/DR data accordingly to the peripheral controller 59. The tester 16 would write to the IR to tell which command to execute. It can send request data by writing to the DR, and it can capture the response data by reading from the DR. Similarly, the parallel command interface 66 reuses this paradigm as much as possible so it will also have an IR and a DR, but they can be implemented as a memory mapped register on the bus.

Depending on the command programmed, reading the DR after writing might not get back the same content that was written. The tester 16 may read and write the IR and DR at any time, but this may result in corrupt data or be out of sync if done at inappropriate times. The transaction protocol described below specifies when reads and writes can occur and what the expected results should be.

Figure 61:
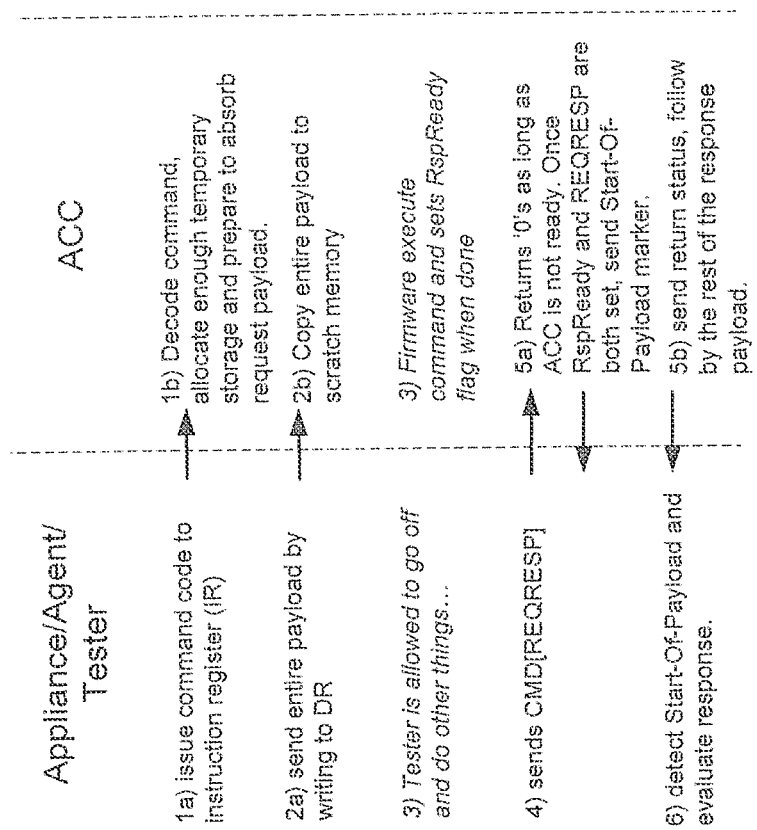
FIG. 61 is a flow diagram illustrating a single command sequence between the appliance and the ACC.

Turning now to FIG. 61, an example single command sequence is shown. The tester 16 initiates one of the commands listed in Table 4 to the ACC 12 by writing the instruction code to the ACC's Instruction Register (IR) at 1a). As soon as the IR is updated signifying a new command is issued, the ACC 12 decodes the command and prepare to absorb the correct amount of data associated with that command at 1b). The tester 16 then sends the data payload associated with the new command by writing data to the ACC's data register (DR) at 2a). If the request payload is not sent in full, the ACC 12 will hang, waiting for the remaining data indefinitely. The ACC 12 will be responsible for sampling the data register as fast as the tester 16 sends it, and storing the entire payload into scratch data RAM 60 at 2b) before executing the command itself. The ACC 12 then issues reads to the DR, and inserts wait states to stretch out a read cycle until a ready signal indicates that new data has arrived.

The actual throughput limit is based on JTAG and ACC system clock frequencies and the ability of ACC's microcontroller to move data from the DR to its RAM 60. When using the custom parallel interface 66, there is the potential for data to be sent faster than the ACC 12 can copy, in which case, flow control to limit how fast the bus should be written. In any case, the ACC 12 should be configured such that incoming data is not dropped.

After the entire payload has been sent and absorbed, the ACC 122 starts to process the command. The agent 20 waits until the command has completed before issuing another command at 3), and this could take a relatively long time. Each command can take up to a fixed maximum number of cycles to execute that type of command. If the appliance 18 waits this maximum number of cycles, it can ensure that the ACC 12 will finish processing the command. While the ACC 12 is processing at 3), the appliance 18/agent 20/tester 16 may use the waiting period to opportunistically perform other tasks, e.g., testing other parts of the SoC, if possible. If the tester 16 does not wait and issues a new command before the previous command is finished, it is considered a protocol violation and the new command will be ignored. (The exception to this is the cmd[REQRESP] and some special commands handled by the hardware exclusively).

When the appliance 18 is ready to come back and ask for the response, it issues the command to Request-for-Response, cmd[REQRESP] at 4). When hardware logic detects this, it sets the SendRespNow flag. If the tester 16 reads from the DR without first sending the cmd[REQRESP], it will get '0's. Once the ACC 12 has finished processing the command and the result is ready, firmware can check the SendRespNow flag to see if the cmd[REQRESP] has been issued. If the cmd[REQRESP] is issued before the ACC 12 finishes executing the command, the ACC 12 sends '0's until it finishes and have the full result ready at 5a). If the cmd [REQRESP] was issued and the ACC 12 has finished executing the command and has the response ready, the ACC 12 can begin to send the response which comprises a Start-of-Payload marker, followed by a response status, and then the response payload if there's any at 5b).

If there are response payload data to be sent, the ACC 12 copies data from the response buffer (in scratch RAM 60) to the DR as fast as the appliance 18 reads from the DR. This continues until the entire response payload is sent. Again, the actual throughput limit is based on clock frequency and the ability of ACC's microcontroller 54 to move data from the RAM 60 to the DR. When using the custom parallel interface 66, there is the potential for data to be read faster than the ACC 12 can copy. In that case, restrictions can be placed on how fast the bus should read data.

The tester 16 should read the DR until it sees the Start-of-Payload marker at 6), then continue to read the entire response. Once the Start-of-Payload is sent and read by the tester, it should not issue another command before the entire response payload is read or else the system 10 may behave unpredictably, including hanging indefinitely.

If the agent 20 continues to read after the entire payload has been sent, the ACC 12 will resume sending all '0's. Should additional programming be required, the appliance 18 can repeat these steps. If no additional programming is required, the appliance can finish by transitioning the ACC 12 to hibernate mode with a cmd[STOPACC].

Some additional comments regarding the REQRESP may be noted. First, the reason for the explicit request for response is to keep the appliance 18 and the ACC 12 synchronized, but it may also allow the tester 16 to perform other tasks in parallel instead of waiting for the ACC 12 to respond. If a command requires some sort of response from the ACC 12, the appliance 18 would issue a cmd [REQRESP] before it issues the next command or else the response will not be sent and will be discarded. If the appliance 18 issues two cmd[REQRESP] back to back, without a valid command in between, then this sequence can be considered a protocol violation. The actual behaviour of the ACC 12 would then make it appear like the second REQRESP is discarded. It is recommended that every command be followed by a cmd[REQRESP] just to close the transaction loop, but the protocol allows omitting the cmd [REQRESP] if the appliance 18 is not concerned with the status or return data. The ACC 12 should always prepare the full response assuming it will be requested at some point, only it without transmitting it without a cmd[REQRESP].

Once a cmd[REQRESP] is issued, and the Start-of-Payload is sent, the appliance 18 needs to make sure to read the entire response. It may not issue another command before all the response is read or else the system 10 may hang indefinitely. If for some reason the appliance 18 does not get a Start-of-Payload after the expected wait time has expired, it may be an indication that something is wrong and that the ACC 12 is stuck in some unknown state for unknown reasons. When that happens, the safest thing to try when attempting to recover from such error is by issuing a STARTACC command to reset the ACC 12. Although, resetting may not be a guaranteed way to recover from all possible (foreseeable or unforeseeable) failures.

Figure 62:
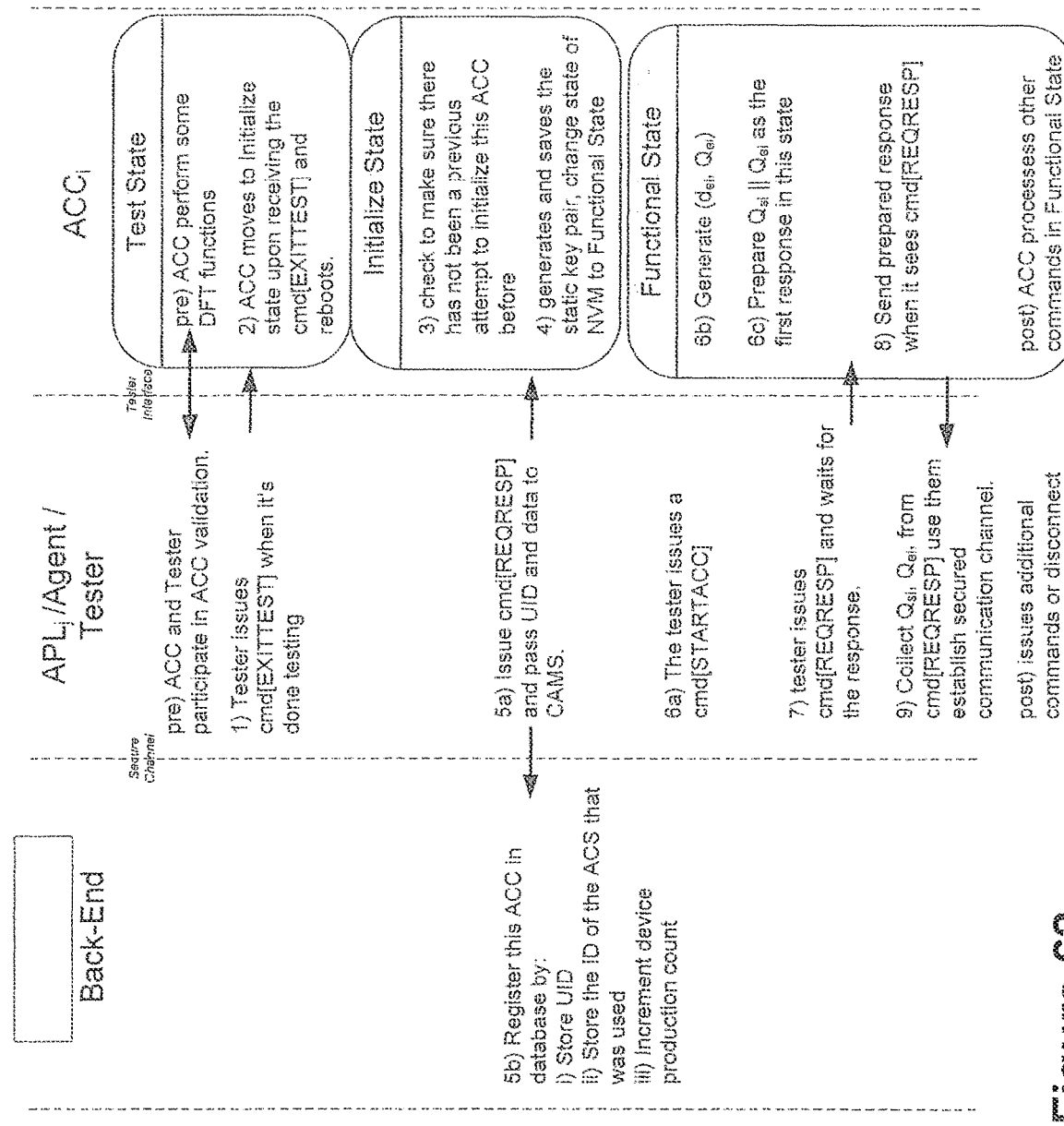
FIG. 62 is a flow diagram illustrating an initialization protocol between the backend, appliance, and ACC.

FIG. 62 illustrates an initialization and identification sequence. The initialization sequence describes how a newly fabricated ACC 12 is brought up from the Test State 80, through the Initialization State 82, to the Functional State 84. The initialization sequence should be executed between an appliance (APP$_j$) 18 and its agent 20 on a tester 16 and an ACC 12 as shown in FIG. 51, some time during the manufacturing process. At the conclusion of the initialization sequence, the ACC 12 will have generated a statistically unique ID which is used to identify a particular SoC die and will be ready to process FCTs 50.

On the "server" side, the appliance 18 should record the initialization event and relay the information obtained as a result of the initialization sequence back to the database in the backend infrastructure 11. The information such as the part number, lot number, wafer ID, time, agent's ID, location, operator ID, and such are valuable information that would allow the vendor to track the history of each individual SoC die using the ACC's UID as a reference.

A set of preconditions should first be considered. A newly fabricated $ACC_i$ is powered up and connected to $APP_j$ agent 20 through a tester 16 or device programmer 26. $ACC_i$ would still be in the Test State 80. If the ACC 12 is not in the Test State 80, it means that it has previously been initialized. If the ACC 12 is in the Initialization State 82, the procedure shown in FIG. 62 would jump to 3). If the ACC 12 is in the Functional State 84, the procedure shown in FIG. 62 would jump to 6). If the ACC 12 is in the Locked State 86, the ACC 12 would remain in the Locked State 86, go to power-saving mode, and return LOCKED status when a response is requested.

A set of feature provisioning bits may be used to control whether certain DFT or debug features are enabled or disabled and such bits would be application specific.

As another precondition, $APP_j$ should obtain the $ACC_i$'s version ID ($VERID_i$), which is composed of a hardware version number and a firmware version number, in order to find out which version of the communication protocol to use. If this has not been done yet, a cmd[VERID] may be sent the the $ACC_i$ to obtain the VERID. This allows the $APP_j$ to account for slight protocol variations between different generations or stepping of $ACC_i$.

$APP_j$ may also have assurances that the $ACC_i$ is healthy and functional by making sure it has passed all DFT tests available.

Finally, a precondition may be that $ACC_i$ does not have any residual artifacts which might impact operations from defect testing such as scan and memory BIST. DFT features would need to be carefully designed to make this possible.

The procedure shown in FIG. 62 will now be described. First, $ACC_i$ powers up and detects that it is booting from a hard reset, and that it is still in the Test State 80. As long as the ACC 12 is still in the Test State 80, firmware ensures that all DFT features are enabled. $ACC_i$ should be able to perform any DFT tests at pre) and to undergo multiple hard reboot cycles without effecting its ability to protect secure data later in its life cycle.

At some point, $APP_j$ issues a cmd[EXITTEST] at 1) to signal that a basic set of tests has finished successfully and now $ACC_i$ should start to disable some DFT features. When $ACC_i$ sees [EXITTEST], it a) writes 0's to the FEAT register to disable DFT features, b) changes the Life Cycle State in NVM 62 to the Initialization State 82, and issues a soft reset at 2).

Upon rebooting, $ACC_i$ should find that a) it's booting due to a soft reset, by looking at a HW flag, b) it's in the Initializaton State 82 by reading the state stored in NVM 62, and c) that this is the first time both a) and b) are both true at 3). Then, the ACC 12 writes an Exit Test marker to NVM 62 to indicate that this ACC 12 has exited the Test State 80, and proceeds to perform its usual Initialization State 82 tasks (see 4) below). If the next time $ACC_i$ reboots and a) and b) are true, but the Exit Test is already set, then it means that the initialization failed and the device is now unreliable. In which case, ACC, will transition to the Locked State 86 immediately.

While in the Initialization State 82, $ACC_i$ attempts to generate the static ECC keys ($d_{si}$, $Q_{si}$) at 4) according to an EC key generation function to be discussed later. If key generation fails, the ACC 12 would transition to the Locked Out State 86 directly. If key generation is successful, the ACC 12 prepares a success response payload having (SUCCESS∥UID). $ACC_i$ then updates the Life Cycle state in NVM 62 such that the next reboot will cause the ACC 12 to start up in the Functional State 84. The ACC 12 would then wait to process additional commands and should not go into hibernation.

If the $APP_j$ optionally issues a cmd[REQRESP] at this point, the response would be either (LOCKED) or (SUCCESS∥UID). $APP_j$ will typically collect the UIDs of all the chips it has initialized, making sure they are valid public keys and forward them to the backend database at 5a) along with other information deemed to be useful to facilitate tracking and cataloguing the dies. At 5b), the backend 11 may store the UID, store the ID of the appliance 18 that was used, and increment a device production count.

A cmd[STARTACC] is the next command issued in the typical initialization sequence at 6). Alternatively, the ACC 12 may be power cycled multiple times at this point, and the behaviour can expect to be the same. $ACC_i$ may come out of reset, run its boot sequence, and come up in the Functional State 84. In the Functional State 84, $ACC_i$ should always automatically start to generate the ephemeral key, ($d_{ei}$, $Q_{ei}$) according to the EC key generation function to be described below. If key generation is successful, the response will be (SUCCESS∥$Q_{si}$∥$Q_{ei}$), otherwise the response will just be (FAILURE) or (LOCKED).

In the meantime, the tester 16 has the option to go on to perform other tasks while waiting for the ephemeral key to be generated. When the tester 16 is ready to retrieve the ephemeral keys, it will issue a cmd[REQRESP] at 7) and wait for a response from $ACC_i$.

When $ACC_i$ has the response ready, and has seen the cmd[REQRESP], it will send a Start-of-Payload marker followed by the response payload back to the $APL_j$ at 8).

$APP_j$ is then expected to extract the information from the response and process it accordingly at 9). If the return status is a FAIL or if the appliance 18 cannot process the data that was received, $APP_j$ has the option to issue a cmd[LOCKOUT] to lock out $ACC_i$. The initialization process may then perform post operations. The appliance 18/agent 20/tester 16 may issue additional commands or disconnect, and the ACC 12 may process such other commands in the Functional State 84.

Some additional features regarding the initialization protocol may be noted. First, the entire initialization process can be streamlined down to be completed very quickly because tester time is very costly. As soon as the appliance 18 has ACC's UID, the appliance 18 can issue a cmd[STOPACC] to have the ACC 12 run its power down routine and go into hibernation (low-power) mode. When the ACC 12 sees the cmd[STOPACC], it should explicitly overwrite all sensitive data from its scratch memory to prevent exposing secret data if at all possible. However, it can be appreciated that if the device was hot-unplugged, the ACC 12 would not be able to neatly wipe out secrets in SRAM and shut down properly.

Once the initialization sequence is completed, the ACC 12 can reconnect to the appliance 18 through a different agent 20 at a later time, perhaps further down the product manufacturing line, such as packaging, during board assembly, or even after the device is fully assembled and being activated at the end retail location by an end customer. The UID is defined to be the x-coordinate of $Q_{si}$ which in this example is a 283-bit number. It is noted that the UID of chips should be registered as soon as convenient in order to detect chips with duplicated UIDs being out in the field.

Figure 63:
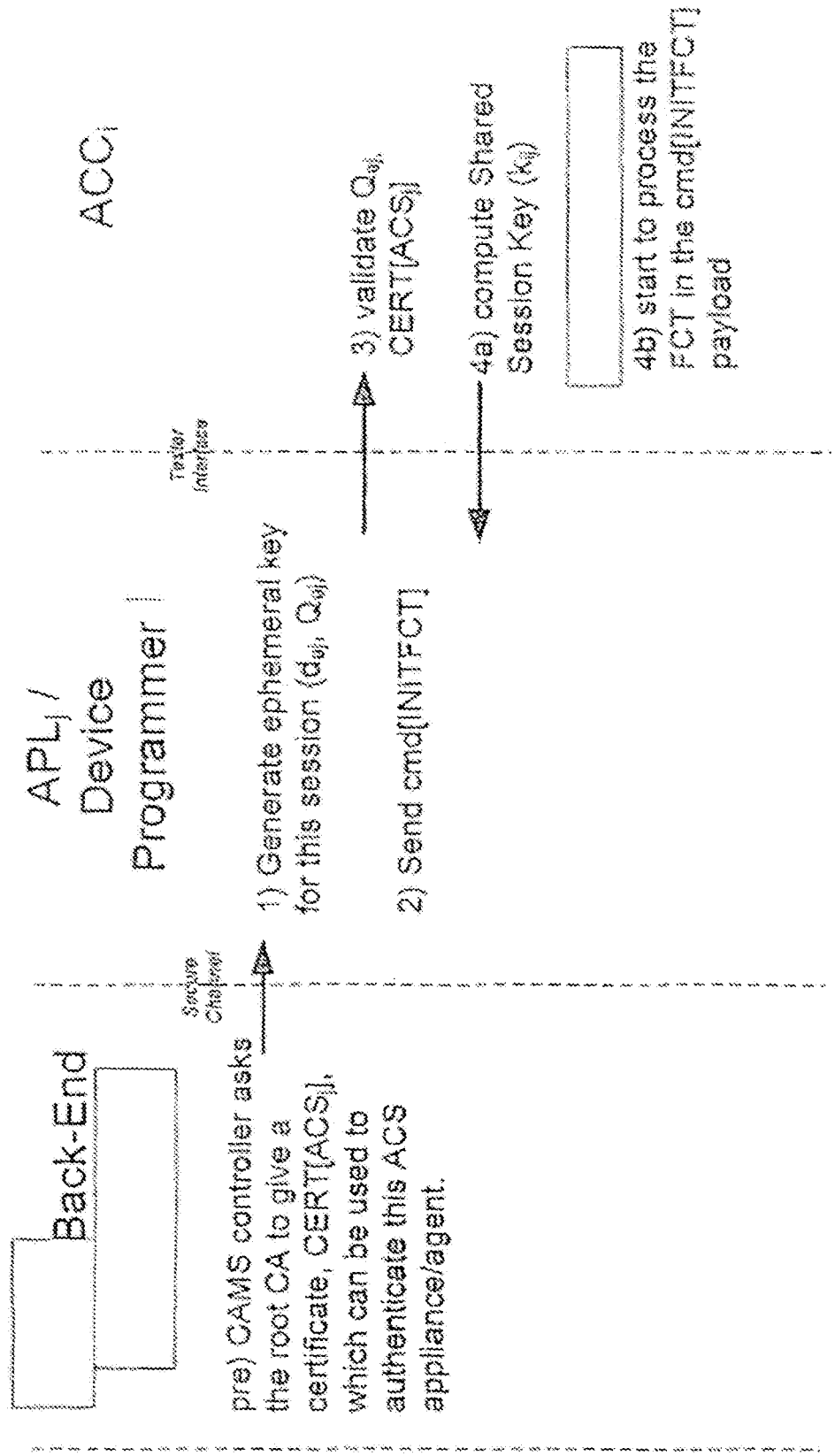
FIG. 63 is a flow diagram illustrating a key agreement protocol between the backend, appliance, and ACC.

Turning now to FIG. 63, a protocol for establishing a secure communication session using key agreement is illustrated. Up to this point in the present example, all the testing and initialization commands between an appliance 18 and an ACC 12 that have been described thus far are sent "in the clear". In order to start secure communications, the two parties will need to participate in a key agreement protocol, and the cmd[INITFCT] can be used to do that.

The cmd[INITFCT] is broken up into two parts: the first part has all the necessary information needed by the ACC 12 to derive a shared secret for a new key session and the second part contains the first FCT 50 that needs to be processed. For the protocol in FIG. 63, several preconditions may exist. First, an initialized $ACC_i$ would have already generated its static and ephemeral keys, $(d_{si}, Q_{si})$, $(d_{ei}, Q_{ei})$. Also, $APP_j$ would have received and validated $Q_{si}$, $Q_{ei}$ and it would be able to extract $UID_i$ from $Q_{si}$. If these first two preconditions are not satisfied, the initialization sequence shown in FIG. 62 may be executed. The appliance 18 has its static key pair, $(d_{sj}, Q_{sj})$, and a certificate $CERT[APP_j]$ signed by the Root CA. Also, $APP_j$ has some indication that it needs to communicate with $ACC_i$. This could be either a manufacturer wanting to preset some default features before shipping, or could be a customer requesting a new feature on his/her device to be enabled. Another precondition is that $ACC_i$ has been pre-programmed with the Root CA's public key, $Q_{ca}$, in its ROM 60. Optionally, $ACC_i$ is pre-programmed with a customer ID (CID) in its ROM 60. ACC has not received another cmd[INITFCT] after it was last rebooted. If it did, it's considered as a protocol error. Finally, a precondition is that $ACC_i$ is ready to handle a new command. This means that $ACC_i$ is in the Functional State 84, is not in hibernation mode, has completed all previous tasks, and is now waiting.

The output will be the status FAIL, or the status SUCCESS and $ACC_i$'s ephemeral public key, $Q_{ei}$. It may be noted that various side effects can occur. $ACC_i$'s message counter number, msgID, may get reset to zero, and both parties could have generated the shared session key, $k_{ij}$ independently from each other.

The procedure shown in FIG. 63 proceeds as follows. The appliance 18 generates its ephemeral keys for this session $(d_{ej}, Q_{ej})$ at 1). The appliance 18 then issues a cmd[INITFCT] at 2) with the request data being $(Q_{ej}||CERT_j||EM\_len||EM_{nij})$. The ACC 12 receives the command and validates the certificate, and the public key, ECDSA_VERIFY $(CERT_j, Q_{ca})$ and public_key_validation $(Q_{ej})$, respectively at 3). The ACC 12 then extracts $Q_{sj}$ from $CERT[APP_j]$. If the protocol requires matching a customer ID (CID), a CID field in the CERT would have to match against the CID stored in ACC 12.

The ACC 12 then computes a shared session key, $k_{ij}$, with ECMQVwKDF $(d_{si}, d_{ei}, Q_{sj}, Q_{ej})$ at 4a). If 3) and 4a) are successful, the ACC 12 continues on to process decrypt and authenticate the FCT 50 in the rest of the payload at 4b). Otherwise, the ACC 12 may stop here and prepare a FAILURE response. If the response is FAIL, the appliance 18 can either restart the sequence or issue a cmd[LOCKOUT]. The appliance 18 can optionally log the error in the database.

A few additional features may be noted. First, if everything was successful, the shared session key $k_{ij}$ computed at the end of this sequence forms the basis for an encryption tunnel using symmetric key ciphers between linking an authorized appliance 18 to a specific ACC 12. Any other ACC 12 or appliance 18 would not be able to participate in any further communications between the two because $k_{ij}$ is known only to the two authorized parties. This sequence may not be repeated without a reboot, by using either a hard reset, or a cmd[STARTACC]. There should be no limit as to how many times the ACC 12 can be rebooted, but each time the ACC 12 reboots, a new ephemeral key will need to be regenerated which could take a noticeable amount of time, in the range of hundreds of milliseconds. If the ACC 12 encounters any error or failures during any step of the key exchange protocol, it should call the Error Handler subroutine, as described above.

In step 3, the ACC 12 verifies $CERT[APP_j]$ using a copy of the Root CA's public key that the ACC 12 has in its ROM 60. The certificate validation step lets the ACC 12 know that the root CA has authenticated and qualified this particular appliance 18 to issue commands to this ACC 12. This is to prevent untrusted appliances 18 from issuing sensitive commands to the ACC 12. If a particular application requires the use CIDs, the certificate will contain a CID which has to match with a CID stored in a table in the ACC's ROM 60. This is to meant prevent an appliance 18 assigned to a particular customer from being used to connect to parts manufactured for another customer. If the CID in the certificate is not found in the CID table, it will be treated as an error.

Figure 64:
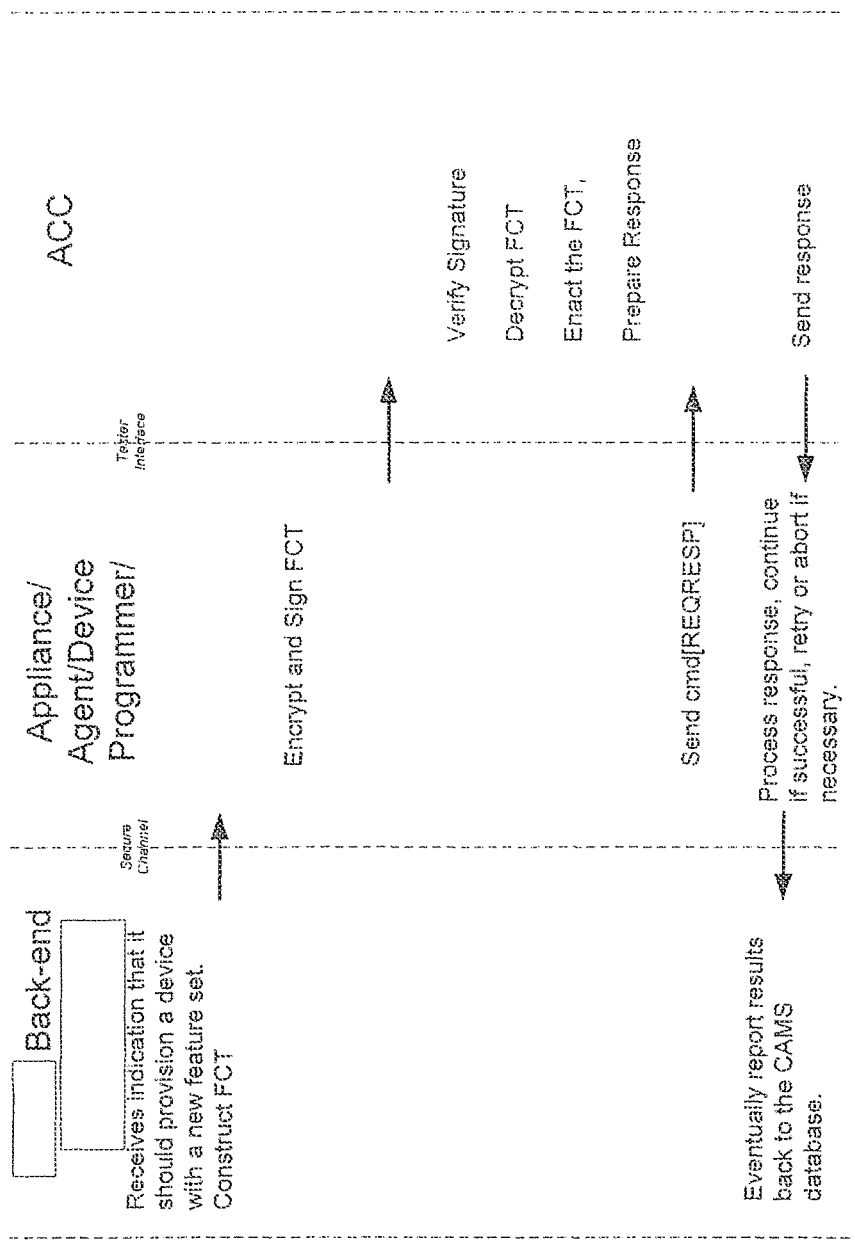
FIG. 64 is a flow diagram illustrating an authentication with confidential messaging protocol between the backend, appliance, and ACC.

FIG. 64 illustrates an example of an authenticated confidential messaging protocol, which will now be described. After the successful execution of the key agreement, the ACC 12 and the appliance 18 will have established the basis of a secure channel between the two, and they are now able to share authenticated confidential messages in the form of FCTs 50. The following preconditions may be required. First, $APP_j$ should have its own static private key, $d_{sj}$; and obtained some indication that $ACC_i$, which owns $UID_i$, will receive a feature control ticket, FCT 50. Second, $ACC_i$ should have $APP_j$'s static public keys, $Q_{sj}$, and $ACC_i$ should be ready to handle a new command. This means that $ACC_i$ is in the Functional State 84, is not in hibernation mode, and has completed its previous task.

The $APP_j$ and $ACC_i$ have their own copies of the following variables and the two copies should match: a shared session key, $k_{ij}$, that had been generated as a result of the key agreement protocol; and msgID, the command serial ID that starts from '0' on cmd[INITFCT] and increments by 2 for each cmd[FCT] (always even), and for responses it equals to msgID from the corresponding command plus '1' (always odd).

The input is a FCT 50 and the output is the status FAIL or the status SUCCESS and whatever data that was requested by the FCT 50. One side effect is that depending on the type of FCT 50, either features on the SoC gets enabled/disabled, or some data was accessed out of the NVM 62. Another side effect may be that both $APP_j$ and $ACC_i$ increment their copy of the command serial ID count, msgID.

The procedure illustrated in FIG. 64 may be summarized as follows.

1. $APP_j$ constructs the INITFCT or FCT payload.
2. $APP_j$ issues the cmd[INITFCT], or cmd[FCT] and sends the requested data payload.
3. $ACC_i$ verifies the authenticity of the message using ECDSA signature verification.
4. $ACC_i$ decrypts the message to obtain the FCT 50.
5. If everything verifies correctly, $ACC_i$ performs the operations requested by the FCT 50, and prepares the FCT 50 response message.
6. $APP_j$ at some point issues a cmd[REQRESP].
7. $ACC_i$ sends the prepared response when it has completed step 5 and after receiving the cmd[REQRESP].
8. $APP_j$ receives the response, then decrypts and verifies the response. If the appliance 18 requires sending more commands or tries resending the same command, it may do so without rerunning the key agreement protocol (i.e.

another cmd[INITIALFCT] should not be sent) as long as the command serial number gets incremented.

APP$_j$ then finishes by reporting a log record back to the backend 11 with the result of this transaction.

Various error conditions may be noted. First, if ACC$_i$ encounters any error or failures during any step of the key exchange protocol, it should call the Error Handler subroutine (see FIG. 59). For step 8, if APP$_j$ receives a FAIL response, APP$_j$ can either retry the sequence or issue a cmd[LOCKOUT]. The appliance 18 can optionally log the error in the database.

Some additional features regarding this protocol may also be noted. First, the command serial ID, msgID, starts with '0' and increments by 2 with every cmd[FCT] in this session. It gets reset back to '0' at the beginning of a new session as a result of a key agreement protocol. However, for the responses to cmd[FCT], msgID is equal to the msgID in the corresponding command plus '1'. The use of this ID prevents the same command and response to be reused in replay-type of attacks. For example, imagine an adversary pays to enable some features, then capture the FCT 50 messages, and immediately asks to disable the features to get a refund, only to turn around right away and replay the enabling FCT 50. Alternatively, an adversary initially forces the appliance 18 to issue an invalid command to generate a FAIL response, then ask to be issued an enablement FCT 50. When the ACC 12 is asked whether the command was processed properly, the adversary could substitute a success response with the recorded FAIL response thereby successfully pretending to have the enablement not go through.

The UID, ties the command and response to one ACC 12, to prevent an adversary from being able to replay this message on another ACC 12. The key pair, d$_{sj}$ and Q$_{sj}$, uniquely identifies the specific appliance 18 who participated in the shared key agreement session that created the session key k$_{ij}$. When they are used in the signing process, it can be used to positively identify the originator of the message. Furthermore, through the use of a CERT[APP$_j$] that is certified by the Root CA during the key agreement protocol, the ACC 12 has the assurance that this appliance 18 is permitted to be issuing FCTs 50.

It may be noted that there are two possible application scenarios: i) FCT 50 messages are created by the backend 11 on a per use, per ACC 12 basis if the device has already reached the retail space, and ii) FCTs 50 could be something the backend 11 batch-configures an appliance 18 which then automatically apply to an entire batch of ACC-embedded dies that it encounters. Depending on how the FCT 50 is used, there may be some server side optimization that can take place when performing step 1).

Discussion of Underlying Cryptographic Algorithms

A discussion of the underlying cryptographic algorithms used herein will now be provided. As noted above, EC arithmetic is advantageously utilized. It is widely held that ECC offers the most security-per-bit of any public key cryptographic scheme. In addition, it can be implemented in hardware quite efficiently, leading to a very small core in terms of silicon area. The ECC parameters utilized by the system 10 are in this example, set according to the sect283k1 F$_2^{283}$ Koblitz curve recommend by the Standards for Efficient Cryptography Group (SEGC). This curve is selected to facilitate an overall strength that is equivalent to 128-bit strength. If this level of security is not needed in a particular application, the field parameters may be reduced to use smaller numbers.

The block cipher function chosen to be used in the ACC 12 is, in this example, an AES symmetric key block cipher. Further detail can be found by referring to [FIPS 197] for the AES specification, as well as the [SP800-38A] and [SP800-38C] for the definition of the CTR and CCM block cipher modes. The parameters for AES where ever it is used in the ACC 12 will, in this embodiment, be a 128-bit key, blocks of 128 bits of data as input, and blocks of 128-bit bit stream as the output. If the input data stream does not fit into a 128-bit block, 128 bits can be broken off at a time.

In the context of the ACC 12, the block cipher may be used in several different ways: a) condition the random bits obtained from the RNG ring oscillators to produce the random strings used as private keys; b) use as a hash function in the Key Derivation Function (KDF) when generating the shared key in ECMQV; c) use as a hash function when verifying the authenticity of a FCT 50 signature; d) decrypting a FCT 50 in counter mode; and e) encrypt and provide message authentication of the response to a FCT 50.

AES CCM* mode may be used to provide authentication and encryption for the responses to FCT 50 commands CCM mode, as described in [SP800-38C], is essentially two AES modes that are defined in [SP800-38A], the Counter (CTR) and the CBC-MAC mode, combined together, with some additional formatting and transformations as described in appendix A of [SP800-38C]. The ACC 12 in this embodiment implements CCM*, which is CCM mode with additional formatting and transformation to be compliant with other real-world implementations of CCM mode, such as it is described in Zigbee.

Inputs to the AES CCM*, in this embodiment, are:

a) 128-bit session key, k.

b) an 8-byte nonce, unique to each message that uses the same key. The nonce is initialized with the message counter, msgID, in the first 4 bytes concatenated with 4 zeros after that.

c) input payload data, $x=(x_0, x_1 \ldots, x_{n-1})$.

The output is cipher text, $C_0\|C_1\| \ldots \|C_{n-1}$, followed by the encrypted MAC, $C_n$. The encrypted MAC, or the tag as referred to in [SP800-38C], would be fixed to be 128-bits long. Although the CCM* specification allows for the option to turn off encryption, the ACC 12 should be configured to always encrypt. The specification also allows for an optional "associated data" input which in this embodiment is chosen not to be used. As such, the associated data string will always have a length of '0'.

Figure 65:
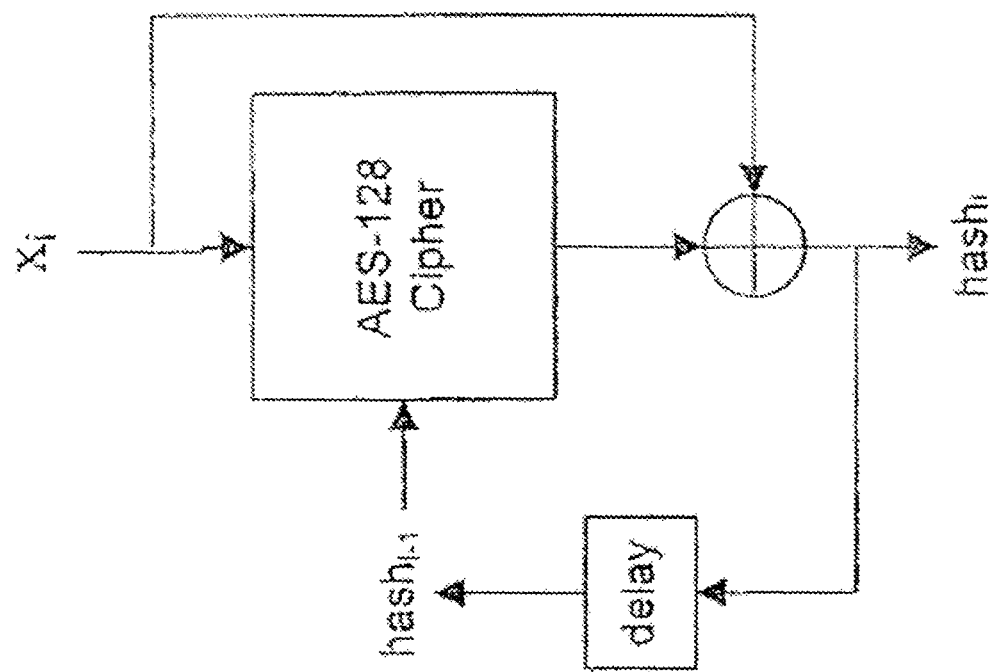
FIG. 65 is a block diagram illustrating an MMO hash function.

Turning now to FIG. 65, the Matyas-Meyer-Oseas Modification Detection Code (MMO_MDC) function is shown, which is based on AES-128 block cipher, and is the hash scheme deployed in the ACC 12 in this example. The inputs comprise an input bit stream, x; and the output is a hash digest. A constant value of the '0' is used as the initial vector (hash$_0$). For each block T of the input bit stream, the bit stream text x$_i$ gets sent in as the input to the AES along with the previous block's hash value as the cipher key. The output of the AES block is XOR'ed with the input, x, to form the hash result, hash$_i$. This is repeated until the entire message is processed. After sending the entire message through, the final hash value is output as the digest.

As discussed above, the ACC 12 in this embodiment will have an on-chip ring oscillator source of entropy, which relies on the fact that there is phase jitter between the oscillator samples. The ACC firmware collects oscillator output data values from the ring oscillator hardware, and uses an AES block cipher for conditioning. The ACC RNG hardware 58 provides at least ½ bit of entropy for each bit read from the RNG hardware 58. The ACC 12 in this example will follow NIST SP800-90 such that:

1) Update( ) function will be defined according to 10.2.1.2 (NIST SP800-90).

2) Obtain 256 bits from ACC HW RNG 58 (entropy_input, to be used in 3)), that contain at least 128 bits of entropy.

3) Follow 10.2.1.3.1 (NIST SP800-90) for CTR_DRBG instantiation ("The Process Steps for Instantiation. When Full Entropy is Available for the Entropy Input, and a Derivation Function is Not Used") where entropy_input is a random bit stream from 2), personalization_string is null, and Update( ) function, specified in 1). It may be noted that the following values inside Update( ) during this step Block_Encrypt(Key=0, IV=1), and Block_Encrypt(Key=0, IV=2), can be pre-computed for speed-ups.

4) Since the "full" entropy is not used as input in 3), finish instantiation by generating 1 byte of random data (see 5)) and discarding it.

5) Define CTR_DRBG_Generate_algorithm( ) as 10.2.1.5.1 (NIST SP800-90) ("The Process Steps for Generating Pseudorandom Bits. When a Derivation Function is Not Used for the DRBG Implementation").

The procedure may be summarized as follows. The firmware enables the RNG 58 to start capturing data. The RNG hardware 58 performs self calibration with respect to the ACC's system clock, and determines how many system clock cycles are needed between sampling the ring oscillator outputs. The hardware captures one entropy bit per sample period and notifies firmware when it has 8 entropy bits by asserting a Ready flag. The firmware polls the RNG 58 for the RNGReady flag and reads the 8 bits. The firmware repeats this until it has obtained 256 bits from ACC's RNG 58. Meanwhile, firmware continuously verifies that the RNG hardware 58 is healthy by checking the RngError flag. The TR_DRBG_Generate_algorithm( ) as 10.2.1.5.1 (NIST SP800-90) is then executed with the parameters listed above.

Elliptic Curve key generation may refer to how a key pair is created from random number stream. A prerequisite is that previously agreed upon EC curve parameters have been selected. The input is a random bit stream, and the output is SUCCESS and a key pair, (d, Q), or FAIL. 1) construct a 283-bit bit stream by perform the random number generation described above, to form the private key, d. 2) Repeat step 1) if d==0.3) Perform an EC point multiplication with the generating point of the EC parameter to create the public key, Q=d x G. 4) Repeat from step 1) if Q is not a valid point on the EC. 5) If this key pair is to be used as the static key, store $(d_{si}, Q_{si})$ in NVM 62. 6) If an error occurred during any step of the process, return FAIL; otherwise, return successful, and the key pair (d, Q).

ECMQV—The goal for key agreement is for two parties to independently derive a shared secret that can then be used as a symmetric key for bulk data encryption. It requires each party to use two pairs of keys, one static and one ephemeral, where each key pair comprising of a secret private key, and a public key. In the present embodiment, a variant to the two-pass ECMQV protocol is utilized, skipping the explicit key confirmation step. It has been recognized that the keys can be implicitly confirmed when messages cannot be decoded properly, i.e., we will know if the keys don't match when FCT 50 messages starts failing to be verified unsuccessfully.

The Key Derivation Function (KDF) is used to derive a key from a shared secret bit string. In the context of this example, the shared key may use the MMO hashing technique as the KDF. The input is a 283 bit string as the shared secret value x, and the output is a 128 bit string as the shared key, k. k=MMO_MDC(x).

The Associated Value Function (AVF) is used to truncate the x-coordinate of an elliptic curve point according to ANSI X9.63 ECMQV AVF. The high half of the x-coordinate is truncated and then the lowest bit of the highest half is forced to be '1' to avoid obtaining all 0's.

The public key validation step is to verify that the public key was generated and received properly. The key validation step checks to see if it meets some basic properties of a valid key. The inputs are EC Domain Parameters, and a candidate public key, Q. The output is either ACCEPT or REJECT. 1) Verify that Q!=0.2) Verify that $x_Q$ and $y_Q$ are elements of the underlying field F. 3) Verify that Q satisfies the EC equation defined by the EC domain parameters. 4) Verify that 4*Q !=0.5) Return ACCEPT if satisfies all of the above, else REJECT.

The ECMQV shared key generation is a way for two parties to derive a shared secret key. After each party derives the shared secret key, there is an optional additional exchange to provide key confirmation. The following describes how party (1) is to compute the shared key with party (2). The inputs are EC Domain Parameters, two validated EC private keys $(d_{s1})$ and $(d_{e1})$ owned by party (1), two validated EC public keys, $Q_{s2}$ and $Q_{e2}$ owned by party (2). The outputs are session private key, $k_{1,2}$; and a status SUCCESS|FAIL. The procedure is as follows. 1) Compute the integer $s=d_{e1}+(avf(Q_{e1}) \times d_{s1})$ (mod n). 2) Compute the EC point: $Z=h \times s \times (Q_{e2}+(avf(Q_{e2}) \times Q_{s2}))$. 3) Check if Z=O, output FAIL and stop. 4) Let $x_Z$ be the x-coordinate of Z, and compute $(k_{1,2})=kdf(x_Z)$. Key generation is sometimes followed by an explicit key confirmation to make sure both parties arrived at the same $k_{ij}$, but may be omitted due to performance concerns. One can also implicitly rely on the fact that if keys were not the same, messages could not be decrypted properly.

The Elliptic Curve Digital Signature Algorithm (ECDSA) is an efficient method to check data integrity, data authentication and provides non-repudiation. The ACC 12 may use the ECDSA algorithm, where the hash function utilized is MMO_MDC described earlier.

As discussed above, the root CA certificate can be signed using ECDSA, and the Appliance 18 can sign FCTs using ECDSA, as such an overview of ECDSA will be provided. The inputs comprise EC Domain Parameters, private key d, and message M. The output is a digital Signature (r, s). 1) Select a random number k in [1, n−1]. 2) Generate an ephemeral key pair Q=k×G. 3) Take the x-coordinate of Q, $x_1$, and convert it into an integer, $x_1'=int(x_1)$. 4) Compute $r=x_1'$ mod n. 5) Compute e=MMO_MDC (M). 6) Compute $s=(k^{-1} \times (e+d \times r))$ mod n. 7) If s==0, then go to step 1.8) Return (r, s).

For each message that the ACC 12 receives from the appliance 18, it will need to verify the signature to make sure the message comes from the appliance 18 it thinks is sending the message and that it has not been altered while in transit. This is the purpose of the signature verification step. The inputs comprise EC Domain Parameters, public key Q, message M, and signature: (r, s). The output is either ACCEPT or REJECT. The signature verification using ECDSA may proceed as follows. 1) Verify that r and s are integers in the interval [1, n−1]. Return REJECT if either criteria fails. 2) Compute e=MMO_MDC (M). 3) Compute w=s mod n. 4) Compute u1=(e×w) mod n. 5) Compute u2=(r×w) mod n. 6) Compute $(x_1, y_1)=(u_1 \times G)+(u_2 \times Q)$. 7) If (X==0), then return REJECT. 8) Take the x-coordinate, $x_1$, and convert it into an integer, $x_1'=\text{int}(x_1)$. 9) If ($r==x_1'$ mod n) return ACCEPT; else return REJECT.

Example Sequence of Operations

Turning now to FIGS. 66a through 66f, an example sequence of operations is provided, which illustrates the use of the system 10 in provisioning, delivering, and implementing a FCT 50 in an ACC 12. The example describes a way of utilizing virtual inventory by permitting controlled and secure feature activation using the ACC 12.

Figure 66A:
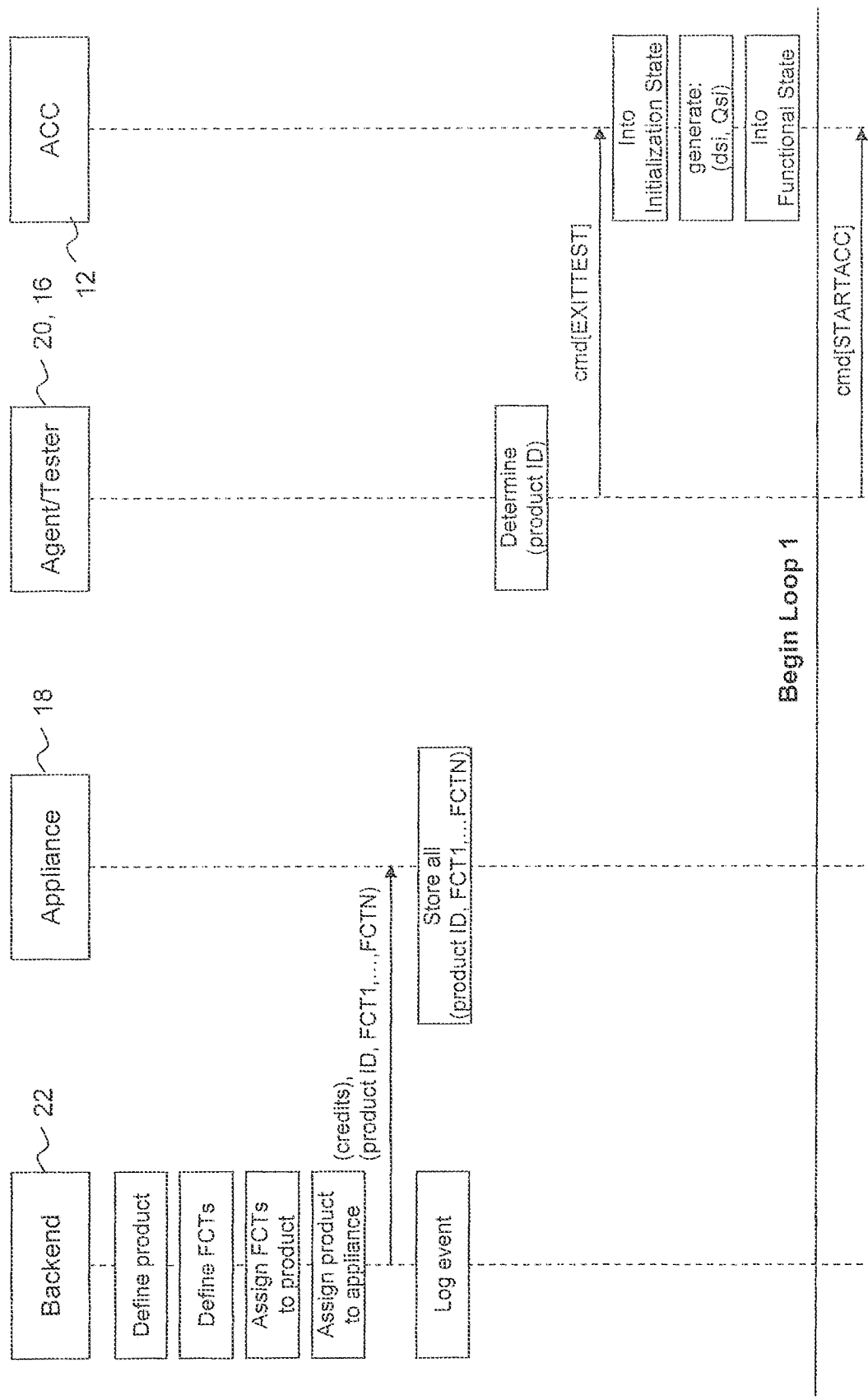
FIGS. 66a to 66f are flow diagrams illustrating a sequence of operations performed in a feature activation routine for virtual inventory.

Referring first to FIG. 66a, it can be seen that the backend infrastructure 11, which may represent the original manufacturer, would first define a product, define FCTs 50, and assign such FCTs 50 to the product (e.g. refer back to FIG. 10A and use of the controller 22). As discussed above, the system 10 may comprise multiple appliances 18 at multiple locations. The backend 11 would then assign a product to an appliance 18 and provide credits for producing an agreed upon or stipulated number of that product, as well as the product ID, and the FCTs 50 to appliance j. The backend 11 at this time may log the event to record which appliance 18 is associated with which product, how many credits were provided, and the number and nature of the FCTs 50 for that product. The appliance 18, upon receipt, would store the product ID, FCTs 50 and retain a record of the number of credits it has received.

The agent 20 then determines the product ID associated with the product being provisioned or communicated with and sends the command cmd[EXITTEST] to transition the ACC 12 into the Initialization State 82. The ACC 12, upon transitioning, generates its static private key dsi and its static public key Qsi and transitions into the Functional State 84. A first loop, Loop 1, now begins, which comprises a series of transactions between the appliance 18, agent 20 and ACC 12 that represent a complete feature provisioning operation defined by either the INITFCT or FCT commands Loop 1 in this example is an outer loop based on a single INITFCT command to initialize an encrypted tunnel 29 for processing FCTs 50. Loop 1 would be repeated for each ACC 12 (e.g. in a production line), or anytime the secure tunnel 29 needs to be established by deriving a shared secret with an ECMQV handshake between the ACC 12 and appliance 18. The derivation of the shared secret requires the INITFCT command Loop 1 begins with the agent 20 sending a STARTACC command to the ACC 12 and, now that the ACC 12 has transitioned into the Functional State 84 (moving now to FIG. 66b), the ACC 12 can generate an ephemeral private key dei and an ephemeral public key Qei.

The agent 20 sends the command cmd[REQRESP] to the ACC 12 to obtain the ACC's public keys Qei and Qsi and the ACC 12 responds by providing such keys to the appliance 18 via the agent 20. The agent 20 logs the event and also provides the product ID associated with the ACC 12 and its public keys to the appliance 18. The appliance 18 logs this event, generates its own ephemeral key pair dej, Qej; generates the shared key kij; and searches FCT 1 by product ID to ensure that the feature associated with FCT 1 is intended to be used in that product. The appliance 18 then generates the CERTj using a combination of VER, CID, Qsj and the SIGcertj, in this case by concatenating such components. The UID, msgID, some padding, the FCT 1, and the static private key dsj of the appliance 18 are then combined (e.g. concatenated) and signed using the ECDSA_SIGN function to generate the signature SIGnij.

Figure 66B:
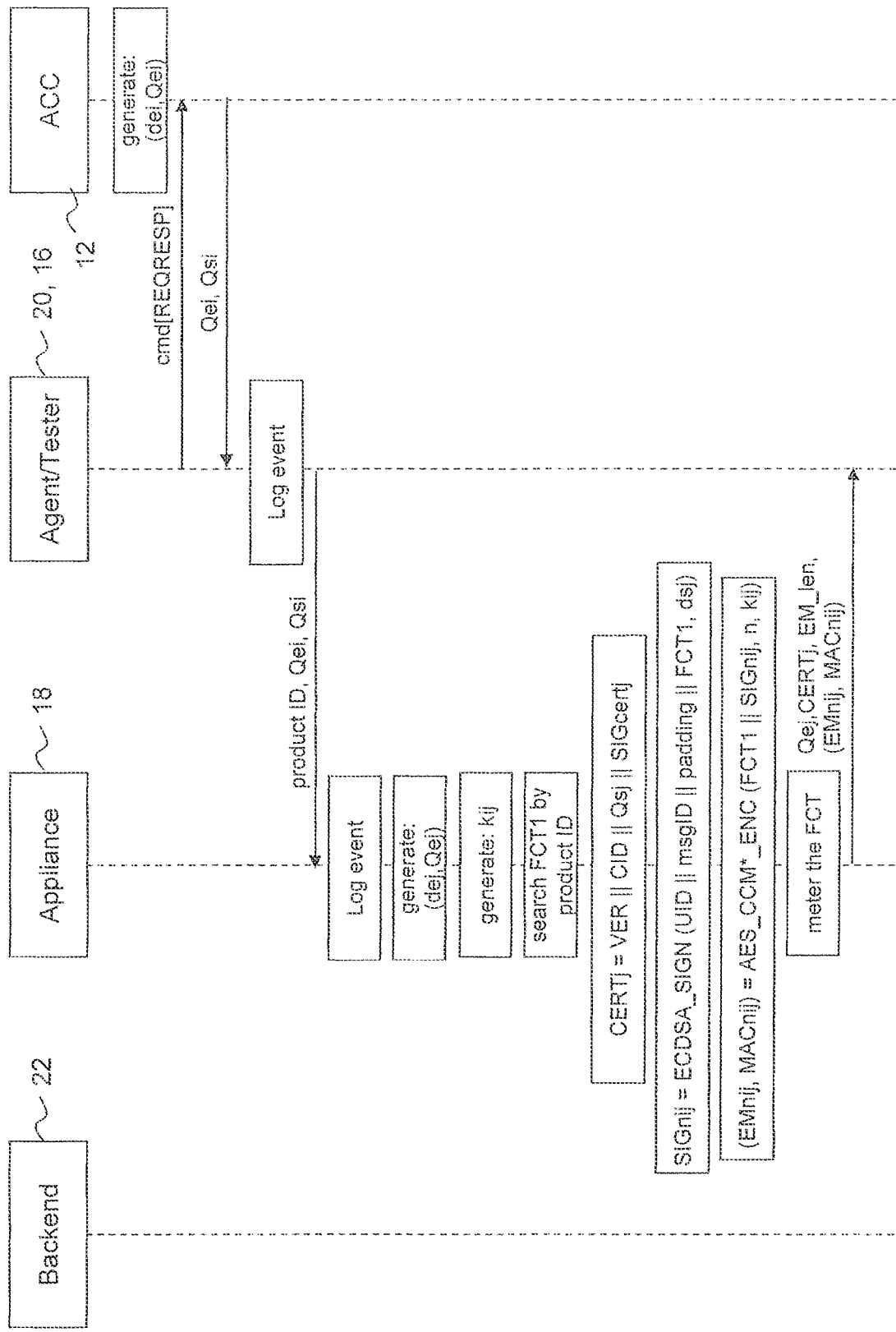
Figure 66C:
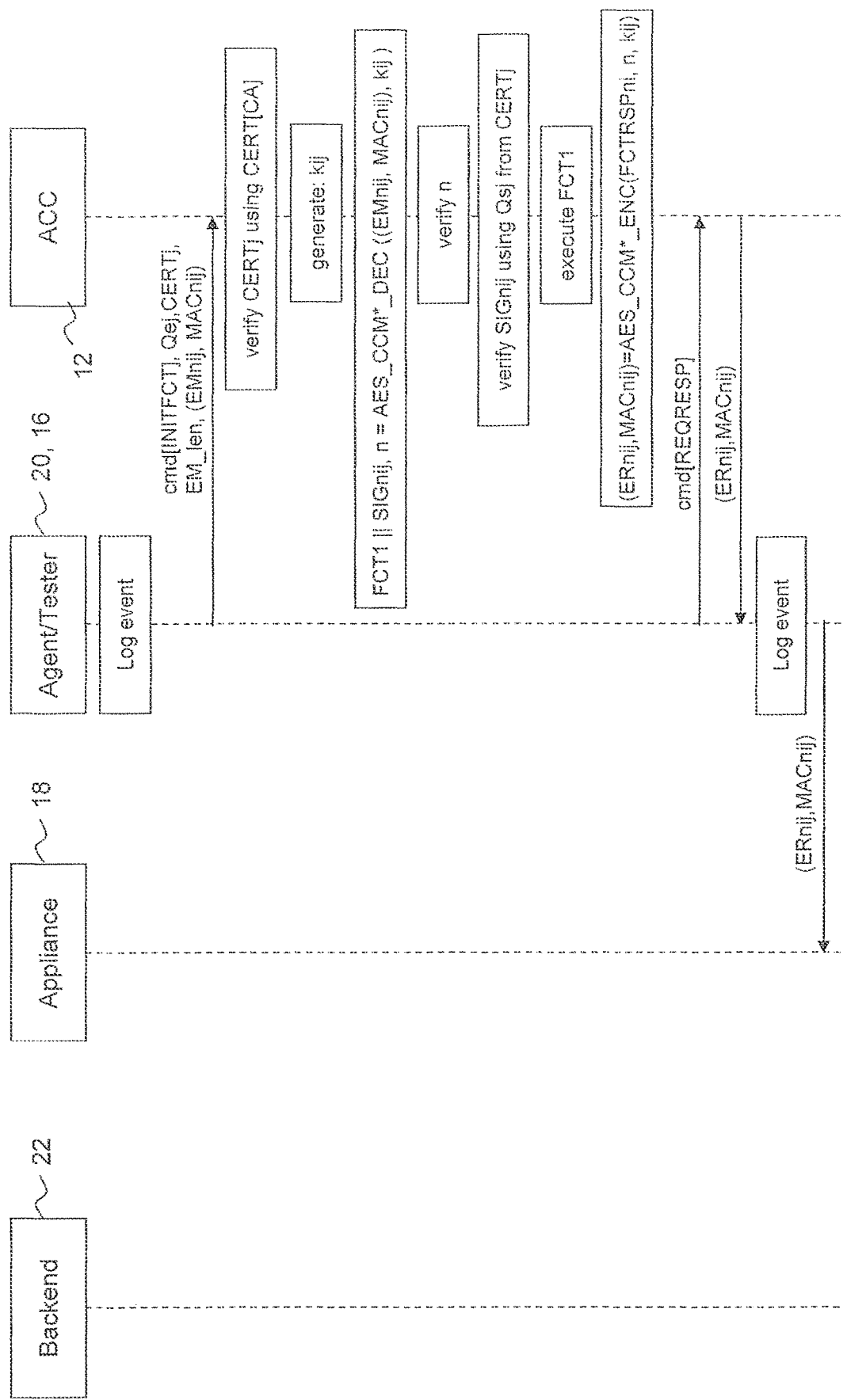
Figure 66D:
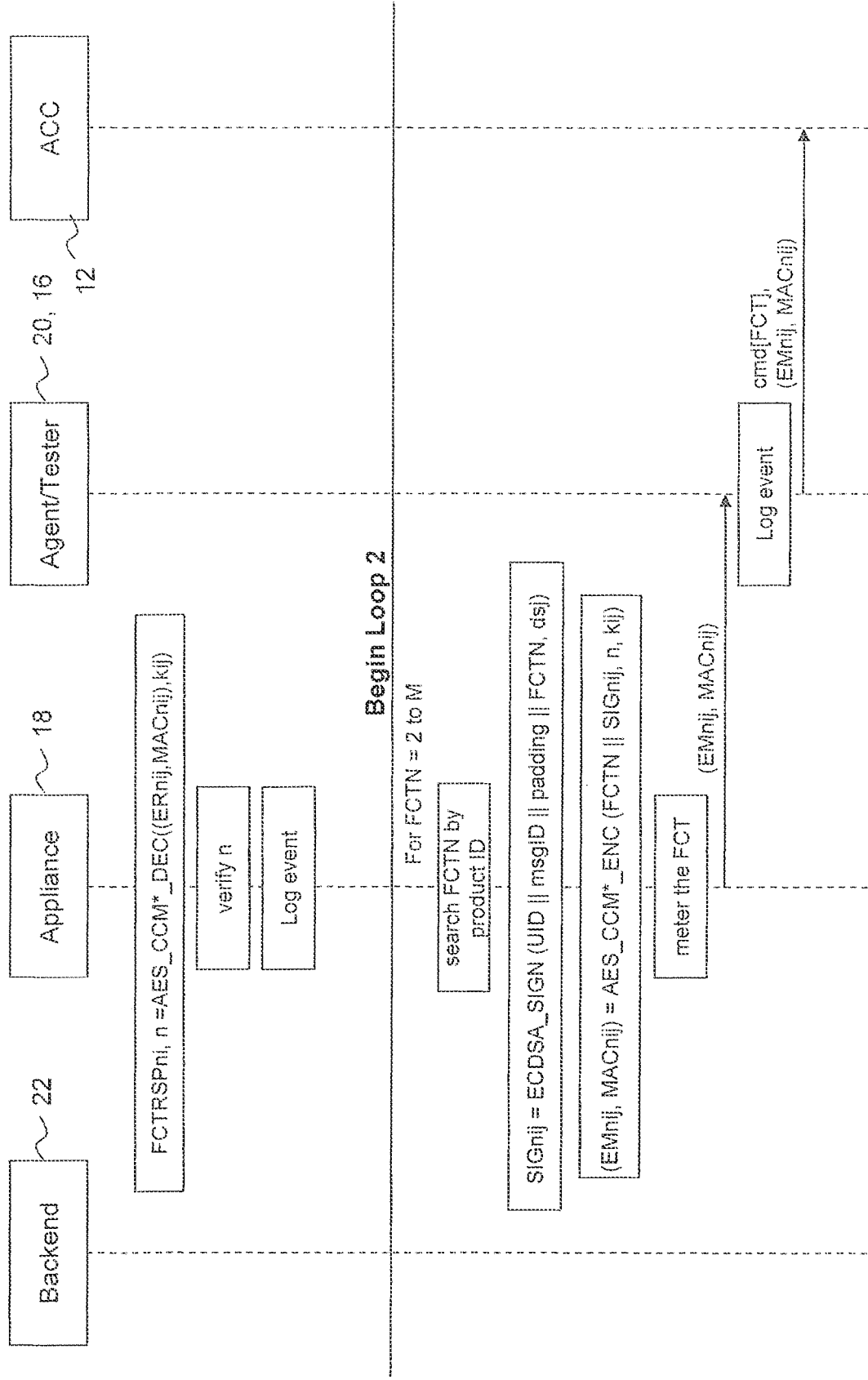
Figure 66E:
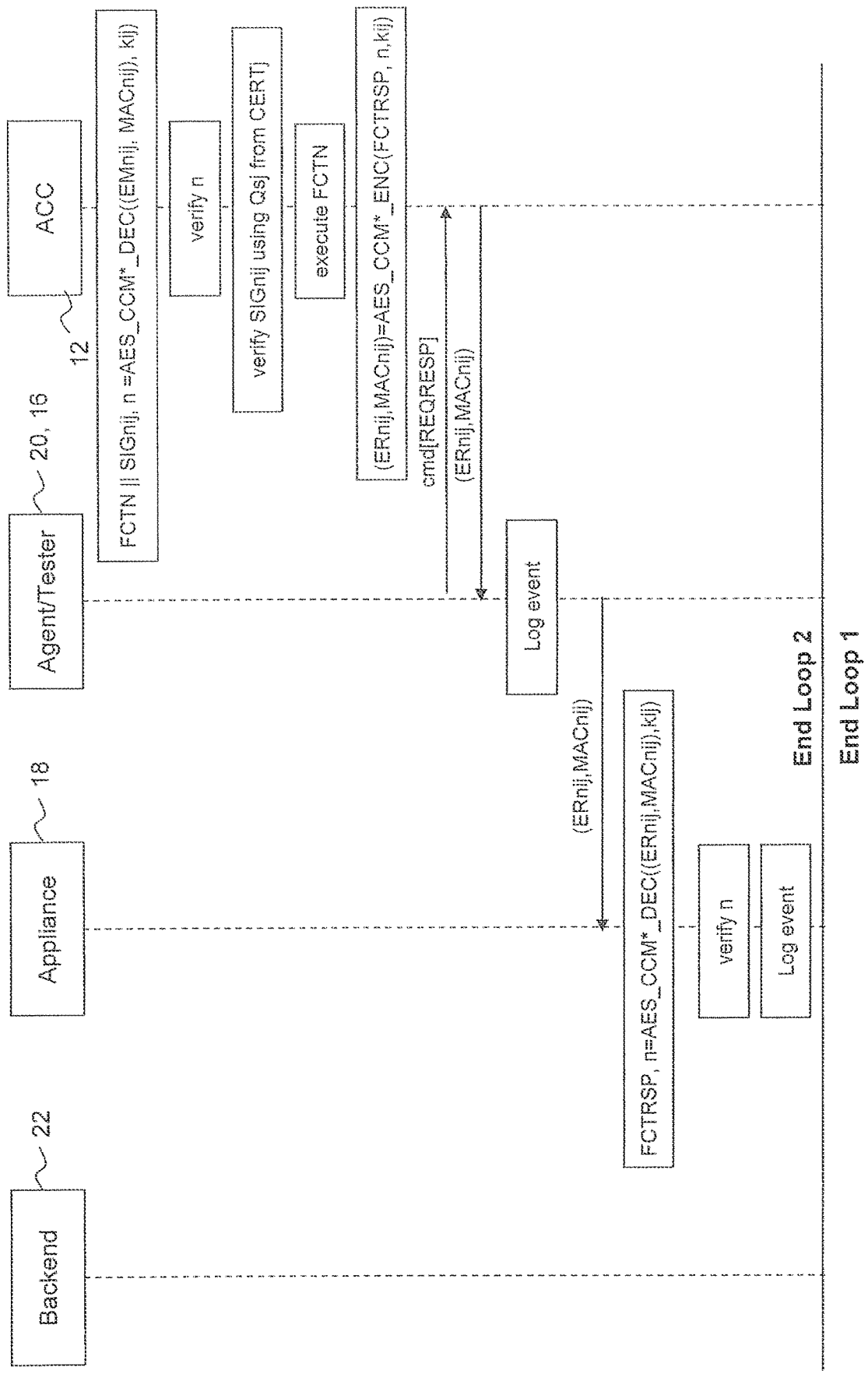

Using the FCT 1, the shared key kij, the nonce n, and SIGnij; (Enij, MACnij) is generated using the AES_CCM*_ENC function as shown in FIG. 66b. The FCT 50 is then metered to indicate consumption of one credit, and the ephemeral public key Qej, the appliance's certificate CERTj, the encrypted message/MAC pair (EMnij, MACnij), and EM_len are then sent to the ACC 12 via the agent 20 (moving now to FIG. 66c). The agent 20 would log this event and also send the command cmd[INITFCT] to the ACC 12 to begin the feature activation procedure.

The ACC 12 begins by verifying CERTj using CERT[CA] to thus verify that it is communicating with the proper appliance 18. Once CERTj is verified, the ACC 12 then generates the shared key kij. FCT1, SIGnij and the nonce n are then recovered using the AES_CCM*_DEC function, using the pair (EMnij, MACnij) and the shared key kij. The signature SIGnij is then verified using Qsj obtained from CERTj, and the nonce n is verified. The FCT 1 may then be executed. An encrypted response pair (ERnij, MACnij) is then generated using the AES_CCM*_ENC function, which takes the FCTRSPni, the nonce n, and the shared key kij as inputs. At some point, the agent 20 then sends the command cmd[REQRESP] to the ACC 12, from which the ACC 12 responds by providing the pair (ERnij, MACnij). The agent 20 logs the event and forwards (ERnij, MACnij) to the appliance 18 (moving now to FIG. 66d).

Figure 66F:
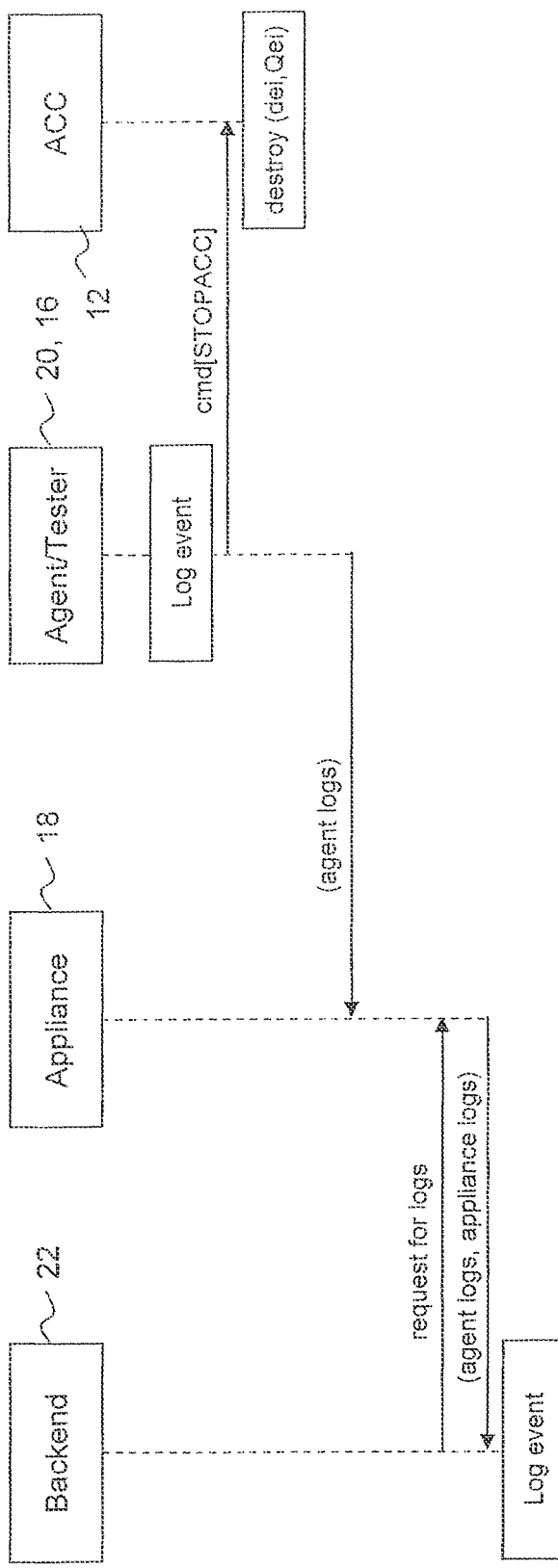

The appliance 18 then decrypts (ERnij, MACnij) using the shared key kij as an input into the AES_CCM*_DEC function to obtain the FCTRSPni message and the nonce n. The appliance then verifies n and logs the event. Next, an optional second loop, Loop 2 may then be executed for FCTN=2 to M additional FCTs 50 as required. Since the INITFCT command has already run, namely in the outer loop, Loop 1, the ephemeral keys and shared secret already exist in the ACC 12 and appliance 18, so further provisioning can be done with the FCT 50 command or multiple FCT 50 commands Once all FCT 50 commands have been executed Loop 2 finishes and then Loop 1 can repeat for a new ACC 12. It can be seen that for each additional FCT 50, that FCT 50, e.g. FCTN is searched by product ID and then the appliance 18 can proceed directly to the generation of SIGnij and the process described above repeated wherein various components already exchanged (e.g. Qej, CERTj) need not be sent again. Loop 2 and then Loop 1 ends on FIG. 66e. Turning now to FIG. 66f, the agent 20 then logs the event, issues the command cmd[STOPACC], at which time ACC 12 destroys the ephemeral keys dei, Qei. The agent 20 then sends its accumulated logs to the appliance 18. The backend 11 may then request the logs of the agent 20 and appliance 18 by requesting same from the appliance 18. The appliance 18 then sends the agent logs and the appliance logs to the backend 11, and the backend 11 can make a final log of this event.

Summary of Advantages

It can therefore be seen that the ACC 12 provides a hardware-based point of trust on the silicon die and using the system 10 described above, can be used to perform various tasks throughout the manufacturing process, as well as the entire product lifecycle, from manufacture through retail channels, to consumer consumption onto "end-of-life"; in a secure, reliable and auditable fashion. It can also be seen that the ACC 12 can be designed to provide the following capabilities: managing accesses to the NVM 62 and protecting certain regions of the NVM 62 from being accessed by unauthorized agents; self-contained generation of a UID used to uniquely identify the ACC 12; self-contained generation of keys used to open up a secure communication channel with a trusted server; ensuring that the enabling and disabling of features are done using trusted equipment by trusted sources; the ability to initiate or disable device self tests and health checks to make sure device has not been tampered with; and locking out the device whenever too many invalid commands are attempted.

Additionally, it may be noted that the ACC 12 can be extended to implement the following features: having the appliance 18 inject the UID instead of limiting the capabilities to only a self-generated UID; and securely booting and authenticating firmware upgrades through code signing.

As discussed, the ACC 12 is typically embedded and integrated in a SoC die, which is then packaged into a chip 40, which is mounted on a printed circuit board (PCB) 44 and eventually assembled into an electronic device 14 or "product". Every chip that has an ACC 12 in it can be registered and logged in the backend database as soon as it has passed wafer testing, which in turn can track every chip manufactured that underwent wafer testing. The ACC 12 may be designed to work in any electronics manufacturing test environment since the security features of the system 10 do not rely on the data link between the appliance 18 and ACC 12 to be trusted, but rather the security is built-in to the communication protocols cryptographically.

Furthermore, if an end-customer wants to reprogram the feature set of his/her particular device, there is the flexibility in the system 10 to allow him or her to connect to an appliance 18 using whatever device programmer 26 the equipment vendor deems fit and the appliance 18 can open up a secure channel by itself. As a result, the system 10 provides the ability to allow provisioning to occur in a completely secure, auditable manner anywhere—from the wafer fab to the ODM to the OEM to end user.

For the fabless chip manufacturer, this provisioning flexibility means that the fabless chip vendor can produce base chips and then have them provisioned at the distributor/ODM/OEM as they need specific features enabled for specific product builds. This greatly reduces the number of mask turns per year per product line saving significant cost. It reduces SKUs and simplifies supply chain management. It can eliminate grey market overstock sales by OEMs. Because the chips can be made so that they will not work unless they are programmed by system 10, this can eliminate illegal overproduction by foundries. In addition, the solution described herein enables aftermarket revenue from the end user directly to the fabless chip vendor—something that is difficult if not impossible using traditional programming solutions. With the system 10, if an end customer wishes to enables a feature contained on a chip (e.g., enhanced graphics capability from his video card), he can order that feature over the web and the chip vendor can issue the command to enable it remotely.

For a device vendor, the benefits can be similar—simplified SKUs and more efficient supply chain management. Just-in-time provisioning is possible to facilitate last minute changes in orders. Inventory of raw components is simplified with the system 10 because the components can be provisioned as needed for the current production. Revenue can also protected because hackers can't find ways to reprogram the devices in an unauthorized way.

Security Model

The objective of a security system such as the system 10 is to prevent an adversary from tampering with the device 14. If a threat is to be treated seriously, it would have to jeopardize the ACC 12 from performing its primary functions. To this end, it makes sense to consider the cost of an attack. There are two parts to the cost equation: 1) The initial effort to probe, research, and reverse engineer our design to have one modified chip; and 2) The incremental effort to repeat that attack on each successive chip if: a) the result of the initial effort was published and made public, and b) he has access the all the equipment necessary to perform the attack readily available.

An attack is considered to be too difficult and non-effective if the incremental cost to enact the attack is more than the retail cost of the chip, or if the attack is limited to a specific feature, then the retail cost of that feature. Thus, we can think of an attack as too difficult if: $[cost to repeat the exploitation]>$[value of all features of a device]. From this perspective, a break that requires modifying each chip individually using techniques involving FIBs or E-beams is not a concern because it is not cost effective. It can be appreciated that in many cases, the occasional single break is acceptable because it would not affect the manufacturer's revenue stream significantly. The most serious threat would be a system-wide break that would enable a hack to be published that would allow many people to repeat the steps with very little effort. However, if an adversary is to spend the time and effort and somehow manage to successfully defeat the first devices 14, it would not be much of a concern if he is unable to utilize the knowledge he gained on the first attempt and repeat on successive devices, in a cost effectively manner Basic Assumptions:

a) The ACC 12 is a closed system and all sensitive operations and data are private and inaccessible from other logic on the die.

b) The rest of the system 10 is secure and is not subject to tampering, so one would not be able to use it to facilitate hash collision finding.

c) The system in which the ACC 12 is embedded has taken the proper precautions such that it does not bypass the suggested/required security measures.

d) The ability to read or write static memory elements using e-beam or lasers and other similar techniques is possible, but it will be difficult and expensive.

e) The ability to read or write ephemeral memory elements outside of ACC 12 programming is outside the scope of our security model.

A list of techniques an adversary might physically attempt to break the system 10 have been identified. An adversary might utilize multiple methods in concert with each other to attempt a break, such as: Inter-chip probing (Oscilloscopes, Logic analyzer, Wafer/Die Testers); Board level JTAG debugger; Modifying ACC ROM 60 (content tempering/replacement at the mask level); Device removal and substitution—(replacing a chip that has the ACC 12 with a device that did not have an ACC 12, swapping one chip with another, connecting multiple chips in parallel); Off line NVM 62 modification; using a forged appliance 18 to communicate with the ACC 12; and injecting glitches on the power and clock signals while ACC 12 is running Such threats should be considered when implementing the system 10.

Additionally, a separate list of techniques an adversary might use to break the system's protocols has also been identified. An adversary would need to use one or more of the physical threats to attack the protocol: side-channel observation; message forging; message replay; message interleaving; passive attack; identity spoofing; key snooping; and timing attacks. As with physical threats, such threats should be considered when implementing the system 10.

Accordingly, the ACC 12 should provide secure tamper-free storage of the CA Public Key, the ACC 12 should provide secure tamper-free storage of ACC's static key pair, the ACC 12 should be able to enable the default set of features without a FCT 50 for a particular device 14, there should be a way to establish a confidential and authenticated channel between the ACC 12 and the appliance 18, there should be a way to issue authenticated commands with ability to verify message integrity from appliance 18 to ACC 12, the communication protocol between the ACC 12 and the appliance 18 should be designed such that it can prevent replay of commands and acknowledgements, steps taken to break one ACC 12 cannot be replicated cost-effectively nor does it lead to a systemic break of mass quantities of parts, and devices should have statistically unique private keys and public identifiers. However, if a very small number of chips, (est. <500 parts), end up with duplicated UIDs it should still be considered acceptable. These capabilities can be provided by implementing the embodiments discussed herein.

In general, there is provided a method for managing electronic assets, the method comprising: providing an appliance communicatively connectable to a controller, the appliance being configured to obtain electronic assets from the controller, the appliance providing communicative connections to a plurality of agents, the plurality of agents being configured to apply the electronic assets to devices; and enabling separate threads to be initiated on the appliance for the controller and for each agent, to enable the appliance to obtain assets from the controller and distribute the electronic assets to the agents in parallel threads.

There is also provided a computer readable medium comprising computer executable instructions that when executed cause a computing device to: provide an appliance communicatively connectable to a controller, the appliance being configured to obtain electronic assets from the controller, the appliance providing communicative connections to a plurality of agents, the plurality of agents being configured to apply the electronic assets to devices; and enable separate threads to be initiated on the appliance for the controller and for each agent, to enable the appliance to obtain assets from the controller and distribute the electronic assets to the agents in parallel threads.

There is also provided an appliance device comprising a processor, a memory, communicative connectability with a controller device, and communicative connectabililty with a plurality of agents, the appliance device being configured to: communicatively connect to a controller, obtain electronic assets from the controller, provide communicative connections to a plurality of agents, the plurality of agents being configured to apply the electronic assets to devices; and enable separate threads to be initiated on the appliance for the controller and for each agent, to enable the appliance to obtain assets from the controller and distribute the electronic assets to the agents in parallel threads.

There is also provided a method for managing electronic assets, the method comprising: providing a controller configured to obtain electronic assets and to provide the electronic assets to one or more appliances, the controller comprising one or more user interface (UI); and enabling separate threads to be initiated on the controller for each UI connection and for each of the one or more appliances to enable the controller to distribute the assets and handle UI interactions in parallel threads.

There is also provided a computer readable medium comprising computer executable instructions that when executed cause a computing device to: provide a controller configured to obtain electronic assets and to provide the electronic assets to one or more appliances, the controller comprising one or more user interface (UI); and enable separate threads to be initiated on the controller for each UI connection and for each of the one or more appliances to enable the controller to distribute the assets and handle UI interactions in parallel threads.

There is also provided a controller device comprising a processor, a memory, one or more user interfaces, and communicative connectability to a plurality of appliances, the controller device being configured to: obtain electronic assets and to provide the electronic assets to one or more appliances, the controller comprising one or more user interface (UI); and enable separate threads to be initiated on the controller for each UI connection and for each of the one or more appliances to enable the controller to distribute the assets and handle UI interactions in parallel threads.

There is also provided a method of controlling the distribution of electronic assets to a test application in a manufacturing process, the method comprising: providing a daemon application programming interface (API) on the test application to provide assets upon detecting a request therefor, and to obtain log data from the test application during testing; initiating a daemon in connection with the daemon API to obtain the log data from the daemon API and to provide the assets to the daemon API, the daemon hosting an agent API for communicating with an appliance remote to the test application; utilizing the agent API to obtain a batch comprising a plurality of assets and to provide one or more log reports containing the log data separately from the test application; and caching the assets to provide a quantity of the assets to the daemon API upon request therefrom to enable the daemon API to provide the assets to the test application thereby avoiding session establishment between the test application and the appliance for obtaining the electronic assets.

There is also provided a computer readable medium comprising computer executable instructions that when executed cause one or more computing devices to: provide a daemon application programming interface (API) on the test application to provide assets upon detecting a request therefor, and to obtain log data from the test application during testing; initiate a daemon in connection with the daemon API to obtain the log data from the daemon API and to provide the assets to the daemon API, the daemon hosting an agent API for communicating with an appliance remote to the test application; utilize the agent API to obtain a batch comprising a plurality of assets and to provide one or more log reports containing the log data separately from the test application; and cache the assets to provide a quantity of the assets to the daemon API upon request therefrom to enable the daemon API to provide the assets to the test application thereby avoiding session establishment between the test application and the appliance for obtaining the electronic assets.

There is also provided a method for securely communicating between remotely separated modules in an asset management system, the method comprising: providing at each module in the system, a hardware security module (HSM) for performing sensitive operations within a secure boundary; and providing in each HSM, a functional module comprising source code for implementing non-traditional operations to protect the operations within the secure boundary.

There is also provided a hardware security module (HSM) comprising: a secure boundary for performing sensitive operations; and a functional module comprising source code for implementing non-traditional operations to protect the operations within the secure boundary.

There is also provided a method for distributing electronic assets to devices, the method comprising: defining a first asset to be added to a device; defining a second asset to be added to the device; defining a product type and associating the first and second assets with the product type; and distributing the first and second assets together for each device associated with the product type.

There is also provided a computer readable medium comprising computer executable instructions that when executed cause a computing device to: define a first asset to be added to a device; define a second asset to be added to the device; define a product type and associating the first and second assets with the product type; and distribute the first and second assets together for each device associated with the product type.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the modules shown herein, or accessible or connectable thereto. Any application or module herein described may be implemented using computer readable/executable instructions that may be stored or otherwise held by such computer readable media.

Although the above system has been described with reference to certain specific embodiments, various modifications thereof will be apparent to those skilled in the art as outlined in the claims appended hereto.

The invention claimed is:

1. A method for distributing electronic assets to devices, the method comprising:
   defining, with a hardware processor, a first asset to be added to a device;
   defining, with the hardware processor, a second asset to be added to the device;
   defining, with the hardware processor, a product type and associating the first asset and the second asset with the product type; and
   distributing via a secure communication channel, by the hardware processor, the first asset and the second asset together to an asset control core (ACC) of the device associated with the product type, wherein the hardware processor is external to the device, and wherein the ACC is a hardware core having an ACC functional microcontroller that is embedded on an integrated circuit (IC) of the device and the ACC:
      provides a cryptographic security engine with self-contained generation of keys used to open up the secure communication channel with the hardware processor,
      provides a self-contained generation of a device ID (UID) that identifies the IC, and
      performs device feature activation or deactivation based on the first asset and the second asset that are received over the secure communication channel.

2. The method according to claim 1, wherein the first asset is one of a first serial number, a first key, and a first feature set.

3. The method according to claim 2, wherein the second asset is one of a second serial number, a second key, and a second feature set.

4. The method according to claim 1, wherein the second asset is one of a serial number, a key, and a feature set.

5. A non-transitory computer readable medium comprising computer executable instructions that when executed cause a computing device to:
   define, by executing with a hardware processor, a first asset to be added to a device;
   define, by executing with the hardware processor, a second asset to be added to the device;
   define, by executing with the hardware processor, a product type and associating the first asset and the second asset with the product type; and
   distribute via a secure communication channel, by executing with the hardware processor, the first asset and the second asset together to an asset control core (ACC) of the device associated with the product type, wherein the hardware processor is external to the device, and wherein the ACC is a hardware core having an ACC functional microcontroller that is embedded on an integrated circuit (IC) of the device and the ACC:
      provides a cryptographic security engine with self-contained generation of keys used to open up the secure communication channel with the hardware processor
      provides a self-contained generation of a device ID (UID) that identifies the IC, and
      performs device feature activation or deactivation based on the first asset and the second asset that are received over the secure communication channel.

6. The non-transitory computer readable medium according to claim 5, wherein the first asset is one of a first serial number, a first key, and a first feature set.

7. The non-transitory computer readable medium according to claim 6, wherein the second asset is one of a second serial number, a second key, and a second feature set.

8. The non-transitory computer readable medium according to claim 5, wherein the second asset is one of a serial number, a key, and a feature set.

9. A computer with a hardware processor for executing computer executable instructions that when executed cause the computer to:
   define, by executing with the hardware processor, a first asset to be added to a device;
   define, by executing with the hardware processor, a second asset to be added to the device;
   define, by executing with the hardware processor, a product type and associating the first asset and the second asset with the product type; and
   distribute via a secure communication channel, by executing with the hardware processor, the first asset and the second asset together to an asset control core (ACC) of the device associated with the product type, wherein the hardware processor is external to the device, and wherein the ACC is a hardware core having an ACC functional microcontroller that is embedded on an integrated circuit (IC) of the device and the ACC:
      provides a cryptographic security engine with self-contained generation of keys used to open up the secure communication channel with the hardware processor provides a self-contained generation of a device ID (UID) that identifies the IC, and performs device feature activation or deactivation based on the first asset and the second asset that are received over the secure communication channel.

10. The computer with the hardware processor to claim 9, wherein the first asset is one of a first serial number, a first key, and a first feature set.

11. The computer with the hardware processor to claim 10, wherein the second asset is one of a second serial number, a second key, and a second feature set.

12. The computer with the hardware processor to claim 9, wherein the second asset is one of a serial number, a key, and a feature set.

* * * * *